US006813777B1

(12) United States Patent
Weinberger et al.

(10) Patent No.: US 6,813,777 B1
(45) Date of Patent: Nov. 2, 2004

(54) TRANSACTION DISPATCHER FOR A PASSENGER ENTERTAINMENT SYSTEM, METHOD AND ARTICLE OF MANUFACTURE

(75) Inventors: Alan J. Weinberger, Monrovia, CA (US); Joseph J. Renton, Orange, CA (US); Rick Neugaubauer, Huntington Beach, CA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/085,245

(22) Filed: May 26, 1998

(51) Int. Cl.[7] .................................................. H04N 7/18

(52) U.S. Cl. .......................................... 725/76; 709/238

(58) Field of Search ................................ 709/238–244, 709/217–219; 725/75, 76, 77; 718/101

(56) References Cited

U.S. PATENT DOCUMENTS

| | | | |
|---|---|---|---|
| 3,602,891 | A | 8/1971 | Clark et al. |
| 3,811,127 | A | 5/1974 | Griffee et al. |
| 3,860,932 | A | 1/1975 | Hochbrueckner |
| 3,868,497 | A | 2/1975 | Vietor |
| 3,972,045 | A | 7/1976 | Perret |
| 3,997,718 | A | 12/1976 | Ricketts et al. |
| 4,047,175 | A | 9/1977 | Taira et al. |
| 4,058,837 | A | 11/1977 | Muntz |
| 4,099,780 | A | 7/1978 | Schmidhuber |
| 4,118,733 | A | 10/1978 | Sarson et al. |
| 4,187,760 | A | 2/1980 | Holt |
| 4,281,352 | A | 7/1981 | Hoffman |
| 4,283,740 | A | 8/1981 | Okada |
| 4,290,083 | A | 9/1981 | Collender |
| 4,352,200 | A | 9/1982 | Oxman |

(List continued on next page.)

FOREIGN PATENT DOCUMENTS

| | | |
|---|---|---|
| DE | 3426803 | 1/1986 |
| EP | 0230280 | 7/1987 |

(List continued on next page.)

*Primary Examiner*—John Miller
*Assistant Examiner*—Scott Beliveau
(74) *Attorney, Agent, or Firm*—Nathan D. Jensen; Kyle Eppele

(57) ABSTRACT

A computer is used to manage communication over a network between one or more network addressable units and a plurality of physical devices of a passenger entertainment system. The system is configured and operated using software to provide passenger entertainment services including audio and video on-demand, information dissemination, product and service order processing, video teleconferencing and data communication services. The system includes a system server and a network supporting multiple computer processors. The processors and the server comprise application software that control telephony applications and network services. The server is coupled by way of the network to physical devices of the system. The server comprises software that instantiates a network addressable unit server that interfaces to one or more network addressable units, that instantiates a services server that interfaces to one or more service clients that provide services of the passenger entertainment system, and that instantiates a router and one or more mail slots comprising a lookup table that identify each of the clients. Data comprising a network routing address and a physical device type are used to access the lookup table to determine message destinations. The respective servers interface to their clients by way of named pipes that translate messages from a first format to a second format. The server also comprises software that instantiates intranodal thread processors that route messages between processes on the physical devices and the one or more service clients to route services of the passenger entertainment system to the processes on the physical devices.

18 Claims, 69 Drawing Sheets

U.S. PATENT DOCUMENTS

| | | | | |
|---|---|---|---|---|
| 4,393,329 A | | 7/1983 | Lehnert | |
| 4,427,038 A | | 1/1984 | Oesterle et al. | |
| 4,428,078 A | | 1/1984 | Kuo | |
| 4,433,344 A | | 2/1984 | Gardin et al. | |
| 4,465,907 A | | 8/1984 | Minear et al. | |
| 4,472,607 A | | 9/1984 | Houng | |
| 4,475,196 A | | 10/1984 | La Zor | |
| 4,490,117 A | | 12/1984 | Parker | |
| 4,513,315 A | | 4/1985 | Dekker et al. | |
| 4,521,021 A | | 6/1985 | Dixon | |
| 4,521,806 A | | 6/1985 | Abraham | |
| 4,554,579 A | | 11/1985 | Citta | |
| 4,554,993 A | | 11/1985 | Houng | |
| 4,573,072 A | | 2/1986 | Freeman | |
| 4,584,603 A | | 4/1986 | Harrison | |
| 4,591,906 A | | 5/1986 | Morales-Garza et al. | |
| 4,630,821 A | | 12/1986 | Greenwald | |
| 4,647,980 A | | 3/1987 | Steventon et al. | |
| 4,649,570 A | | 3/1987 | Terbrack et al. | |
| 4,684,981 A | | 8/1987 | Toyoshima et al. | |
| 4,692,569 A | | 9/1987 | Winner | |
| 4,765,481 A | | 8/1988 | Walsh et al. | |
| 4,835,604 A | | 5/1989 | Konda et al. | |
| 4,853,555 A | | 8/1989 | Wheat | |
| 4,853,764 A | | 8/1989 | Sutter | |
| 4,866,515 A | | 9/1989 | Tagawa et al. | |
| 4,866,787 A | | 9/1989 | Olesen | |
| 4,868,577 A | | 9/1989 | Wingard | |
| 4,896,209 A | | 1/1990 | Matsuzaki et al. | |
| 4,918,535 A | | 4/1990 | Grabis et al. | |
| 4,945,563 A | | 7/1990 | Horton et al. | |
| 4,975,696 A | | 12/1990 | Salter, Jr. et al. | |
| 4,997,233 A | | 3/1991 | Sharon | |
| 4,999,729 A | | 3/1991 | Stifter | |
| 5,001,555 A | | 3/1991 | Park | |
| 5,024,398 A | | 6/1991 | Riedinger et al. | |
| 5,035,005 A | | 7/1991 | Hung | |
| 5,051,822 A | | 9/1991 | Rhoades | |
| 5,179,447 A | | 1/1993 | Lain | |
| 5,181,107 A | | 1/1993 | Rhoades | |
| 5,193,208 A | | 3/1993 | Yokota et al. | |
| 5,208,590 A | | 5/1993 | Pitts | |
| 5,214,505 A | | 5/1993 | Rabowsky et al. | |
| 5,218,167 A | | 6/1993 | Gasque, Jr. | |
| 5,220,419 A | | 6/1993 | Sklar et al. | |
| 5,289,272 A | | 2/1994 | Rabowsky et al. | |
| 5,301,245 A | | 4/1994 | Endoh | |
| 5,319,452 A | | 6/1994 | Funahashi | |
| 5,363,121 A | * | 11/1994 | Freund | 718/101 |
| 5,363,433 A | | 11/1994 | Isono | |
| 5,370,306 A | | 12/1994 | Schulze et al. | |
| 5,373,324 A | | 12/1994 | Kuroda et al. | |
| 5,374,104 A | | 12/1994 | Moore et al. | |
| 5,404,567 A | | 4/1995 | DePietro et al. | |
| 5,425,516 A | | 6/1995 | Daines | |
| 5,430,492 A | | 7/1995 | Dambacher | |
| 5,437,464 A | | 8/1995 | Terasima et al. | |
| 5,440,337 A | | 8/1995 | Henderson et al. | |
| 5,442,652 A | | 8/1995 | Jacobson | |
| 5,463,656 A | | 10/1995 | Polivka et al. | |
| 5,465,384 A | | 11/1995 | Bejan et al. | |
| 5,480,158 A | | 1/1996 | Schulze et al. | |
| 5,481,478 A | | 1/1996 | Palmieri et al. | |
| 5,481,757 A | | 1/1996 | Mihara et al. | |
| 5,510,900 A | | 4/1996 | Shirochi et al. | |
| 5,524,272 A | | 6/1996 | Podowski et al. | |
| 5,526,035 A | | 6/1996 | Lappington et al. | |
| 5,532,753 A | | 7/1996 | Buchner et al. | |
| 5,532,760 A | | 7/1996 | Inoue | |
| 5,537,152 A | | 7/1996 | Ishikawa | |
| 5,539,449 A | | 7/1996 | Blahut et al. | |
| 5,539,657 A | | 7/1996 | Utsumi et al. | |
| 5,546,050 A | | 8/1996 | Florian et al. | |
| 5,547,248 A | | 8/1996 | Marechal | |
| 5,555,021 A | | 9/1996 | Igarashi | |
| 5,565,908 A | | 10/1996 | Ahmad | |
| 5,568,484 A | | 10/1996 | Margis | |
| 5,581,270 A | | 12/1996 | Smith et al. | |
| 5,584,047 A | | 12/1996 | Tuck | |
| 5,596,647 A | | 1/1997 | Wakai et al. | |
| 5,600,717 A | | 2/1997 | Schneider et al. | |
| 5,608,535 A | | 3/1997 | Yoshida et al. | |
| 5,610,822 A | | 3/1997 | Murphy | |
| 5,617,331 A | | 4/1997 | Wakai et al. | |
| 5,641,319 A | | 6/1997 | Stoel et al. | |
| 5,651,050 A | | 7/1997 | Bhagat et al. | |
| 5,761,507 A | * | 6/1998 | Govett | 718/101 |
| 6,529,932 B1 | * | 3/2003 | Dadiomov et al. | 718/101 |

FOREIGN PATENT DOCUMENTS

| | | |
|---|---|---|
| EP | 0277014 | 8/1988 |
| EP | 0457673 | 11/1991 |
| EP | 0569225 | 11/1993 |
| EP | 0647914 | 4/1995 |
| JP | 1291281 | 5/1988 |
| JP | 63202194 | 8/1988 |
| JP | 63208995 | 8/1988 |
| JP | 63209333 | 8/1988 |
| JP | 63215287 | 9/1988 |
| JP | 1257640 | 10/1989 |
| JP | 1300719 | 12/1989 |
| JP | 1301430 | 12/1989 |
| JP | 1301431 | 12/1989 |
| JP | 2013490 | 1/1990 |
| JP | 2148927 | 6/1990 |
| JP | 2149196 | 6/1990 |
| JP | 2155853 | 6/1990 |
| JP | 2171399 | 7/1990 |
| JP | 2179567 | 7/1990 |
| JP | 2304791 | 12/1990 |
| JP | 6111124 | 4/1994 |
| JP | 7135500 | 5/1995 |
| JP | 7202918 | 8/1995 |
| JP | 9074551 | 3/1997 |
| WO | WO90/15508 | 12/1990 |
| WO | WO93/16558 | 8/1993 |
| WO | WO94/13105 | 6/1994 |
| WO | WO94/28679 | 8/1994 |
| WO | WO95/12853 | 5/1995 |
| WO | WO96/19897 | 6/1996 |

* cited by examiner

QAM Audio

| Video Announcement Destination | Video Announcement Video | Video Announcement Audio |
| --- | --- | --- |
| Passenger Seat | SDU | Headphones |
| Cabin | Overhead Displays | Cabin Audio Speakers |
| Passenger Seat and Cabin | SDU and Overhead Display | Headphones and Cabin Audio Speakers |

Fig. 10

| | |
|---|---|
| CFS | 0 – 1 |
| PAT | 0 – 1 |
| Printer | 0 – 1 |
| PESC-A | 0 – 2 |
| PESC-V | 0 – 1 |
| VMOD | 1 – 2 |
| TU | 0 - 32 (2 columns 16 TUs per column) |
| DU | 0 - 96 (3 per TU) |
| ADB | 1 - 8 |
| ADB Local Area Controller (ALAC) | 0 - 5 (1 per LAC on 747-400) |
| AVU* | 1 - 7 (three-wide per ADB seat column)<br>1- 8 (two-wide per ADB seat column) |
| SDU (seats)* | 3 maximum per AVU |
| PCU (seats)* | 3 maximum per AVU |
| OEB | 0 - 30 / ADB overhead column<br>(up to 3 columns per ADB) |
| FDB | 0 - 40 |

Fig. 13

| | |
|---|---|
| Game Order, Payment, and Download | 10 seats/15 min |
| Movie Order Payment and Delivery | 15 seats/min |
| Passenger Service Requests | 15 seats/min |

Fig. 14

| Item | PESC | ADB | AVU | DU | CFS | PAT | VR | Printer | PCU |
|---|---|---|---|---|---|---|---|---|---|
| BIT Testing | 1 min | 1 min | 1 min | 1 min | 1 min | 1 min | 1 min | 1 min | 1 min |
| BITE Testing | 3 min | 3 min | N/A | N/A | N/A | N/A | N/A | N/A | N/A |

Definitions:

BIT Testing Duration = Amount of time required for LRU to complete comm. tests and report on errors BITE Testing Duration = Amount of time required for LRU to complete its internal BITE testing

Fig. 16

| Item | Requirement |
|---|---|
| Source Impedance | Less than 50 ohms |
| Load Impedance | 600 ohms nominal (unbalanced) |
| Output Level | 775 mV rms at 1 KHz |
| Audio Bandwidth | 50 Hz--15 KHz |

Fig. 14a

| | PAT | PRINTER | CFS | VR | PVIS | VMOD | AR | PESC-A Primary | PESC-A Second. | PESC-V | TU | DU | ADB | ALAC | FJB | AVU | SDU DUS | SDU UEB | SDU DUC | PCU |
|---|---|---|---|---|---|---|---|---|---|---|---|---|---|---|---|---|---|---|---|---|
| PAT | | | | | | | | | | | | | | | | | | | | |
| Printer | | | | | | | | | | | | | | | | | | | | |
| CFS | X | X | | X | | | X | X | | | | | | | | | | | | |
| VR | | | | | | | | | | | | | | | | | | | | |
| PVIS | | | | | | | | | | | | | | | | | | | | |
| VMOD | | | | | | | | | | | | | | | | | | | | |
| VR | | | | | | | | | | | | | | | | | | | | |
| PESC-A Primary | | | X | | | | | | X | X | | | X | X | | | | | | |
| PESC-A Secondary | | | | | | | | X | | X | | | | | | | | | | |
| PESC-V | X | | | | | | | X | | | X | | | | | | | | | |
| TU | | | | | | | | | | | | | | | | | | | | |
| DU | | | | | | | | | | | | X | | | | | | | | |
| ADB | | | X | | | | | X | | | | | X | X | | X | | | | |
| ALAC | | | X | | | | | X | | | | | X | | | | | | | |
| FJB | | | | | | | | | | | | | | | | | | | | |
| AVU | | | | | | | | | | | | | | | | | X | X | X | X |
| SDU DUS | | | | | | | | | | | | | | | | | | | | |
| SDU UEB | | | | | | | | | | | | | | | | | | | | |
| SDU DUC | | | | | | | | | | | | | | | | | | | | |
| PCU | | | | | | | | | | | | | | | | | | | | |

Fig. 20

EXAMPLE SCENARIO

At the "end" of each flight, the four event logs and the SQL Errorlog are "archived" on the CFS hard disk. When the "Offload" is performed, the FLTSALES.CSV file containing the point-of-sale data is generated and then "zipped" together with the corresponding "archived" logs for each flight that has not been previously "Offloaded".

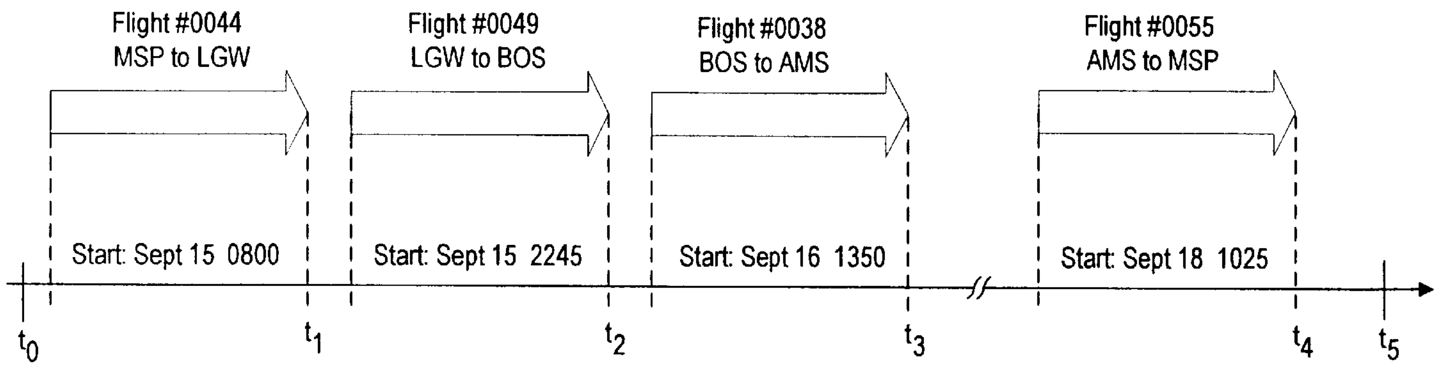

$t_1$ = Archive Files: 09150800.LGW $t_2$ = Archive Files: 09152245.BOS $t_3$ = Archive Files: 09161350.AMS $t_4$ = Archive Files: 09181025.MSP $t_5$ = "Data Offload"
Zip File 1: 0044LGW.258
Zip File 2: 0049BOS.258
Zip File 3: 0038AMS.259
Zip File 4: 0055MSP.261

A 294,952 byte event log zips down to 18,658 bytes. A flight with 1500 orders (600 cash, 900 credit card) generates an 184,842 byte data file, which zips down to 2,373 bytes. Allowing 80 Kb for the four event logs [note: they should actually be much less since they are cleared out each flight] and 5 Kb for the data file, this means that 16 flights could be "Offloaded" on a single diskette. It took 10 seconds to "archive" the four event logs and 1 min 10 seconds to "Offload" to the hard drive.

Fig. 21

TO CREATE OFFLOAD ZIP FILE

CFS

Call MakeOffloadFile
(in: FlightID)

(1) exec CalcZipFileName stored_procedure
( in: FlightID)
(Out: ZIP FILE NAME)
calculates ZIP FILE NAME for this Flight:
Format: FFFFFAAA.JJJ
where: FFFFF = Flight Number
AAA = Arrival Airport
JJJ = Julian Date (2) Call DUMP_POS.EXE
(in: FlightID)
Reads the CFS database and creates the
FLTSALES.CSV file on CFS ARCHIVE (3) exec CalcArchiveFileName stored_procedure
( in: FlightID)
(out: ArchiveFileName)
calculates ARCHIVE FILE NAME for this Flight:
Format: MMDDhhmm.AAA
where: MM = Month of Flight
DD = Day of Flight
hh = Hour of Flight
mm = minute of Flight
AAA = Arrival Airport (4) Call PKZIP.EXE
( in: ZIP FILE NAME)
( in: ArchiveFileName)
(out: FLTSALES.CSV)
zips FLTSALES.CSV and the four event logs for
this Flight, and stores it in CFS ARCHIVE

Fig. 22

TO TRANSFER OFFLOAD ZIP FILE

CFS

Call FetchOffloadFile
(in: FlightID)

(1) exec CalcZipFileName stored_procedure
( in: FlightID)
(Out: ZIP FILE NAME)
calculates ZIP FILE NAME for this Flight:
Format: FFFFFAAA.JJJ
where: FFFFF = Flight Number
AAA = Arrival Airport
JJJ = Julian Date (2) Verify enough disc space exists to put this offload file on the destination floppy (3) Copy the Offload file from the CFS Archive directory to the PAT floppy drive (4) Reset the Offload Flag for this flight in the Flight database table.

(5) Delete the Offload file from the CFS Archive directory.

Fig. 23

TO PURGE ARCHIVE DATA

CFS (1) [SetWeightOffWheels] API executable called by CabinService (a) Call [GetDate] SQL built-in function
Returns Timestamp that becomes
the *WeightOffWheelsTime* for this flight.

(b) exec ["Update Flight"] SQL statement
(in: FlightID of current flight)
(in: Timestamp)
Updates the *Flight* database table for this flight.
triggers [Flight_UTrig] SQL Update Trigger Call [PurgeOldArchives] stored procedure (A) Cascade Deletes from the Flight database table that exceed the ArchivePeriod or ArchiveLimit (B) Call [PurgeAudioDetail] stored procedure (C) Call [PurgeCartInventory] stored procedure (D) Call [PurgeExchange] stored procedure (E) Call [PurgeGameDetail] stored procedure (F) Call [PurgePrice] stored procedure (G) Call [PurgeProductEffectivity] stored procedure (H) Call [PurgeVideo] stored procedure (I) Call [CalcArchiveFileName] stored procedure
( in: FlightID)
(out: ArchiveFileName)

(J) Call [CalcZipFileName] stored procedure
( in: FlightID)
(out: OffloadFileName)

(K) Call [PARCHIVE.EXE] executable
(in: ArchiveFileName)
(in: OffloadFileName)
Deletes the indicated files from the CFS hard drive ACS Database
Format for individual SEB's
This file is constructed by ADBs/ACCs

| OEB No. | Seat Row Id (01-97,C1,C2) | Col Id | Reading Lamps Lamp-1 | Lamp-2 | Lamp-3 | Lamp-4 | Row Call Lamp-1 | Lamp-2 |
|---|---|---|---|---|---|---|---|---|
| 1 | 05 | OR | 12v | 12v | - | - | 28v | - |
| 2 | 04 | OR | 12v | 12v | - | - | 28v | - |
| 3 | 03 | OR | 12v | 12v | - | - | 28v | - |
| 4 | 02 | OR | 12v | 12v | - | - | 28v | - |
| 5 | 01 | OR | 12v | 12v | - | - | 28v | - |
| 6 | 01 | OL | - | 12v | 12v | - | 28v | - |
| 7 | 02 | OL | - | 12v | 12v | - | 28v | - |
| 8 | 03 | OL | - | 12v | 12v | - | 28v | - |
| 9 | 04 | OL | - | 12v | 12v | - | 28v | - |

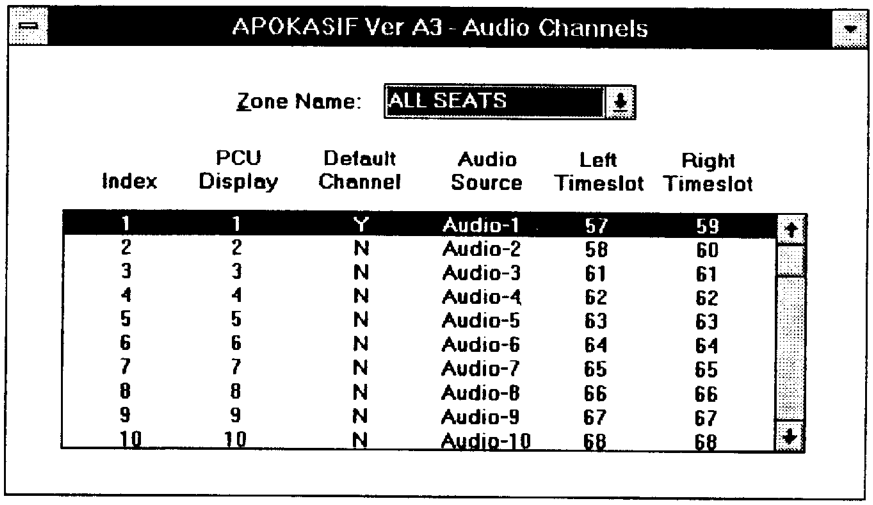

| Index | PCU Display | Default Channel | Audio Source | Left Timeslot | Right Timeslot |
|---|---|---|---|---|---|
| 1 | 1 | Y | Audio-1 | 57 | 59 |
| 2 | 2 | N | Audio-2 | 58 | 60 |
| 3 | 3 | N | Audio-3 | 61 | 61 |
| 4 | 4 | N | Audio-4 | 62 | 62 |
| 5 | 5 | N | Audio-5 | 63 | 63 |
| 6 | 6 | N | Audio-6 | 64 | 64 |
| 7 | 7 | N | Audio-7 | 65 | 65 |
| 8 | 8 | N | Audio-8 | 66 | 66 |
| 9 | 9 | N | Audio-9 | 67 | 67 |
| 10 | 10 | N | Audio-10 | 68 | 68 |

Fig. 26-49

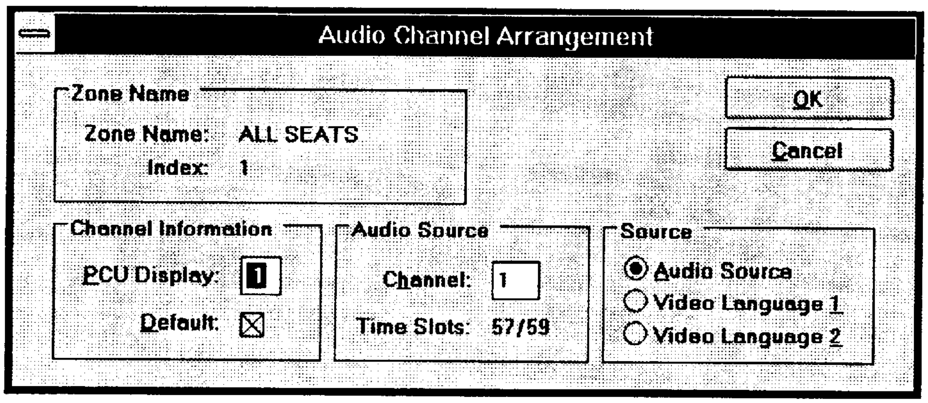

Fig. 26-50

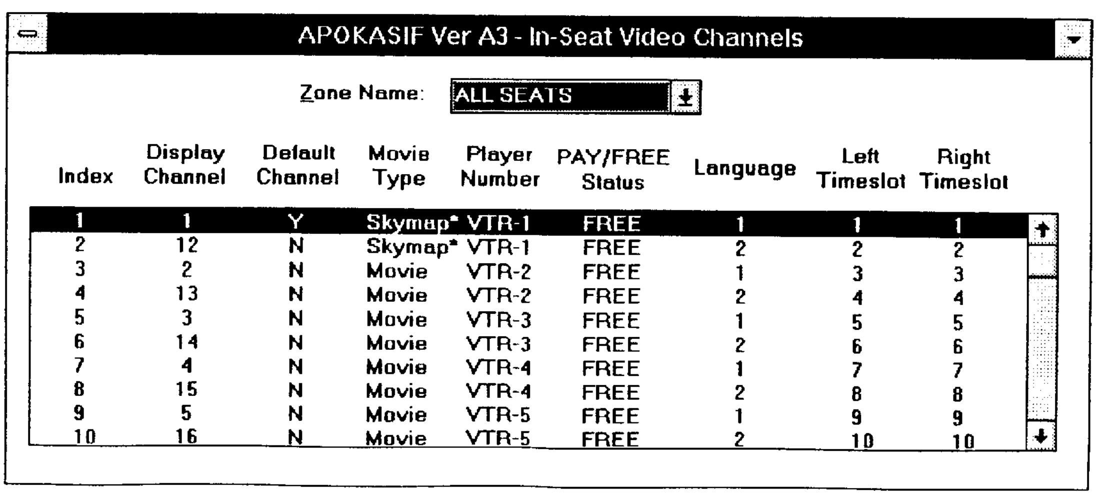

| Index | Display Channel | Default Channel | Movie Type | Player Number | PAY/FREE Status | Language | Left Timeslot | Right Timeslot |
|---|---|---|---|---|---|---|---|---|
| 1 | 1 | Y | Skymap* | VTR-1 | FREE | 1 | 1 | 1 |
| 2 | 12 | N | Skymap* | VTR-1 | FREE | 2 | 2 | 2 |
| 3 | 2 | N | Movie | VTR-2 | FREE | 1 | 3 | 3 |
| 4 | 13 | N | Movie | VTR-2 | FREE | 2 | 4 | 4 |
| 5 | 3 | N | Movie | VTR-3 | FREE | 1 | 5 | 5 |
| 6 | 14 | N | Movie | VTR-3 | FREE | 2 | 6 | 6 |
| 7 | 4 | N | Movie | VTR-4 | FREE | 1 | 7 | 7 |
| 8 | 15 | N | Movie | VTR-4 | FREE | 2 | 8 | 8 |
| 9 | 5 | N | Movie | VTR-5 | FREE | 1 | 9 | 9 |
| 10 | 16 | N | Movie | VTR-5 | FREE | 2 | 10 | 10 |

Fig. 26-51

*Control Center Runtime Software Architecture (PAT and CFS)*

The Seat Network Addressable Units Function and Data Paths

The VCP Network Addressable Unit Function and Data Paths

The TestPort Network Addressable Unit Function and Data Paths

The Services Function and Data Paths

TRANSACTION DISPATCHER FOR A PASSENGER ENTERTAINMENT SYSTEM, METHOD AND ARTICLE OF MANUFACTURE

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

The present invention relates to providing entertainment to passengers in a vehicle, and more specifically, to systems, methods and articles of manufacture that provide for a networked passenger entertainment system that integrates audio, video, passenger information, product ordering and service processing, communications, and maintainability features, and permits passengers to selectively order or request products and services, receive video, audio and game data for entertainment purposes, and communicate with other passengers and computers on- and off-board the aircraft, and which thereby provides for passenger selected delivery of content over a communication network.

BACKGROUND OF THE INVENTION

The assignee of the present invention manufactures in-flight aircraft passenger entertainment systems. Such systems distribute audio and video material to passengers derived from a variety of sources. For example, such systems provide passengers with audio generated from audio tape players, movies derived from video tape players, and interactive services such as games, shopping and telecommunications. A variety of inventions have been patented by the assignee of the present invention and others relating to in-flight aircraft entertainment systems and their components. Certain of these prior art systems and components are summarized below.

U.S. Pat. No. 3,795,771 entitled "Passenger Entertainment/Passenger Service and Self-Test System" discloses a time multiplexed passenger entertainment and service combined system suitable for distribution throughout compartments of super aircraft. Common power supplies, cabling, and boxes, and hybrid microelectronics and/or medium or large scale MOSFET integrated circuit chips are employed. A main multiplexer receives passenger address or tape deck analog signals and converts them to a pulse code modulated digital bit stream which is time shared between channels. A coaxial cable transmits the bit stream to compartment submultiplexers. Each submultiplexer receives the digital bit stream, optionally inserts into the bit stream bits representing analog-to-digital converted movie audio or compartment introduced passenger address and distributes the data stream along four columns of seat group units on individual column coaxial cables. At each seat group unit a demultiplexer of a seat group demultiplexer/encoder converts the bit stream into the original analog signals, amplifiers the analog signals and drives individual seat transducers for passenger listening.

A passenger control unit provides channel and volume level selection. The passenger service system provides control functions comprising reading light, stewardess call (aisle and control panel lights and chimes). The service system comprises a section timer/decoder to generate binary logic pulses which are transmitted by cable sequentially down and up the seat columns from seat group unit to seat group unit. A similar cable connects the corresponding overhead unit containing the reading lights, etc. to the section timer/decoder. The seat encoder of each seat group demultiplexer/encoder receives digital interrogating signals, processes them relative to switch positions determined by the passenger and sends out results to the section timer/decoder. The overhead decoder of each seat group receives the retransmitted digital signals from the section timer/decoder and performs switching functions conforming to seat encoder commands. The system incorporates a self-test subsystem comprising a test signal generator and circuits operating in conjunction with the entertainment and service system circuits.

U.S. Pat. No. 5,289,272 entitled "Combined Data, Audio and Video Distribution System in Passenger Aircraft" discloses a passenger aircraft video distribution system that distributes modulated RF carrier signals from a central signal source to be used at each passenger seat. The carriers are modulated to contain audio, video also other digital data, such as graphics, and slide shows and the like. Analog video signals from the video source are modulated on individually discrete carriers in the range of 54 to 300 megahertz. Audio information, including audio sound channels and the video audio, are digitized and combined with digital data in a combined serial bit stream that is multiplexed, and then modulated on an RF carrier having a frequency sufficiently above the frequency band of the video signals so that the resulting spectrum of the modulated audio RF carrier does not interfere with the modulated video carriers. The RF carrier signals are combined and distributed to individual seats. The modulated audio carrier is separated from the video carriers at each seat or each group of seats and then demodulated and demultiplexed for selection at each individual seat of a chosen audio channel.

U.S. Pat. No. 4,866,515 entitled "Passenger Service and Entertainment System for Supplying Frequency-Multiplexed Video, Audio, and Television Game Software Signals to Passenger Seat Terminals" discloses a service and entertainment system for transmitting video signals, audio signals and television game software signals from a central transmitting apparatus to each of a plurality of terminals mounted at respective passenger seats in an aircraft, or at respective seats in a stadium, or theater, or the like. The video signals, audio signals and television game software signals are frequency-multiplexed and then transmitted to the terminals, so that desired ones of the frequency-multiplexed signals can be selected at each terminal unit.

U.S. Pat. No. 4,647,980 entitled "Aircraft Passenger Television System" discloses a television system that provides for individualized program selection and viewing by aircraft passengers. The system comprises a plurality of compact television receivers mounted in front of each airline passenger in a rearwardly facing position within the passenger seat immediately in front of each passenger. Each television receiver is provided as a lightweight module adapted for rapid, removable installation into a mounting bracket opening rearwardly on the rear side of a passenger seat, with a viewing screen set at a tilt angle accommodating an average reclined position of the seat. Exposed controls permit channel and volume selection by the individual passenger, and an audio headset is provided for plug-in connection to the module. A broadcast station on the aircraft provides prerecorded and/or locally received programs on different channels to each television module for individual passenger selection.

U.S. Pat. No. 4,630,821 entitled "Video Game Apparatus Integral with Aircraft Passenger Seat Tray" discloses a video game apparatus employed by a passenger of an aircraft. The apparatus includes a tray that is mounted on the rear of an aircraft seat. The tray has an internal hollow with a rectangular aperture on a top surface which surface faces the passenger when the tray is placed in a usable position. Located in the rectangular aperture is a TV display screen. Located in the internal hollow of the tray is a video game apparatus that operates to provide a video game display on the surface of said TV display screen. The surface of the tray containing the TV display screen also includes a plurality of control elements that are coupled to the video game apparatus to enable the passenger to operate the game. To energize the game, the tray contains a cable coupling assembly whereby when a cable is inserted into the assembly, the video game is energized to provide a display of a game selected by means of a selector switch also mounted on the top surface of the tray.

U.S. Pat. No. 4,352,200 entitled "Wireless Aircraft Passenger Audio Entertainment System" discloses that audio information in several audio channels is supplied via head sets to passengers seated aboard an aircraft in rows of seats including armrests and being distributed along an elongate passenger section inside a metallic fuselage. An antenna is run along the elongate passenger section of the aircraft for radio transmission inside such elongate passenger section. Individual antennas are provided for the passenger seats for receiving the latter radio transmission. These receiving antennas are distributed among predetermined armrests of the passenger seats. The audio information to be transmitted is provided in radio frequency channels in a band between 72 and 73 MHz. The distributed receiving antennas are coupled via seated passengers to the transmitting antenna. The radio frequency channels are transmitted in the mentioned band via the transmitting antenna, seated passengers and distributed receiving antennas to the predetermined armrests. Audio information is derived in the audio channels from the transmitted radio frequency channels also in the predetermined armrests. Passengers are individually enabled to select audio information from among the derived audio information in the audio channels. The selected audio information is applied individually to the headsets.

U.S. Pat. Nos. 5,965,647 and 5,617,331 entitled "Integrated Video and Audio Signal Distribution System and Method for use on Commercial Aircraft and Other Vehicles" disclose passenger entertainment systems employing an improved digital audio signal distribution system and method for use on commercial aircraft and other vehicles. A plurality of digital audio signal sources are provided for generating a plurality of compressed digital audio signals. The compressed digital audio signals are provided to a multiplexer that domain multiplexes the signals to produce a single composite digital audio data signal. The composite digital audio data signal is provided to a demultiplexer which is capable of selecting a desired channel from the composite digital audio data signal. The selected channel is provided to a decompression circuit, where it is expanded to produce a decompressed digital output signal. The decompressed digital output signal is then provided to a digital-to-analog converter and converted to an analog audio signal. The analog audio signal is provided to an audio transducer.

While the above patents disclose various aspects of passenger entertainment systems and components used therein, none of these prior art references disclose a fully integrated networked passenger entertainment system that integrates audio, video, product ordering and service processing, networked communications, and maintainability features. Accordingly, it is an objective of the present invention to provide for systems and methods that implement an integrated networked passenger entertainment and communication system that provides for passenger selected delivery of content over a communication network. It is a further objective of the present invention to provide for systems and methods that permit passengers to selectively order or request products or services, receive audio, video and game data, that permits communication of information to passengers from aircraft personnel, and that permits passengers to communicate with other passengers and computers located on- and off-board an aircraft.

SUMMARY OF THE INVENTION

The foregoing problems are overcome in an illustrative embodiment of the invention in which a computer manages communication over a network between one or more network addressable units and a plurality of physical devices of a passenger entertainment system on a vehicle. The passenger entertainment system is configured and operated using software to provide passenger entertainment services including audio and video on-demand, information dissemination, product and service order processing, video teleconferencing and data communication services between passengers on-board the vehicle using a local networks, and between passengers and people and computers off-board the vehicle using a communications link.

The passenger entertainment system includes a system server and a network for supporting a plurality of computer processors that are each coupled to a video camera, a microphone, a video display, an audio reproducing device, and an input device located proximal to a plurality of seats. The computer processors and the system server comprise application software that selectively controls telephony applications and network services. The system server has a plurality of interfaces that interface to components (physical devices) of the passenger entertainment system.

In carrying out the present invention, the system server is coupled by way of the network to a plurality of physical devices. The system server comprises software that instantiates a network addressable unit server that interfaces to one or more network addressable units and manages communication therefrom and thereto. The system server comprises software that instantiates a services server that interfaces to one or more service clients that provide services of the passenger entertainment system and manages communication therefrom and thereto. The system server comprises software that instantiates a router having one or more mail slots identifying each of the network addressable unit clients and service clients that moves messages between the network addressable unit clients and the service clients.

The router and one or more mail slots comprise a lookup table. Data comprising a network routing address and a physical device type are used to access the lookup table to determine the ultimate destination for a message. The network addressable unit server and the client server respectively interface to the network addressable unit clients and service clients by way of named pipes that translate messages from a first format to a second format. More particularly, the network addressable unit server has at least an input named pipe and an output named pipe for routing messages from and to the one or more network addressable unit clients. Similarly, the services server has at least an input named pipe and an output named pipe for routing messages from and to the one or more service clients. The system server also comprises software that instantiates intranodal thread processors that route messages between processes on the physical devices and the one or more service clients to route services of the passenger entertainment system to the processes on the physical devices.

BRIEF DESCRIPTION OF THE DRAWINGS

The various features and advantages of the present invention may be more readily understood with reference to the following detailed description taken in conjunction with the accompanying drawings, and in which:

FIG. 10 is a chart that illustrates configurability of the system;

FIG. 13 is a chart that illustrates typical download rates for downloading data in the system;

FIG. 14 is a chart that illustrates typical test times for testing the system;

FIG. 14*a* illustrates typical testable interfaces of a preferred embodiment;

FIG. 16–16*a* is a chart that illustrates passenger address analog output requirements of a preferred embodiment;

FIG. 20 shows an example “offload” scenario employed in software of a preferred embodiment;

FIG. 21 depicts generating a zipped “offload” file;

FIG. 22 illustrates transferring the “offload” file;

FIG. 23 illustrates a calling sequence involved in managing cabin file server disk space;

FIGS. 26-1 through 26-58 show display screens that illustrate details of a graphical user interface (GUI) of the Aircraft Configuration System;

FIG. 27 is a block diagram of the software architecture in accordance with a preferred embodiment;

FIG. 28 illustrates network addressable unit function and data paths;

FIG. 29 illustrates message processor function and data paths;

FIG. 30 illustrates transaction dispatcher function and data paths;

FIG. 31 illustrates system monitor function and data paths;

FIG. 32 illustrates ARCNET message packet components used in the software architecture;

FIG. 33 illustrates operational flow of an ARCNET driver;

FIG. 34 illustrates backbone network addressable unit function and data paths;

FIG. 35 illustrates seat network addressable unit function and data paths;

FIG. 36 illustrates VCP network addressable unit function and data paths;

FIG. 37 illustrates Test Port network addressable unit function and data paths;

FIG. 38 illustrates Services function and data paths;

FIG. 39 illustrates an exemplary cabin file server database structure;

FIG. 40 illustrates primary access terminal network addressable unit function and data paths;

FIG. 41 illustrates primary access terminal RPC client-.DLL function and data paths;

DETAILED DESCRIPTION

Figure 1:
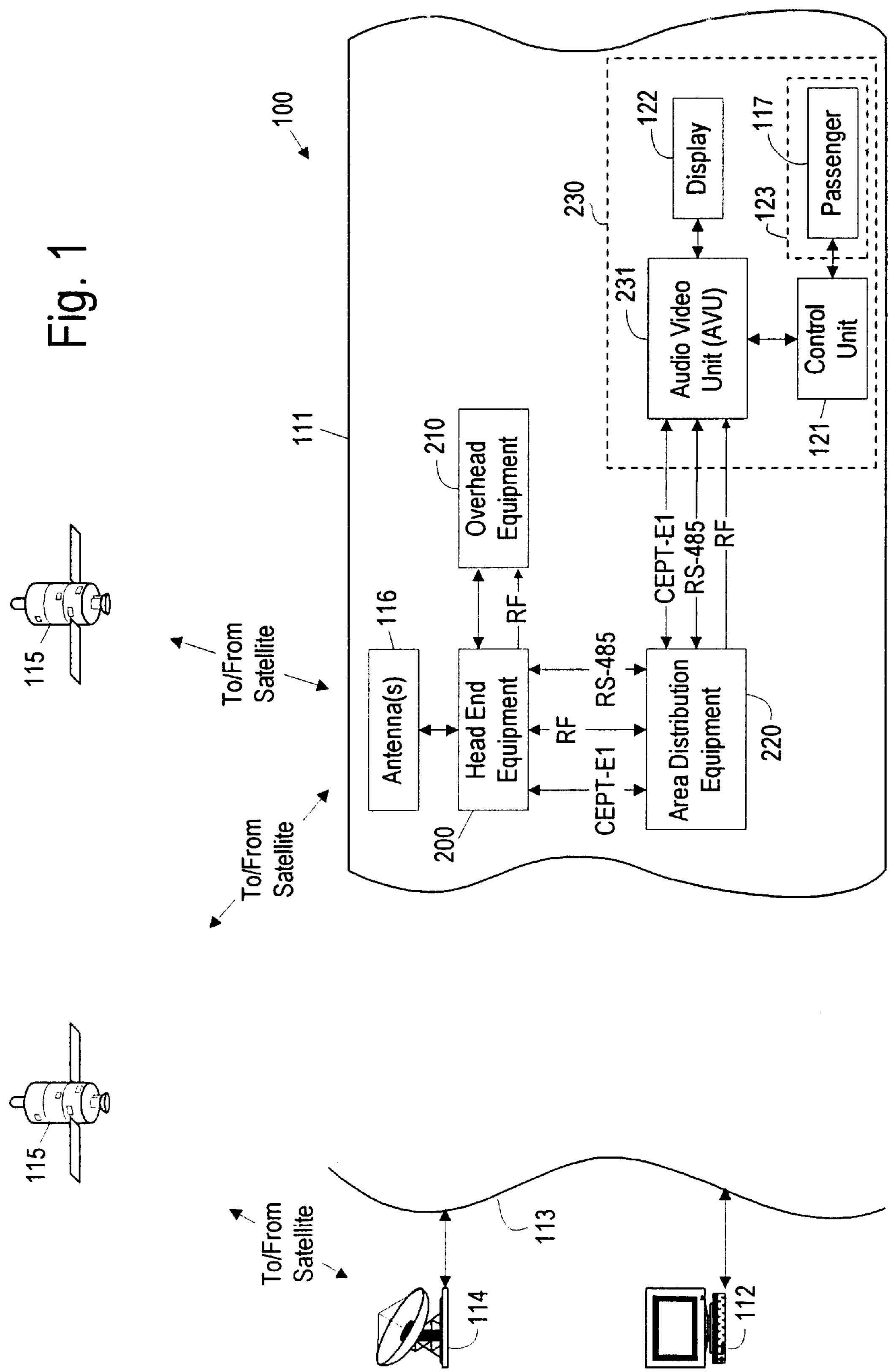
FIG. 1 illustrates an operational environment depicting a total entertainment system in accordance with a preferred embodiment.

Referring now to the drawing figures, FIG. 1 illustrates an operational environment depicting an exemplary total entertainment system 100 in accordance with a preferred embodiment. The operational environment shown in FIG. 1 depicts a flight of an aircraft 111 employing the total entertainment system 100. The total entertainment system 100 comprises an integrated networked passenger entertainment and communication system 100 that provides for in-flight passenger entertainment and information dissemination, service and product order processing, video teleconferencing and data communication between passengers on-board the aircraft 111, and video teleconferencing, voice and data communication between passengers 117 on-board the aircraft 111 and people and computers on the ground.

The exemplary embodiment of the total entertainment system 100 resides on the aircraft 111 and comprises an integrated networked passenger entertainment and communication system 100 that provides for in-flight passenger entertainment, information dissemination, video teleconferencing and data communication between passengers on-board the aircraft 111, and video teleconferencing, voice and data communication between passengers on-board the aircraft 111 and people and computers on the ground. The integrated networked airborne communication system provides entertainment services, information distribution, product and service order processing, and communication services using local networks and the Internet 113. The present invention thus provides for a level of capabilities and services heretofore unavailable in any airborne passenger entertainment system.

Numerous improvements over the predecessor APAX-150 system developed by the assignee of the present invention and other prior art system are incorporated in the system 100. These are discussed in detail below, and representative drawings are provided where appropriate to show details necessary to understand these improvements.

The system 100 is comprised of four main functional areas including head end equipment 200, area distribution equipment 210, seat group equipment 220, and overhead equipment 230. The head end equipment 200 provides an interface to external hardware and operators. The area distribution equipment 210 routes signals to and/or from the head end equipment 200, the seat group equipment 220, and the overhead equipment 230, depending upon the type of service provided to or requested by the passengers. The seat group equipment 220 contains passenger control units (PCU) 121 and screen displays 122, or display unit (DU) 122 for use by the passengers 117. The overhead equipment 230 includes video monitors and/or projectors and bulkhead screens or displays (FIG. 8) for displaying movies and other information. The system 100 thus routes or otherwise displays information to the passengers either under control of the flight attendants or passengers 117. These functional areas and components will be described in more detail below.

Video conferencing data and computer data derived from ground based computers 112 connected to the Internet 113 is transferred over the Internet 113 to a satellite ground station 114 and is uplinked to a communications satellite 115 orbiting the Earth. The communications satellite 115 downlinks the video conferencing and/or computer data to the aircraft 111 which is received by way of an antenna 116 that is part of a satellite communications system (FIG. 3) employed in the head end equipment 200 of the system 100. In a similar manner, video conferencing data and/or computer data derived from passengers 117 on-board the aircraft 111 is uplinked to the satellite 115 by way of the satellite communications system and antenna 116 to the satellite 115, and from there is downlinked by way of the satellite ground station 114 and Internet 113 to the ground based computer 112.

Handheld or fixed passenger control units 121 (FIG. 7*d*) and seatback screen displays 122 (seat displays 122) are provided at each passenger seat 123 that permit the passengers 117 to interface to the system 100. The passenger control units 121 are used to control downloading of movies for viewing, select audio channels for listening, initiate service calls to flight attendants, order products and services, and control lighting. The passenger control units 121 are also used to control game programs that are downloaded and played at the passenger seat 123. In addition, the passenger control units 121 are also used to initiate video conferencing and computer data transfer sessions either within the aircraft or with ground based computers 112.

The passenger control units 121 uses carbon contacts in lieu of conventional membrane switches. This provides for more reliable operation One or more satellites 115, which may be the same as or different from the satellites 115 used for Internet communication, transmit television signals to the aircraft 111. One currently deployed satellite television broadcast system is the DirecTV system which has orbiting satellites 115 that may be used to transmit television programs to the aircraft 111, in a manner similar to ground-based systems used in homes and businesses. In the present system 100, however, a steerable antenna 116 is used to track the position of the satellite 115 that transmits the signals so that the antenna 116 remains locked onto the transmitted signal.

The present system 100 thus provides for an integrated and networked passenger entertainment and communication system 100 that in essence functions as an airborne intranet that provides a level of passenger selected and controlled entertainment and communications services, passenger services and product ordering services that has heretofore not been provided to aircraft passengers. Complete details of the architecture of the system 100 and the software architecture employed in the system 100 are described below.

Figure 2:
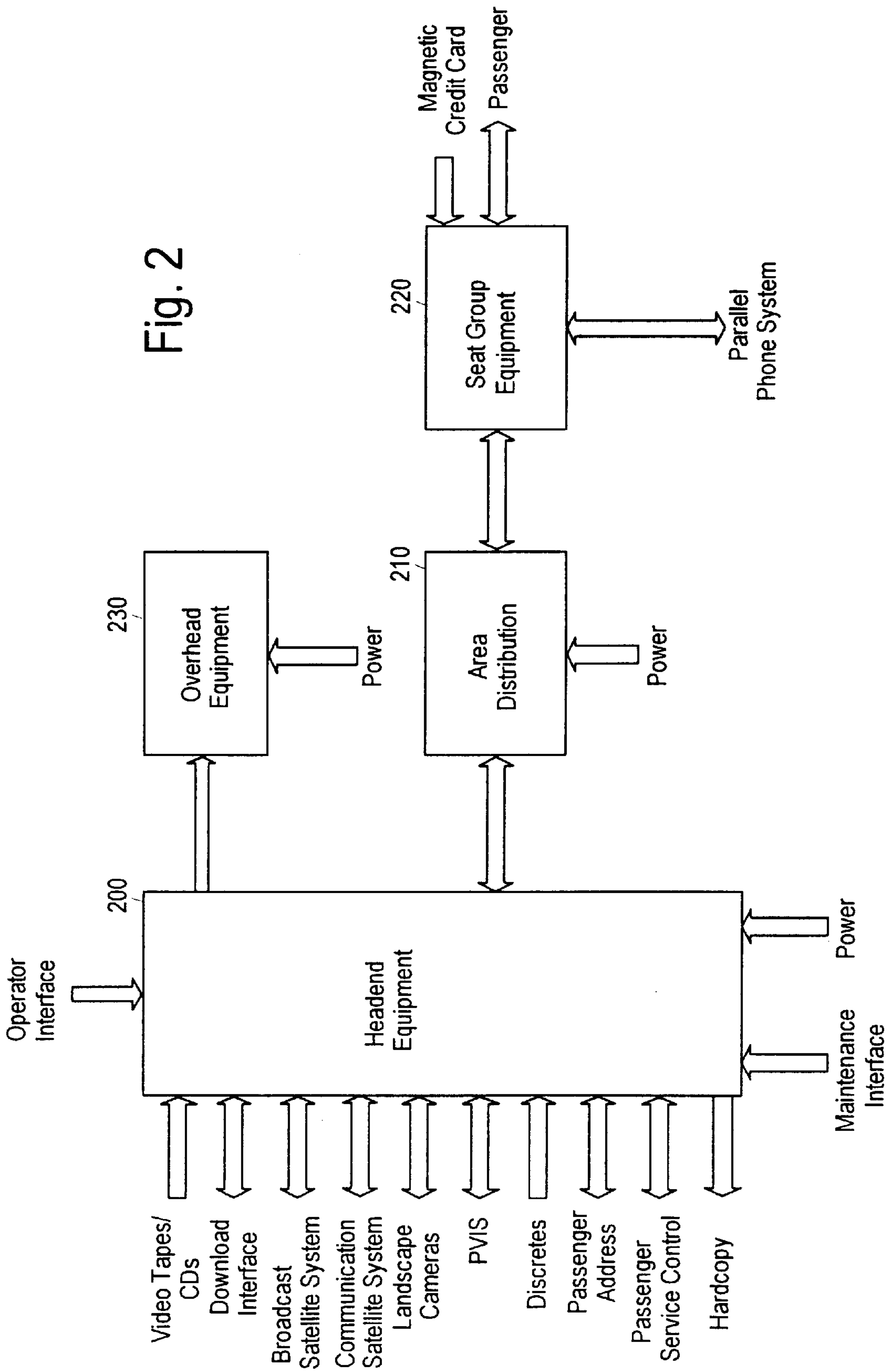
FIG. 2 is an exemplary block diagram of an embodiment of the total entertainment system.

FIG. 2 is an exemplary block diagram of an embodiment of a total entertainment system 100 that is employed on the aircraft 111, and illustrates inputs, outputs and interfaces of the system 100. The system 100 comprises the head end equipment 200, the area distribution equipment 210, the seat group equipment 220, and the overhead equipment 230. The head end equipment 200 and the seat group equipment 220 include a variety of computer processors and operating software that that communicate over various networks to control and distribute data throughout the aircraft 111 and send data to and receive data from sources external to the aircraft 111. A detailed embodiment of the total entertainment system 100 is shown in FIG. 3, which will be described after discussing a representative hardware environment that is useful in understanding the system 100 and its operation which is presented in FIG. 4.

Figure 4:
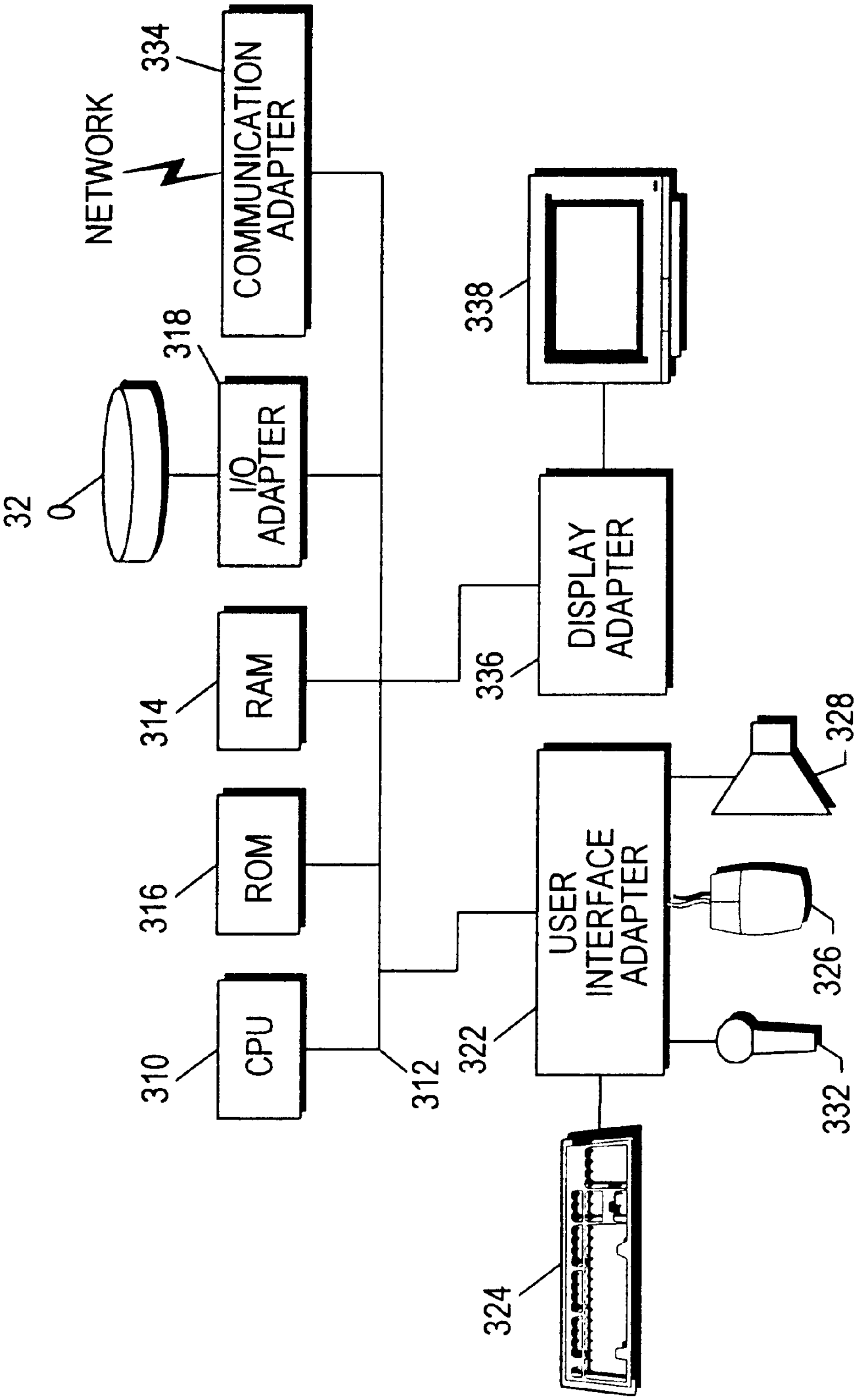
FIG. 4 shows a diagram illustrating a typical hardware configuration of a workstation employed in accordance with a preferred embodiment.

A preferred embodiment of the system 100 is practiced in the context of a personal computer such as the IBM PS/2, Apple Macintosh computer or UNIX based workstation. A representative hardware environment is depicted in FIG. 4, which illustrates a typical hardware configuration of a workstation in accordance with a preferred embodiment having a central processing unit 310, such as a microprocessor, and a number of other units interconnected via a system bus 312. The workstation shown in FIG. 4 includes a random access memory (RAM) 314, read only memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network (e.g., a data processing network) and a display adapter 336 for connecting the bus 312 to a display device 338. The workstation typically has resident thereon an operating system such as the Microsoft Windows NT or Windows/95 operating system (OS), the IBM OS/2 operating system, the MAC OS, or UNIX operating system. Those skilled in the art will appreciate that the present invention may also be implemented on platforms and operating systems other than those mentioned.

Figure 3:
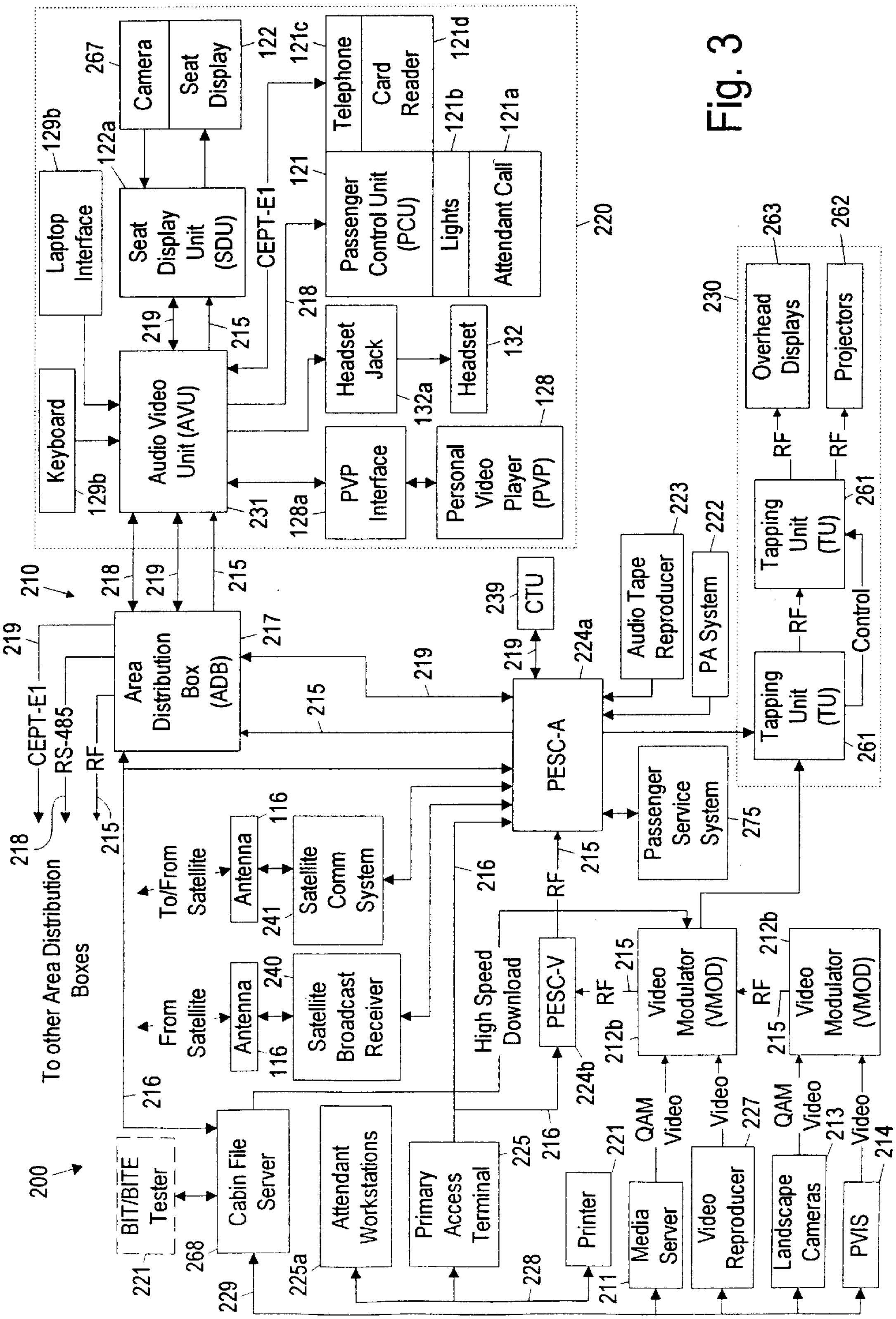
FIG. 3 shows a detailed block diagram of the total entertainment system of FIG. 2.

Referring to FIG. 3, the head end equipment 200 comprises a media server 211 in accordance with a preferred embodiment that is coupled to a first video modulator 212*a*. The media server 211 may be one manufactured by Formation, for example.

The media server 211 supplies 30 independent streams of video, and stores about 54 hours worth of video. The first video modulator 212*a* may be one manufactured by Olsen Technologies, for example. A video reproducer 227 (or video cassette player 227), such a triple deck player manufactured by TEAC, for example, is also coupled to the first video modulator 212*a*. The video cassette player 227 has three 8 mm Hi-8 video cassette players that output three video programs on three video channels under control of a flight attendant.

The head end equipment 200 also comprises one or more landscape cameras 213 and a passenger video information system 213 that are coupled to a second video modulator 212*b*. The landscape cameras 213 may be cameras manufactured by Sexton, or Puritan Bennett, for example. The second video modulator 212*b* may also be one manufactured by Olsen Technologies, for example. The passenger video information system 214 may be a unit manufactured by Airshow, for example.

The head end equipment 200 comprises first and second passenger entertainment system controllers (PESC-A, PESC-V) 224*a*, 224*b*, that comprise video, audio and phone processors. Although only one unit is shown, in certain configuration, primary and secondary PESC-A controllers 224*a* may be used. The second video modulator 212*b* routes RF signals through the first video modulator 212*a*, and the outputs of both video modulators 212*a*, 212*b* are routed through the second passenger entertainment system controller (PESC-V) 224*b* to the first passenger entertainment system controller (PESC-A) 224*a*. The first passenger entertainment system controller (PESC-A) 224*a* is used to distribute video and data by way of an RF cable 215 and an ARCNET (RS-485) network 216 (ARCNET 1, ARCNET 2), respectively, to area distribution equipment 210 which routes the video and data to the passenger seats 123.

The head end equipment 200 comprises a primary access terminal (PAT) 225 and a cabin file server (CFS) 268 which are used to control the system 100. The first passenger entertainment system controller (PESC-A) 224*a* is coupled to the cabin file server 268 by way of the ARCNET network (ARCNET 1) 216, and is coupled to the primary access terminal (PAT) 225 and the second passenger entertainment system controller (PESC-V) 224*b* by way of the ARCNET network (ARCNET 2) 216. The first passenger entertainment system controller (PESC-A) 224*a* is also coupled to a public address (PA) system 222, to an audio tape reproducer (ATR) 223, and to a cabin telephone system (CTS) 239. The audio tape reproducer 223 may be one manufactured by Sony or Matsushita, for example. The cabin telephone system 239 may be systems manufactured by AT&T or GTE, for example. Signals associated with the cabin telephone system 239 are routed through the system 100 by means of a CEPT-E1 network 219.

The cabin file server 268 is coupled to the primary access terminal 225 and to a printer 226 by way of an Ethernet network 228, such as a 100 Base-T Ethernet network 228, for example. The cabin file server 268 is used to control the storage of content and use information. The primary access terminal 225 is used to control entertainment features and availability. The media file server 211 is controlled from the cabin file server 268 by way of an ARINC 485 (RS-485) network 229 coupled therebetween. The cabin file server 268 is optionally coupled to a BIT/BITE tester 270 that is used to perform built in testing operations on the system 100.

The video reproducer 227 (or video cassette player 227) outputs a first plurality of NTSC video (and audio) streams corresponding to a first plurality of prerecorded video channels. The media server 211 stores and outputs a plurality of quadrature amplitude modulated MPEG-compressed video transport streams corresponding to a second plurality of prerecorded video channels. The first video modulator 212*a* modulates both the NTSC video streams from the video reproducer 227 and the quadrature amplitude modulated MPEG compressed video streams from the media server 211 to produce modulated RF signals that are distributed to passenger seats 123 of the aircraft 111. The modulated RF signals containing the modulated video streams output by the first video modulator 212*a* are coupled through the second passenger entertainment system controller 224*b* to the first passenger entertainment system controller 224*a* and from there by way of an RF cable 215 to audio-video seat distribution units (AVU) 231 located at each passenger seat 123.

The first passenger entertainment system controller 224*a* is coupled to a plurality of area distribution boxes 217 by way of the RF cable 215 and the ARCNET network 216. The area distribution boxes 217 are used to distribute digital and analog video streams to the audio-video seat distribution units 231 at the passenger seats 123. The area distribution boxes 217 couple quadrature amplitude modulated MPEG-compressed video transport streams derived from the media server 211 and NTSC video signals derived from the video cassette player 227 that have been modulated by the video modulator 112 to the passenger seats 123 of the aircraft 111.

One audio-video seat distribution unit 231 is provided for each seat 123 and contains a tuner and related circuitry (FIG. 7) that demodulates the modulated RF signals, demodulates the NTSC video streams to produce NTSC video and audio signals for display, and decompresses and demodulates the quadrature amplitude modulated MPEG-compressed video transport streams to produce MPEG NTSC video and audio signals for display. The audio-video seat distribution unit 231 controls distribution of video, audio and data to a headset 232 or headphones 232, the seat display 122, and the passenger control unit 121. The audio-video seat distribution unit 231 couples the video and audio signals from a selected video stream to the seat display 122 and by way of a headset jack 132*a* to the headset 132 (headphones 132) for passenger viewing and listening.

The passenger control unit 121 includes an attendant call switch 121*a*, a light switch 121*b*, and may include a telephone 121*c* and magnetic card reader 121*d*. In certain zones of the aircraft 111, a personal video player (PVP) 128 is coupled to the audio-video seat distribution unit 231 by way of a personal video player interface 128*a*. The audio-video seat distribution unit 231 provides an interface between the telephone 121*c* and the cabin telephone system 239 and permits telephone calls to be made by the passenger 117 from the seat 123.

In certain zones of the aircraft 111, a personal computer interface 129*a* is provided which allows the passenger 117 to power a personal computer (not shown) and to interface to the system 100. Alternatively, a keyboard 129*b* may be provided that allows the passenger 117 to interface to the system 100. The use of the personal computer 129*a* or keyboard 129*b* provides a means for uploading and downloading data by way of the satellite communications system 241 and the Internet. In addition, a video camera is provided in the adjacent to the seat display 122 that views the passenger 117 to permit video teleconferencing services. Details of the audio-video unit 231 will be described in more detail with reference to FIG. 7.

Referring now to FIG. 4, it shows a simplified diagram of the system 100 and illustrates distribution of video signals from the video cassette player 227 and media server 211 to the seat displays 122. To implement video on demand in accordance with a preferred embodiment, the media server 211 outputs 30 digital MPEG-compressed video transport streams on three video channels (ten streams each), while the video cassette player 227 outputs three video streams on three video channels.

To gain extra throughput, the 30 digital MPEG compressed video streams output by the media server 211 are 64-value quadrature amplitude modulated (QAM). However, it is to be understood, however, that by using 256-value QAM encoding, for example, the number of video programs delivered in each video channel may be further increased. Consequently, the present system 100 is not limited to any specific QAM encoding value.

The video streams from the video cassette player 227 and the quadrature amplitude modulated MPEG compressed video transport streams from the media server 211 are then modulated by the first video modulator 212*a* for transmission over the RF cable 215 to the audio-video seat distribution unit 231 at each of the passenger seats 123. To provide first class passengers 117, for example, with true video on demand, the streams are controlled by the passengers 117, with one stream assigned to each passenger that requests video services.

The simultaneous transfer of video streams derived from both the video cassette player 227 and the media server 211 in an aircraft entertainment system is considered unique. In particular, conventional systems either process analog (NTSC) video signals or digital video signals, but do not process both simultaneously. However, in the present system 100, NTSC and quadrature amplitude modulated MPEG-compressed digital video signals are processed simultaneously through the first video modulator 212*a* and distributed to passenger seats 123 for display.

Object-Oriented Programming (OOP) is employed in the software and firmware used in the system 100, which will now be discussed. A preferred embodiment of the software used in the system 100 is written using JAVA, C, or the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a passenger entertainment system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows. Objects can represent physical objects, such as automobiles in a traffic-flow simulation, electrical components in a circuit-design program, countries in an economics model, or aircraft in an air-traffic-control system. Objects can represent elements of the computer-user environment such as windows, menus or graphics objects. An object can represent an inventory, such as a personnel file or a table of the latitudes and longitudes of cities. An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90%, of a new OOP software program consists of proven, existing components made from preexisting reusable objects, then only the remaining 10%) of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows. Objects and their corresponding classes break down complex programming problems into many smaller, simpler problems. Encapsulation enforces data abstraction through the organization of data into small, independent objects that can communicate with each other. Encapsulation protects the data in an object from accidental damage, but allows other objects to interact with that data by calling the object's member functions and structures. Subclassing and inheritance make it possible to extend and modify objects through deriving new kinds of objects from the standard classes available in the system. Thus, new capabilities are created without having to start from scratch. Polymorphism and multiple inheritance make it possible for different programmers to mix and match characteristics of many different classes and create specialized objects that can still work with related objects in predictable ways. Class hierarchies and containment hierarchies provide a flexible mechanism for modeling real-world objects and the relationships among them. Libraries of reusable classes are useful in many situations, but they also have some limitations. For example, regarding complexity, in a complex system, the class hierarchies for related classes can become extremely confusing, with many dozens or even hundreds of classes. As for flow of control, a program written with the aid of class libraries is still responsible for the flow of control (i.e., it must control the interactions among all the objects created from a particular library). The programmer has to decide which functions to call at what times for which kinds of objects. Regarding duplication of effort, although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further; Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries. The first relates to behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

The second relates to call versus override. With a class library, the class member is used to instantiate objects and call their member functions. It is possible to instantiate and call objects in the same way with a framework (i.e., to treat the frame-work as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

The third relates to implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment utilizes HyperText Markup Language (HTML) to implement documents on the Internet together with a general-purpose secure communication protocol for a transport medium between the client and the merchant. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTMP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in a number of areas, including poor performance, restricted user interface capabilities, it can only produce static Web pages, there is a lack of interoperability with existing applications and data, and there is an inability to scale.

Sun Microsystem's Java language solves many of the client-side problems by improving performance on the client side, enabling the creation of dynamic, real-time Web applications, and providing the ability to create a wide variety of user interface components. With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom user interface components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multi-threaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

FIG. 4 illustrates inputs, outputs and interfaces of the system 100. Passenger computer system 120 is in communication with the plane server computer system 130 (not shown). A session operates under a general-purpose secure communication protocol such as the SSL protocol. The server computer system 130 is additionally in communication with a satellite broadcast receiving system 140. The satellite broadcast receiving system 140 is a system that provides DirecTV content, for example, such as current sports, news and movie information, and that interfaces to a financial institution to support the authorization and capture of transactions. The customer-institution session operates under a variant of a secure payment technology such as the SET protocol, as described herein.

The in-flight entertainment system 100 in accordance with a preferred embodiment is a complex system with many components and which forms a total entertainment system (TES) 100. To assist the reader in making and utilizing the invention without undue experimentation, the following is an overview that discusses some of the components and where their descriptions are located. Also, the requirements for the system 100 are discussed and are verified by test, analysis, inspection or demonstration. The system architecture and components are then discussed in detail and a typical system configuration is disclosed. Individual components of the system 100 are also described. Verification methods are also discussed along with requirements traceability. For the purpose of this description, definitions are provided in a glossary that are used herein. System mnemonics and a list of acronyms are also provided in the glossary.

The system 100 in accordance with a preferred embodiment is a configurable and scaleable in-flight entertainment system 100 that provides a wide range of passenger entertainment, communications, passenger service, and cabin management services. A fully capable system 100 provides passengers with audio entertainment, video entertainment, video games, and other interactive and communications services.

Some of the features that are unique to the system 100 include, 88 channels of digital audio (broadcast), 24 (to 48) channels of video (broadcast), in-seat, bulkhead, and overhead displays and monitors, cabin management functions provided through a central terminal (the primary access terminal, a wide range of audio and video entertainment services, display of information derived from the passenger video information system and landscape cameras, provisions for video teleconferencing and data communication between passengers on-board the aircraft, provisions for video teleconferencing, voice and data communication between passengers on-board the aircraft and people and computers on the ground, a parallel telephone system that interfaces with the normal in-cabin telephone system 239 the use of ARINC 485 standard interfaces between major components, preview and control of video and audio by flight attendants, and built-in-test functions and maintenance.

As was explained above, the system 100 has four main functional areas comprising: 1) head end equipment 200, 2) area distribution equipment 210, 3) seat group equipment 220, and 4) overhead equipment 230. Each of these pieces of equipment are described in more detail in the following sections.

Figure 5:
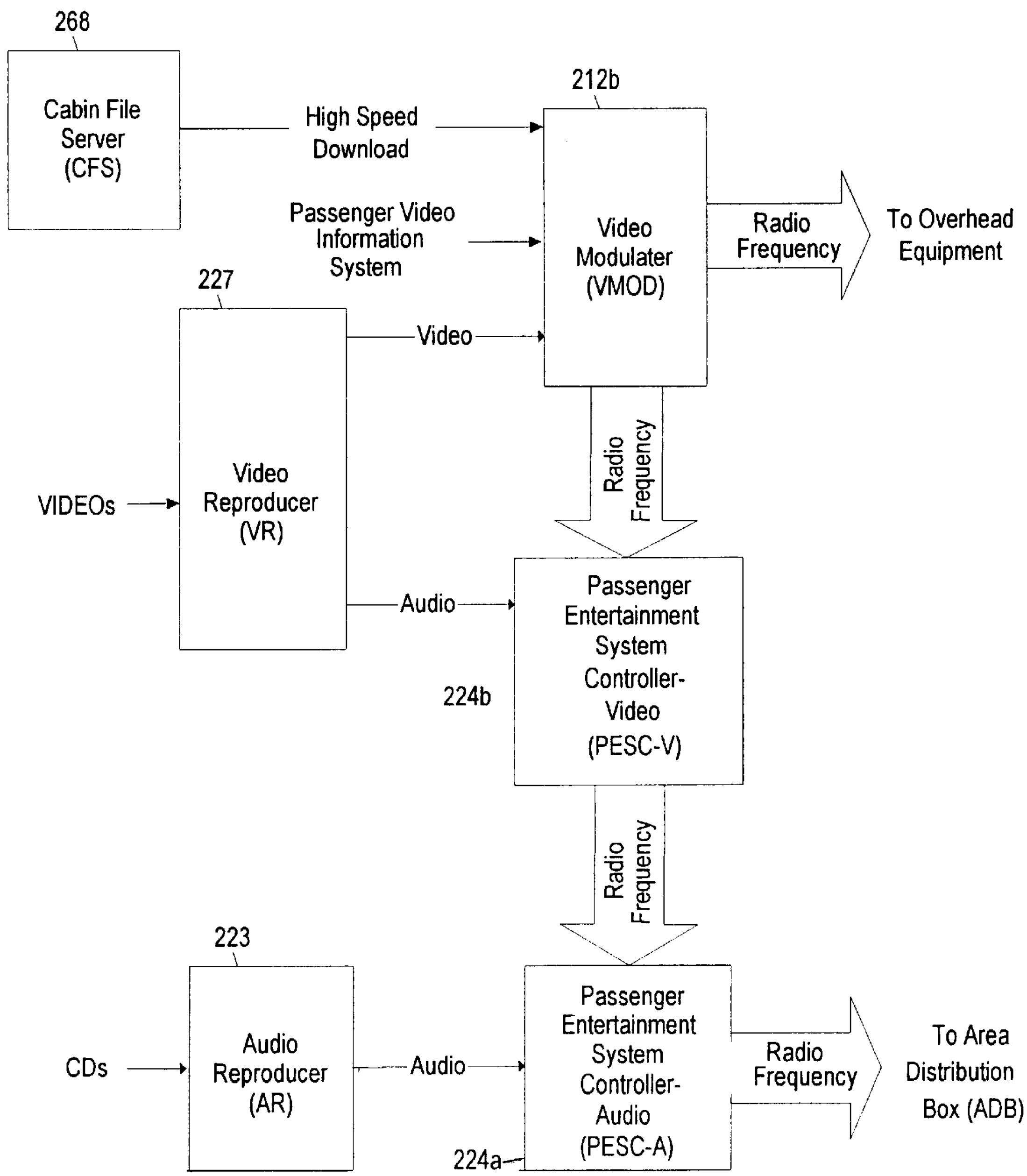
FIG. 5 is a diagram illustrating head end equipment in accordance with a preferred embodiment.

FIG. 5 is a block diagram of exemplary head end equipment 200 in accordance with a preferred embodiment. The head end equipment 200 accepts inputs from the media server 211, one or more landscape cameras 213, and the passenger video information system (PVIS) 214 and distributes the video/audio information throughout the aircraft 111 to the individual passengers 117.

The head end equipment 200 is the prime interface between external hardware and operators (purser and flight attendants). The head end equipment 200 includes an operator interface, an aircraft interface, a maintenance interface, an interface for downloading configuration data to the system 100 and for downloading reports from the system.

The media server 211 and the video cassette player 227 are coupled to the first video modulator 212*a*. The media server 211 stores video programming and supplies independent video and audio streams for viewing by passengers. The video cassette player 227 outputs prerecorded movies for viewing by passengers. The passenger video information system 214 and the landscape cameras 213 are coupled to the second video modulator 212*b*. The landscape cameras 213 interface to the second video modulator 212*b* and whose output may be viewed by passengers at their seats during takeoff and landing. In accordance with a preferred embodiment, the landscape cameras 213 may also be controlled by selected passengers using their respective passenger control units 121.

The media server 211 stores and outputs a plurality of quadrature amplitude modulated (QAM) MPEG-compressed video transport streams corresponding to a plurality of prerecorded video programs or channels. The first video modulator 112*a* modulates the NTSC video streams from the video cassette player 227 and the quadrature amplitude modulated MPEG compressed video streams from the media server 211 to produce modulated RF signals that are distributed to passenger seats 123. The modulated RF signals containing the modulated video and audio streams output by the video modulator 112 are coupled by way of the first and second passenger entertainment system controllers (PESC-A, PESC-V) 224*a*, 224*b* onto an RF cable 215 to audio-video seat distribution units 231 (part of the seat group equipment 210) located at passenger seats 123.

The first passenger entertainment system controller (PESC-A) 224*a* distributes video and data by way of the RF cable 215 to passenger seats 123. The ARCNET network 216 is used to send control signals between components of the head end equipment and the components of the seat group equipment 220. The first passenger entertainment system controller (PESC-A) 224*a* is coupled to the cabin file server 268 and to the primary access terminal 225 (which corresponds to the purser workstation 225) by way of the ARCNET network (ARCNET 2) 216*a*. The first passenger entertainment system controller (PESC-A) 224*a* is also coupled to the public address (PA) system 222 and the audio tape reproducer (ATR) 223. The purser workstation 225 is used to configure the system 100 to set up the entertainment options that are available to passengers 117. The flight attendant workstations 225*a* are distributed throughout the aircraft 111 and allow flight attendants to respond to passenger service requests and process orders and monetary transactions.

The cabin file server 268 is coupled to the primary access terminal 225 (purser workstation 225) and to a printer 226 by way of an Ethernet network 228. Flight attendant workstations 225*a* are also coupled to the cabin file server 268 by way of the Ethernet network 228. The cabin file server 268 controls the storage of content and use information. The primary access terminal 225 controls entertainment features and availability. The media server 211 is controlled from the cabin file server 268 by way of an ARINC 485 network 229 coupled therebetween.

The video cassette player 227 outputs a NTSC video and audio streams corresponding to a first plurality of prerecorded video channels. The media server 211 stores and outputs quadrature amplitude modulated MPEG-compressed video transport streams corresponding to a second plurality of prerecorded video channels. The first video modulator 212*a* modulates both the NTSC video streams from the video cassette player 227 and the quadrature amplitude modulated MPEG compressed video streams from the media server 211 to produce modulated RF signals that are distributed to passenger seats 123. The modulated RF signals containing the modulated video streams output by the first video modulator 212*a* are coupled by way of the first passenger entertainment system controller (PESC-A) 224*a* and the RF cable 215 to the audio-video seat distribution units 231 located at each passenger seat 123.

The first passenger entertainment system controller (PESC-A) 224*a* is coupled to a plurality of area distribution boxes 217 by way of the RF cable 215 and the ARCNET network 216 (ARCNET 1). The area distribution boxes 217 are used to distribute digital and analog video streams to the audio-video seat distribution units 231 at the passenger seats 123. The area distribution boxes 217 couple quadrature amplitude modulated MPEG-compressed video transport streams derived from the media server 211 and NTSC video signals derived from the video cassette player 227 that have been modulated by the first video modulator 112*a* to the passenger seats 123.

The head end equipment 200 also interfaces with the passenger address (PA) system 222 and passenger video information system 214 so that these systems are integrated into the in-flight entertainment system 100. A download interface (FIG. 2) of the head end equipment 200 provides for input of configuration information and games. The head end equipment 200 also provides flight attendants with cabin management services allowing overall control and operation of the in-flight entertainment system 100. A maintenance interface is provided to aid in fault detection and location.

The head end equipment 200 embodies a number of unique aspects, which will be described in detail below.

Figure 5A:
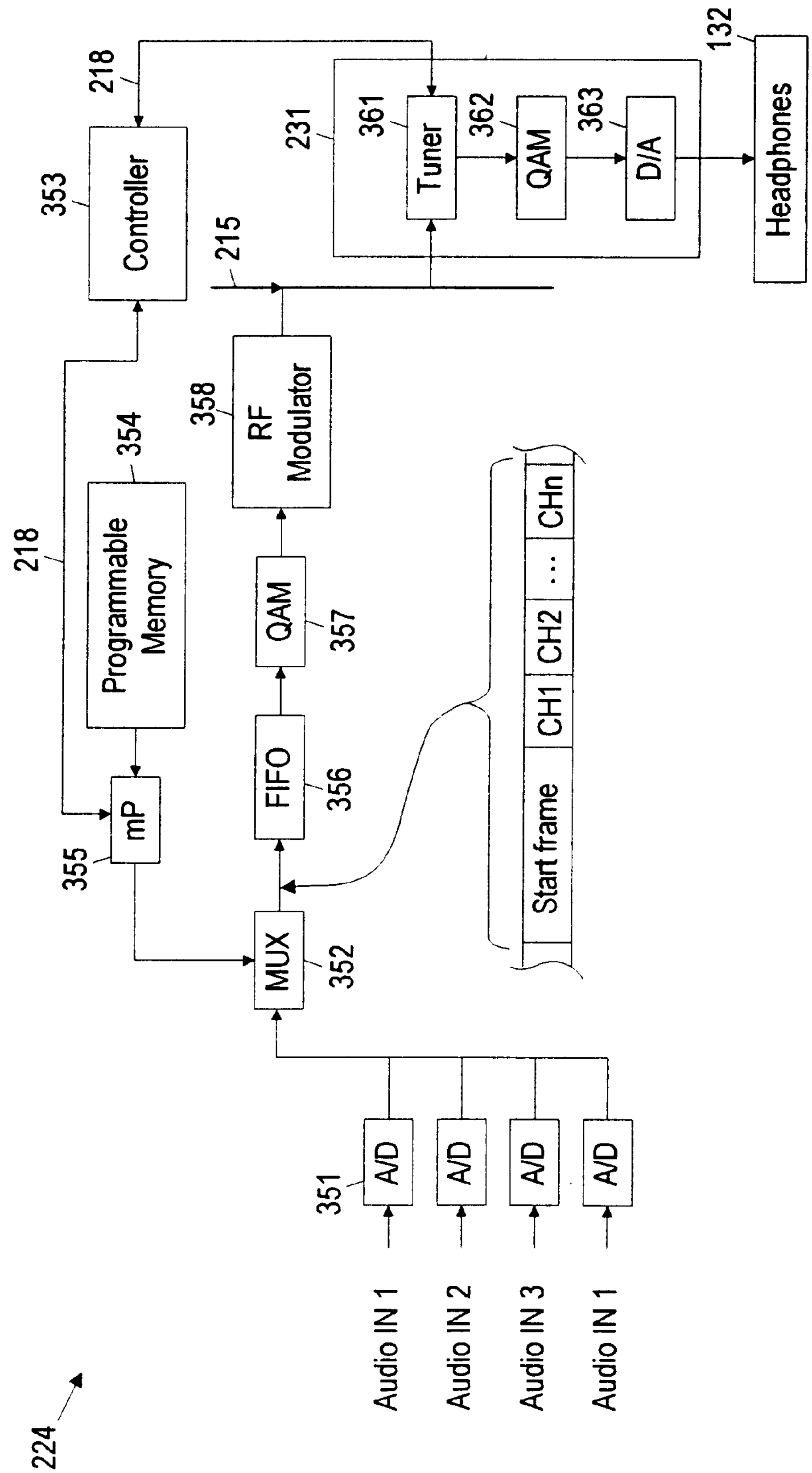
FIG. 5*a* is a diagram illustrating distribution of QAM digital audio in accordance with in accordance with a preferred embodiment.

FIG. 5*a* is a diagram illustrating distribution of quadrature amplitude modulated (QAM) digital audio in accordance with of the present invention. This aspect is embodied in an improved passenger entertainment system controller 224 and cooperative audio-video unit 217 that provides for distribution of quadrature amplitude modulated (QAM) digital audio signals to passenger seats 123 throughout the aircraft 111. The passenger entertainment system controller 224 comprises a plurality of analog to digital converters (A/D) 351 that digitize audio input signals from input sources, such as one or more audio tape reproducers 223, the passenger address system 222 and the passenger service system 275. The signal from these sources are multiplexed in a multiplexer (MUX) 352 which is controlled by a controller 353 and microprocessor ($\mu$P) 355 having a programmable memory. The programmable memory stores code for use by the microprocessor 355 in multiplexing the signals.

The output of the multiplexer 352 is input to a first-in first-out (FIFO) buffer 356 and output signals therefrom are quadrature amplitude modulated using a quadrature amplitude modulator 356. The format of the output signals from the FIFO buffer 356 is shown and includes a start frame set of bits (header) followed by each of the respective audio channels (CH1 . . . CHn). The output of the quadrature amplitude modulator 356 is modulated onto a carrier by an RF modulator 358 which transmits the QAM and RF modulated signal over the RF cable 215 to the audio-video units 231 at each of the passenger seats 123.

The audio-video units 231 each comprise an RF tuner 261 that demodulates the RF modulated signal transmitted over the RF cable 215 which is coupled to a QAM demodulator 262 which demodulates the quadrature amplitude modulated signals. The output of the QAM demodulator 262 is converted to an analog signal by a digital to analog converter (D/A) 363 and sent to the headphones 132. Selection of a particular channel that is to be listened to by a passenger 117 is made using the tuner 361 which demodulates the signal associated with the selected channel.

The improved quadrature amplitude modulated (QAM) digital audio distribution provided by this aspect of the present invention provides for a greater number of audio channels to be communicated over the RF cable 215. This is similar to the quadrature amplitude modulation of the video streams discussed above with reference to FIG. 4. The quadrature amplitude modulation provides for a plurality of states (not compression) that increases the usage of the bandwidth of the RF cable 215. Any type of analog input signal may be processed, including signals from the audio tape reproducers 223, passenger address system 222, passenger service system 275 or other analog audio source.

Figure 6:
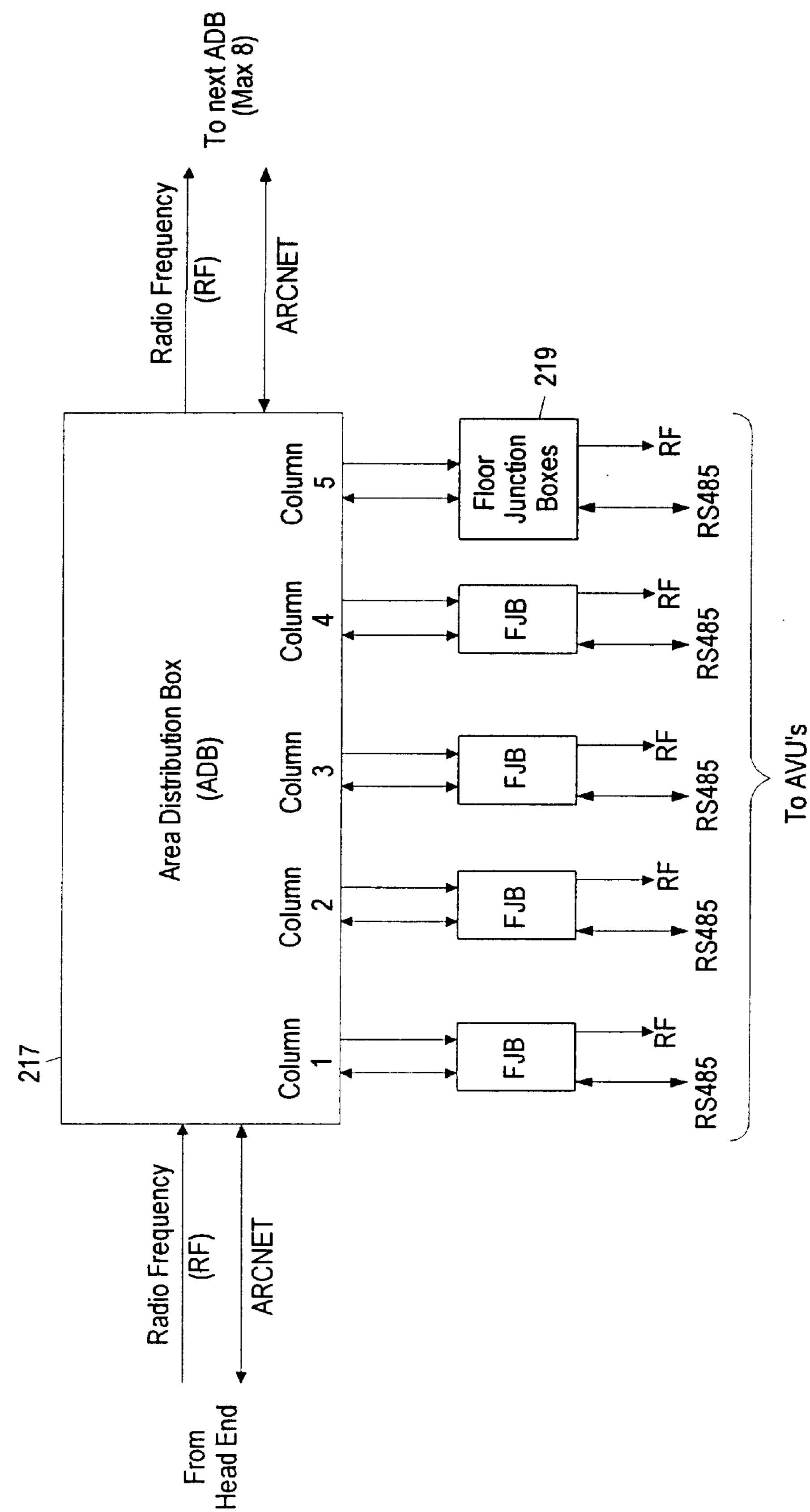
FIG. 6 is a block diagram of area distribution equipment in accordance with a preferred embodiment.

The area distribution equipment 210 distributes information from the head end equipment 200 to the seat group equipment 220. The area distribution equipment 210 also provides power to the seat group equipment 220. FIG. 6 is a block diagram showing the area distribution equipment 210 in accordance with a preferred embodiment.

The area distribution equipment 210 distributes data throughout the communications network formed between the head end equipment 200 and the seat group equipment 220. The area distribution equipment 210 comprises the plurality of area distribution boxes 217 that are each coupled to a plurality of floor junction boxes 219 that are individually coupled to respective audio-video seat distribution units 231 in the seat group equipment 210 of respective columns of passenger seats 123. The area distribution boxes 217 interface to the audio-video seat distribution units 231 by way of the junction boxes 219 using full-duplex RS-485 interfaces and RF cables 215. The RS-485 interfaces provide control and data links between the seat group equipment 220 and the head end equipment 200. The RF cables 215 couple audio and video data to headphones 232 and seat displays 122 for listening and viewing by the passengers 117.

The first passenger entertainment system controller (PESC-A) 224*a* is coupled to the plurality of area distribution boxes 217 by way of the RF cable 215 and the ARCNET network 216. The area distribution boxes 217 are used to distribute digital and analog video streams to the audio-video seat distribution units 231 at the passenger seats 123. The area distribution boxes 217 couple quadrature amplitude modulated MPEG-compressed video transport streams derived from the media server 211 and NTSC video signals derived from the video cassette player 227 that have been modulated by the video modulator 112 to the passenger seats 123.

Figure 6A:
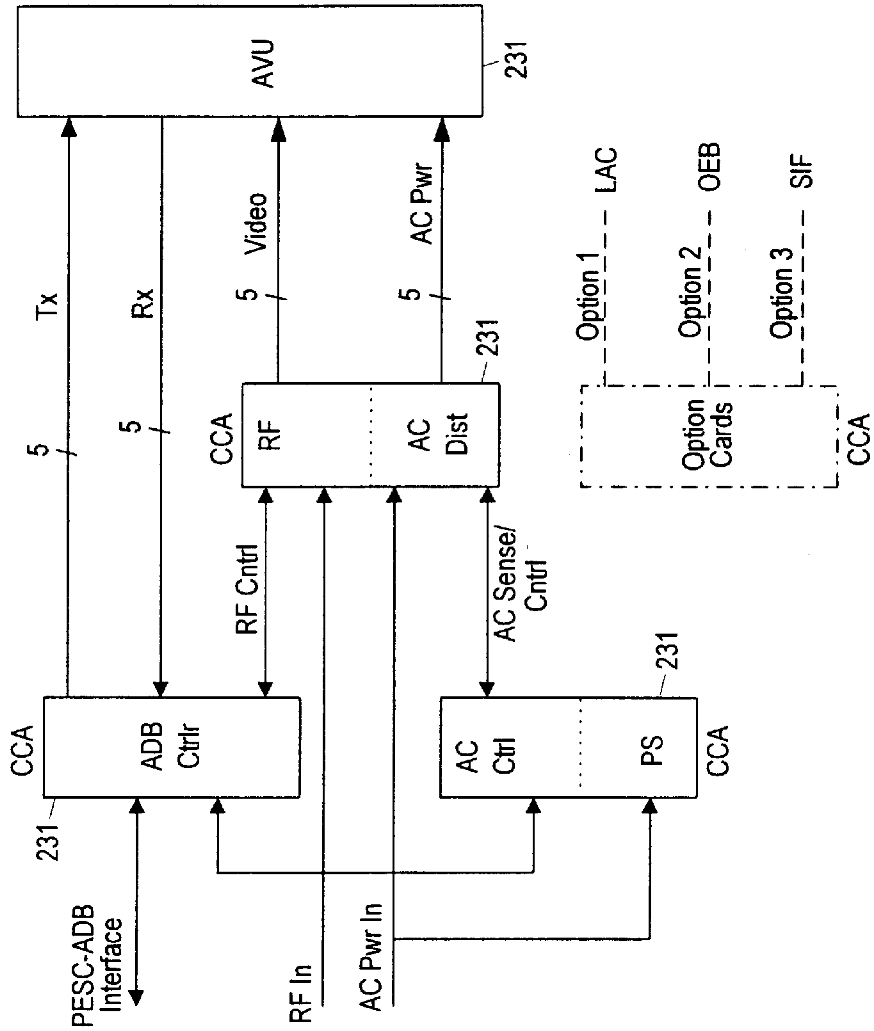
FIG. 6*a* illustrates details of an area distribution box used in the area distribution equipment.

FIG. 6*a* illustrates details of an area distribution box 217 used in the area distribution equipment 210. In a basic system, the area distribution box (ADB) 217 provides for interfacing the primary passenger entertainment system controller (PESC) 224 to audio-video units, either directly or via floor unction boxes 219. The area distribution box 217 acts as a connection box to facilitate the distribution of system power, combined audio/video signals and service data to the various audio-video units 231.

The area distribution box 217 acts as a connection box to facilitate the distribution of system AC power, combined audio/video signal and service data for up to five columns of audio-video units, and relay of service data and combined audio/video signals to the next area distribution box 217. The area distribution box 217 has an RS-232 serial diagnostic port to allow verification of functionality.

The area distribution box 217 utilizes and distributes single phase, 115 VAC, 400 Hz power to each AVU column output. The area distribution box 217 provides distribution of a maximum of 7.5 Amps (continuous) to each individual column. The total AC power consumption of the area distribution box 217 is 46 Watts nominal, 0.40 Amperes nominal. The area distribution box 217 monitors the AC power output to each individual AVU column and identifies current draw in excess of 7.5 AMPS for a duration in excess of 200 milliseconds as a short circuit condition. The area distribution box 217 monitors the AC power output to each individual AVU column and identifies unbalanced current between the AC HI and LO lines in excess of 50 ma for a duration in excess of 200 milliseconds as a ground fault condition.

The area distribution box 217 removes power from a seat column in which either a short circuit or ground fault condition is identified. The area distribution box 217 restores power to a seat column from which power had been removed without requiring physical access to the area distribution box 217. When power is reapplied to such a column, the short circuit protection circuit functions normally and removes power from the column if the short circuit condition persists. The area distribution box 217 processor/s monitors the status of the AC power output to each individual AVU column for BIT/BITE purposes.

All area distribution box versions have built-in monitoring functions that report equipment status to the processor board. Therefore, no external warning devices are required for the area distribution box 217. All area distribution box versions have energy-storing capacitors for short-term hold-up of critical voltages during an AC power interruption. Therefore, no batteries are required for the area distribution box 217.

The area distribution box 217 receives combined audio/video via an RF coaxial input from the primary passenger entertainment system controller (PESC) 224 or a previous area distribution box 217. The area distribution box 217 relays the RF signal to the next area distribution box 217 and for distribution of the RF audio/video signal to each column of audio-video units 217.

The area distribution box 217 provides the means to adjust the RF level in order to ensure that the proper RF levels for the video and modulated audio signals are supplied to the AVU tuners and demodulators; in the presence of changing system configurations and operational conditions. This RF leveling is accomplished by the local processor/s in the area distribution box 217 by controlling a variable attenuator.

The area distribution box 217 provides a digital communication link with the passenger entertainment system controller 224 and other area distribution boxes 217 via a control data bus. In addition, the area distribution box 217 provides a communications link for up to 5 AVU columns. This digital communication link is used by the area distribution boxes 217 and passenger entertainment system controllers 224 to communicate control data, commands, and status. The area distribution box 217 provides an asynchronous serial, RS-232 compatible, diagnostic port for control and status of internal BIT/BITE functions.

The area distribution box 217 provides for interfacing voice data, originating at passenger telephones 121*c*, to the passenger entertainment system controller 224. The telephone interface provides for input data from each AVU column to be combined with input data from another area distribution box 217 (at J2) and retransmitted to the passenger entertainment system controller 224 or the next area distribution box 217. The area distribution box 217 provides one open card slot to provide for expansion-retrofit function interfaces not provided in the baseline area distribution box 217. As a minimum, the area distribution box 217 provides for three retrofit options: interface to up to 3 columns of overhead electronics boxes (OEB) (not shown); interface to up to 4 seat electronics unit (SEU) columns from an APAX-140 local area controller (LAC); and provide a Standard Interface communication with aircraft zone management units (ZMUs). The area distribution box 217 provides additional service data interfaces and discrete token outputs for direct connections for up to three (3) columns that each contain up to 30 overhead electronic boxes.

An local area controller interface retrofit option provides connection to up to 4 of the SEU column interfaces of a single APAX-140 local area controller. The area distribution box 217 emulates up to 31 APAX-140 seat electronics units (SEU) per LAC column in order to interface APAX-150 audio-video unit 231 to the APAX-140 local area controller and, in effect, allow a single APAX-150 audio-video unit 231 to preform the functions of both an APAX-150 audio-video unit 231 and an APAX-140 seat eletronics unit.

The area distribution box 217 provides an RS-485 standard interface with an aircraft core zone unit. The interface provides a bidirectional, half-duplex, RS-485 serial interface compatible with the characteristics specified in ARINC-628, Part 3, standard interface. Provision are made for built-in-test capability to fully test the operation of the standard interface in either local or external loopback mode. The area distribution box interface signal pinout assignments are as shown in the tables below.

Area distribution box signal assignments

| Connector | Pin | Signal | Comment |
|---|---|---|---|
| J1 | A1 | 11 5V AC HI | from PESC or ADB |
| | A2 | 11 5V AC LO | |
| | A3 | CHASSIS GROUND | |
| | A4 | RF IN | |
| | 3 | SIGNAL GROUND | |
| | 4 | SHIELD GROUND | |
| | 5 | DATA 1 HI | |
| | 6 | DATA 1 LO | |
| | 7 | DATA 2 HI | |
| | 8 | DATA 2 LO | |
| | 12 | SIGNAL GROUND | |
| | 13 | ADDRESS BIT 2 | |
| | 14 | SIGNAL GROUND | |
| | 15 | ADDRESS BIT 0 | |
| | 16 | SIGNAL GROUND | |
| | 17 | ADDRESS BIT I | |
| J2 | A1 | RFOUT | to ADB |
| | 3 | SIGNAL GROUND | |
| | 6 | SHIELD GROUND | |
| | 7 | DATA 1 HI | |
| | 8 | DATA 1 LO | |
| | 9 | DATA 2 HI | |
| | 10 | DATA 2 LO | |
| | 12 | DSCRTIN 1 | |
| | 13 | DSCRTIN 2 | |
| J3 | A1 | RF OUT | Port 1 to FDB/AVU |
| | 1 | 11 5V AC HI | RH OUTBOARD |
| | 2 | 11 5V AC LO | |
| | 3 | AVU SEQ 1 | |
| | 4 | DATA 1 HI | |
| | 5 | DATA 1 LO | |
| | 6 | SHIELD | |
| | 7 | AVU SEQ 2 | |
| | 9 | DATA 2 HI | |
| | 10 | DATA 2 LO | |
| J4 | A1 | RF OUT | Port 2 to FDB/AVU |
| | 1 | 11 5V AC HI | RH CENTER |
| | 2 | 11 5V AC LO | |
| | 3 | AVU SEQ 1 | |
| | 4 | DATA 1 HI | |
| | 5 | DATA 1 LO | |
| | 6 | SHIELD | |
| | 7 | AVU SEQ 2 | |
| | 9 | DATA 2 HI | |
| | 10 | DATA 2 LO | |

Option 1, OEB Retrofit Signals

| Connector | Pin | Signal | Comment |
|---|---|---|---|
| J7 | 3 | OEB SEQ1 | OEB |
| | 4 | OEB DATA1 | LEFT COLUMN |
| | 6 | SHIELD | |
| J8 | 3 | OEB SEQ2 | OEB |
| | 4 | OEB DATA2 | CENTER COLUMN |
| | 6 | SHIELD | |
| J9 | 3 | OEB SEQ3 | OEB |
| | 4 | OEB DATA3 | RIGHT COLUMN |
| | 6 | SHIELD | |
| J10 | 3 | +28 VDC | Discretes |
| | 4 | +28 VDC Return | |
| | 7 | DISCOUT1 | |
| | 8 | DISCOUT2 | |
| | 9 | DISCOUT3 | |
| | 10 | DISCOUT4 | |

Option 2, LAC Retrofit Signals

| Connector | Pin | Signal | Comment |
|---|---|---|---|
| J7 | i | INLAC1 | LAC J7 |
| | 2 | OUTLAC1 | |
| | 3 | GND | |
| | 4 | GND | |
| | 5 | OUTLAC2 | |
| | 6 | INLAC2 | |
| | 7 | PROGINI | |
| | 8 | GROUND | |
| | 9 | GROUND | |
| | 10 | PROGIN2 | |
| J8 | 1 | INLAC3 | LAC J8 |
| | 2 | OUTLAC3 | |
| | 3 | GND | |
| | 4 | GND | |
| | 5 | OUTLAC4 | |
| | 6 | INLAC4 | |
| | 7 | PROGIN3 | |
| | 8 | GROUND | |
| | 9 | GROUND | |
| | 10 | PROGIN4 | |
| J9 | all | no connect | |
| J10 | all | no connect | |

The area distribution box 217 receives a combined audio/video signal on the input coaxial cable from the passenger entertainment system controller 224 or a previous area distribution box 217 and distributes the signal to each column of audio-video units 231. Also, this audio/video signal are distributed to the next area distribution box 217 on an output coaxial cable. The coaxial cable is terminated at the end of all area distribution boxes 217, and direct AVU columns. Any unused coaxial output are terminated.

AC Power outputs to each of the AVU/FDB columns meet the following design specifications.

AC Power Characteristics

| Parameter | Limit (*1) | Duration |
|---|---|---|
| Peak Current (min.) | 8.5 AMPS RMS | <200 milliseconds (*2) |
| Max Current | 7.5 AMPS RMS | continuous |
| Overcurrent Limit | 7.5 AMPS RMS | >=200 milliseconds |

(*1) All limits given to 10% tolerance.
(*2) Overcurrent Limit.

Option 1, OEB Retrofit Signals

| Connector | Pin | Signal | Comment |
|---|---|---|---|
| J7 | 3 | OEB SEQ1 | OEB |
| | 4 | OEB DATA1 | LEFT COLUMN |
| | 6 | SHIELD | |
| J8 | 3 | OEB SEQ2 | OEB |
| | 4 | OEB DATA2 | CENTER COLUMN |
| | 6 | SHIELD | |
| J9 | 3 | OEB SEQ3 | OEB |
| | 4 | OEB DATA3 | RIGHT COLUMN |
| | 6 | SHIELD | |
| J10 | 3 | +28 VDC | Discretes |
| | 4 | +28 VDC Return | |
| | 7 | DISCOUT1 | |
| | 8 | DISCOUT2 | |
| | 9 | DISCOUT3 | |
| | 10 | DISCOUT4 | |

| Option 2, LAC Retrofit Signals | | | |
|---|---|---|---|
| Connector | Pin | Signal | Comment |
| J7 | i | INLAC 1 | LAC J7 |
| | 2 | OUTLAC 1 | |
| | 3 | GND | |
| | 4 | GND | |
| | 5 | OUTLAC2 | |
| | 6 | INLAC2 | |
| | 7 | PROGINI | |
| | 8 | GROUND | |
| | 9 | GROUND | |
| | 10 | PROGIN2 | |
| J8 | 1 | INLAC3 | LAC J8 |
| | 2 | OUTLAC3 | |
| | 3 | GND | |
| | 4 | GND | |
| | 5 | OUTLAC4 | |
| | 6 | INLAC4 | |
| | 7 | PROGIN3 | |
| | 8 | GROUND | |
| | 9 | GROUND | |
| | 10 | PROGIN4 | |
| J9 | all | no connect | |
| J10 | all | no connect | |

The area distribution box 217 receives a combined audio/video signal on the input coaxial cable from the passenger entertainment system controller 224 or a previous area distribution box 217 and distributes the signal to each column of audio-video units 231. Also, this audio/video signal is distributed to the next area distribution box 217 on an output coaxial cable. The coaxial cable is terminated at the end of all area distribution boxes 217, and direct AVU columns. Any unused coaxial output are terminated.

| RF Signal Characteristics | | | | | |
|---|---|---|---|---|---|
| | RF Signal Characteristics (dB V) | | | | |
| | 50 MHz | | 400 MHz | | |
| Interface | Min | Max | Min | Max | Coaxial Cable |
| ADB Input | 31.0 | 44.0 | 27.0 | 41.0 | 50 Ohm, RG400 or equivalent |
| ADB Output | 36.0 | 42.0 | 36.0 | 42.0 | 50 Ohm, RG400 or equivalent |
| AVU/FDB Output | 25.0 | 33.0 | 35.0 | 42.0 | 50 Ohm, RG188 or equivalent |

Figure 7D:
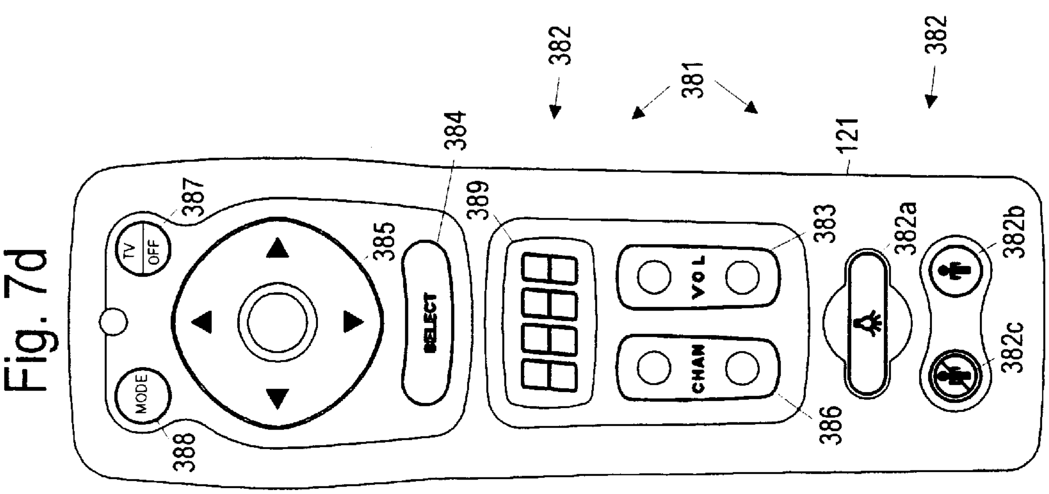
FIG. 7*d* illustrates a typical fixed passenger control unit.
Figure 7:
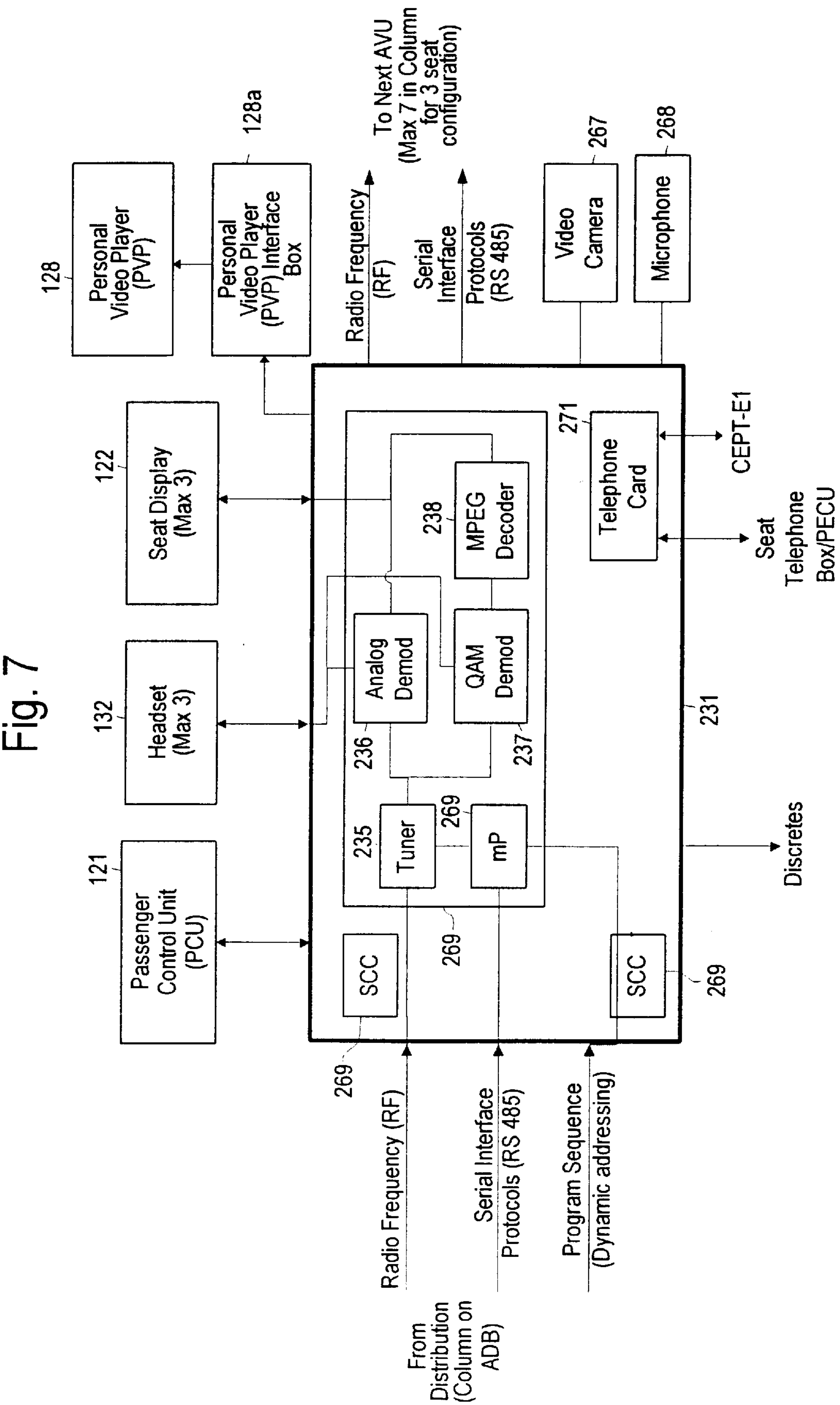
FIG. 7 is a block diagram of seat group equipment in accordance with a preferred embodiment.

FIG. 7 is a block diagram of exemplary seat group equipment 220 in accordance with a preferred embodiment. The seat group equipment 220 provides an interface for individual passengers 117. The seat group equipment 220 allows passengers 117 to interact with the system 100 to view movies, listen to audio, select languages, play games, video conference with others on and off the aircraft 111, and interface with other interactive services. The seat group equipment 220 includes the seat display 122, headphones 232, interface 128*a* for the personal video player 128 (in certain zones), a plurality of seat controller cards (SCC) 269, one for each seat 123 in the row to interface with the area distribution equipment 210, a video camera 267 and a microphone 268 for use in video conferencing, and a telephone card that interfaces to the passenger control unit 121 when it includes the telephone 121*c* and/or credit card reader 121*d*.

The passenger control unit 121 also comprises depressible buttons that permit selection of items that are displayed on the seat display 122 and turn on call lights and overhead lights, and electronics. The passengers thus control reading lights and flight attendant call enunciators via the passenger control unit 121 for making selections. In designated sections or seats, the passengers also control selection of movies and games that are to be played, control the landscape cameras, and activate video conferencing and data communications. In selected sections (business and first class) of the aircraft 111, the telephone 121*c* and credit card reader 121*d* are integrated into the passenger control unit 121, while in other sections (such as coach class) these components are not provided.

The seat controller cards 269 in each audio-video seat distribution unit 231 contain a tuner 235 that demodulates the modulated RF signals to produce intermediate frequency signals containing the NTSC video streams and the quadrature amplitude modulated MPEG compressed video streams. An analog demodulator 236 is used to demodulate the NTSC video streams to produce NTSC video and audio signals for display. A QAM demodulator 237 and an MPEG decoder 238 are used to demodulate and decompress the quadrature amplitude modulated and compressed MPEG compressed video streams to produce MPEG NTSC video and audio signals for display. The seat controller cards 269 in the audio-video seat distribution unit 231 couple the video and audio signals from a selected video stream to the video display 122 and the headset 232 for the respective passenger that is viewing and listening to the selection. The selected video stream that is displayed is one selected by the passenger 117.

Each of the seat controller cards 269 includes a microprocessor ($\mu$P) 272, such as a PowerPC™ processor, for example, that controls the tuner. The microprocessor 272 is used to address the seat controller card 269 as a node on the network. A database is set up in the primary access terminal 225 which includes entries for each of the microprocessors (i.e., each seat 123). The addressability feature permits programming of each seat to receive certain types of data. Thus, each audio-video unit 269 may be programmed to selectively receive certain videos or groups of video selections, or audio selections from selected audio reproducers. The addressability aspect of the present system 100 allows the airline to put together entertainment "packages" for distribution to different zones or groups of seats. Also, each seat (or seats in different zones) may be programmed to be able to play games, use the telephones 121*c* and credit card reader 121*d*, use a personal video player or computer, have the ability to engage in video teleconferencing and computer data interchange, or gain access to the Internet. Furthermore, the addressability associated with each seat permits order processing and tracking, and control over menus that are available to passengers at respective seats, for example. The addressability feature also permits dynamic reconfiguration of the total entertainment system 100.

Figure 7A:
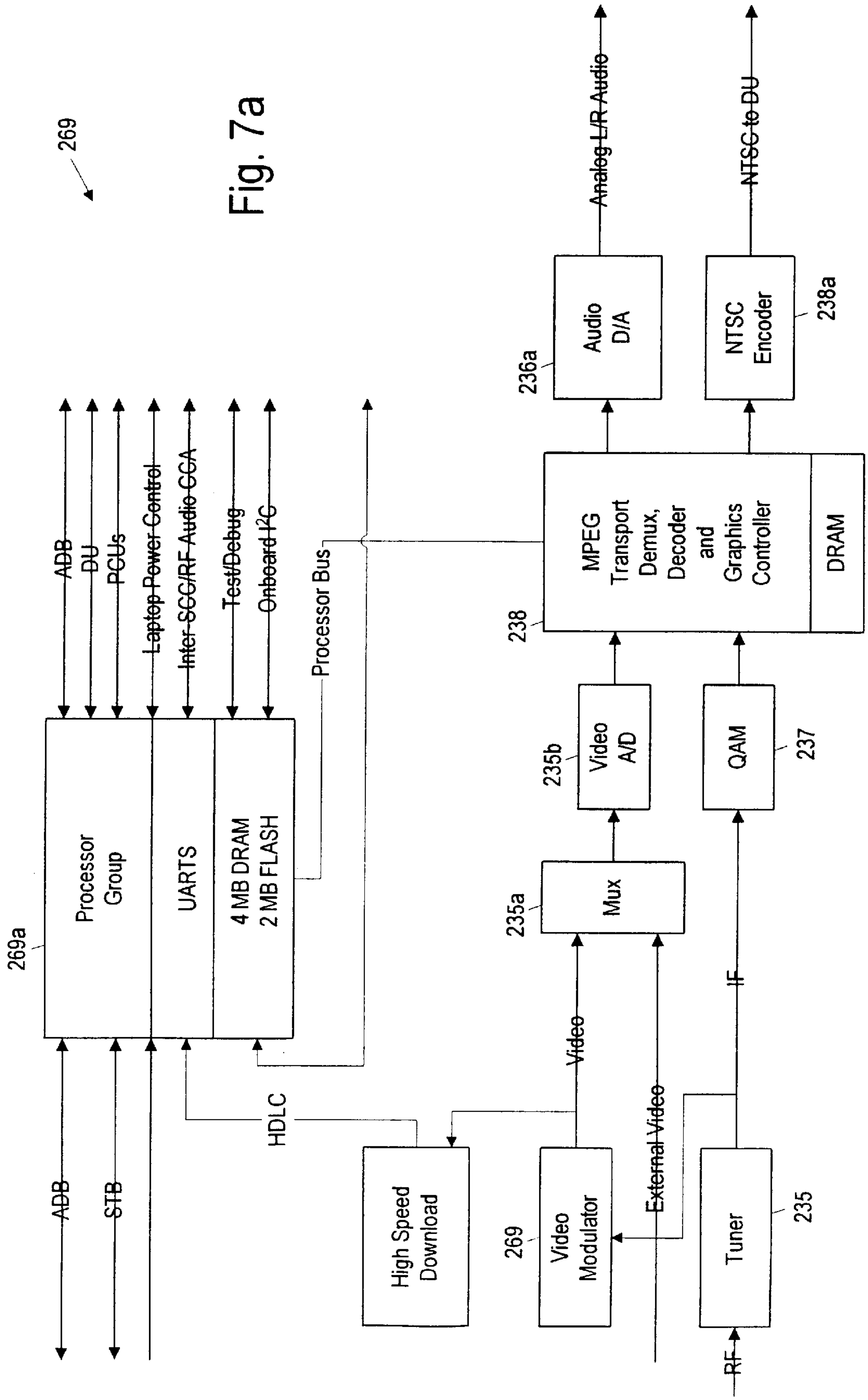
FIG. 7*a* is a block diagram of the seat controller card of the seat group equipment in accordance with a preferred embodiment.

FIG. 7*a* is a block diagram of the seat controller card 269 of the audio-video unit 231. The audio-video unit communicates with the head end equipment 200 via the area distribution box 217. The audio-video unit 231 provides outputs for 1–3 seats 123. The audio-video unit 231 provides RF tuning for audio, video and data, (MPEG and QAM decode), passenger service system (PSS) controls, passenger entertainment controls, display controls, telephone system interface, and laptop power system control interface.

The major functional requirements of the audio-video unit 231 are that it: (a) drives 1–3 seat display units 122 with or without touch screens, (b) provides touch screen and display controls, (c) provides two audio jacks per seat (1 stereo jack, 1 noise canceling headset), (d) provides two passenger control unit interfaces per seat 123 (1 stationary, 1 corded), (e) interfaces to a parallel telephone system, (f) provides discrete signal interface a parallel laptop power supply system, (g) demodulates and tunes NTSC and QAM from the RF signal, (h) provides a PC type video games, (i) provides an RS-485 interface for ADB-AVU or AVU-AVU communications, j) provides an interface for personal video players, and (k) provides a PSS interface to an external parallel passenger service system (PSS), (1) provides hardware and software interfaces that provide for video teleconferencing and Internet communications.

Referring to FIGS. 7 and 7*a*, one seat controller card 269 is dedicated to a passenger seat. Therefore, 3 seat controller cards 269 are required for a 3-wide audio-video unit. 2 seat controller cards 269 are required for a 2-wide audio-video unit 231. A power supply module (PSM) supplies power for the 3 seat controller cards 269, an audio card (that includes the tuner 235 and the analog demodulator 236), the displays, and PCUs 121. The audio card electrical circuits comprise audio and RF demodulators (i.e., the tuner 235 and the analog demodulator 236). An interconnect card connects the 3 seat controller cards 269, the audio card, the power supply module, and external connectors.

The seat controller card 269 provides many functions for a single passenger. The seat controller card 269 is comprised of a circuit card assembly (CCA), operating system 290 and drivers 291–295 (see FIG. 7*b*). Up to three seat controller cards 269 may reside in an audio-video unit 231 along with the power supply module, a backplane circuit card assembly, a radio frequency (RF) audio circuit card assembly, and application software. The audio-video unit 231 resides under the passenger's seat 123 and serves from 1 to 3 passengers 117 depending on the configuration. Some of the functions that the seat controller card 269 provides include: analog video and audio demodulation, graphics overlay capability, and Motion Picture Experts Group (MPEG) video and audio decompression. The seat controller card 269 provides the ability to demodulate the existing analog video signals as well as MPEG encoded signals delivered by the media server 211 which comprises a video-on-demand (VOD) server.

The audio source is derived from the MPEG decoder 238. The MPEG decoder 238 processes up to a layer 11 MPEG-1 encoded audio stream. The source of the encoded audio stream comes from a digital RF channel.

The tuner 235 downconverts the RF channels to a common intermediate frequency (IF). The channels may either be digital information which is quadrature amplitude modulation (QAM) encoded or analog NTSC video signals. The QAM encoded video signals are demodulated by the QAM demodulator 237 and passed to the MPEG decoder 238. The NTSC video signals are digitized in a video A/D converter 235*b* and are passed to the MPEG decoder 238. The format of the digital channels after QAM demodulation is MPEG-2 transport streams. The MPEG-2 transport streams may contain many streams of video, audio and data information. The MPEG decoder 238 (demultiplexer) may also receive data information to be sent to the SCC processor group 269*a*. In the MPEG transport group, the capability exists to add text overlay with the digital video data. The digital data is converted to analog NTSC format using an NTSC encoder 238*a* for the display 122.

The NTSC video signal to the passenger display 122 may come from 3 sources. One source is an analog NTSC signal from an RF channel. The second source is from an MPEG-1 or MPEG-2 encoded video signal from a digital RF channel. The 3rd source is from an external NTSC signal. All 3 of these sources go through a graphics controller (shown as part of the MPEG decoder 238). The digital video data is converted to analog NTSC format by the NTSC encoder 238*a*. The NTSC video signal is sent to the display unit 122. The graphics controller can overlay either a portion of the video source or the entire screen. The graphics controller is accessed by the SCC processor group 269*a*.

The SCC processor group 269*a* comprises a PowerPC processor operating 40 MHz, for example, 4 MB of DRAM, 2 MB of FLASH RAM, an RS-232 interface to the display unit 122, an RS-232 interface for debugging purposes, an RS-232 interface for the personal video player (8 mm player), an RS-485 interface to the area distribution box 217, a synchronous serial interface for inter-SCC and RF audio circuit card assembly communication, a TTL UART interface to a seat telephone box (STB) 303, a TTL UART interfaces to the passenger control units 121, Slot ID TTL inputs, a Laptop Power TTL output, a Reset TTL input, two TTL outputs for software programmable LEDs not on the seat controller card 269, one TTL output for a software programmable LED on the seat controller card 269, two TTL outputs for PSS discretes (Read and Call Light), a TTL output for +12 VDC switchable for LCD backlight, a 12C interface for communication with various onboard components, and it has the ability to generate sounds through the MPEG controller 238 to the audio D/A 236*a*.

The power supply module supplies the required power for the audio-video unit 231, the displays 122, and the PCU/handsets 121.

The audio circuit card assembly provides several functions. It demodulates the RF signal to provide audio. It has a multiplexer with audio inputs from the seat controller card 269, demodulated RF signal audio, and external audio. It routes the 115 VAC power to the power supply module and routes the DC power from the power supply module to the interconnect card.

The audio to the passenger headphones can come from the RF audio circuit card assembly. The RF audio circuit card assembly can demodulate and convert the digital Pulse-Code Modulation (PCM) audio signals from the passenger entertainment system controllers 224 to analog signals for all three passengers supported by the audio-video unit 231. When the audio source is from the RF audio circuit card assembly then the audio source from the seat controller card 269 is not used. Each seat controller card 269 can communicate with the RF audio circuit card assembly to select the RF audio channel, its volume, and whether or not to send the RF audio or the SCC audio to the passenger.

The interconnect card connects all the modules within the audio-video unit 231. It is a backplane to which the 3 seat controller cards 269, the audio card, and the external connectors interconnect. The audio-video unit 231 avoids internal wiring and cables for ease of assembly. The interconnect card provides the RF tap and splitter for the audio and seat controller cards 269. The interconnect circuit card assembly provides 3 externally viewable LED's (Red, Green, Amber).

Figure 7B:
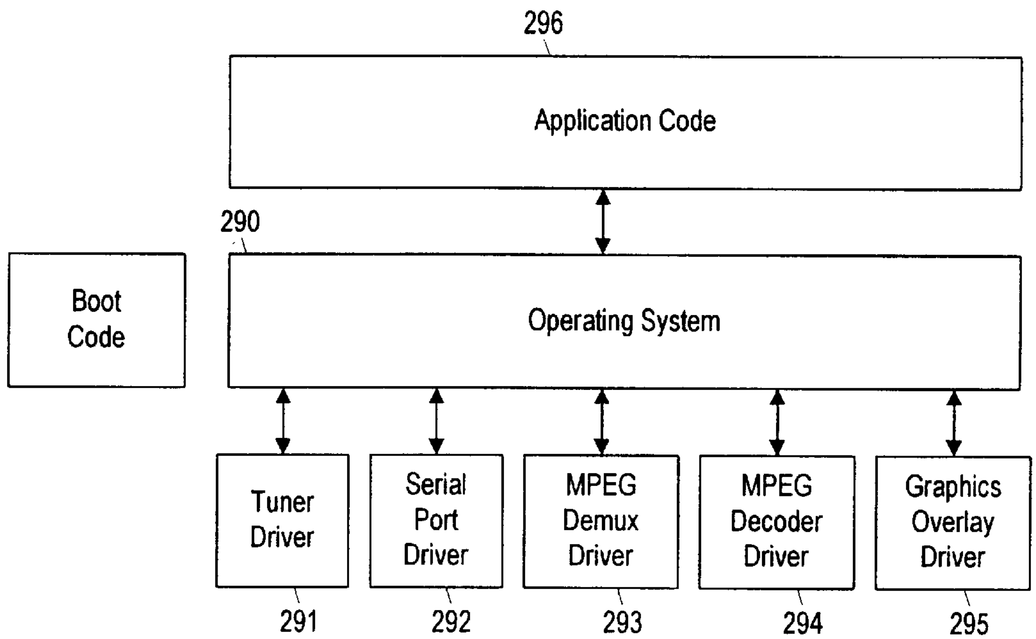
FIG. 7*b* is a block diagram of software used in the seat controller card of FIG. 7*a;*

FIG. 7*b* is a software block diagram for the seat controller card 269 in the audio-video unit 231 of FIG. 7*a*. An operating system 290 and hardware drivers 291–295 provide a standard and protected environment for developing applications. The operating system 290 on the seat controller card 269 is a version of the OS-9000 operating system from Microware.

The AVU software is downloadable from the head-end equipment. This downloadable software includes a database, application software 296, operational software, and dynamic addressing (sequence in) software. The software is partitioned as follows. flash memory (2 MB) contains operating system software, diagnostics, core applications, custom applications, and a database. RAM contains graphics and games. The EEPROM (256 Bytes) contains configuration data. The SCC software provides power-on confidence tests and boot code to load the operating system. The SCC software also provides drivers for accessing the various hardware functions of the seat controller card 269. The drivers include a graphics overlay driver, an MPEG decoder driver, an MPEG demultiplexer driver, serial port drivers, a tuner driver, for example.

The interface to the area distribution box 217 is a half-duplex Universal Synchronous/Asynchronous Receiver Transmitter (USART) channel with an RS-485 transceiver physical interface to a single twisted wire pair. The termination for the RS-485 data lines is at the area distribution box 217 and after the last seat controller card 269 on the data lines. The termination is not provided on the SM. The SCC processor group 269*a* reads the status of the RS-232 sequence in signal and drives the RS-232 sequence out signal to a high or low state.

The seat controller card 269 also has the sequence in signal provide a hardware clear to send function for the area distribution box UART. The clear to send signal to the UART is asserted under the following conditions: it has been enabled by the seat controller card 269 when the seat controller card 269 does not need to have software control over the sequence signals, when the sequence in signal is asserted, when the sequence out signal is not asserted, and when the UART request to send signal is asserted.

The seat controller card 269 also has the sequence in signal provide a hardware path to propagate to the sequence out signal. The sequence out signal is asserted by hardware under the following conditions: it has been enabled by the seat controller card 269 when the seat controller card 269 does not need to have software control over the sequence signals, when the sequence in signal becomes asserted, when the sequence out signal is not asserted, and when the UART request to send signal is not asserted.

The sequence out signal is de-asserted by hardware under the following conditions: it has been enabled by the seat controller card 269 when the seat controller card 269 does not need to have software control over the sequence signals, when the sequence in signal is de-asserted, and when the sequence out signal is asserted.

The high speed download signal from the cabin file server 268 is an FMO encoded HDLC data stream.

The audio-video unit 231 also provides a maximum of three interfaces for communicating with the display unit 122 associated with that audio-video unit 231. The audio-video unit 231 communicates with the processor in the display unit 122 via a single full-duplex RS-232 link. The RS-232 data transmission speed between the display unit 122 and the audio-video unit 231 is 19.2 Kbps minimum. This interface is used by the audio-video unit 231 to transmit display unit control information.

The seat controller card 269 outputs a composite video baseband signal (CVBS) to the display unit 122 at a level of 1 V peak to peak into 75 ohm impedance. The external NTSC signal is a CVBS at a level of 1V peak to peak into 75 Ohm impedance.

The audio-video unit 231 provides an interface for 6 passenger control units 121. This interface is implemented as a full-duplex TTL level. This interface is used to transmit passenger service requests in the form of PCU pushbutton information from the passenger control unit 121 to the audio-video unit 231, and for the passenger control unit 121 to transmit BIT/BITE results data to the audio-video unit 231.

The seat controller card 269 outputs left and right analog audio baseband signals to the RF audio circuit card assembly at a level of 2V peak to peak into a 5 k ohm impedance.

The audio-video unit 231 supplies data communications via TTL serial interface to the seat telephone 121*c*. In some cases, 115 VAC power may be supplied to the seat telephone 121*c* from the audio-video unit 231. The audio-video unit 231 supplies the interface to a parallel passenger service system in the form of reading light, call, and call reset discretes. An interface for audio, video, and data is provided for the use of personal video players 128.

The seat controller card processor group 269*a* drives the laptop power output with a TTL compatible output. The output drive is at least 3.2 mA.

The debug port download discrete signal is coupled to a TTL compatible input with an pull-up resistor to +5V DC. The signal may be tied to ground or left open. When the signal is grounded it indicates that code is to be downloaded through the debug port and programmed into the FLASH RAM. The seat controller card processor group 269*a* reads the state of the debug port download discrete signal.

The built-in seat test discrete signal is tied to a TTL compatible input with an pull-up resistor to +5V DC. The signal may be tied to ground or left open. When the signal is grounded it indicates to the application code to perform built-in seat tests.

The reset input to the seat controller card 269 causes a hardware reset of the PowerPC processor. The signal may be tied to ground or left open. When the signal is grounded it causes a hardware reset.

The inter-SCC and RF audio circuit card assembly interface is a serial peripheral interface (SPI) between all three seat controller cards 269 and the RF audio circuit card assembly in the audio-video unit 231. Any seat controller card 269 can become the master of the bus. The signal pins are described as follows. Each seat controller card 269 has an SPI request output signal and an SPI grant input signal. The request and grant signals are active low TTL. The seat controller cards 269 drive the request lines and the RF audio circuit card assembly arbitration logic drives the grant lines. When the seat controller card 269 is granted control of the SPI it becomes the master.

The master sources the clock and only pulses the clock when there is data to be sent. There are two data lines: master in/slave out and master out/slave in. There are three master select out signals. One is for the RF audio circuit card assembly and two are for the other two seat controller cards 269. The SPI slave select input indicates that the seat controller card 269 is a slave to another SCC master. The sustained data rate between a master and a slave seat controller card 269 is at least 100 Kbps.

The seat controller card 269 demodulates a QAM-64 encoded digital stream from the IF output of the tuner, performs forward error correction (FEC) on the digital stream, and produces an ISO/IEC 13818-1 MPEG-2 transport stream (MPTS). The seat controller card 269 de-multiplexes at least two packetised elementary streams, one for video and one for audio, from an MPTS. The seat controller card 269 decrypts both the audio and video elementary streams. The transport packet headers is not encrypted. The key used for decrypting is obtained from the cabin file server 268 via the area distribution box 217. The seat controller card 269 decodes video elementary streams according to the WAEA 0395 specification for low resolution seat backs. The seat controller card 269 decodes audio elementary streams according to the WAEA 0395 specification. The seat controller card 269 receives at least one private data stream from the multiplexed MPEG-2 transport stream. The seat controller card 269 provides notification of MPEG processing errors to the operating system, including MPTS underruns or overruns.

The seat controller card 269 provides full duplex UART channels for the following interfaces: display unit 122 with an RS-232 physical interface, STB 303 with a TTL physical interface, PCU-A with a TTL physical interface, PCU-B with a TTL physical interface, Debug with an RS-232 physical interface, Personal Video Player.

The seat controller card processor group 269*a* drives the two LED outputs with a TTL compatible output. The output drive is at least 3.2 mA. Upon power up the outputs is tristate. The signals can be driven low under software control. he seat controller card 269 does not drive the signals high, only tristate.

Figure 7C:
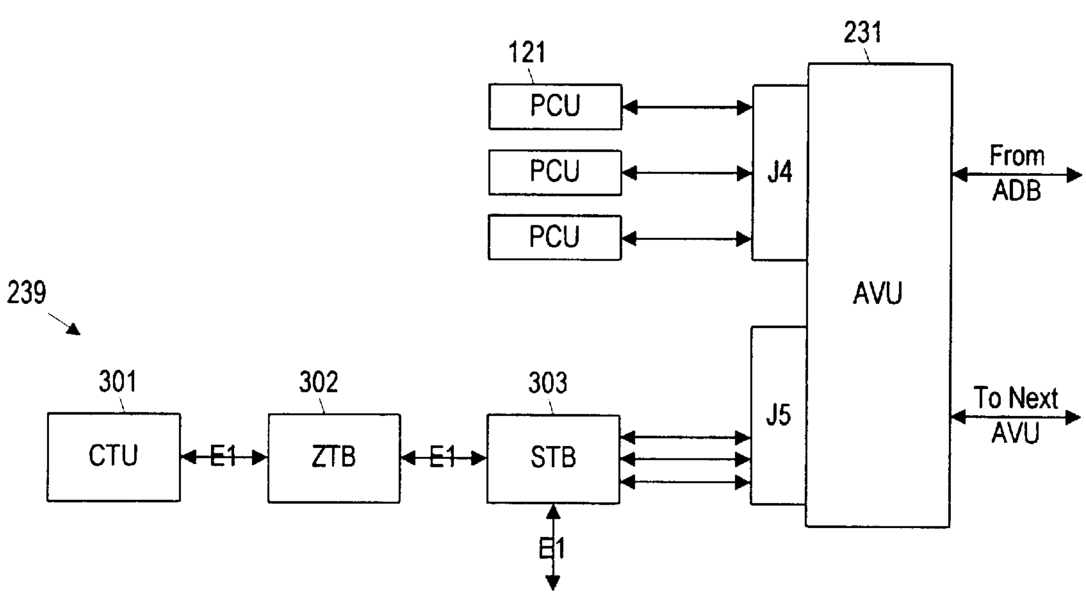
FIG. 7*c* is a block diagram of an AVU interface to a parallel telephone system in accordance with a preferred embodiment.

FIG. 7*c* is a block diagram of the AVU interface to the cabin telephone system 239 (which includes a cabin telephone unit 301 and a plurality of zone telephone boxes 302), and which provides for a parallel telephone system. The PCU/handset 121 is a passenger control unit 121 with PSS and entertainment controls on one side of the unit and a telephone handset 132 on the opposite side. The audio-video unit 231 provides DC power and data communications to the PCU/handset 121. The audio-video unit 231 interfaces to the seat telephone 121*c* via the serial data bus TTL level. It passes telephone function communications between the PCU/handset 132 and the seat telephone box 303. It may read telephone information such as phone numbers entered at the PCU/handset 132 and display them on the seat display 122. The audio signals to and from the PCU/handset 132 are routed through the audio-video unit 231 directly to the seat telephone box 303. The audio-video unit 231 does not supply power to the seat telephone box 303.

FIG. 7*d* illustrates a typical fixed passenger control unit 121. The passenger control unit 121 interfaces with the system via the audio-video unit 231 and provides a passenger interface having input controls 381 and indicators 382. The passenger control unit 121 communicates with the audio-video unit 231 for PCU/AVU data, AVU/PCU data, and power.

The interface between the audio-video unit 231 and the passenger control unit 121 include the signals listed in the following table.

AVU Interface

| | | | |
|---|---|---|---|
| PCUPWR | 5–6.5 VDC, 10%, TBID ma max. | to PCU | from AVU |
| SigGnd | Signal Ground | to PCU | from AVU |
| TxData-150 | 0–5V TTUCMOS, 2400 bps, 8 bit char, odd parity, 1 stop bit | to AVU | from PCU |
| RxData-150 | 0–5V TTUCMOS, 2400 bps, 8 bit char, odd parity, 1 stop bit | to PCU | from AVU |

The interface between the game controller (GC) and the passenger control unit 121 includes the signals listed in the following table.

Game Controller Interface

| | | | |
|---|---|---|---|
| GCPWR | 5 VDC, 10 ma max. | to GC | from PCU |
| SigGnd | 5 VDC Return | to GC | from PCU |
| P/S | Load/Shift, TTUCMOS | to GC | from PCU |
| Sclk | Shift Clock, TTL/CMOS | to GC | from PCU |
| Sdata | Shift Data, TTUCMOS | to PCU | from GC |

The interface between the credit card reader 121*d* and the passenger control unit 121 includes the signals listed in the following table.

Card Reader Interface

| | | | |
|---|---|---|---|
| CCRPWR | 5 VDC, 120 ma max. | to CCR | from PCU |
| SigGnd | 5 VDC Return | to CCR | from PCU |
| SCL | 17C -Shift Clock, 0–5 V Open-Collector | to/from CCR | to/from PCU |
| SDA | 12C Shift Data, 0–5 V Open-Collector | to/from CCR | to/from PCU |

The passenger control unit 121 may be either side mounted or top mounted onto an arm rest. The passenger control unit 121 has a display 389 that is a 4 character alphanumeric display. An LED display 389 is typically used, but is not mandatory. An equivalent LCD display 389 may be used instead.

Brightness of the LED display 389 is controllable, as a minimum, to two levels of brightness. Full brightness is such that the display 389 is clearly readable when the cabin lights are turned on (at normal intensity). When dimmed, the brightness level of the display 389 is such that the display 389 is barely readable when the cabin lights are turned on (at normal intensity). Keypad backlight brightness is such that function key locations are visible when the cabin lights are dimmed (off), but are not visibly illuminated when the cabin lights are on. The brightness of the LED display 389 is luminous 5.6 mcd (typical). Keypad backlight brightness is luminous 3 mcd (typical).

A reading light on/off function key 382*a* turns on/off an overhead reading light. Pressing the reading light function key sends a message to turn on/off the reading light.

Call light on and call cancel function keys 382*b*, 382*c* permit calling a flight attendant. Pressing the call light on function key 382*b* sends a message to turn on the flight attendant call light and chime. Canceling the call to a flight attendant is done by pressing the call cancel flight attendant call function key 382*c*. Pressing the call cancel function key 382*c* sends a message to turn off the flight attendant call light.

A volume control (increase/decrease volume) key 383 is provided. Pressing a part of the volume function key 383 that contains a convex bump increases the audio level for the music, video, or game. Pressing a part of the volume function key 383 that contains a concave depression decreases the audio level for the music, video, or game. Pressing of the volume control function key 383 sends messages to increase or decrease the audio level.

A select function key 384 allows the passenger to make a selection.

Screen navigation function keys 385 provide a means for a passenger 117 to navigate through menus displayed on the display 122 or seat display unit (SDU) 133. These function keys 385 allow the passenger 117 to navigate through the system by providing capability to move up, down, left, and right on the display 122.

A channel up/down function key 386 provides for channel control (increase/decrease channel selection). Pressing a part of the channel function key 386 that contains a convex bump increases the audio or video channel by one, depending on which mode the passenger is using (audio or video). Pressing a part of the channel function key 386 that contains a concave depression decreases the audio or video channel by one. Pressing of the channel up/down function key 386 sends messages to increase/decrease channel numbers.

If the backlight of the seat display unit 133 is off, then pressing a TV/OFF function key 387 turns the seat display unit backlight on. If the backlight of the seat display unit 133 is on but the passenger is at any screen besides the main menu, then pressing the TV/OFF function key 387 returns the passenger to the main menu. If the backlight of the seat display unit 133 is on and the passenger is already at the main menu, then pressing the TV/OFF function key 387 turns the backlight of the seat display unit 133 off.

Pressing a mode function key 388 allows the passenger to have picture adjustment control of the seat video display through menus displayed on the seat display unit 133. Pressing the mode function key 388 cycles through the screen adjustment types (contrast, brightness, color, and tint, as applicable).

When a passenger activates a function key, the passenger control unit 121 passes function key data to the audio-video unit 231 for processing. The audio-video unit 231 receives the function key data in a message transmitted via an AVU interface. Function key inputs have a debounce time of twenty milliseconds. Function keys are polled at least every 20 milliseconds. The time between detection of function key activation to the time the output of the function key activation message to the audio-video unit 231 is started is no more than five milliseconds.

Several of the function keys include an auto-repeat feature. These include the volume up, volume down, left function, right function, up function, down-function, channel up, and channel down keys 383, 385, 386. When an auto-repeat function key is activated continuously, a function key activation message is sent to the audio-video unit 231 every second until the function key is released.

In addition to the auto-repeat feature, the channel up function key and the channel-down-function key includes a "stewing" feature. Whenever a channel control function key is still activated after five seconds have elapsed, then the passenger control unit 121 transmits a slew-channel message to the audio-video unit 231 to activate "slewing" of the channels on the display of the passenger control unit 121. "Slewing" means that the audio-video unit 231 increases the rate at which the channels on the display are incremented or decremented. After the slew-channel message is sent, the passenger control unit 121 discontinues sending any function key activation messages for that function key until it is released. After the function key is released, the passenger control unit 121 sends a slew-channel-off message to the audio-video unit 231 to halt the "slewing" of channels on the display. If the function key remains activated longer than 90 seconds, the passenger control unit 121 sends the slew-channel-off message to the audio-video unit 231 to halt the slewing of channels on the display. The passenger control unit 121 sends no more function key activation messages for that function key to the audio-video unit 231 until it is released. This feature prevents a stuck function key from overloading the audio-video unit 231 with messages.

All other function keys report the first occurrence of a function key closure, but no other messages for that function key are reported until after the function key is opened.

Concurrent function key activation of the channel up, channel down, volume up, and volume down function keys 386, 383 is be permitted. If both function keys 386, 383 are activated, only the first function key detected is considered activated. If the second function key remains activated after the, first function key is released, it is then considered activated.

The passenger control unit display 389 is a 4-character alphanumeric LED display which, during in-flight entertainment operation, is controlled by the audio-video unit 231 to inform the passenger of current mode status and video functions.

The passenger control unit 121 accepts messages from the audio-video unit 231 instructing it to display characters on its display 389. The displays 389 may be updated at any time while the passenger control unit 121 is in the in-flight entertainment state or BITE state. Allowing the passenger control unit 121 to update the displays 389 at any time, the system has the ability to indicate general status, BIT results and BITE results.

If the passenger control unit 121 has just undergone a reset, it updates the display as follows. The passenger control unit 121 displays the results of its self-test. The passenger control unit 121 does not display the results of its self-test if it receives the set-display command from the audio-video unit 231.

Passenger information indicators are updated on command from the audio-video unit 231. The passenger control unit 121 performs automatic dimming of its display as follows. Automatic dimming is performed only after the passenger control unit 121 receives the enable-autodim command from the controlling audio-video unit 231. Automatic dimming is performed only when LED display 389 are present. No automatic dimming is performed if the displays are LCD. When no function key activation or display update has occurred during a five to ten second period of time, the passenger control unit 121 dims the LED display 389. Upon subsequent function key activation by a passenger or upon receipt of a command to update the display, the passenger control unit 121 returns the display 389 to its normal intensity.

The passenger control unit 121 enters a test/maintenance mode when the passenger control unit 121 receives it's own loopback-message. Once the passenger control unit 121 is in test/maintenance mode, the passenger control unit 121 displays "TEST" on the LEDs of the display 389. When a button is activated, the passenger control unit 121 displays the result of the button test. When the activated button is released, the passenger control unit 121 displays "TEST".

During BIT/Self-Test operation, verification of passenger control unit function keys are determined by the following table.

LED Display for BIT/Self-Test

| Function | 4-Character Display |
|---|---|
| BIT ROM Check | ROMC |
| BIT ROM Check Failure | ROMF |
| BIT RAM Check | RAMC |
| BIT RAM Check Failure | RAMF |

-continued

| LED Display for BIT/Self-Test | |
|---|---|
| Function | 4-Character Display |
| Communications Check Failure | COMF |
| Communications Check Passed | WAIT |

During manufacturing/production test operation, verification of the function keys of the passenger control unit 121 is determined by the following table.

| LED Display for Manufacturing/Production Test Manufacturing/Production ATP | |
|---|---|
| Self-Test Mode | TEST |
| TWOFF | WON |
| Mode | MODE |
| Navigation Up | UP |
| Navigation Down | DOWN |
| Navigation Left | LEFT |
| Navigation Right | RGHT |
| Select | ENTR or SEL |
| Channel Up | CHUP |
| Channel Down | CHDN |
| Volume Up | VUP |
| Volume Down | VDN |
| Reading Light | LGHT |
| Attendant Call | CALL |
| Attendant Call Cancel | CANL or CNCL |

The passenger control unit 121 interfaces to the credit card reader 121*d*. The credit card reader 121*d* reads three magnetically encoded tracks from credit cards 257 that are encoded in accordance with ISO standards 7810 and 7811. Data content is read in accordance with the VisaNet Standards Manual and contain at least: major industry identifier, issuer identifier, primary account number, surname, first name, middle initial, expiration date, service code, and PIN verification data.

The passenger control unit 121 interfaces to a standard super NES game controller. The game controller support the following functions. Pressing the Left and Right Movement function key allows the passenger to move left and right during game play. Pressing the Up and Down Movement function key allows the passenger to move up and down during game play. Pressing the game start function key allows the passenger to start the game. Pressing the game select function key allows the passenger to make a variety of selections at the beginning of a game (i.e., game difficulty, etc.). Pressing the A, B, X, Y game functions function keys allows the passenger to perform several functions during game play (i.e., jump, fire, defend, etc.). Pressing the paddle functions function keys allows the passenger to perform left/right paddle functions (i.e., "fire buttons").

Figures 8, 9:
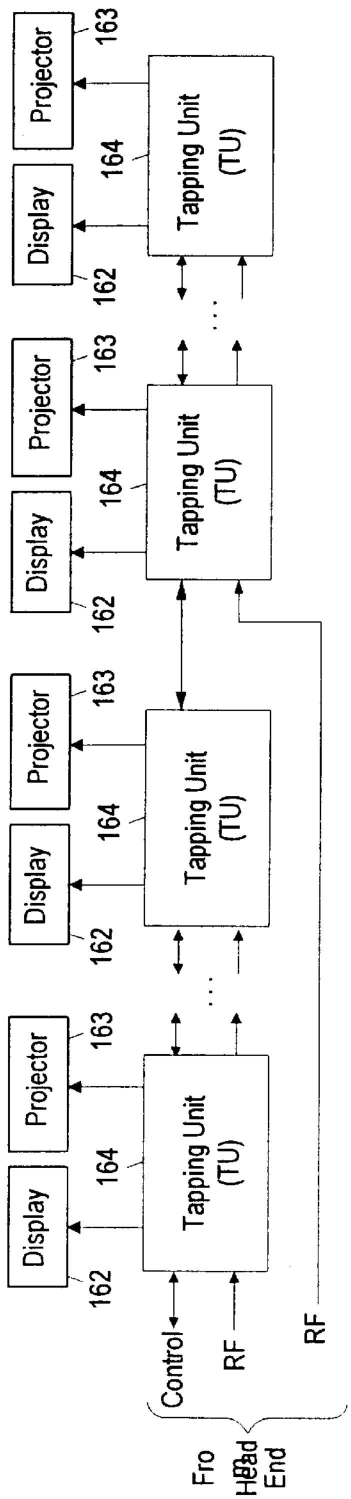
FIG. 8 is a block diagram of overhead equipment in accordance with a preferred embodiment.
FIG. 9 is a chart that illustrates routing of video and audio information in the system.

FIG. 8 is a block diagram of exemplary overhead equipment 230 in accordance with a preferred embodiment. The overhead equipment 230 accepts display information from the first passenger entertainment system controller (PESC-A) 224*a* in the head end equipment 200 and distributes it to overhead projectors 262 or overhead or wall mounted displays 263 or bulkhead monitors 263 throughout the aircraft 111.

The overhead equipment 230 comprises a plurality of tapping units 261 coupled to the overhead and bulkhead monitors 263 and video projectors 262. The overhead equipment 230 uses RF video distribution, wherein the RF signal is distributed from the head end equipment 210 to the overhead equipment 230 via the plurality of tapping units 261 which are connected in series. The tapping units 261 contain tuners 235 to select and demodulate the RF signal providing video for the monitors 263 and projectors 262 coupled thereto. Control is provided to the overhead equipment 230 using an RS-485 interface 264 coupled the first passenger entertainment system controller (PESC-A) 224*a*. The information on the RS-485 interface 264 between the first passenger entertainment system controller (PESC-A) 224*a* and the tapping units 261 is controlled via operator input and protocol software running on the cabin file server 268.

A preferred embodiment of the in-flight entertainment system 100 operates in three possible states. These states include 1) a configuration state, 2) a ground maintenance state, and 3) an entertainment state. In the configuration state, aircraft-installation-unique parameters are initialized and modified. The configuration state is initiated by an operator. The configuration state is entered and exited without the use of additional or modified system hardware. In the ground maintenance state, the system 100 performs self-diagnostics to determine system failures. The ground maintenance state is initiated by an operator. The ground maintenance state is entered and exited without the use of additional or modified system hardware. The entertainment state is the primary state of the system 100 and is initiated by the operator. The system 100 provides several entertainment modes as defined below. The system 100 has modular in design so any one or all modes may exist simultaneously depending on the configuration of the system 100. The system 100 is configurable so that each zone (first class, business class, coach class, for example) of the aircraft 111 can operate in a different entertainment mode. In the entertainment state, the passenger address functions and passenger service functions are independent of the mode of operation.

The entertainment modes include an overhead video mode, a distributed video mode, and an interactive video mode. In the overhead video mode, video is displayed in the aircraft on the overhead monitors 163. Different video entertainment is possible for different sections of the aircraft. In the distributed video mode, multiple video programs is distributed to the individual passengers of the aircraft at their seat. The passenger selects the video program to view. The quantity of programs available depends upon system configuration. In the interactive video mode, the system 100 provides a selection of features in a graphical user interface (GUI) presentation to the passenger. Depending on the system configuration, the features may include language selection, audio selection, movie selection, video game selection, surveys, and display settings.

The system 100 supports three different methods of addressing passengers 117. These are passenger address (PA) override, emergency passenger address, and video announcement methods. Upon initiation of any of the three passenger address methods, an independent external interface signal (i.e., keyline) is routed to the first passenger entertainment system controller (PESC-A) 224 of the system 100. The system 100 distributes passenger address audio in the manner described below.

The system 100 utilizes keyline data to direct the passenger address audio to a particular passenger address zone, selected passenger address zones, or to the entire aircraft 111. During operation, the system 100 does not introduce an audibly perceptible artifact into the distributed audio programming when the state of the keylines changes.

A minimum volume level for the passenger address audio that is heard on passenger headphones 232 is specified in an off-line database. If the current volume of any headphone 232 in the selected zone(s) is below this minimum level, then the volume for that headphone 232 is raised to the minimum volume level. If the current volume of the headphone 232 is above this minimum level, then the volume is not changed.

Passenger address announcement functions may be provided by a separate on-board passenger service system 255, such as an APAX-140 system 255 (FIG. 15) marketed by Rockwell Collins Passenger Systems, and which is employed as the passenger address system 222. Such systems provide keyline information and passenger address audio for distribution the system 100. A passenger address announcement is initiated by a crew member keying a PA microphone on the aircraft 111. Passenger address audio is the voice of a crew member speaking into a microphone. The two types of passenger address announcements are described below.

For passenger address override, passenger address audio is directed to either a particular passenger address zone or selected passenger address zones as indicated by the keyline data. If the selected passenger address zones comprise the entire aircraft 11, then this is equivalent to an emergency passenger address, discussed below. The system 100 routes the passenger address audio signal to cabin audio speakers in the specified passenger address zone(s). The volume level for the cabin audio speakers is controlled by the separate on-board system, such as the APAX-140 system 255, for example. The system 100 also routes the passenger address audio to all passenger headphones 232 in the specified passenger address zone(s), regardless of which audio or video program was previously selected by the passenger 117. In addition, the system 100 displays "PA" on LCD displays of all passenger control units 121 in the specified passenger address zone(s). Also, the system 100 does not pause any active video or audio programming during the passenger address override announcement.

For emergency passenger address, passenger address audio is directed to the entire aircraft 111. The system 100 routes the passenger address audio signal to all cabin audio speakers in the entire aircraft 111. The volume level for the cabin audio speakers is controlled by the separate on-board system. The system 100 also routes the PA audio signal to all passenger headphones in the entire aircraft 111, regardless of which audio or video program has been previously selected by the passenger. In addition, the system 100 displays "PA" on all PCU displays 389 in the entire aircraft 111. The system 100 also pauses all active video entertainment for the duration of the emergency PA announcement. Upon completion of the announcement, the system 100 automatically reactivates the selected entertainment after a tailorable delay time from the time the keyline discrete becomes inactive.

The system 100 initiates a video announcement upon operator input at the primary access terminal 225. Video announcement audio and video are contained on the video announcement tape. The system 100 permits the selection, on a zonal basis, of whether a video announcement is routed to the passenger seat 123, the cabin, or to both the passenger seat 123 and the cabin. FIG. 9 is a table that illustrates routing of video and audio information in a preferred embodiment of the system 100.

It is possible to override, on a zonal basis, a passenger's in-seat viewing selection (i.e., seat display unit 133) and in-seat audio (i.e., headphones 132). When in-seat override is not activated, it is possible for each passenger 117 in the selected zone to choose to view and/or listen to the video announcement.

Upon initiation of the video announcement, the system 100 causes all overhead displays and all overridden in-seat displays within the selected zone(s) to select the video channel on which the video announcement is being played, regardless of which video channel had been previously selected. The system 100 also causes all cabin audio speakers and all overridden passenger headphones within the selected zone(s) to select the audio channel on which the video announcement is being played, regardless of which audio channel has previously been selected.

When in-seat override is activated for a particular zone, it is not possible for the passengers in that zone to turn off their video display, turn off their headphone audio or turn it down below the minimum volume level during the video announcement. Upon completion of the video announcement, the previously selected in-seat video channels and in-seat audio channels is restored.

A default volume level for the cabin audio speakers is specified in an off-line database. The volume for the cabin audio speakers are adjustable on a zonal basis. These volume adjustments are retained until the system 100 is shut down.

The system 100 confirms that the video reproducer 227 (video cassette player 227) assigned to the video announcement is operational and contains a tape prior to initiating a video announcement. If the assigned video reproducer 227 fails or is manually stopped during a video announcement, the video announcement terminates and the previously selected in-seat video channels and in-seat audio channels are restored.

Passenger service functions (e.g., reading light and attendant call) are provided by a separate on-board system such as CIDS system 251 or the APAX-140 system 255. Information regarding passenger service interfaces is presented below. The system 100 enables the passenger to control these functions via the passenger control unit 121. The system 100 makes the following passenger service requests available via the passenger control unit 121: turn on reading light, turn off reading light, initiate the flight attendant call/chime light, and cancel the flight attendant call/chime light.

The system 100 provides the support functions described below. The system 100 manages all monetary transactions for services and products. The system 100 allows flight attendants who have logged onto the system 100 to perform the functions related to transaction processing (i.e., sales/revenue services described below). In addition, the system 100 notifies the flight attendants when a transaction is initiated that requires interaction with the flight attendants. For example, notification is necessary for collection of cash when a cash transaction is initiated. The method(s) of notification are tailorable after the following have occurred: sounding the flight attendant call chime, lighting the flight attendant call light, displaying a message to the operator.

The system 100 maintains a record of all transactions processed during the flight. These transactions include service orders (e.g., movies, games), product orders (e.g., duty-free ordering), and canceled/refunded orders. The system 100 archives these records until the data is deleted from the system 100 via an data off-load function described below. The system 100 stores the following information as applicable to each order: seat number, service or product ordered, quantity of service or product ordered, credit card information for credit card orders, unit and total cost of the service or product, and the ID of the flight attendant who processed the order.

The system 100 is tailorable to either allow delivery of a service before payment is made or to deny delivery of a service until after a payment is made. When the system 100 has been tailored to deny delivery of a service until after payment is made and the payment method selected by a passenger is cash, it is possible for the passenger to cancel the service order (e.g., movies, games, packages) at any time prior to payment.

Pricing data is specified on a zonal basis for all available services (e.g., movies, games, packages) and products (e.g., duty free items) using an off-line database. The system 100 implements a pricing policy specified via an off-line database. For example, the pricing data may specify $3 for all movies, for example. The price policy may specify all movies are half price when three or more movies are ordered. The system 100 prohibits revenue processing when pricing data is not specified in the off-line database.

The system 100 allows passengers to pay for services and/or products with cash or a credit card 257 as described below. Cash transactions may be initiated either at the passenger's seat or at the operator console (attendant workstation or primary access terminal). The system 100 may be configured to allow cash transactions to be represented in any one of up to 30 different currency types. The list of different currency types are specified in the off-line database. The base currency for a given aircraft 111 is specified in the off-line database. All monetary transactions performed at the operator console are displayed in this base currency.

Credit card transactions may be processed either at the passenger's seat 123 or at the operator console. The system 100 may be configured to allow any one of up to ten different credit card types to be used for a credit card transaction. The list of different credit card types is specified in the off-line database. The system 100 records all credit card transactions in a selected base currency.

The system 100 performs the following credit card validations. The system 100 denies credit card payment when any of these validations fail. The system 100 verifies that the number format of the credit card 257 follows the standard number format for that particular credit card type, verifies that the number range of the credit card 257 falls within the standard number range for that particular credit card type, verifies that the number of the credit card 257 does not exist on the bad number list, verifies that the total cost of the requested transaction does not exceed the limit established for that particular credit card type, and verifies the expiration date of the credit card 257.

The following corresponding data are specified in the off-line database: the standard number format for each credit card type, the allowable number range for each credit card type, a list containing up to 10,000 bad credit card numbers, and a credit card limit for each credit card type.

An illustrative embodiment of the passenger entertainment system 100 provides for credit card 257 processing to pay for products and services purchased by passengers 117 at their seats 123. The system 100 displays products and/or services that are available for purchase on the video display 122 at a passenger seat 123. The passenger 117 selects products and/or services to be purchased using the passenger control unit 121 at the passenger seat 123 to create a credit card transaction. Credit card data for the credit card transaction is supplied using the credit card reader 121*d* at the passenger seat 123. The credit card transaction data is validated, and the purchased products and/or services are supplied to the passenger subsequent to validation.

The system 100 verifies that the number format of the credit card 257 follows a predefined number format for a particular credit card type, verifies that the number range of the credit card 257 falls within a predefined number range for that particular credit card type, verifies that the number of the credit card 257 does not exist on a bad number list, verifies that the total cost of the requested transaction does not exceed a limit established for that particular credit card type, verifies the expiration date of the credit card 257, and denies credit card payment for the credit card transaction when any of the verifications fail. The information regarding each credit card transaction is stored subsequent to the transaction. The stored data includes seat number, product and/or service that is purchased, quantity of product and/or service that is ordered, information regarding the credit card 257, and unit and total cost of the product and/or service.

In accordance with a preferred embodiment, the passenger entertainment system 100 may directly communicate with credit card company computers to verify and validate credit card purchases and also download and/or archive transaction files on airline or credit card company computers located remote from the vehicle 111. To implement this, the communications link is used to communicate with a remote computer 112. The credit card transaction data is verified and/or downloaded from the system 100 to the remote computer 112 by way of the communications link. The credit card transaction data may be encrypted prior to downloading or prior to verifying the credit card transaction data.

The system 100 stores the following types of data for off-line retrieval: BIT/BITE data, passenger statistics, passenger survey results and transaction records. The system 100 stores data for up to 40 flight. In addition, the system 100 deletes the data corresponding to the oldest flight once the data collection for a flight exceeds the storage limit.

The system 100 collects usage data on services (e.g., movies, games) available to the passengers 117. The usage data is captured at a rate of at least one sample per minute. Usage data includes the following: seat number, class, time spent viewing movies by title, time spent listening to entertainment audio by title, and time spent playing games by title.

The system 100 provides the passenger entertainment and interactive services as described below. The system 100 provides audio programming to the passengers. When in the interactive video mode of operation, the system 100 displays a list of audio programs available to the passenger on the seat display 133. This list is configurable via an off-line database. The system 100 may be configured to allow selection of an audio program using either the seat display 122 or controls on the passenger control unit 121 depending on the system 100 requirements. The selected audio program is routed to the corresponding passenger headphone. The system 100 controls the headphone volume of the audio programming via controls on the passenger control unit 121.

The system 100 distributes audio programming on a maximum of 83 mono audio channels. The audio inputs is configurable into any combination of mono or stereo pairs, provided the total number of individual inputs does not exceed 83. Five audio channels are dedicated to the separate on-board PA system for a total of 88 channels of system audio. The arrangement of the audio inputs and the assignments to channels are configurable via an off-line database.

The various video entertainment options provided by the system 100 are discussed below. The system 100 provides video programming to all passengers 117. When in the interactive video mode of operation, the system 100 displays a list of video programs available to the passenger on the screen display 122 of the seat display unit 133. This list is specified via an off-line database. The system 100 may be configured to allow selection of a video program using either the seat display 122 or controls on the passenger control unit 121 depending on the system requirements. The selected video program is routed to the corresponding seat display unit 133. The system 100 controls the volume of the audio sent to the headphone from the video programming via controls on the passenger control unit 121.

Each video program in the database has an associated date range that specifies when the video program is available. The list displayed only contains those video programs where the date of the current flight falls within the date range specified for that particular video program.

The system 100 requires payment for individual video programming according to a unit price and a price policy. Once a movie is purchased, all showings of that particular movie is made available to the passenger.

When in the interactive mode of operation, the system 100 provides video games to the passengers 117. The system 100 displays a list of up to 10 video games available to the passenger on the seat display 122. This list is specified via an off-line database.

The system 100 may be configured to allow selection of a video game using either the seat display unit 133 or controls on the passenger control unit 121 depending on the system requirements. The selected video is downloaded to the corresponding passenger seat 123 for viewing on the seat display 122. The system 100 controls the headphone volume of the audio from the video game via controls on the passenger control unit 121.

Each video game in the database has an associated date range that specifies when the video game is available. The system 100 only displays those video games where the date of the current flight falls within the date range specified for a particular video game.

When a video game is requested, the system 100 initiates the game at the passenger's seat 123. The system 100 displays an image indicating the approximate amount of time remaining until the game is ready. This display is periodically updated. Once the video game has been initialized, the system 100 provides full game control through the depressible buttons on the passenger control unit 121.

The system 100 may be configured to allow video games to be purchased in time increments (i.e., pay by the hour). Given such a configuration, the system 100 requires the initial purchase of playing time to be 60 minutes with additional purchases to be in 15 minute multiples. The system 100 is configured to allow a passenger to exit the current game prior to the end of the purchased amount of play time. The remaining purchased game time is saved and can be used later during the flight. The system 100 is configured to allow the passenger to either resume playing this game at a later time or to select a different game providing game service has not been terminated by the flight attendants. The system 100 requires payment for this game purchase time according to a unit price and a price policy.

The system 100 supports entertainment packaging. An entertainment package is a predetermined set of one or more movie titles and/or game titles with a predetermined amount of game play time. The contents of each entertainment package is specified via an off-line database. The system 100 requires payment for entertainment packages according to a unit price and a price policy.

The system 100 displays a list of available packages on the screen 122 of the seat display unit 133. Each package in this list must have an associated date range that specifies when the package is available. Up to four packages per date range are specified via an off-line database. The displayed list only contains those packages where the date of the current flight falls within the date range specified for that particular package.

As is shown in FIG. 7, for example, if configured with a personal video player 151 that interfaces to the audio-video unit 231 by way of a personal video player interface 152, the system 100 controls the personal video player 151 via controls at the seat display 122. The system 100 provides commands to the personal video player 151 to play, rewind, fast forward, pause, stop and eject a tape. When the personal video player 151 is commanded to play or pause, the recorded video picture is present on the screen 122 of the seat display unit 133. Only airline-provided tapes may be used in the personal video player 151.

The system 100 is configured to allow the video output of a personal video player 151 in either of two adjacent seats 123 to be routed to the seat display unit 133 on both seats 123. The system 100 is also configured to allow selection of the video output of either personal video player 151 in two adjacent seats 123 to be displayed on either seat display 122. The audio output is routed to the corresponding headphones of the receiving seat display unit 133.

The system 100 may be configured to allow passengers to select an alternate language as described below. The system 100 is programmed to all display information on seat displays 122 in up to four different languages. The system 100 may be configured to allow the passenger to select one of these different languages for display of text on the screen of the corresponding seat display 122. Once a language selection is made, that selection remains in effect until another selection is made or until detection of the beginning of a flight. Upon detection of the beginning of a flight, the system 100 reverts to the default language for display of text on each seat display 122. The default language is specified in an off-line database.

Video tapes may include a single movie recorded in two different languages; a primary language and one other language. Each tape is assigned to a particular video tape player or reproducer. The relationship between each video tape player and the available language configuration is specified in an off-line database. The system 100 is configured to allow the passenger to select either the default primary language or the other language for the audio of the headphones during the viewing of movies. Audio output by the cabin speakers can only be heard in the primary language.

The system 100 is configured to allow the passenger to adjust the brightness of the screen of the seat display 122. The adjustments are made in response to controls on the passenger control unit 121 and/or touch screen inputs on the screen of the seat display 122. Video quality adjustments made via controls on the passenger control unit 121 are allowed only while viewing video programming. Adjustments made to video quality remains in effect until the system 100 is shutdown.

The system 100 is configured to allow a passenger to select a survey and to respond to questions contained in the survey. The questions are established by the airline and are stored in an off-line database. The system 100 archives the results (i.e., answers to the survey questions) of each completed survey. The system 100 can selectively display the following information to the operator: the results of each survey taken at each seat for the current flight, the corresponding seat class zone, and the time the survey was collected.

The system 100 provides the ability to place telephone calls from each passenger seat 123. In certain configurations, the telephone handset is integrated into the passenger control unit 121. The handset includes a telephone button pad, a microphone, and a speaker. The system 100 prompts for payment when using the telephone service. Payment must be made via a credit card 257. The system 100 provides the capability to enter the phone number via controls on the passenger control unit 121. The system 100 also displays phone call status on the screen of the seat display 122. The status information displayed includes the following: Invalid credit card, No available lines, All lines busy, Called line busy, Call disconnected, Invalid phone number entered, and Call in-progress. The system 100 does not process or capture telephone service transactions. Also, the system 100 does not include telephone service purchases on seat receipts.

The system 100 provides the ability for passengers 117 to select items from an electronic catalog displayed on the screen of the seat display 122. The catalog may be divided into categories. The system 100 provides the capability to configure the categories and the items via an off-line database tool. No inventory control or transaction processing is done by the system 100. However, the flight attendants are notified on the primary access terminal 225 of duty free orders.

The system 100 provides the capability to display on the screen of the seat display 122 a running tabulation of all expenses, excluding telephone charges, incurred at a seat during the current flight.

The system 100 provides the flight attendant services described below. The system 100 is configured to allow the flight attendants to display flight information at the operator console (primary access terminal) from the off-line database or retrieved from other equipment on-board the aircraft 111. If this information is not available, the system 100 is configured to allow information to be entered manually at the operator console as detailed below. Flight information may include the following: aircraft registration number, flight number, departure airport, arrival airport, flight duration, and route type.

The system 100 is configured to allow flight attendants to manually enter flight information at the operator console. Airport codes are used to represent the departure airport and arrival airport. Valid airport codes are able to be specified in the off-line database. The system 100 uses these codes to validate the airport code entered manually by the flight attendants. When verification of an airport code fails, the system 100 allows the manually entered airport code to be added to the off-line database. In addition, all flight information is able to be specified in the off-line database. The system 100 then displays the appropriate flight information based on the flight number entered manually by the flight attendants at the operator console.

The system 100 is able to automatically retrieve flight information from another source such as the passenger video information system or the aircraft 111 itself. The system 100 then displays this information at the operator console. The system 100 also allows the flight attendants to manually modify this retrieved flight information.

The system 100 controls the video reproducers 227*n* the manner described below. The system 100 determines the playing status of all assigned video reproducers 227. The system 100 displays a message to the operator when an abnormal condition is detected (i.e., video reproducer 227 not playing when it should, video reproducer 227 still playing when it should not).

The system 100 is configured to allow flight attendants to initiate a video announcement. Upon activation the system 100 starts the video reproducer 227 which contains a video announcement tape. The system 100 is also configured to allow flight attendants to conclude a video announcement prior to the end of the video announcement. If terminated the system 100 stops the video reproducer 227 which contains the video announcement tape. When a tape change is required, the system 100 pauses the video announcement and display a prompt.

The system 100 is configured to allow flight attendants to select an alternate video reproducer 227 to use for a video announcement. This video reproducer 227 must be operational and not currently assigned to other functions. The system 100 reassigns the video reproducer 227 to its prior assignment once the video announcement is complete.

If the desired alternate video reproducer 227 is assigned to a movie cycle that has already been initiated, then the video reproducer 227 must be manually stopped (i.e., via the front panel of the video reproducer 227) before it can be reassigned to a video announcement. The remaining video reproducers 227 assigned to this movie cycle, continues to play. However, if this movie cycle is stopped and then started again, all video reproducers 227 assigned to the movie cycle plays. This includes the video reproducer 227 that was previously reassigned to a video announcement.

The system 100 is configured to allow flight attendants to initiate a movie cycle. The system 100 starts each of the video reproducers 227 assigned to that movie cycle. The system 100 allows a movie cycle to be initiated when at least one of the video reproducers 227 assigned to the cycle is operational and contains a tape. When one or more video reproducers 227 assigned to a movie cycle are non-operational or do not contain a tape, the system 100 displays a message to the operator upon initiation of the movie cycle. The system 100 allows a movie cycle to be initiated only if the cycle can complete prior to a specified interval of time before the end of the flight. In addition, the system 100 allows the flight attendants to pause, resume, and/or stop a movie cycle.

The system 100 is configured to allow the flight attendants to specify a start time for each movie cycle. This start time may either be in minutes relative to the time when the movie cycle is initiated or in minutes relative weight-off-wheels. The system 100 also allows the flight attendants to define a between-cycle intermission time. This time is in minutes and must exceed the time required to prepare the video reproducer 227 containing the longest playing tape for the next cycle (i.e., tape rewind).

The system 100 is configured to allow the following information to be displayed: the number of minutes until the start of each initiated movie cycle, and the number of minutes until intermission for each of the currently playing movie cycles. The system 100 may be configured to allow the following information to be displayed at the passenger seat 123: the number of minutes until the start of the next movie cycle, the number of minutes remaining on the current movie cycle, and the number of minutes elapsed into the current movie cycle.

The system 100 is also tailorable to display one of the following at the passenger seat 123 upon completion of a movie: a customer specified menu, and an alternate video channel. The alternate video channel is specified in the off-line database. If an alternate video channel is displayed, the system 100 allows the passenger to change the channel selection. Upon completion of the movie cycle intermission, the system 100 displays a customer specified menu.

The system 100 is configured to allow manual control of individual video reproducer functions as supported by the video reproducer 227. The functions that are controlled are as follows: start, stop, pause, eject, fast forward, repeat, and rewind. Manual control of video reproducers 227 may override automatic control of video reproducers 227 such as the movie cycle service.

The system 100 is configured to allow the flight attendants to control the video programming displayed on the overhead monitors 163. "Overhead" refers to both overhead monitors 163 and bulkhead (LCD) monitors 163. The system 100 displays, on the overhead monitors 163, any available video input to the system 100. In addition, the system 100 allows the flight attendants to turn the overhead monitors 163 on and off either individually or zonally.

The system 100 is configured to allow the flight attendants to assign a video source to the overhead monitors 163 on a zonal basis. Each zone can be assigned a unique video source. The system 100 also allows the flight attendants to assign a video source to the overhead monitors 163. The system 100 allows a different video source on a zonal basis. The overhead monitors 163 are assigned to a video source via the off-line database or manually via the operator console. Also the system 100 may be configured to allow the display, on a zonal basis, of the current assignment of an overhead monitor 163 to a video source.

The system 100 is configured to allow the flight attendants to preview the video selection that is currently available for viewing by the passengers. The system 100 also allows the flight attendants to listen to the audio selection that is currently available for listening by the passengers. In addition, the system 100 allows the flight attendants to adjust the tint, contrast, color, and brightness of the previewed video selection that is displayed as well as the volume of the audio associated with the video selection. The system 100 retains these adjustments between flights.

The system 100 is configured to allow the flight attendants to swap the following information from one seat to another seat: purchased services, purchase summary information, complimentary service assignments, movie lockout information, and game lockout information. If a transaction is already in progress when a seat transfer is initiated, the system 100 aborts the transaction. If video game playing has been purchased by the hour at the seat being transferred, the system 100 resets the timer to the initial purchased time. Upon completion of a seat transfer, the system 100 displays the seat display 122 of both seats involved in the transfer.

The system 100 is configured to allow the flight attendants to reset seat group equipment 220 for groups of seats without resetting the entire system 100. The system 100 displays the seats that are affected by the reset at the operator console.

The system 100 is configured to allow the flight attendants to prevent any movie, paid for or free, from being shown at a given seat. This can be done even after the movie has been purchased and/or movie viewing is in progress. The system 100 also allows the flight attendants to prevent all games, paid for or free, from being played at a given seat. This can only be done before the game has been purchased and/or prior to game download. If seat lockout is requested after game play has commenced, then the game has to be exited in order for the lockout function to take effect.

The system 100 is configured to allow the flight attendants to pause and resume all passenger entertainment and interactive services described herein. This function is referred to as Start/Stop in-flight entertainment. When interactive services are paused the following occurs: passenger selection of entertainment and interactive services is disabled, all video reproducers 227 are stopped, in-seat video players (personal video players) are stopped, all in-seat games are terminated, and completed questions from an in-progress passenger survey are saved. When interactive services are paused, the system 100 continues to provides audio entertainment including volume via controls on the passenger control unit 121.

For services that are purchased based on a unit of time, the system 100 excludes all paused time from usage time calculations. When entertainment and interactive services are resumed, the system 100 performs the following: enables passenger selection of entertainment and interactive services, resumes playing of all stopped video reproducers 227, and restores passenger video channel selections.

The sales/revenue related services described below are supported by the system 100. The system 100 provides the capability to create an order, at the primary access terminal 225, for any passenger 117. When the specified method of payment is cash or when an order is created for a product that is to be delivered on-board the aircraft 111, the system 100 provides notification to the flight attendants.

The system 100 provides the capability to verify that the order has been placed for a particular passenger 117. This is accomplished via the seat display 122 of the corresponding passenger seat 123. The system 100 also provides the capability to cancel the order for a particular passenger. This is also accomplished via the seat display 122 of the corresponding passenger seat 123.

When the system 100 has been tailored to deny a service until after payment is made and the payment method selected by a passenger is cash, the system 100 provides the capability to cancel the video programming order at any time prior to payment. This is accomplished via the seat display 122 of the corresponding passenger seat 123. In addition, when the system 100 has been tailored to deny service until payment is made, the system 100 is able to provide the purchased service when no payment is required or when the payment method selected by the passenger is by credit card 257.

When the system 100 has been tailored to deliver services before payment is made, the system 100 is able to provide the purchased service upon creation of a service order. This service order can be created at the seat display 122 of the corresponding passenger seat 123.

The system 100 provides the ability, at the primary access terminal 225, to account for payment for any passenger's order for any service or product purchased on board the aircraft 111. It is possible to use any of the payment methods described above. The passenger is able to verify at the seat display 122 that an order has been paid. When an order is paid and order reconciliation is not required, the flight attendant notification is cleared. When the system 100 is configured to deny service until payment is made, payment of a service order results in delivery of the service to the associated passenger.

The system 100 provides the ability, at the primary access terminal 225, to reconcile any passenger's order that requires product delivery on board the aircraft 111. When an order is reconciled and payment has already been made, the flight attendant notification is cleared.

The system 100 provides the ability, at the primary access terminal 225, to cancel any cash passenger product and/or service order that has not been paid. When an order is canceled, the flight attendant notification is cleared. The passenger is able to verify at the seat display 122 that an order has been canceled. When a video game or movie order is canceled and the service has already been provided to the passenger, the system 100 is configurable to automatically or manually revoke that service from the passenger. Order cancel information is not included on seat receipts.

The system 100 provides the ability, at the primary access terminal 225, to refund any paid passenger product and/or service order. The passenger is able to verify, at the seat display 122, that an order has been refunded. When a video game or movie order is refunded, the service is revoked from the passenger. Order refund information is included on seat receipts.

The system 100 provides the ability to display at the primary access terminal 225, and also to print, a list of orders for which cash collection is to be made during a flight. This list includes seat number, product/service ordered, and the amount due. All lists are ordered by seat number. Orders may be listed by service type and/or by general service zone. It is possible to display at the primary access terminal 225, or to print, a list for a specified service type or only a specified general service zone of the aircraft 111.

The system 100 provides the ability to display at the primary access terminal 225, and also to print, a list of orders for which delivery is to be made during a flight (i.e., orders requiring reconciliation). This list includes seat number and a description of the product/service ordered. This list also includes a space for the passenger to initial/sign indicating receipt of the item(s) from the flight attendants. All lists are ordered by seat number. It is possible to list orders by service type and/or by general service zone. It is possible to display at the primary access terminal 225 or to print a list for all or for a specified service type or a specified general service zone of the aircraft 111.

The system 100 provides the ability, at the primary access terminal 225, for a flight attendant to offer complimentary services to passengers. The types of services that can be offered include movies, games and/or movie/game packages defined in an IFE Functions database. It is possible to provide complimentary service to an individual seat or to the entire aircraft 111. Passengers ordering complimentary service are not prompted to enter payment information. It is possible for the flight attendants to terminate complimentary service.

The system 100 provides the ability to perform currency exchange rate calculations at the primary access terminal 225. Exchange rate calculations are made to support a display with up to 4 decimal places. The number of decimal places displayed are standard for the selected currency unless the standard exceeds four decimal places. The system 100 is capable of maintaining up to 30 currency exchange rates.

The system 100 is configured to allow the flight attendants to generate the reports described in the following sections. The system 100 is able to generate a hardcopy of these reports via the system printer. The system 100 also allows the flight attendants to view these reports at the primary access terminal 225. All reports can be manually generated at the primary access terminal 225. The system 100 allows the flight attendants to automatically generate the transaction report and the passenger survey report. The system 100 is tailorable to automatically generate these two reports at a time relative to one of the following events: calculated end of flight time, or time of weight on wheels.

The system 100 is configured to allow the flight attendants to generate a report of any and/or all transactions made during the current flight. The system 100 also allows the flight attendants to display and/or print this report. The system 100 provides the capability to generate transaction reports via any combination of the following: by general service zone, by flight attendant, and by transaction type. The system 100 also provides the capability to automatically generate the transaction report.

The system 100 is configured to allow the flight attendants to generate a report of any or all of the transactions made by a passenger. The system 100 also allows the flight attendants to display and/or print this report. When multiple transactions are included on a single receipt, the system 100 calculates and displays a total cost. The system 100 includes any or all of the following on a seat receipt: airline name, product code, product description, product price, time and date of purchase, payment method, for credit card payments: credit card number, and for cash payments: currency type The system 100 is configured to allow the flight attendants to generate a report of all BIT detected non-operational seats. The system 100 also allows the flight attendants to display and/or print this report. The non-operational seats are identified by seat number in the report.

The system 100 is configured to allow the flight attendants to generate a report, on a seat number basis, of those passenger surveys completed during the current flight. The system 100 allows the flight attendants to display and/or print this report. The passenger survey report includes the following: seat number, seat class, survey question key, and passenger survey response.

The system 100 is configured to allow the flight attendants to generate a report for a specified seat or a specified general service zone of the aircraft 111. The system 100 allows the flight attendants to display and/or print this report. The system 100 also provides the capability to automatically generate the passenger survey report.

The system 100 is configured to allow the flight attendants to print a report of the exchange rate associated with each currency defined in the off-line database. The exchange rate is in relation to the primary access terminal 225 display currency.

The system 100 provides the capability, at the primary access terminal 225, to manually shutdown the system 100. The system 100 also has the ability automatically shutdown the system 100. The system 100 is tailorable to perform the automatic shutdown at a time relative to one of the following events: calculated end of flight time, or time of weight on wheels.

If the cabin file server database 493 contains any open transactions from the current flight, then the system 100 displays a message on the primary access terminal 225 prior to shutdown of the system 100.

The system 100 provides the capability to off-load archived (i.e., previous flight leg) data to a removable disk or other device connected to the primary access terminal 225. AU credit card transaction data are encrypted before it is off-loaded (defined in the Visa International in-flight commerce operating principles and MasterCard International in-flight commerce operating parameters and specifications). The system 100 tags all data that has been off-loaded. It is possible to off-load data by specifying all files that are not tagged as off-loaded or by specifying a flight leg. If there is no data to off-load, a message informs the requester of that fact.

Figures 1, 26:
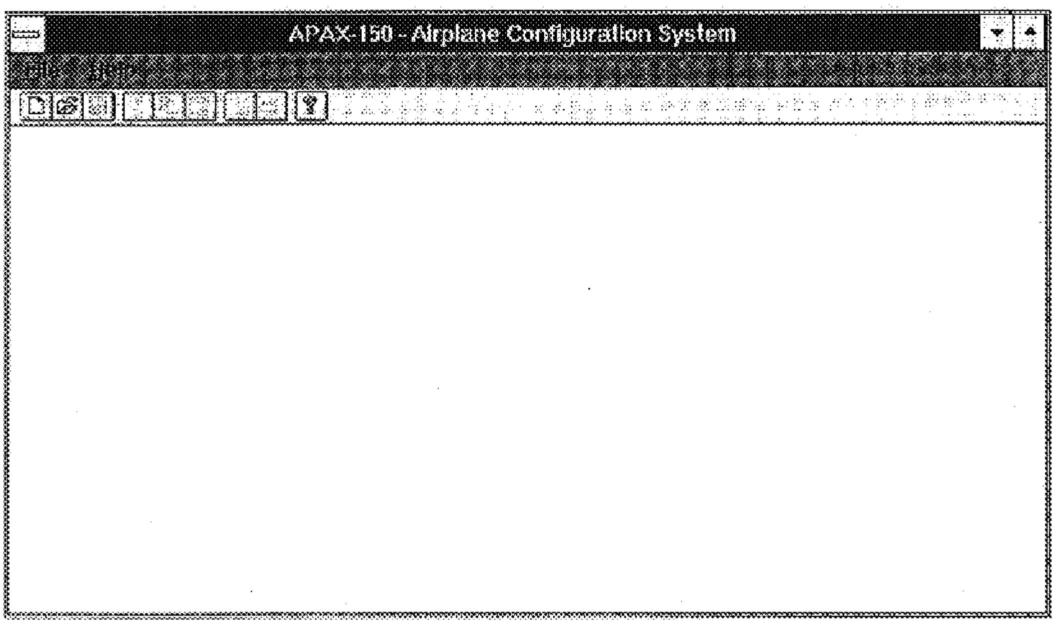
Figures 2, 26:
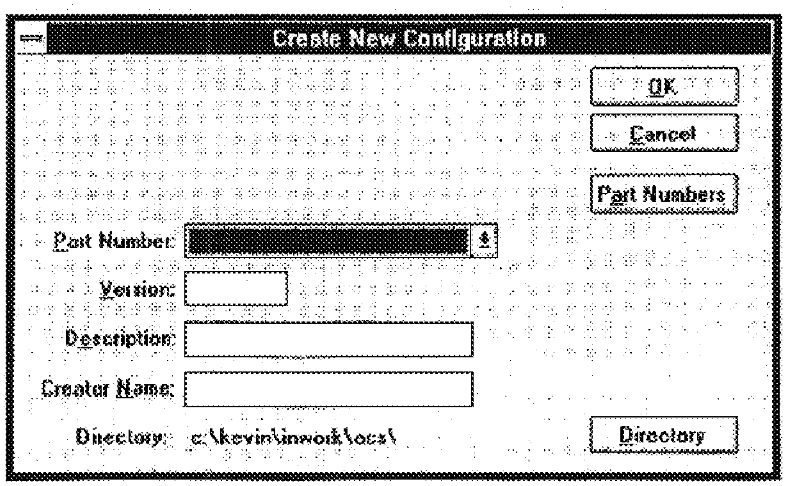
Figures 3, 26:
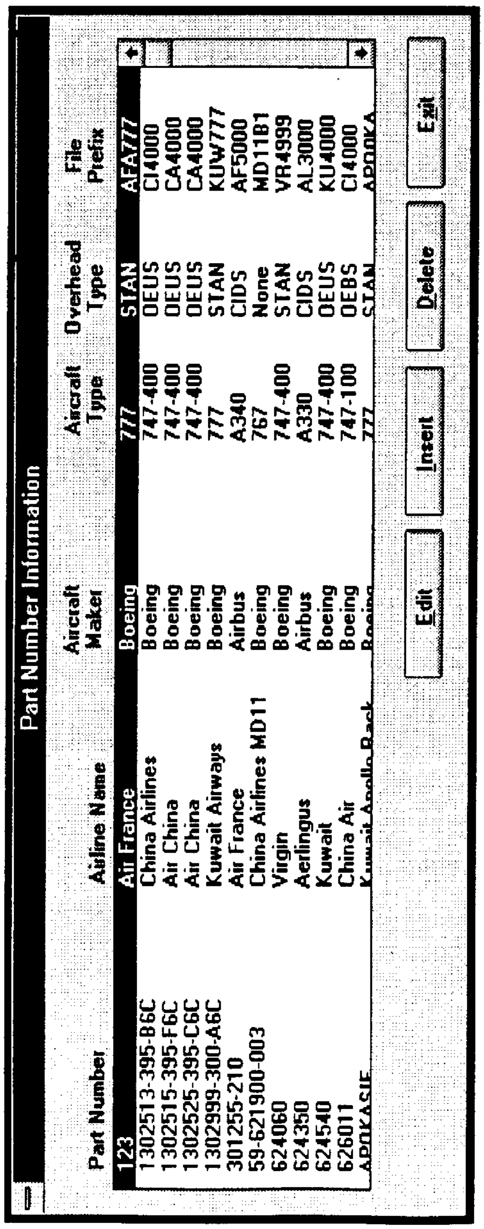
Figures 5, 26:
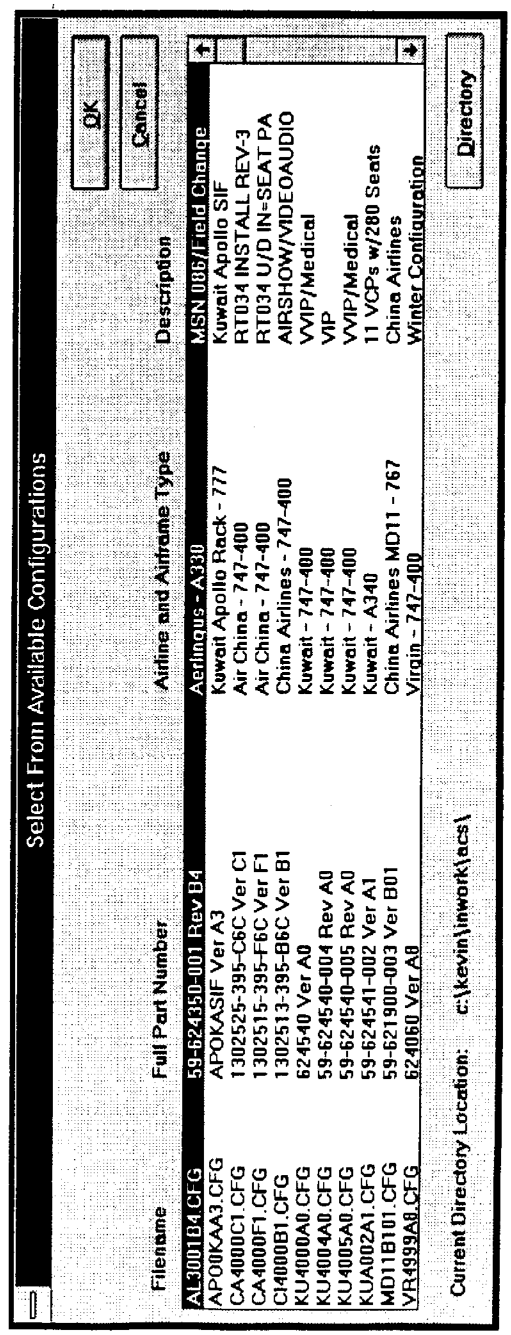
Figures 4, 26:
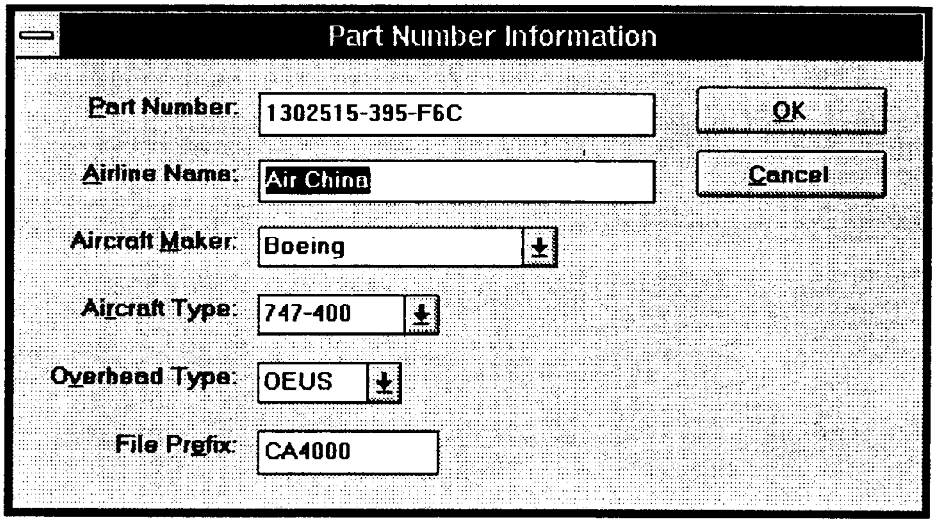
Figures 6, 26:
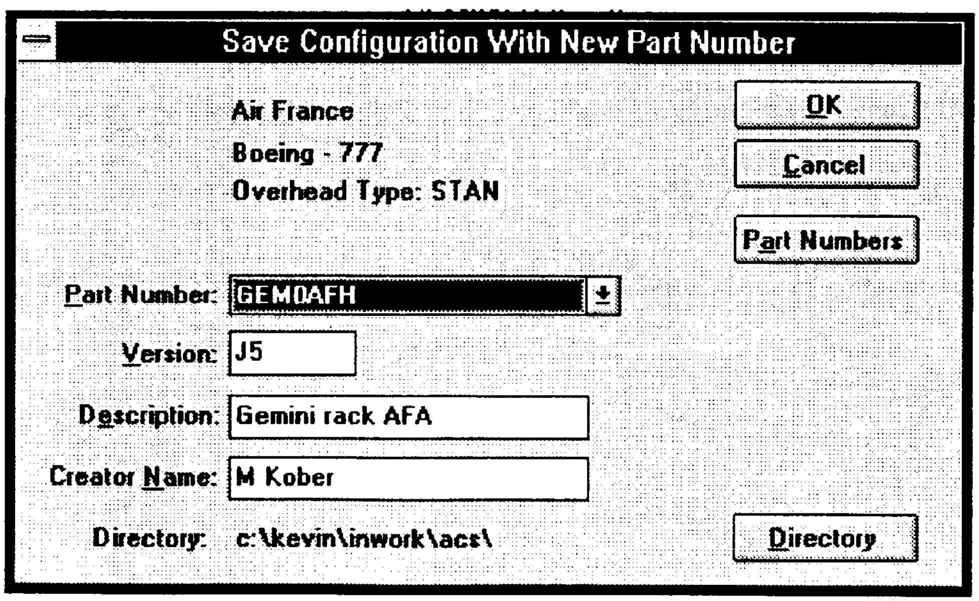
Figures 7, 26:
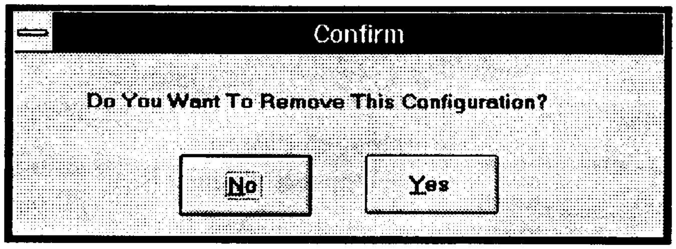
Figures 8, 26:
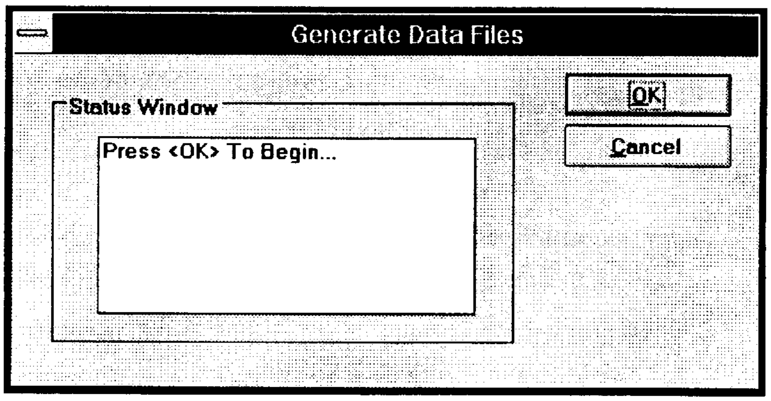
Figures 9, 26:
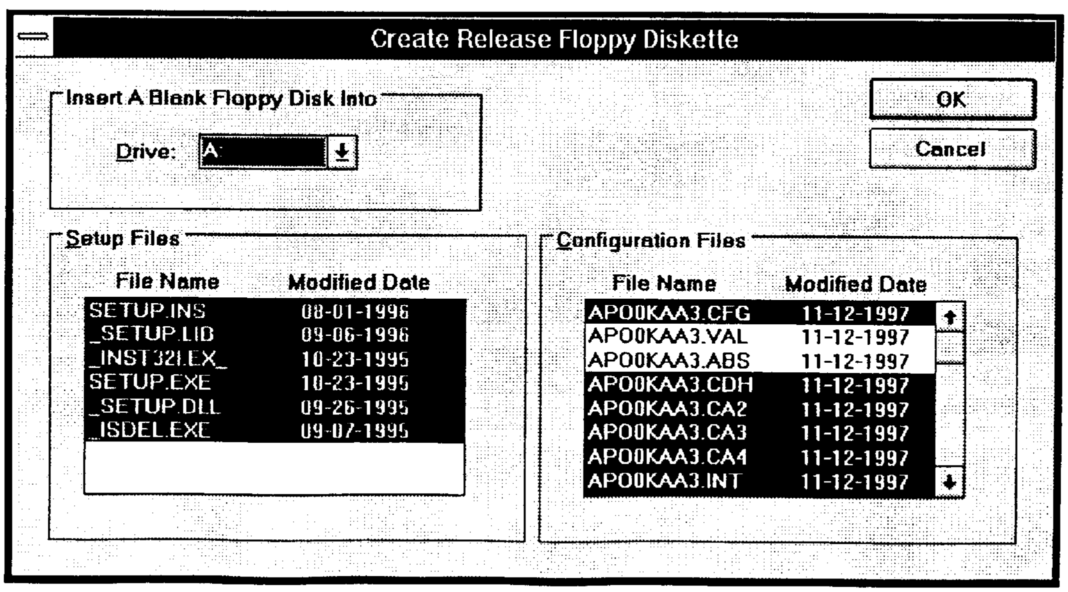
Figures 10, 26:
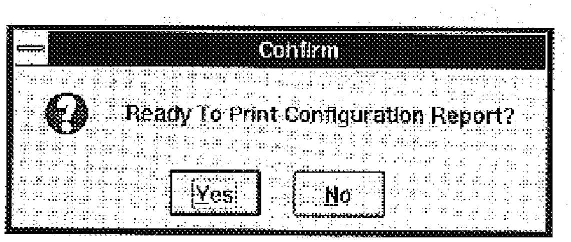
Figures 11, 26:
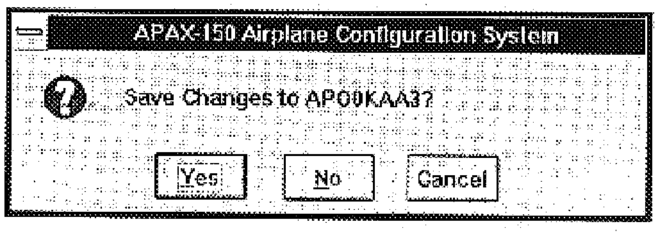

The system 100 is designed to be configurable to support a wide range of system configurations. FIG. 10 is a table depicting the allowable range of line replaceable units that may be installed to configure the system 100 for a specific application in accordance with a preferred embodiment. The limit on the number of audio-video seat distribution units 231 is determined by the maximum power supply capability of the area distribution boxes. This range of configurability allows the system 100 to be configured to support the following minimum functionality: 520 seats 123, 88 mono audio channels distributed to seats—83 video reproducer and audio reproducer channels plus 5 passenger address channels, and 16 video channels distributed to seats.

Figure 11:
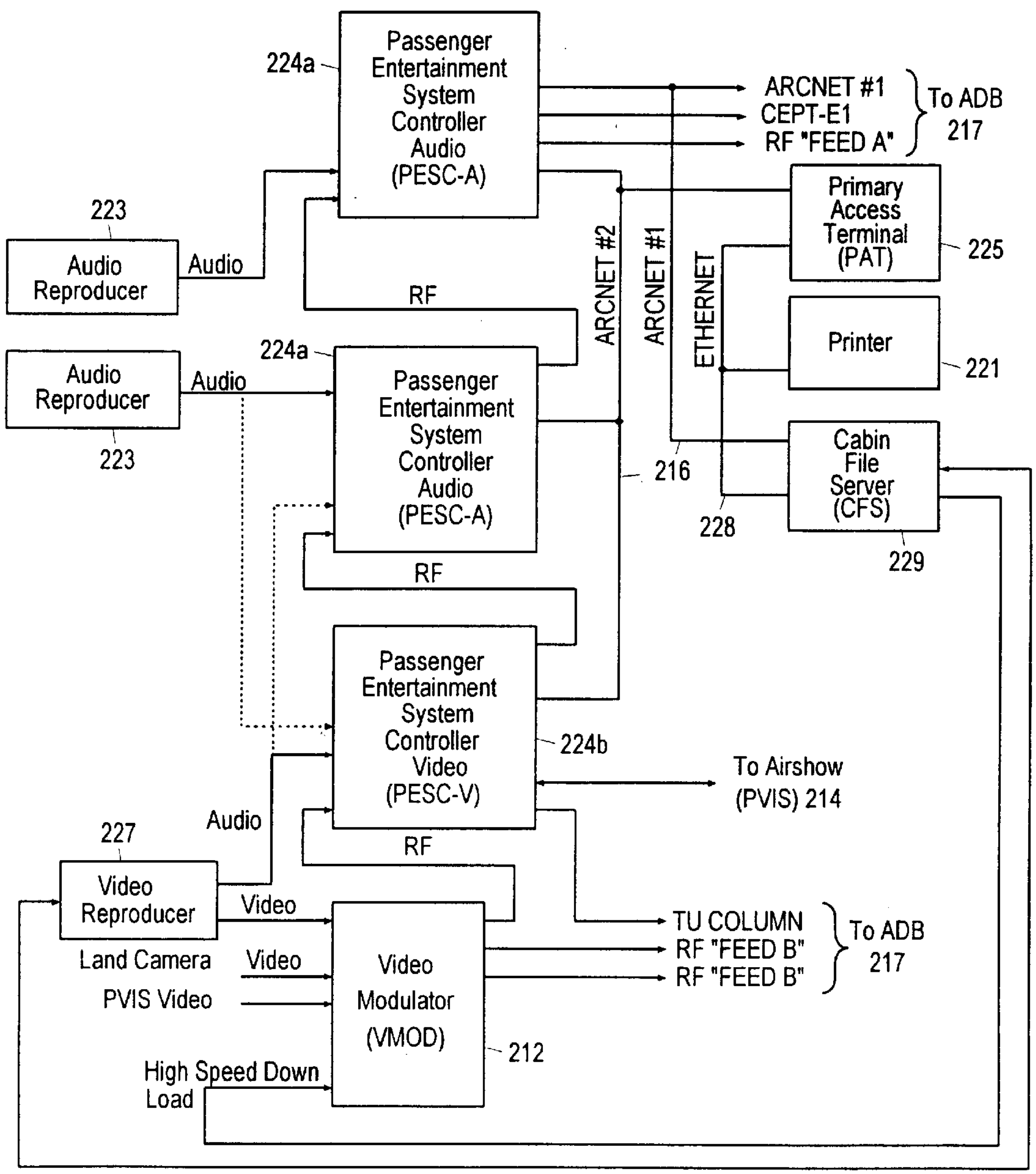
FIG. 11 illustrates an exemplary configuration of the head end equipment in accordance with a preferred embodiment.
Figure 12A:
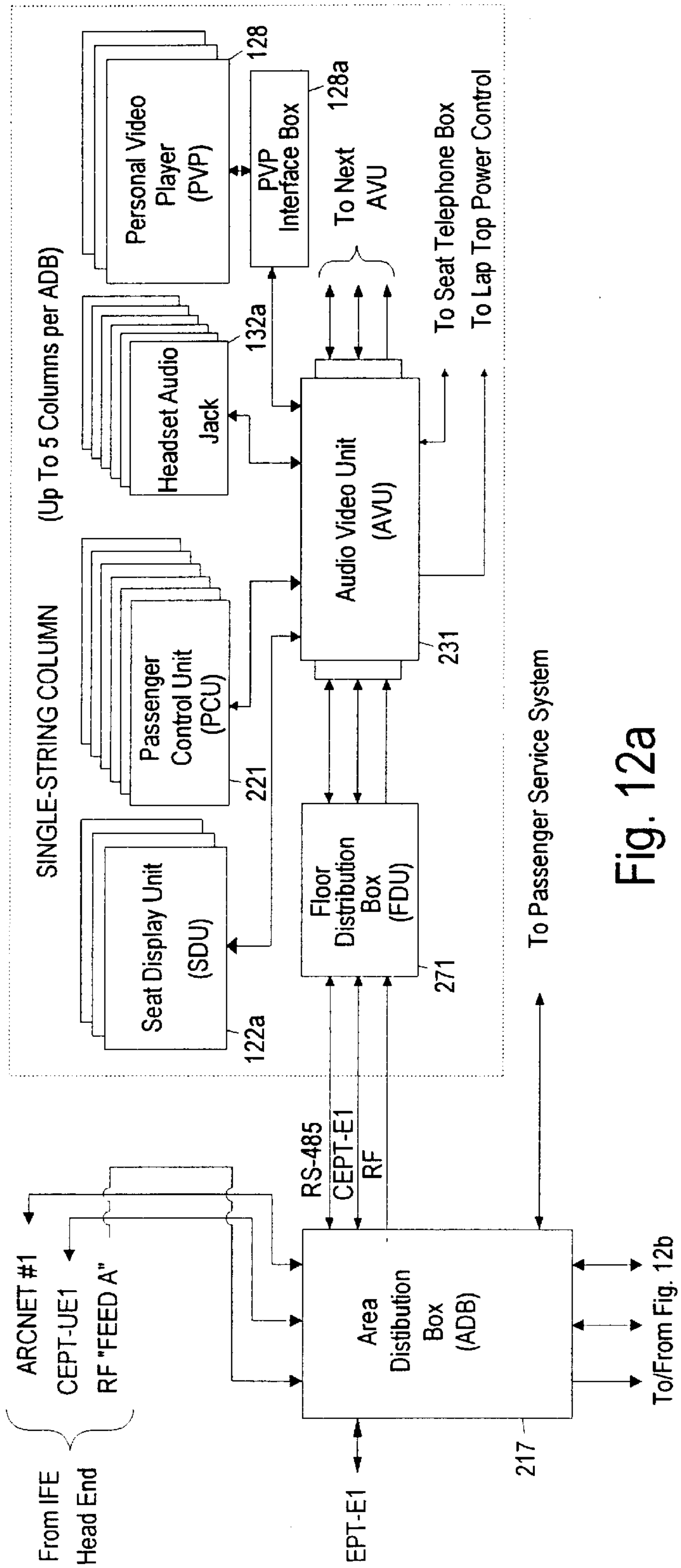
FIGS. 12*a*–12*c* illustrate an exemplary configuration showing seat group equipment and distribution of information.
Figure 12C:
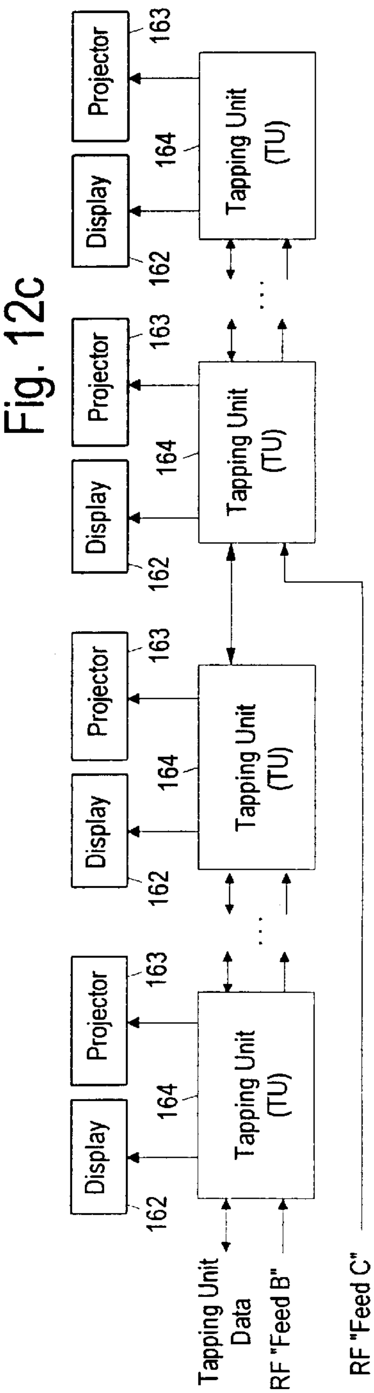
Figure 12B:
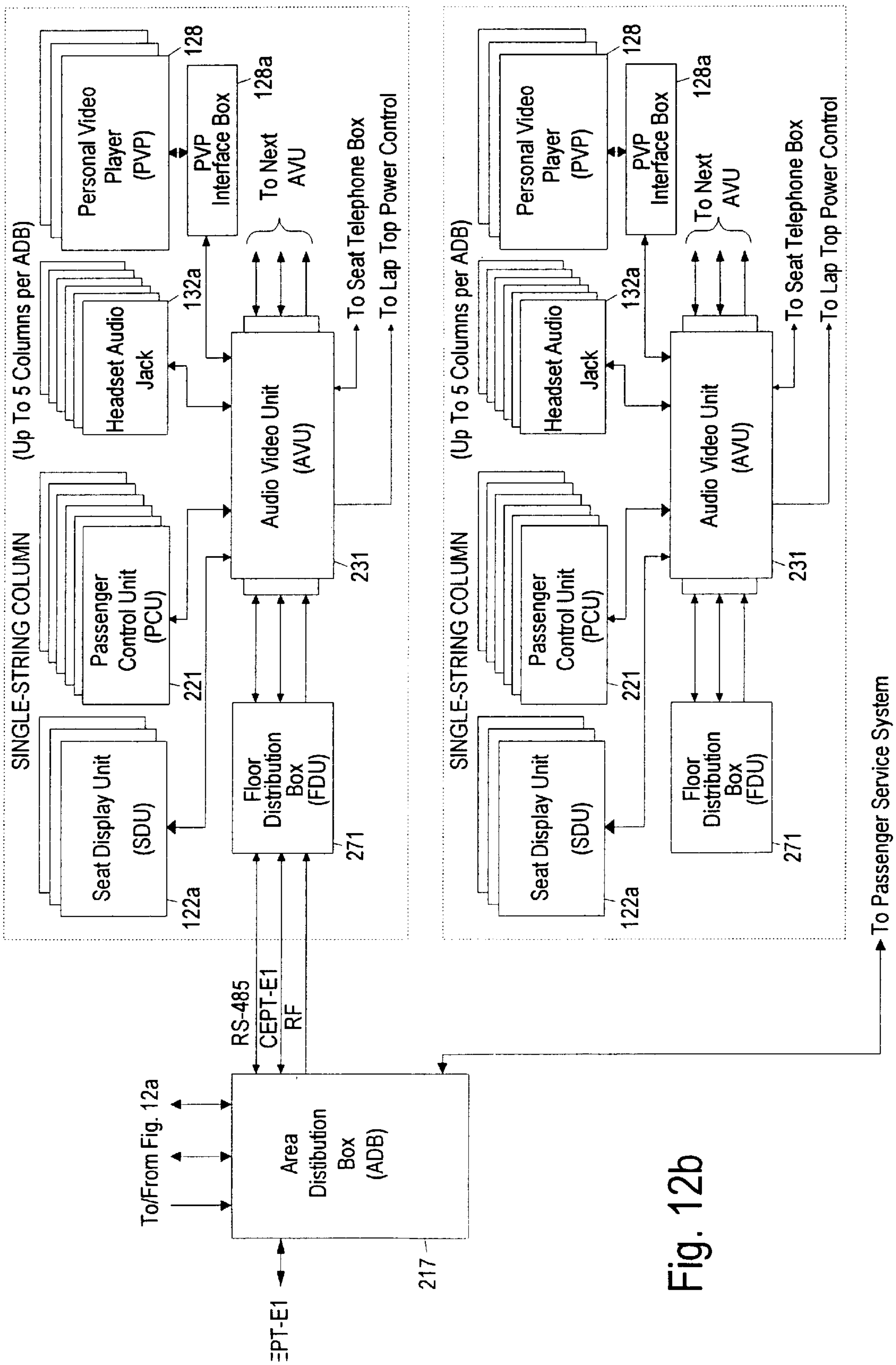

FIG. 11 shows a detailed block diagram that illustrates an exemplary configuration of the head end equipment 200 in accordance with a preferred embodiment. FIGS. 12*a*–12*c* illustrate an exemplary configuration showing the seat group equipment 220 and distribution of information in accordance with a preferred embodiment and distribution of information though the system 100.

The system 100 supports the special case of an interactive system 100 configured with a cabin file server 268 but without a primary access terminal 225. In this configuration, interactive services are supported, but the ability to collect revenue for those services is not supported. Thus, the services may be provided but the passengers may not be charged for them. In this configuration, the cabin file server 268 is configured to allow the loading of video games and application code in the seat display unit 133 for the appropriate seat display 122 to the seats on an as-requested basis.

The system 100 is configured to allow the operator to gain access to the following utility functions which are provided for system maintenance. Access to the various utility functions can be denied or allowed based on the password entered by the operator. Typically, a super user password provides access to all of the following functions, and a maintenance user password and flight attendant password provides access to a subset of these functions.

The system 100 is configured to allow the operator to reboot both the cabin file server 268 and the primary access terminal 225. The system 100 also allows the operator to start and stop the applications running on the cabin file server 268 and the primary access terminal 225. In addition, the system 100 allows the operator to calibrate the touch-screen on the primary access terminal 225 and to calibrate the camera.

The system 100 provides access to the system maintenance (SYSMAINT) tool. This tool orchestrates BITE testing and provide BIT reporting capabilities. The system 100 also provides access to the data offload tool described below The system 100 is configured to allow the operator to verify that the software residing in the primary access terminal 225 and cabin file server 268 is the same as that which was loaded during installation.

The system 100 is configured to allow the operator to run, at a minimum, the following operating system tools: MS DOS to execute basic DOS operating system commands for both the primary access terminal 225 and cabin file server 268, Q-Slice to view memory usage and allocation of the primary access terminal 225, notepad for basic text editing and registry editor for Windows NT Registry editing, SQL object manager for viewing customer specific database parameters, and event viewer to view the Windows NT event log for trouble shooting purposes.

The system 100 is configured to allow the operator to simulate an actual flight on the ground. This test flight supports all system functions available during normal operation. At the end of the test flight, NT event log data and transaction data (excluding revenue transaction data) is available for offload to removable media, described below. At the end of the test flight, the system 100 deletes the revenue transaction data related to the test flight.

The following paragraphs define the performance characteristics of the system 100. FIG. 13 sets forth in tabular form the performance criteria that is met while operating for one hour under a load scenario in accordance with a preferred embodiment. In particular, FIG. 13 is a chart showing typical download rates for of the system 100.

The response time for providing lexical feedback to users (flight attendants or passengers) does not exceed one second. Lexical feedback is defined as the time from a user input (at a keyboard, touch panel, passenger control unit 121, etc.), until the system 100 responds with some visual or audible indication that the system 100 has received that input. For example, the response may be moving a cursor, highlighting a button, or simply displaying a message acknowledging that the input is being processed.

The response time to a passenger service request does not exceed 200 milliseconds. Passenger service request is defined as reading light on/off, and flight attendant call chime. For an Airbus aircraft 111, this time is measured from the time of the passenger control unit switch depression to the moment the message is initiated by the first passenger entertainment system controller (PESC-A) 224*a* to the CIDS system 251. For systems that interface to the APAX-140 system 255, this time is measured from the PCU switch depression to the moment the message is initiated by the ADB-LAC to the local area controller__. For all other aircraft 111, this time is measured from the time of the passenger control unit switch depression to the moment the output is activated on the overhead electronics box.

The system response time to support "hand-eye" coordination games does not exceed 30 milliseconds. Response time in this case is defined from the moment of switch depression on the passenger control unit 121 to the time at which the game processor receives the command.

The system 100 has the following game and application program download times. When a game is terminated, the SDU application is downloaded and the main menu presented on the seat display 122 in less than 20 seconds. This time applies for a single system user playing a game with no outstanding game requests. A 2-megabyte game downloads in less than 20 seconds. Game download is defined as the time elapsed from first presentation of the download screen until presentation of the game introduction screen. This time applies for single system user requesting a game and no transmission errors.

The system 100 processes to completion a minimum of 100 seat initiated transactions within a period of 150 seconds without loss of a transaction. Five of the 100 seat initiated transactions are game download requests for five different games. All 100 transactions are initiated within a period of five-seconds. Operations at the primary access terminal 225 are not required during peak loads defined above.

Figures 12, 26:
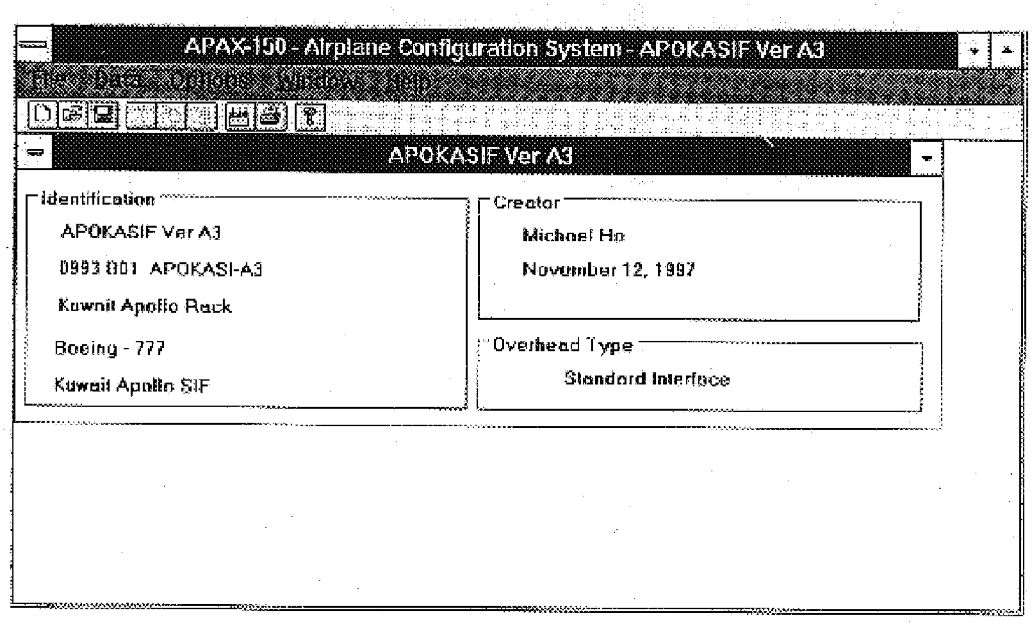
Figures 13, 26:
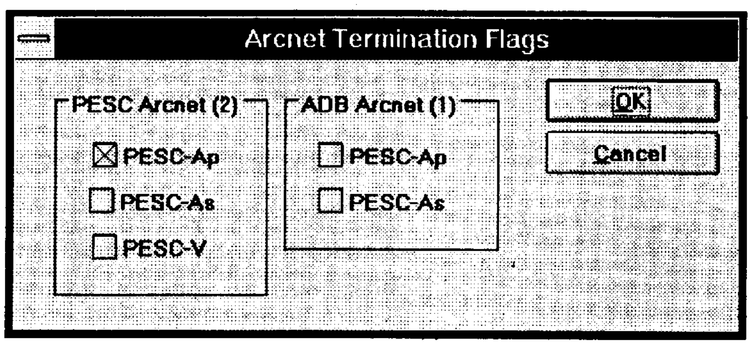
Figures 14, 26:
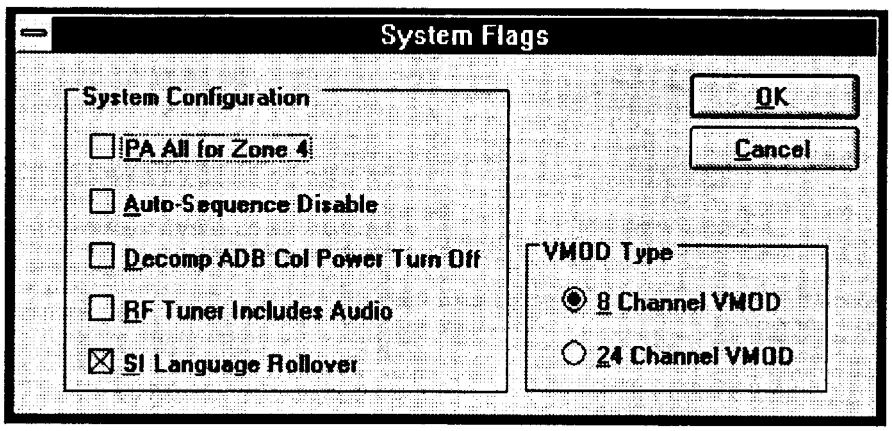
Figures 15, 26:
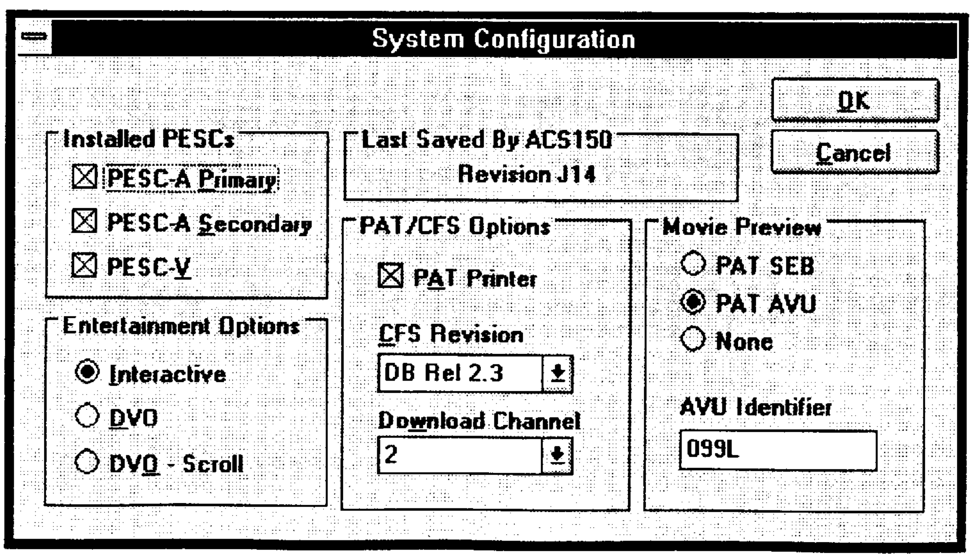

The table shown in FIG. 14 sets forth the system test times for completing BIT/BITE testing in accordance with a preferred embodiment.

Interruption of power is defined as a cycling of the primary power source from ON to OFF and then back to ON which lasts for more than 200 ms. A power transient is defined as any interruption in power which lasts for less than 200 ms. The system 100 responds to power interruptions in accordance with the following requirements.

The system 100 is tolerant of varying sequences of application of power. In all cases, the system 100 becomes stable and operational regardless of the sequence in which different line replaceable units receive power.

All line replaceable units in the system 100 retain sufficient software-based functionality to resume normal operation following the interruption of power or during a power transient. The system line replaceable units retain software that was previously and successfully downloaded following interruption of power or during a power transient.

The system 100 provides the capability to detect faults and isolate those faults to a single failed line replaceable unit during normal operation. Fault detection during normal operation is implemented as a system built-in test (BIT) capability. More extensive, and possibly intrusive, testing occurs outside of the normal operation state, using a system built-in test equipment (BITE) capability. These capabilities are described below.

In addition to the system self-test capability, each line replaceable unit is designed to facilitate line replaceable unit bench testing and troubleshooting, which includes strategic placement of test points, loop-back features in testing circuit paths, and packaging for easy access to these test points.

Line replaceable units include status LEDs or other displays to display results of initialization and communication tests performed at that line replaceable unit. If LEDs are used, status is indicated as defined below. A green LED ON is used to indicate that everything is running normally (application code). A yellow LED is used to indicate communications and downloading status. A yellow LED OFF indicates that communication is good. A yellow LED ON indicates that there is no peer-to-peer communications (bus or same type line replaceable unit). A yellow light flashing on/off regularly indicates that the line replaceable unit is in PROM only mode. PROM code is executing but application code is not running. A yellow light blinking quickly on a line replaceable unit indicates that the line replaceable unit is in the download state. Red, green, and yellow LEDs illuminated indicates that no code is running, and that PROM code did not initialize correctly. Red, green, and yellow LEDs flashing continuously together indicate that a watchdog time-out has occurred in the line replaceable unit.

Built-in test (BIT) operates continuously as a background task during normal system operation. BIT tests are performed periodically after initialization is complete. Periodic tests are run at least once every 15 seconds. With the exception of LEDs and diagnostic displays of the primary access terminal 225, BIT testing does not interfere with normal operations, and does not generate sounds, lights, or displays.

Periodic BIT tests include internal line replaceable unit tests and communications tests. Internal tests are a subset of the tests discussed below. The subset applied to each line replaceable unit is selected on the basis of criticality. Basic communication tests, as defined below, are performed to verify inter-LRU communications.

During communications testing, each line replaceable unit periodically attempts to communicate with the other line replaceable units with which it normally exchanges data. Interfaces that are tested are shown in the chart of FIG. 14*a*. FIG. 14*a* shows interfaces to be tested utilizing an "X" to indicate that the interface between the two intersecting line replaceable units are tested in accordance with a preferred embodiment. Only line replaceable units identified in the aircraft configuration database are tested.

Faults detected by BIT are reported to a designated fault depository in an unsolicited manner. Upon power up, the fault depository is defaulted to the first passenger entertainment system controller (PESC-A) 224*a*. The first passenger entertainment system controller (PESC-A) 224*a* logs faults to a resident non-volatile BIT memory based on requirements for communication to a centralized maintenance computer (CMC) 252. The first passenger entertainment system controller (PESC-A) 224*a* routes all BIT fault data to the cabin file server 268. The cabin file server 268 event log stores failures and include date and time of the failure relative to GMT, and line replaceable unit mnemonic identifier. The system 100 provides the ability to display all or part of the centrally stored BIT event record on the primary access terminal 225. It provides the ability to print all or part of this record on the printer. Multiple faults of the same type for the same suspected line replaceable unit are recorded as a single error record, with a data field indicating how many instances of the fault have been detected.

Software errors detected during normal system operation is also saved in event logs of the cabin file server 268 and primary access terminal 225. Software errors saved include but are not limited to the following; bad returns from CAPI calls, no AC power, no UPS power, ARCNET time-out, Ethernet time-out, etc.

A history of critical events are also saved in the cabin file server 268 and event logs. Critical events stored includes as a minimum: power interruptions, air/ground mode switch activations, start of movie cycle, and end flight.

The event logs for a flight are saved at the end of the flight. When the current log is saved, it is immediately cleared from memory. The depth of saved files is at least 40 flight legs. It is possible for the user to download the event log data to a floppy disk or print the contents to the printer from the primary access terminal 225.

Built-In Test Equipment (BITE) operates as a foreground task in the BITE line replaceable unit state operating via SYSMAINT. The BITE line replaceable unit state can be entered from the normal operation state only when the aircraft 111 is on the ground. BITE testing may be intrusive, and are therefore performed only upon demand.

Once BITE testing has been initiated, the system 100 ensures that erroneous data is not communicated to the external system. The system 100 does so by sending a ground maintenance message to all external systems as appropriate as an indication that the system 100 is off line. Once the BITE tests are completed, the system 100 is capable of automatically sending a power up status message to all external systems as may be appropriate. This power up status message indicates that the system 100 is back on line.

The BITE testing scheme reduces the number of extraneous line replaceable unit failure reports sent to the centralized maintenance computer or displayed at the SYSMAINT screen. The initiating line replaceable unit running SYSMAINT uses a hierarchical scanning approach. When the error log is reviewed by the operator, the line replaceable unit closest to the head-end that have faults are displayed first. The operator can then ignore failures of other line replaceable units past the failed line replaceable unit, since he/she knows that these failures are most likely erroneous. After correcting the problems closest to the head-end, the test can be run again with the downstream line replaceable unit failures examined in detail.

Most line replaceable units in the system 100 have hardware specifically designed to support the BIT/BITE capability. All such additional hardware is limited to an extent that this BIT/BITE specific hardware has no more than 10% (of the failure rate associated with the line replaceable unit so that mission specific hardware in the line replaceable unit accounts for the remaining 90% of the failures.

The system 100 is configured to indicate the status of reporting the system configuration as prescribed in the SYSMAINT user's manual, User's Guide for the Total Entertainment System (TES) Maintenance Program.

It is possible to initiate BITE from the primary access terminal 225, a multi-purpose control display unit (MCDU) 240, which corresponds to the satellite broadcast receiving system 240, on Airbus aircraft 111, or from a PC-based maintenance terminal connected to a line replaceable unit diagnostic port. Any software program which initiates BITE is called a BITE client. The BITE client is responsible for formatting, displaying, and printing BIT or BITE data. Conflicts are automatically resolved in the case where operators attempt to initiate BITE from several locations at the same (or nearly the same) time.

Interfaces to communicate with the centralized maintenance computer on Airbus aircraft 111, and support initiation of BITE is implemented in the first passenger entertainment system controller (PESC-A) 224*a*. All BITE test results are reported to the fault depository, which is the initiating BITE client.

The SYSMAINT tool provides a common operator interface for initiation of BITE and analysis of BITE information. This tool is executable on a PC-based maintenance terminal or the primary access terminal 225. The SYSMAINT tool displays the results of BITE testing, as well as the results of the SYSMAINT analysis of these results.

For BITE initiated at the multi-purpose control display unit 240, all system BITE results are reported to the centralized maintenance computer for display at the multi-purpose control display unit 240.

BITE automatic testing activates a sequence of tests defined for each line replaceable unit as described in accordance with a preferred embodiment. Each line replaceable unit reports the results of its internal tests. Basic communication tests are also performed to verify inter-LRU communications.

The purpose of the line replaceable unit internal test is to ensure that each line replaceable unit is fully functional as a stand-alone unit. All testable components are tested. Typical primary targets in the internal test are power supplies, memory, ADC/DAC, communication controllers, control logic, etc. Each detected fault is attributed to a component and reported as such. Test primitives that provide low-level capabilities are developed to support: manual testing during hardware integration and checkout, manual testing at factory or shop bench, and automatic testing.

In performing line replaceable unit BIT and BITE testing, test primitives are included in each line replaceable unit to allow external test equipment to exercise the line replaceable unit via an external interface. The pass/fail analysis is not the responsibility of the test primitives, but of the entity requesting the information.

Figure 15:
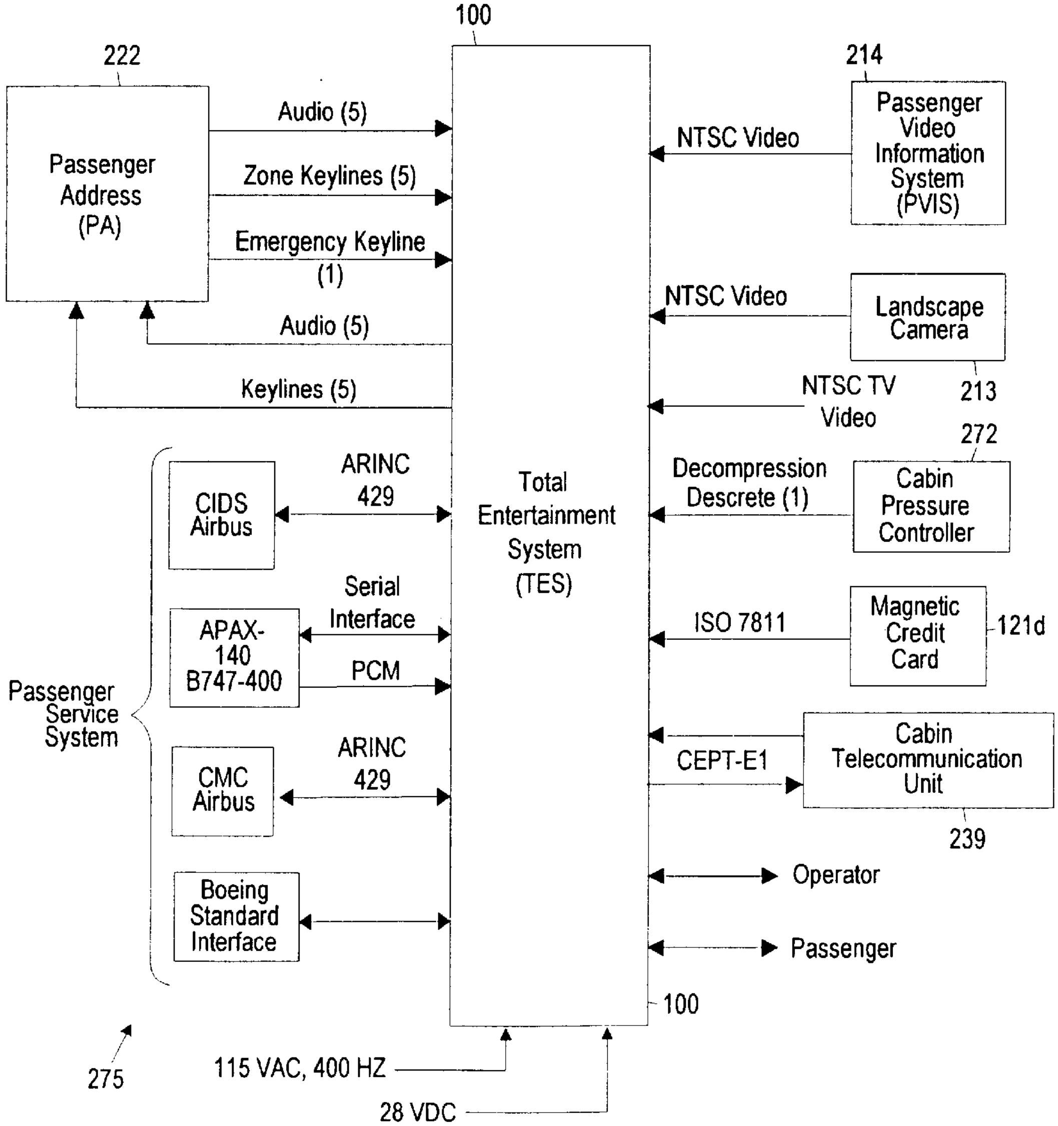
FIG. 15 illustrates external interfaces of a preferred embodiment.

FIG. 15 is a block diagram illustrating external interfaces of the system 100 in accordance with a preferred embodiment. The system 100 accepts three types of inputs for passenger address (PA) signals. The three types include: discrete inputs, Pulse Code Modulated (PCM) data, and CIDS messages. The type of PA interface used is dependent on the type of aircraft 111 on which the system 100 is installed:

For Airbus A330/340 installations, the system 100 accepts five analog inputs for distribution of PA audio signals to assigned passenger address zones. The system 100 also accepts five passenger address and one direct PA (emergency or all zones) keyline discrete inputs, in accordance with ARINC 720-1, Attachment 1.

For 747-400 installations, the system 100 accepts PCM passenger address information from the APAX-140 system 255. The PCM data stream includes five passenger address audio channels and four PA keylines.

For 747-100/200 installations, the system 100 accepts passenger address and emergency passenger address inputs from a single keyline passenger address controller source for distribution of selected passenger address audio signals to the appropriate passenger address zones of the aircraft 111. The system 100 also accepts a video announcement in-progress discrete.

Figures 16, 26:
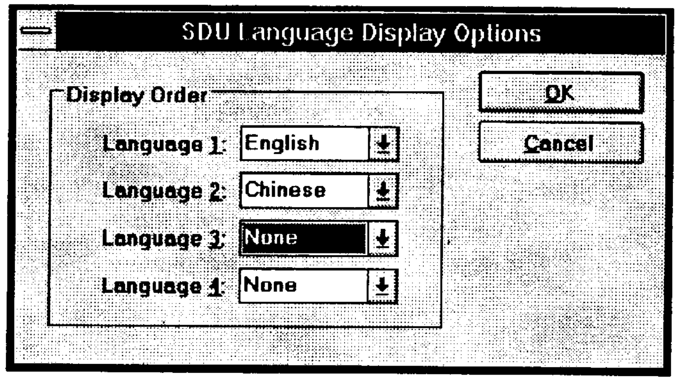
Figures 17, 26:
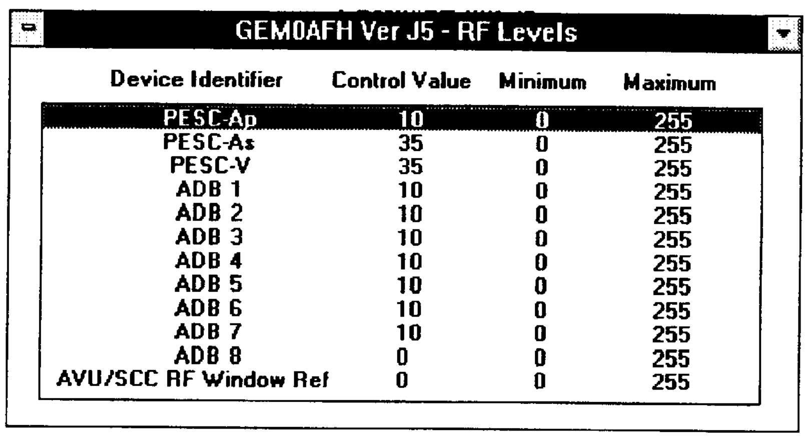
Figures 18, 26:
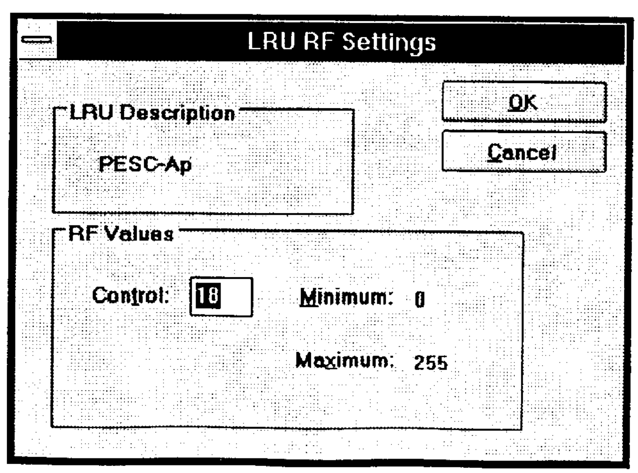
Figures 19, 26:
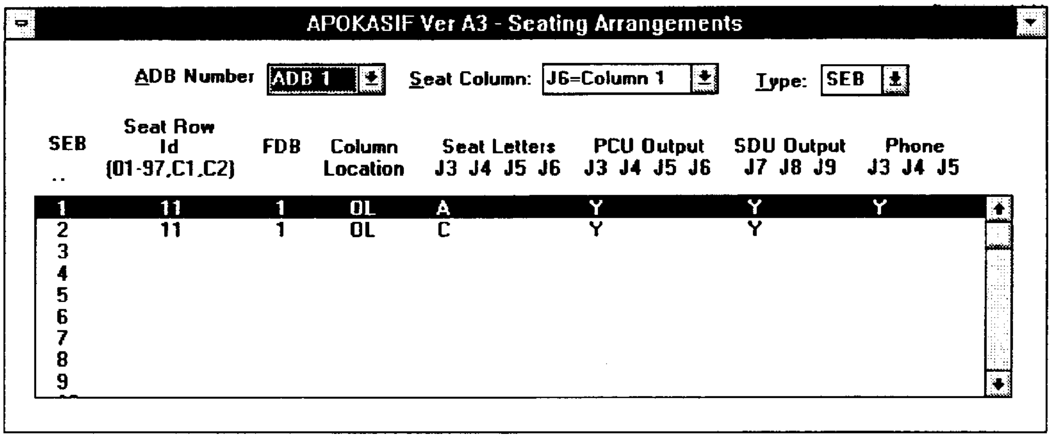

The system 100 has five analog audio outputs in accordance with the table shown in FIG. 15 that can be used to drive a PA control system. The system 100 also provides five 28V keyline signals, in accordance with ARINC 720-1, Attachment 1, one for each of the audio outputs. FIG. 16 is a tabular depiction of passenger address analog output requirements in accordance with a preferred embodiment of the system 100.

The system 100 supports four different types of interfaces to the passenger service system (PSS) of the aircraft 111. The system 100 communicates with the passenger service system 275 to turn on and off passenger reading lights, turn on and off attendant lights and cause an audible chime for flight attendant call. The system 100 provides only one of these four interface types for any given installation. The four interface types and affiliated requirements are set forth below:

On Airbus 330/340 aircraft 111, the first PSS interface type is the cabin data intercommunication data system (CIDS) interface 251*a*. The CIDS interface 251*a* provides a dedicated low speed serial data interface. The CIDS serial data interface 251*a* complies with the requirements set forth in ARINC-429. Data are transmitted between CIDS system 251 and the system 100. The following information is exchanged over the CID interface 251*a*. System layout data from the CIDS system 251 to the system 100. The system layout data includes no smoking zones, PA, and video distribution zones. Passenger service data (attendant call, reading light switching, etc.) from the system 100 to the CIDS interface 251*a*.

On Boeing 747-400 installations, the second PSS interface type is to an APAX-140 system 255.

On DC 10-30/40, the third PSS interface type is the APAX-110/120 interface (not shown). The system 100 has a discrete output for communicating with the APAX-110/120 system.

On Boeing Aircraft 111 with a Standard Interface 253, the fourth PSS interface type is the Boeing Standard Interface (SIF) 253. The SIF 253 is implemented in accordance with Boeing Document D6-36440, Standard Cabin System Requirements Document.

The system 100 has an interface to the passenger video information system 214. The PVIS interface is comprised of video and audio signals from the passenger video information system 214, and a control interface. The requirements for each of these PVIS interfaces are discussed in the following paragraph.

The system 100 accepts NTSC composite video from the passenger video information system 214 with a signal level of 1 volt, peak-to-peak. The video input presents a 50-ohm impedance at the interface. The video input accepts a single ended signal with negative synchronization. The system 100 accepts a standard balanced audio signal from the passenger video information system 214 that is fed into a 600Ω load. The PVIS control interface is capable of sending commands to and receiving status from the passenger video information system 214. The PVIS control interface provides a serial interface to the Airshow system that complies with the requirements set forth in Airshow DIU communications message description document, 100422-14, and an Interface Control Document for the RS 485 Airshow DIU to CCC, 100422-5.

The system 100 has an interface to the landscape cameras 213. The landscape camera interface is comprised of a landscape camera video input and a landscape camera control interface. The requirements for each of these landscape camera interfaces is set forth below. The landscape camera video input accepts an NTSC compliant video signal with a signal level of 1 volt peak-to-peak with embedded negative synchronization. The landscape camera video input presents a 50 ohm impedance to a single ended line. The landscape camera control interface is an RS-485 interface.

Figure 16A:
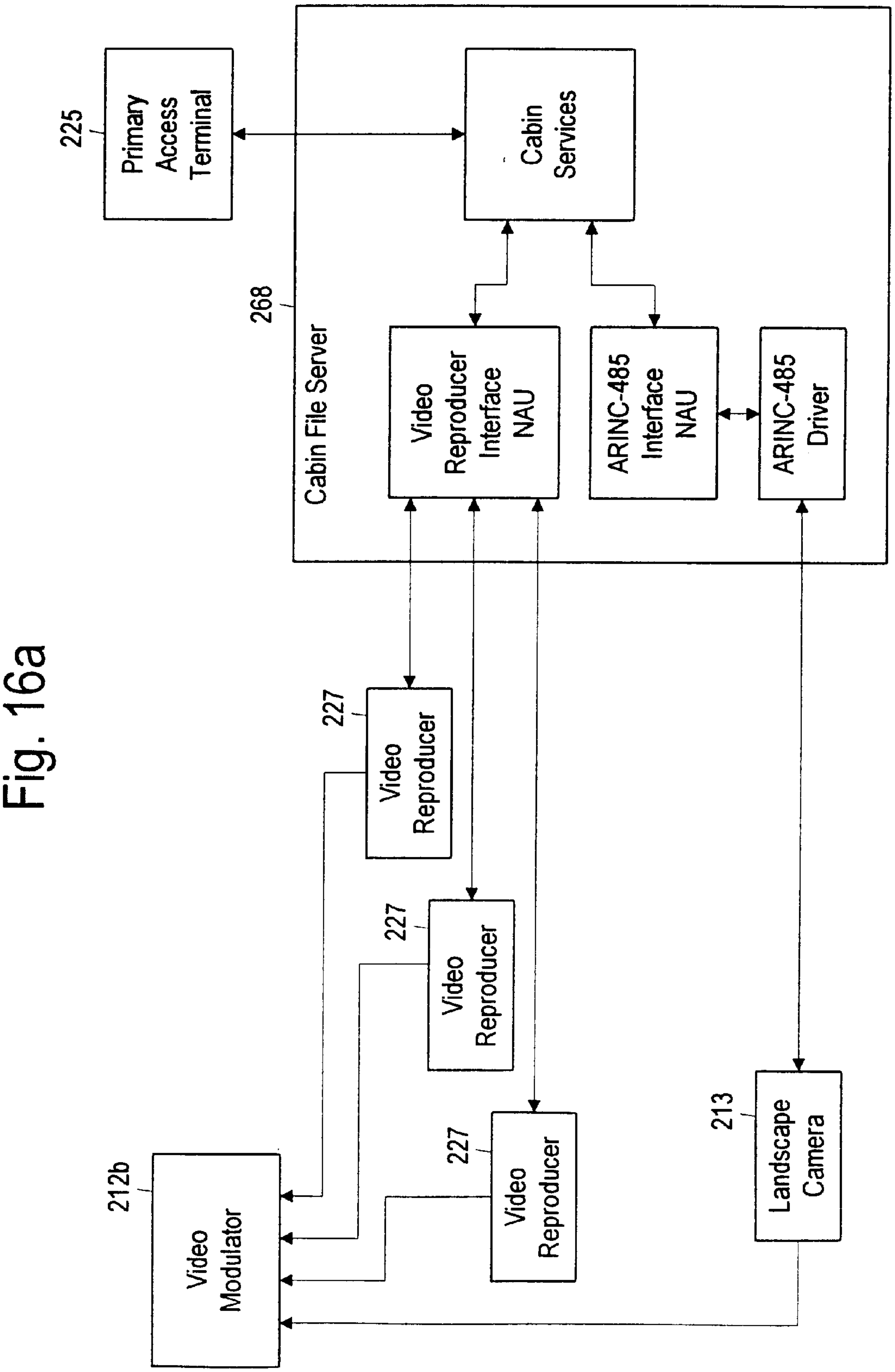

Referring to FIG. 16*a*, it shows how the video reproducers 227 are controlled, and also shows how the system 100 implements control over the landscape cameras 213. However, one aspect of the present invention is that the landscape cameras 213 may be remotely controlled by passengers 117 from their seats 123. Normally, the pointing direction and output of the landscape cameras 213 are controlled from the primary access terminal 225 by way of an interface in the cabin file server 268.

The system 100 has a cabin pressure controller interface 256. The cabin pressure controller interface 256 is a discrete input active ground implemented in accordance with ARINC 720-1, Attachment 1. The system 100 disconnects power from all cathode ray tubes (CRTs) within 100 milliseconds of the discrete signal at the cabin pressure controller interface 256 becoming active.

The system 100 is able to read magnetically encoded credit cards 257 using the credit card readers 121*d* in the passenger control units 121 and at the operator console that are encoded in accordance with ISO Standards 7810 and 7811. Data content is read in accordance with the VisaNet standards manual and contain at least: major industry identifier, issuer identifier, primary account number, surname, first name, middle initial, expiration date, service code, and PIN verification data.

When the system 100 is equipped with the parallel phone option, the system interfaces with the seat telecommunication box of the telephone system. In a parallel phone configuration the system 100 passes phone keystrokes and audio (both transmit and receive) from the handset to the telephone seat box units.

When configured with the integrated telephone option, the system 100 provides a CEPT-E1 interface to a cabin telecommunications unit (CTU) 301. This interface is used to send/receive all digitized voice and telephone signaling information to/from the cabin telecommunications unit 301.

The system 100 provides for a man-to-machine interface to allow flight personnel and maintenance personnel to perform system administration functions. The operator interface provides the following minimum capabilities. The system 100 has a video display with graphical capability commensurate with the display requirements for Microsoft Windows graphical user interface (GUI). The system 100 has a video touch screen compatible with the graphical user interface. The system 100 has an alphanumeric keyboard for flight personnel and maintenance personnel to communicate text and numeric symbols to the system 100. The keyboard layout is "QWERTY" and includes function keys. The system 100 has an IBM personal computer 3.5 inch flexible diskette disk drive. The system 100 has magnetic-stripe card reader located at the operator console that provides the capability to read magnetically encoded credit cards 257 that are encoded in accordance with ISO Standards 7810 and 7811. Data content is read in accordance with the VisaNet Standards Manual and contain at least: major industry identifier, issuer identifier, primary account number, surname, first name, middle initial, expiration date, service code, and PIN verification data. The system 100 can read magnetically encoded credit cards 257 containing flight attendant and maintenance personnel identification and system user authorization data. The system 100 has an interface to an audio headphone at the operator interface.

The system 100 provides for a man-to-machine interface to the passenger that is located at each seat. The system 100 provides a separate interface at each seat in the aircraft 111. The interface provides the following capabilities. The system 100 has a video display screen 122 at each seat. The video display screen 122 is used to display NTSC video and seat application software graphics for passenger viewing. The system 100 supports the use of touch video screens 122. The system 100 has a passenger control unit 121 located at each seat 123. The passenger control unit 121 allows the passenger to control system features including reading lights, flight attendant call lights, seat display on and off, audio volume control, game control, video channel selection and audio channel selection. The passenger control unit 121 provides control of cursor motion on the video display screen 122 and selection of objects displayed on the screen 122 proximate to or coincident with the cursor. The passenger control unit 121 may be integrated with the telephone handset 121*c*. The passenger control unit 121 may be integrated with a magnetic credit card reader 121*d*. The system 100 has an interface to an audio headphone 132 located at each seat. The system 100 has a telephone handset 121*c* located at selected seats. The telephone handset 121*c* includes a microphone and an audio earpiece. The telephone handset 121*c* provides telephone control keys to enable the passenger to initiate calls, terminate calls and to dial destination telephone numbers during the call initiation sequence. The telephone handset 121*c* may be integrated with the passenger control unit 121.

The system 100 interfaces to the aircraft 111 and receives a signal indicative of the aircraft 111 reaching a 10,000 foot altitude level. Once this level is reached, personal computers used by passengers may be operated. The system 100 routes a signal to each audio-video seat distribution unit 231 that is indicative of reaching the 10,000 foot altitude level. This signal is converted to a flashing icon, for example, which is displayed to the passengers.

The system 100 operates on 115V+15V/400 Hz ac and 28 Vdc power from the aircraft 111. The system 100 is in operational state within 7 minutes of the application of power. When the ambient temperature is 5 degrees Celsius to −15 degrees Celsius, it is acceptable to extend this startup period by up to 6 additional minutes. Each line replaceable unit within the system 100 resists a power transient of up to 200 ms in duration without damage and with negligible effect on the passengers after the transient has occurred.

Figure 17:
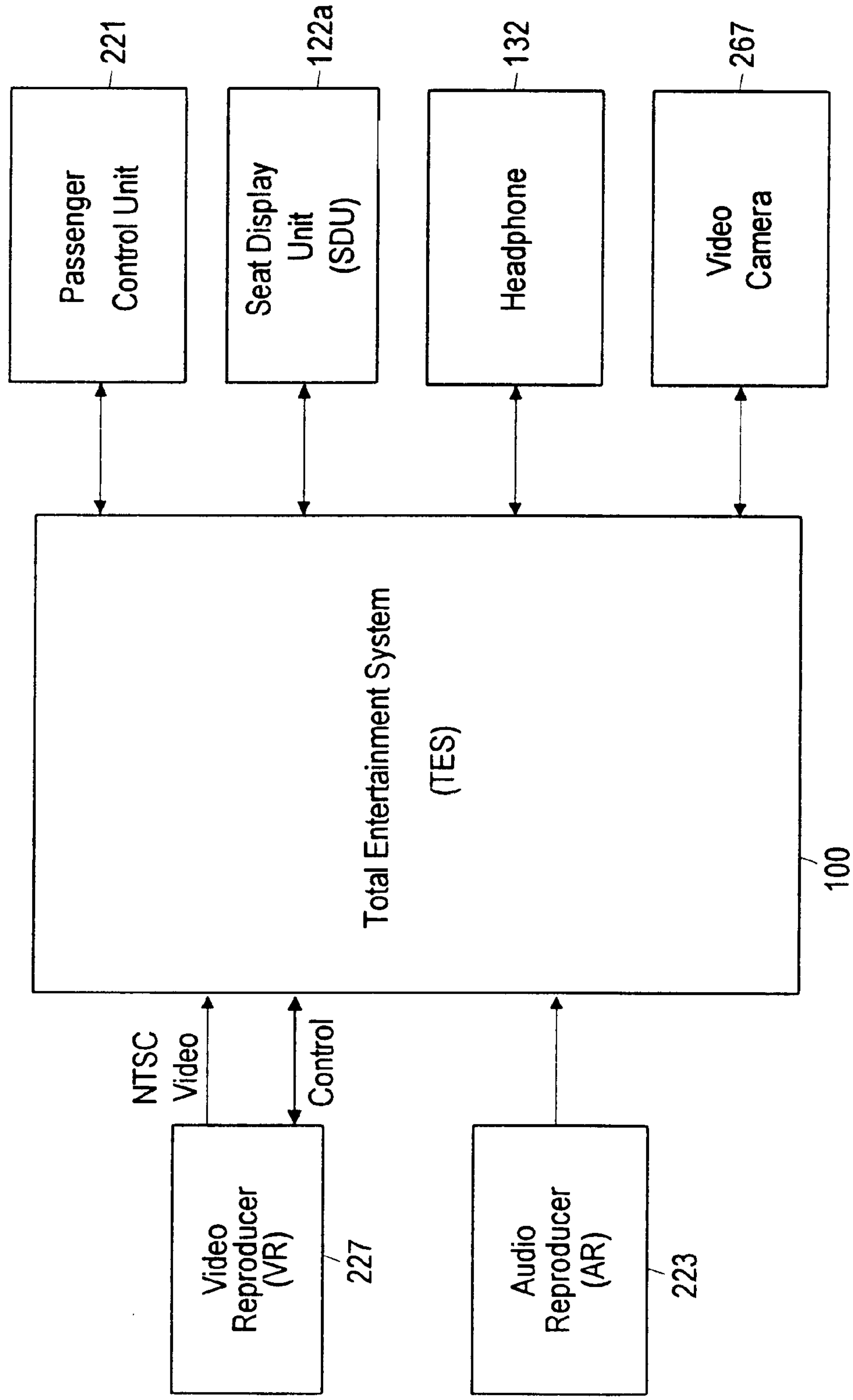
FIG. 17 illustrates internal interfaces of a preferred embodiment.

The internal interfaces of the system 100 are depicted in FIG. 17. The system 100 has a plurality of interfaces to video reproducers 227. Each video reproducer interface is comprised of a video input and a control interface. The system 100 accepts video from each video reproducer 227. The system 100 accepts video in the form of NTSC composite video, 1 volt peak-to-peak, with negative synchronization. The video input provided by the system 100 presents a 50 ohm impedance, single ended. The system 100 employs an RS-422 interface to control the video reproducer 227.

The system 100 accepts a maximum of 88 analog audio inputs. The audio inputs are used to receive audio data from audio reproducers (AR) 123 comprising the audio tape recorders 123, prerecorded boarding music, passenger address audio, or other sources of audio programming. All audio inputs are standard balanced inputs complying with RTCA/DO 170, except the signal level is 0 dBm or 0.775V into a 600Ω load.

The audio-video seat distribution unit 231 has interfaces used to communicate with the passenger control units 121 controlled by that audio-video seat distribution unit 231. This interface is implemented as a full-duplex RS-232 interface. Data transmission speed is 2.4 Kbps minimum. This interface is used to transmit passenger service requests in the form of PCU push button information from the passenger control unit 121 to the audio-video seat distribution unit 231, and for the passenger control unit 121 to transmit BIT/BITE results data to the audio-video unit 231. Messages and protocols are in accordance with interface requirements listed herein.

The audio-video seat distribution unit 231 has interfaces for communicating with the seat displays 122 associated with that audio-video seat distribution unit 231. The audio-video seat distribution unit 231 communicates with both processors in the seat display 122 via a single full-duplex RS-232 link. The RS-232 data transmission speed between the seat display 122 and the audio-video seat distribution unit 231 is 9.6 Kbps minimum. This interface is used by the audio-video seat distribution unit 231 to transmit SDU control information. The audio-video seat distribution unit 231 outputs a composite video baseband signal to the seat display unit 133 at a level of 1V peak to peak into 75Ω impedance.

The audio-video seat distribution unit 231 has interfaces for communicating with the video cameras 267. The audio-video seat distribution unit 231 receives video input signals from the video cameras 267 that may be transmitted to other audio-video seat distribution units 231 for internal video teleconferencing, or are transmitted by way of the satellite communications system 241 and the Internet to provide for remote video teleconferencing.

In order to efficiently implement video teleconferencing, the use of a higher speed, larger bandwidth communication network may be provided to permit many simultaneous uses. This is achieved using a high speed network, such as the 100 Base-T Ethernet network 228 that is currently employed in the head end equipment 200. Interconnection of each of the audio-video seat distribution units 231 by way of a 100 Base-T Ethernet network 228 in addition to, or which replaces the lower bandwidth RS-485 network 218, provides substantial bandwidth to implement video teleconferencing.

Interconnection of the audio-video seat distribution units 231 using the 100 Base-T Ethernet network 228 also permits data communications between personal computers located at the seats 123 and remote computers 112. This is achieved by interfacing the 100 Base-T Ethernet network 228 to the satellite communications system 241. Inter-computer telecommunications may be readily achieved using a Web browser running on portable computers connected to the audio-video seat distribution units 231, or by integrating a Web browse into the audio-video seat distribution units 231 itself. This is readily achieved by running the Web browser on the microprocessor 269 used in each audio-video seat distribution unit 231. Messages may be drafted using a keyboard 129*b* connected to the audio-video seat distribution units 231. Touchscreen seat displays 122 may be also readily programmed to initiate actions necessary to initiate videoconferencing, initiate communications, transfer messages, and other required actions.

The system 100 provides headphone outputs at each seat and at the primary access terminal 225. All audio headphone outputs complies with the interface requirements listed in the table below.

| Headphone Interface Requirements | |
|---|---|
| Frequency Response | 50 Hz to 15 KHz ± 3 dB |
| Signal-to Noise Ratio | 85 dB |
| System Headroom | +3 dB |
| Channel-to-Channel Separation | >60 dB |
| Total Harmonic and Quantization Distortion | 1% maximum at 1 mW and 50 mW output at 50 Hz to 15 KHz through a 15 KHz low-pass filter |
| Power Output | 100 mW minimum into 300 or 40 ohms for input signal level of 1 mW into 600 ohms at 1 KHz |

The prime internal interface to the system 100 is as described below. The ARCNET network 216 is used as the major data communications path between major elements. This network interconnects the following components: cabin file server 268, primary access terminal 225, PESC-A (primary) 224*a*, PESC-A 224*a* (secondary, if used), PESC-V 224*b*, and all Area distribution boxes 217.

Certain line replaceable unit types require the assignment of a unique address within the system 100. This is referred to as line replaceable unit addressing. Line replaceable units that require unique addresses are the PESC-A primary/secondary 224*a*, PESC-V 224*b*, video reproducers 227, area distribution box 217, tapping unit 261, and primary access terminal 225. Each of these line replaceable unit types are assigned a unique address during system installation. The addressing of area distribution boxes 217 and tapping units 261 conform to the requirements shown in the next five tables.

For Boeing aircraft 111, each area distribution box 217 has a pin-coded address for addressing of the units from the passenger entertainment system controller 224, as shown in the following table.

Boeing Aircraft ADB Addressing

| Address | A2 | A1 | A0 |
|---|---|---|---|
| ADB1 | 1 | 1 | 1 |
| ADB2 | 1 | 1 | 0 |
| ADB3 | 1 | 0 | 1 |
| ADB4 | 1 | 0 | 0 |
| ADB5 | 0 | 1 | 1 |
| ADB6 | 0 | 1 | 0 |
| ADB7 | 0 | 0 | 1 |
| ADB8 | 0 | 0 | 0 |

For Airbus aircraft 111, each area distribution box 217 has a pin-coded address for addressing of the units from the passenger entertainment system controller 224, as shown in the following table.

Airbus Aircraft ADB Addressing

| Address | A2 | A1 | A0 |
|---|---|---|---|
| ADB1 | 1 | 1 | 1 |
| ADB2 | 1 | 1 | 0 |
| ADB3 | 1 | 0 | 1 |
| ADB4 | 1 | 0 | 0 |
| ADB5 | 0 | 1 | 1 |
| ADB6 | 0 | 1 | 0 |
| ADB7 (Option) | 0 | 0 | 1 |

For Boeing aircraft 111, each tapping unit 261 has a pin-coded address for addressing of the units on the input connector, as shown in the following table.

Boeing Aircraft Tapping Unit Addressing

| Address | A4 | A3 | A2 | A1 | A0 |
|---|---|---|---|---|---|
| TU1 | 0 | 0 | 0 | 0 | 0 |
| TU2 | 0 | 0 | 0 | 0 | 1 |
| TU3 | 0 | 0 | 0 | 1 | 0 |
| TU4 | 0 | 0 | 0 | 1 | 1 |
| TU5 | 0 | 0 | 1 | 0 | 0 |
| TU6 | 0 | 0 | 1 | 0 | 1 |
| TU7 | 0 | 0 | 1 | 1 | 0 |
| TU8 | 0 | 0 | 1 | 1 | 1 |
| TU9 | 0 | 1 | 0 | 0 | 0 |
| TU10 | 0 | 1 | 0 | 0 | 1 |
| TU11 | 0 | 1 | 0 | 1 | 0 |
| TU12 | 0 | 1 | 0 | 1 | 1 |
| TU13 | 0 | 1 | 1 | 0 | 0 |
| TU14 | 0 | 1 | 1 | 0 | 1 |
| TU15 | 0 | 1 | 1 | 1 | 0 |
| TU16 | 0 | 1 | 1 | 1 | 1 |

For Airbus aircraft 111, each tapping unit 261 has a pin-coded address for addressing of the units on the input connector, as shown in the following table.

Airbus Aircraft Tapping Unit Addressing

| Address | A4 | A3 | A2 | A1 | A0 |
|---|---|---|---|---|---|
| TU1 | 0 | 0 | 0 | 0 | 0 |
| TU2 | 0 | 0 | 0 | 0 | 1 |
| TU3 | 0 | 0 | 0 | 1 | 0 |
| TU4 | 0 | 0 | 0 | 1 | 1 |
| TU5 | 0 | 0 | 1 | 0 | 0 |
| TU6 | 0 | 0 | 1 | 0 | 1 |
| TU7 | 0 | 0 | 1 | 1 | 0 |
| TU8 | 0 | 0 | 1 | 1 | 1 |
| TU9 | 0 | 1 | 0 | 0 | 0 |
| TU10 | 0 | 1 | 0 | 0 | 1 |
| TU11 | 0 | 1 | 0 | 1 | 0 |
| TU12 | 0 | 1 | 0 | 1 | 1 |

For Boeing 777 aircraft 111, each tapping unit 261 has a pin-coded address for adderessing of the tapping unit 261 on the input connector, as shown in the following table.

Boeing 777 Aircraft Tapping Unit Addressing

| VDU # | Bit Gnd | Bit 2 (2) | Bit 3 (4) | Bit 4 (8) | TU Addr. | TU # |
|---|---|---|---|---|---|---|
| 1 | Gnd | Gnd | Gnd | Gnd | 0 | 1 |
| 2 | Open | Gnd | Open | Open | 13 | 14 |
| 3 | Gnd | Gnd | Open | Open | 12 | 13 |
| 4 | Open | Open | Gnd | Open | 11 | 12 |
| 5 | Gnd | Open | Gnd | Open | 10 | 11 |
| 6 | Open | Gnd | Gnd | Open | 9 | 10 |
| 7 | Gnd | Gnd | Gnd | Open | 8 | 9 |
| 8 | Open | Open | Open | Gnd | 7 | 8 |
| 9 | Gnd | Open | Open | Gnd | 6 | 7 |
| 10 | Open | Gnd | Open | Gnd | 5 | 6 |
| 11 | Gnd | Gnd | Open | Gnd | 4 | 5 |
| 12 | Open | Open | Gnd | Gnd | 3 | 4 |
| 13 | Gnd | Open | Gnd | Gnd | 2 | 3 |
| 14 | Open | Gnd | Gnd | Gnd | 1 | 2 |
| 15 | Gnd | Open | Open | Open | 14 | 15 |
| 16 | Open | Open | Open | Open | 15 | 16 |

The system 100 is designed and manufactured in accordance with the general reliablity/safety and maintainability requirements and the following specific requirements. In response to an aircraft decompression signal, all equipment with high voltages susceptible to arcing (i.e., cathode ray tube monitors 163 and projectors 162) is automatically switched off. In addition, the system 100 retracts all monitors 163 and projectors 162 that are not in their stowed positions. The electrical system is designed to minimize the risk of electrical shock to crew, passengers, servicing personnel, and maintenance personnel using normal precautions. The external surface temperature of any part that is handled during normal operation by the flight crew or a passenger does not exceed 60° C.

Insulating materials for equipment installed in pressurized compartments does not emit any toxic gases in quantities that could be hazardous to the health of crew and passengers. Smoke and toxic gas emission of material during combustion does not exceed values listed in the following table at the 4.0 minute mark of the NBS Smoke Chamber Test, ASTM F814-84b (tested at 2.5 watts/cm$^2$ flaming mode):

TaSmoke and Toxic Emissions

| Gas | CO | HCN | HF | HCL | $SO_2$ | NOX |
|---|---|---|---|---|---|---|
| Emission (ppm) | 3500 | 150 | 200 | 500 | 100 | 100 |

All non-metallic and metallic/non-metallic materials and combinations meet the applicable fire property requirements of FAR Part 25, amendments 25 through 70. The requirements are summarized as follows. Wiring meets FAR 25.1359(d). PSU-mounted speaker monitor panels (including surrounding shroud and NS/FSB sign/speaker escutcheon) and wall-mounted monitor surrounding shroud meets FAA 25.853 (a), (a-1). Monitor case, monitor recess box, and wiring/cable conduits meets FAR 25.853 (b). Monitor screen cover (clear protective sheet) meets FAR 25.853 (b-2).

The system 100 is tailorable to prevent unauthorized access to the system 100. Secured access is provided to flight attendants, as well as to service and other airline personnel. Methods of providing secured access are tailorable by swiping a magnetically encoded card, and manually logging on to the system 100.

With the magnetically encoded card method, the user is required to swipe a magnetically encoded card during the logon process. The following information is encoded on the magnetic card: user ID number, user PIN code, and user grade level.

After the card is swiped, the system 100 prompts the user to manually enter the PIN. The system 100 verifies that the PIN entered manually matches the PIN encoded on the card.

With the manual logon method, the user is required to manually enter the following information: user ID number, user PIN code, and user grade level. This method can also be used as a backup method in the event that the card swipe is not successful.

Once the user is logged onto the system 100, the system 100 provides the user with access to flight attendant services only in accordance with the grade level (either encoded on the card, or entered manually). The system 100 supports the definition of a maximum of 10 user grade levels. The grade level required for access to flight attendant services is tailorable. When the airline elects not to tailor the system 100 with security features, the system 100 provides for registration of personnel accessing the system 100. Access registration is provided for flight attendants, as well as for service and other airline personnel.

The system 100 meets the environmental requirements of D6-36440 and RTCA/DO-160, as shown in the following table.

Environmental Requirements

| Environment | DO-160 Section | Category |
|---|---|---|
| Temperature and Altitude | 4 | A1 |
| Temperature Variation | 5 | B |
| Humidity | 6 | A |
| Shock | 7 | normal operation 6G, 11 ms, 3 axis crash shock: 15 G, 11 ms, 3 axis |
| Vibration | 8 | C (LRU w/o hard drive) B' Modified (LRU w/hard drive) B' Modified = During the Vibration Test per 66-621082, LRUs containing hard drives are subjected to RTCA/DO-160 Robust Random Vibration Curve B', except the APSD remains flat at .002 $g^2$/Hz from 500 Hz to 1240 Hz and then rolls off at a slope of −6 dB/octave to 2000 Hz. |
| Power Input | 16 | A |
| Conducted Voltage Transient | 17 | A |
| Audio Frequency Conducted Suscepti-bility | 18 | Z |
| Induced Signal Suscepti-bility | 19 | Z |
| Radio Frequency Suscepti-bility (radiated and conducted) | 20 | T |

-continued

Environmental Requirements

| Environment | DO-160 Section | Category |
|---|---|---|
| Spurious Radio Frequency Emission | 21 | Z Radiated cw: max. 30 dB micro V/m in the range from 25 to 1215 MHz |

The system 100 provides spare capacity requirements for processing, memory and disk storage shown in the following table. These requirements apply to each applicable line replaceable unit on an individual basis. Memory utilization requirements apply to each memory type (for example RAM, ROM, FLASH EEPROM, EEPROM).

System Spare Capacity Requirements

| System Resource | Requirement |
|---|---|
| Memory Margin | 40% |
| Processing Capacity Margin | 30% |
| Disk Storage Margin | 30% |

The system line replaceable units complies with the MTBF values listed in the following table. The MTBF values have been calculated in accordance with Reliability Prediction of Electronic Equipment, MIL-HDBK-217F. Specifically, the Part Stress Analysis Prediction method where the environment is Airborne, Inhabited, Cargo. The mean ambient temperature of the system environment is 40° C.

LRU Reliability

| LRU | Req'd Min MTBF (Airbus) (hours) | MTBF Calculated (hours) | MTBF Estimated (hours) | MTBF Mea-sured (hours) | MTBUR Mea-sured* (hours) |
|---|---|---|---|---|---|
| PESC-A | 125 | 2361 | — | 30735 | 12294 |
| PESC-V | 125 | 2361 | — | 10790 | 10790 |
| ADB-CIN | 180 | 4700 | — | 43567 | 21783 |
| ADB-CIL | 180 | 4700 | — | N/A | N/A |
| ADB-LAC | 180 | TBD | 3000 | 13488 | 10790 |
| FDB | N/A | TBD | 200000 | | |
| AVU-3 | 350 | 2184 | — | 19702 | 10977 |
| AVU-2 | 350 | 2184 | — | 20440 | 13649 |
| PCU | 600 | TBD | 100000 | 38136 | 29674 |
| PAT/Brick | 125000 | 5021 | — | N/A | N/A |
| CFS | N/A | 7300 | — | N/A | N/A |
| Printer | N/A | TBD | — | 30735 | 15368 |
| VMOD | N/A | TBD | 8000 | 61470 | 15368 |
| TU | 220 | TBD | 100000 | 92205 | 92205 |
| VR (SVHS) | 3 | TBD | 7000 | 3498 | 3415 |
| 16" DU | 10 | TBD | 10000 | N/A | N/A |
| 19" DU | 10 | TBD | 10000 | N/A | N/A |
| 8.6" DU | 10 | TBD | 20000 | N/A | N/A |
| Projector | 10 | TBD | 10000 | N/A | N/A |
| DU Retractor | 60 | TBD | — | N/A | N/A |
| OEB | N/A | 31369 | — | N/A | N/A |
| DUC | 10 | TBD | 15000 (plus 10000 backlight) | 3787 | 3591 |

-continued

LRU Reliability

| LRU | Req'd Min MTBF (Airbus) (hours) | MTBF Calculated (hours) | MTBF Estimated (hours) | MTBF Measured (hours) | MTBUR Measured* (hours) |
|---|---|---|---|---|---|
| DUS | 10 | TBD | 2000 (plus 10000 backlight) | 35492 | 25981 |
| UEB | N/A | 1092 (Dual) | — | 11755 | 7794 |
| | | 4274 (Single) | 60548 | 35054 | |
| PVIS | N/A | TBD | 12000 | 10245 | 2561 |

Legend:
N/A = Not Available
TBD = To Be Determined
*Measured using VAA data for 6 a/c, 1/1/95 to 12/31/95

The system BITE detects at least 60% of all system failures. Of the failures detected, BITE isolates 80% to a single failed line replaceable unit, 90%) to two possibly failed line replaceable units, and 95% to three possibly failed line replaceable units.

The system 100 provides an airline seat availability (ASA) of at least 96%. The ASA is calculated as the weighted average of all flight-leg seat availability (FSA) values for a specific calendar week: ASA=100−((monthly inoperable seats/monthly seats)*100), where monthly seats is calculated as follows: (the number of seats per aircraft 111)*(number of aircraft 111)*(number of flights per day) *30.

Monthly inoperable seats is defined as the number of inoperable seats occurring in a given month. The number of inoperable seats is calculated according to the following. Each inoperable seat display 122, passenger control unit 121, or Cordreel reported counts as one inoperable seat. Each inoperable audio-video unit 231 counts as 2 or 3 inoperable seats, depending on the layout of the passenger arrangement (LOPA). Each inoperable area distribution box 217 counts as several inoperable seats, depending on LOPA. Each inoperable primary access terminal 225, cabin file server 268, or passenger entertainment system controller 224 counts as full aircraft inoperable (actual number of seats depends on LOPA). Each inoperable audio or video channel counts as 1⁄15 of aircraft inoperable (actual number of seats depends on LOPA).

From the weekly ASA, a single percentage is reported on a monthly basis for most airline customers. Actual calculation averaging can be tailored for each airline customer. The following are examples of tailored calculation averaging: report a single percentage monthly that is based on a 60-day moving window, report a single percentage monthly that is cumulative (i.e., since beginning of program), report a single percentage monthly that is based on a 30-day moving window, and report a daily percentage which is calculated per aircraft 111 or per fleet (based on requests from Program Management Office).

All line replaceable units include fault indication LEDs as described herein. Upon power-up, each line replaceable unit performs a power-up self test and set the LEDs. Upon detection of a "fatal" fault, each line replaceable unit terminates all message handling and, where feasible, physically disconnect itself from any networks (e.g., ARCNET, Ethernet). To avoid hanging up other elements of the system 100, each line replaceable unit containing a central processing unit (CPU) includes a watchdog timer. The watchdog timer automatically resets the line replaceable unit if no activity is detected from the CPU in a given time interval.

Loss of communications with a seat display 122 is detected and reported to the event log. The system 100 develops a list of inoperative seats while the system 100 is in the normal operation state. The system 100 is configured to allow the flight attendants to display, at the primary access terminal 225, this list of inoperative seats. When an audio-video unit 231 detects that an SDU application download has failed three consecutive times, the applicable seat transitions to Distributed Video mode. The seat automatically transitions back to Normal mode upon successful download of the SDU application.

The system 100 displays a message at the primary access terminal 225 when loss of communication occurs with any video reproducer 227.

If the card reader at the primary access terminal 225 becomes inoperable, the system 100 is configured to allow the flight attendants to change from flight attendant card activation to keypad and/or touchscreen entry. If a passenger's card reader becomes inoperable, the system 100 is configured to allow the flight attendants to perform the transaction at the primary access terminal 225.

On seat displays with touch screen, the system 100 provides redundant SDU navigation control via the passenger control unit 121. If the in-seat display becomes inoperable, the passenger control unit 121 can be used to control the seat display 122. If the touch screen of the primary access terminal 225 becomes inoperable, the system 100 is configured to allow the flight attendants to operate the primary access terminal 225 from the keyboard.

The system 100 is configured to allow the flight attendants to display, on the primary access terminal 225, the contents of all hardcopy reports. The system 100 displays, on the primary access terminal 225, one of the following status messages: printer status is UNKNOWN, printer is OFFLINE, printer door is OPEN, printer is OUT OF PAPER, printer is ONLINE, printer communication failure, printer is printing, and printer ERROR.

The system 100 displays a message on the primary access terminal 225 when a cabin file server failure is detected and when the cabin file server 268 recovers. Upon detection of a failure, if the cabin file server 268 does not recover within a tailorable amount of time, all seats automatically transitions to distributed video mode. All seats automatically transitions back to Normal mode upon recovery of the cabin file server 268 and successful download of the SDU application.

All transaction records are redundantly stored to the hard disk in the primary access terminal to provide backup in case of cabin file server hard disk failure. This backup occurs at least once every 10 minutes to ensure that the backup information is relatively current. It is possible to offload the transaction data and print reports from this data.

The Area distribution boxes 217, audio-video units 231, and seat displays 122 contain a built-in default database. This database is used under the following conditions: unable to receive a valid database due to a failed interface, and database is corrupt. The default database (or the algorithm used to generate the default database) is stored in nonvolatile memory. This database is the same as the database for a typical flight in the following functions: games are free to all zones, movies are free to all zones, generic movie titles, generic audio titles, and generic game titles.

When the PESC-A 224*a* detects a failure during the download of an ADB database, the PESC-A 224*a* retries the download a minimum of two times between power-ups. When an area distribution box 217 detects a failure during the download on an AVU database, the area distribution box 217 retries the download a minimum of two times between power-ups.

In the event of loss of communications with a passenger control unit 121, the system 100 provides the ability to transfer SDU navigation control to another seat.

The system 100 uses commercially available components to the greatest extent possible. Physical characteristics of the system line replaceable units are shown in the following table.

LRU Physical Characteristics

| LRU | Max Weight (kg) | Measured Weight (kg) | Max Power (watts) | Measured Power (watts) | Color | Size H × W × L (mm) |
|---|---|---|---|---|---|---|
| PESC-A | 4 | 4.8 | 40 | 62 | RAL7021 (black) | 4 MCU |
| PESC-V | 4 | 4.8 | 40 | 62 | RAL7021 (black) | 4 MCU |
| ADB-CIN | 1.8 | 2.6 | 10 | 19 | DSP | 85 × 170 × 210 |
| ADB-CIL | 1.8 | 2.6 | 10 | 19 | DSP | 85 × 170 × 210 |
| ADB-LAC | 1.8 | 2.6 | 10 | 19 | DSP | 85 × 170 × 210 |
| ADB-777 | 1.8 | 2.6 | 10 | 19 | DSP | 85 × 170 × 210 |
| FDB | N/A | .21 | 2 | 0 | DSP | 55 × 65 × 170 |
| SEB-AVI-13 | .35 | 1.1 | 10 | 75 (4") | DSP | 42 × 134 × 126 |
| SEB-AVI-12 | .45 | 1.1 | 12 | 58 (4") | DSP | 53 × 134 × 157 |
| AVU | | TBD | | 67 | | |
| PCU-VIC | .12 | .2 | .75 | .5 | airline dependent | N/A |
| PCU-VICP | .12 | 0.2 | .75 | 0.5 | airline dependent | N/A |
| PAT/Brick | 9 | 18.1 | 25 | 125 (SEB) | RAL7021 (black) | Galley space envelope |
| CFS | N/A | 7.8 | N/A | 85 | N/A | N/A |
| Printer | N/A | 5.9 | N/A | 60 (print) 14 (idle) | N/A | N/A |
| VMOD | N/A | 7.5 | N/A | 37 | N/A | N/A |
| TU | .3 | .3 | 10 | 14 | DSP | 62 × 134 × 126 |
| VR - SVHS | 3.5 | 6.4 | 40 | 45 | RAL7021 (black) | space envelope |
| VR - Triple Deck TEAC | | 11.5 | | 62 | | space envelope |
| 16" DU | 10 | 14.8 | 100 | 54 | DSP | space envelope |
| 19" DU | 18 | 25 | **120** | 100 | DSP | space envelope |
| 10.4" LCD DU | | 3.1 | | 2.8 | DSP | space envelope |

-continued

LRU Physical Characteristics

| LRU | Max Weight (kg) | Measured Weight (kg) | Max Power (watts) | Measured Power (watts) | Color | Size H × W × L (mm) |
|---|---|---|---|---|---|---|
| 8.6" LCD DU | .9 | 3.1 | 20 | 35 | DSP | space envelope |
| 6.4" LCD DU | | 1.26 | | | | |
| 6.0" LCD DU | | 1.50 | | | | |
| Projector | 20 | TBD | 150 | 147 | N/A | N/A |
| DU Retractor | 28 | TBD | 80 | TBD | DSP | space envelope |
| OEB | N/A | TBD | N/A | TBD | N/A | N/A |
| DUC | .8 (5") | 1.6 | 10 (5") | 18 | airline dependent | airline dependent |
| DUS | .8 (5") | 1.6 | 10 (5") | 18 | airline dependent | airline dependent |
| UEB | N/A | .9 | N/A | 15 | N/A | N/A |
| AERIS | N/A | 10 | N/A | 3.5 | N/A | N/A |

Legend:
N/A = Not Available
DSP = Depends on surface protection

All software development complies with the requirements defined for Level E software documented in RTCA/DO-178, Software Considerations in Airborne Systems and Equipment Certification.

The system software is designed in a layered fashion, and an application programming interface (API) layer is defined and documented for the primary access terminal 225 and seat display 122. These application programming interfaces are used as the foundation upon which to implement the GUIs. The GUIs are thus implemented in a manner that facilitates rapid prototyping and GUI modification within the constraints of the services provided by the application programming interfaces. These application programming interfaces permit customer or third-party development of compatible GUIs. Interfaces may be added to the APIs that provide expanded functionality for customer or third-party developers who wish to provide services that are in addition to the current application programming interfaces.

The equipment is designed for passive cooling. Equipment to be installed in the electronic equipment bay is designed and qualified to operate normally when provided with an ARINC 600 cooling interface. In addition, equipment requiring forced air cooling and that is used in the 737 avionics bay is qualified to operate normally when provided with an ARINC 404A cooling interface.

As a minimum, metal oxide semiconductors and micro-semiconductors and 0.1 percent precision metal film resistors are identified as electrostatic discharge sensitive devices (EDSDs). Electrostatic discharge sensitive devices are electrical and electronic devices (e.g., transistor, diode, microcircuit) and components (e.g., resistors) which may undergo an alteration of electrical or physical characteristics as a result of up to 10 discharges from a 100-picofarad capacitor charged to 15,000 volts or less and discharged through a 1500 ohm resistor into any two terminals or any surface and any terminal.

Assemblies containing electrostatic discharge sensitive devices, as a minimum, are identified as follows. All electrostatic discharge sensitive devices are identified by a Component Maintenance Manual or Overhaul Manual. Each assembly, as well as all equipment containing electrostatic discharge sensitive devices, is identified with a "Caution" or "Attention" label. The label provides a highly visible indication of the message intended to be conveyed.

The potential of damaging any electrical/electronic part contained within the equipment by virtue of discharging an electrostatic pulse into a connector pin, accessible external to the line replaceable unit, is assessed. For each susceptible pin, transient protection circuitry is provided to preclude any requirements for special handling of completed systems. A conductive connector dust cover is used to protect sensitive electronic circuitry from introduction of an electrostatic pulse through the connector pins. A "Caution" label is affixed near the assembly external connection. The label dictates the need for the conductive dust cover during transportation and storage.

All equipment having the same part number is directly interchangeable in terms of form, fit, and function.

The system 100 is designed in accordance with human engineering principles described in the Department of Defense Criteria Standard, MIL-STD-1472. This standard is used as a guide to ensure that the equipment is designed with close consideration of human capabilities and limitations. The design minimizes factors that degrade the ability to use the system 100, induce misuse of the system 100, increase risk of personal injury to the user, and be such that the skills and effort required to use the system 100 do not exceed the abilities/capabilities of operational and maintenance personnel. Human factors evaluation of the system 100 and line replaceable unit installation, safety, and operability is conducted before and during design reviews, mock-up development, inspections, demonstrations, analysis, and tests.

The system 100 has the following graphical user interfaces: flight attendant GUI at the primary access terminal 225, and passenger GUI at the seat 123 (SDU/PCU). Each of these GUIs have the following properties: graphic orientation, clear and directly selectable functions (no "hidden" functions), consistency in screen layout and flow (look and feel), and "lexical" feedback (i.e., visible change on the display) for every user action.

Many of the line replaceable units in the system 100 are software loadable in that the contents of the line replaceable unit's memory can be overwritten from a source external to the line replaceable unit. The system 100 provides a facility for loading software into all line replaceable units. The software loading facility ensures that any attempt to load software into a line replaceable unit is appropriate for that type of line replaceable unit. The software loading function indicates when a line replaceable unit can and can not be loaded, the status of software load attempts as either successful or unsuccessful, and an estimate of the time required to load the software into the line replaceable unit. The software load facility employs a high speed download link to the line replaceable units, when appropriate, in order to minimize the time required to load software into a line replaceable unit. The software loading facility precludes load attempts when the aircraft 111 is in flight.

Referring again to FIG. 2, it depicts the architecture of the system 100, and its operation will now be described with reference to this figure. The architecture of the system 10 is centered around RF signal distribution of video, audio, and data from the head end equipment 200 to the seat group equipment 220. Video and audio information is modulated onto an RF carrier in the head end equipment 200 via the video modulator 112 and passenger entertainment system controllers 224*a*, 224*b* respectively prior to distribution throughout the aircraft 111. Referring again to FIG. 5, it shows a functional block diagram of the signal flow to and from the head end equipment 200.

The source of video may be from video cassette players 227, landscape cameras 213, TV video output by the media server 211, or the passenger video information system 214. The source of audio information may be from audio reproducers 223, audio from video cassette players 227, or audio from the passenger address system 222.

There are two types passenger entertainment system controllers 224; PESC-A 224*a* primarily interfaces with audio reproducers 223 and PESC-V 224*b* primarily interfaces with the video reproducers 227 (comprising the video cassette player 227) along with the media server 211, the landscape camera 213 and the passenger video information system 214. Audio information is digitized with the passenger entertainment system controllers 224*a*, 224*b* and prepared for transmission over the RF cable 215. The PESC-A 224*a* also provides the interface to the overhead equipment 230.

The RF signal to the seats 123 is distributed from the head-end equipment 200 to the area distribution boxes 217. The area distribution boxes 217 distribute the RF signal, power, and data to the seat group equipment 220. These signals are passed on to the next area distribution box 217 in a daisy-chained manner. In addition to the RF signal, a lower bit rate (1.25 Mbps) bidirectional communications path (ARCNET network 216) is routed to all area distribution boxes 217 from the head end equipment 200.

At the seat group equipment 220, the audio-video seat distribution unit 231 receives the RF and ARCNET signals. The audio-video seat distribution unit 231 at the seat selects via its tuner 235 (FIG. 7) and demodulates the RF signal to provide video for the display and audio for the headphones 132. The audio-video seat distribution unit 231 also handles the interface with the passenger control unit 121 which contains an integrated telephone 121*c*. For the parallel phone option, the audio-video seat distribution unit 231 interfaces with a telephone telecommunication unit 301 (FIG. 7*c*). In this option, the audio-video seat distribution unit 231 buffers commands from the passenger control unit 121 prior to sending them on to the parallel phone system 239 (FIG. 7*c*). With an integrated phone option, the audio-video seat distribution unit 231 processes the phone call and communicates back to the head end equipment 200 for interface with the cabin telecommunications unit 301.

The primary access terminal 225 provides the operator interface to the system 100, enabling the operator to centrally control the video reproducer 227 and media server 211, start BITE, control the landscape cameras 213, etc.

The cabin file server 268 is the system controller, which controls many of the system functions, such as interactive functions, and stores the system configuration database and the application software. The cabin file server 268 communicates to other components within the head end equipment 200 via the ARCNET interface 216.

The overhead equipment 230 includes the monitors 263, projectors 262 and tapping units 261. The overhead video entertainment system is based on RF distribution similar to the in-seat video system. The RF signal is distributed from the head end equipment 200 to the overhead equipment 230 via a series of tapping units 261 connected in series. The tapping units 261 contain tuners 135 to select and demodulate the RF providing video for the monitors 263 and projectors 262. Control of the overhead equipment 230 is via the RS-485 interface from the PESC-V 124*b*. The information on the PESC-V 124*b* to tapping units 261 interface is controlled via operator input and protocol software running in the cabin file server 268.

The system 100 uses the RF network 215 to distribute all audio and video programming from the head end equipment 200 to the seats 123. The RF network 215 is also used to support downloading of video games and other applications to the seats 123.

The RF network 215 operates over a nominal frequency range from 44 to 550 MHz. The system 100 provides up to 48 6-MHz wide channels for distribution of video information. One of these channels may be used for the distribution of video games and other application software to the seats 123. The video channels are allocated to a bandwidth from 61.25 through 242.6 MHz (nominal). The frequency range from 108 to 137 MHz (nominal) remains unused.

The frequency range from 300 to 550 MHz is used for distribution of audio information to the seats 123. One embodiment of the system 100 uses pulse code modulation to transmit the audio data over the allocated frequency range. This supports a maximum of 88 mono audio channels (83 entertainment and five PA). The allocation of these channels to audio reproducers 223 (entertainment audio), video reproducers 227 (movie audio tracks) and to passenger address lines (PA audio) is database configurable and may be defined by the user. It is also possible to read and set RF levels for the passenger entertainment system controllers 224*a*, 224*b* and area distribution box 217 by means of an off-line maintenance program.

The system 100 uses the ARCNET network 216 as the major data communications path between major components. The ARCNET network 216 interconnects the following components: cabin file server 268, primary access terminal 225, PESC-A (primary) 224*a*, PESC-A (secondary) 224*a*, PESC-V 224*b*, and all the area distribution boxes 217.

The ARCNET network 216 is implemented as two physical networks, with the primary PESC-A 224*a* serving as a bridge/router between the two. Any device on ARCNET 1 216 is addressable by any device on ARCNET 2 216 and vice versa. In addition to the primary PESC-A 224*a*, ARCNET 1 216 connects the following components: cabin file server 268, and a maximum of eight Area distribution boxes 217. In addition to the primary PESC-A 224*a*, ARCNET 2 224*b* connects the following components: a maximum of one PESC-V 224*b*, primary access terminal 225, and the secondary PESC-A 224*a*.

Both ARCNET subnetworks (ARCNET 1, ARCNET 2) 216 operate at a data transmission speed of 1.25 Mbps.

Each area distribution box 217 provides the ability to interface with up to five columns of audio-video units 231. The ADB-to-AVU communication link is implemented as a full-duplex multi-dropped RS-485 interface 218. The RS-485 data transmission speed between the area distribution box 217 and the audio-video units 231 is 115 Kbps. The area distribution box 217 has the capability to address a maximum of 30 audio-video units 231 per column.

Each properly configured area distribution box 217 provides the ability to interface directly with the passenger service function (reading light, attendant call, etc.) hardware. In some aircraft configurations the area distribution box 217 interfaces with three columns of overhead electronic boxes. The ADB-to-OEB communication link is implemented as a half-duplex, multi-dropped RS-232 interface. The RS-232 data transmission speed between the area distribution box 217 and the overhead electronics boxes is 9.6 Kbps. The area distribution box 217 has a capability to address a maximum of 30 overhead electronics boxes per column.

The system 100 allows all units that interface with the Area distribution boxes 217 on one of these interfaces to communicate with any other line replaceable unit that interfaces to any area distribution box 217 on one of these interfaces. The area distribution box 117 provides the following capabilities to facilitate message traffic (1) from one line replaceable unit in a column to another line replaceable unit in the same column, (2) from one line replaceable unit in a column to a line replaceable unit in a different column, and from one line replaceable unit to a line replaceable unit in a different area distribution box 217.

The PESC-V 224*b* in the head end equipment 200 provides an interface to two columns of tapping units 261. This interface is implemented as a half-duplex multi-dropped RS-485 interface, providing the capability to send monitor and control messages to the tapping unit 261. Data transmission speed is 9600 bps. The PESC-V 224*b* addresses a maximum of 16 tapping units 261 per column.

The cabin file server 268, primary access terminal 225, and printers, are interconnected via an Ethernet interface. The interface, messages, and protocols conform to Ethernet 802.3 for communications link control and medium access.

The area distribution boxes 217 may be provided in various configurations designed to meet specific aircraft configuration requirements. The following are general ADB requirements. Not all capabilities are implemented in all types of area distribution boxes 217. The following table lists the types of area distribution boxes 217 acceptable to the system 100.

ADB Configurations

| Model | Telephone | Passenger Service System (PSS) |
|---|---|---|
| ADB-CIN | No | No |
| ADB-CINP | Yes | No |
| ADB-CINP/U | Yes | No |
| ADB-CIO | No | OEB |
| ADB-CIOP | Yes | OEB |
| ADB-LAC | No | APAX-140 |
| ADB-LACP | Yes | APAX-140 |
| ADB-LACP/U | Yes | APAX-140 |
| ADB-CISP | Yes | Boeing's Zone Management Unit (ZMU) |
| ADB-CISP/U | Yes | Boeing's Zone Management Unit (ZMU) |

Legend: C = Circuit breaker control, AC = Local Area Controller option, I = Interactive, P = Phone option, N = No options, U = Upgradeable, O = OEB interface and S = Standard interface.

The area distribution box 217 provides the following functions: distributes 115 VAC 400 Hz power to audio-video units 231, provides an AVU communication link, provides a passenger service system interface for aircraft 111 configured with APAX-140, provides a passenger service system interface for an aircraft 111 configured with Boeing's zone management units, provides input discretes for ADB address information, provides a telephone services interface, orchestrates AVU addressing (sequencing), orchestrates AVU database download, orchestrates AVU application software download, provides input and output discretes via the ACS database, provides an external test/diagnostic communication port, provides indicators representing power, operational status, communication status, and software status, distributes RF to audio-video units 231, and monitors and controls RF levels to seat columns via software The audio-video unit 231 contains one seat controller card 269 per passenger seat 123, and may contain up to three seat controller cards 269 to accommodate three passenger seats 123. The audio-video unit 231 contains a single power supply, and a single audio card.

The audio-video unit 231 performs the following functions: provide data communication to and from the area distribution box 217, provide bidirectional communication with other seat controller cards 269 and virtually any other unit in the system 100, receive RF, Data, and CEPT-E1 telephony information distributed through the Area distribution boxes 217, demodulate and convert the digital RF video and audio to analog video and audio, and provide video and audio outputs to the passengers, provide DC power to all seat controller cards 269 and peripheral line replaceable units attached to the audio-video unit 231, including passenger control units 121 and seat displays 122, allows each seat controller card 269 to tune to a separate audio channel at the same time, by using the passenger control unit 121 and seat display 122, provide the passenger with control of entertainment audio and video selection and volume, game play, and passenger services, and provide indicators representing power, operational status, and communication status.

The cabin file server 268 provide the following functions: processes and stores transaction information from passengers, stores passenger usage statistics for movies, games, shopping, stores passenger survey responses, stores flight attendant usage statistics for login/logout, and provide flight attendant access control, controls the video reproducers 227, controls the landscape camera, controls the PVIS line replaceable unit, stores seat application software and game software, distributes seat application and game software via the RF distribution system, provides power backup sufficient to allow orderly automatic shutdown of the cabin file server 268 operating system when primary power is removed, has indicators representing power, operational status, and communication status, downloads databases via the RF distribution system, has the ability to print reports, and has connectors for a keyboard, monitor, and mouse.

The name "display unit" represents various types of overhead or bulkhead monitors 163 designed to meet specific aircraft configuration requirements. The display unit provides the following functions: displays video entertainment and information to the passengers, accepts power, RF, and control from the tapping unit 261, for 16 inch and 19 inch retractor mechanisms, deploys into the passenger cabin and retracts into the overhead storage position, provides indicators representing power, operational status, and communication status.

The floor disconnect box (FDB) provides the following functions for Airbus aircraft 111: distributes power, audio, video, and passenger service system data from one area distribution box 217 and/or one or two audio-video units 231 to a maximum of two seat columns, provides termination for the AVU/FDB line, and provides a point of connection/disconnection without interrupting other parts of system 100.

The floor junction box only provide the following functions for Boeing aircraft 111: continues power, audio, video, and passenger service system data from one area distribution box 217 and/or one audio-video unit 231 to one seat column, provides termination for the AVU/FJB line, and provides a point of connection/disconnection without interrupting other parts of the system 100.

Various types of passenger control units 121 are designed to meet specific aircraft configuration requirements. The following are general PCU requirements. Not all capabilities are implemented in all types of passenger control units 121. The following table lists the types of line replaceable units acceptable to the system 100.

PCU Configurations

| Model | Passenger Controls | Game Controls | Telephone | Credit Card Re |
|---|---|---|---|---|
| PCU | Yes | No | No | No |
| EPCU-I | No | Yes | No | No |
| EPCU-VI | Yes | Yes | No | No |
| EPCU-VIC | Yes | Yes | No | Yes |
| EPCU-VICP | Yes | Yes | Yes | Yes |
| UPCU-A | Yes | Yes | Yes | Yes |

Legend: PCU denotes passenger control unit, which is a fixed-mounted in seat design that is not removable from the seat, and provides passenger control capability for entertainment and passenger services (attendant call/reading lights). E denotes enhanced PCU, which is a PCU design that is enhanced so that it may be removed from the seat. I denotes interactive/game capability, which provides interactive passenger control capability for entertainment, games, and passenger services (attendant call/reading lights). V denotes video controls. C denotes card reader, wherein the PCU contains a credit card reader 121*d*. P denotes phone, wherein the PCU contains a telephone handset 121*c*. UPCU-A denotes universal PCU, which provides ability to combine any one or more functions, i.e., entertainment, passenger services (attendant call/reading lights), games, and phone, and has dual-format capability of AT&T and GTE phones.

The passenger control unit 121 provides the following functions: passenger seat control of reading light, attendant call light, seat display 122 on/off and adjustments, switching between audio and video, audio and video volume, audio and video channels, and game control, illuminates selection buttons for reading light, attendant call light, seat display 122 on/off and adjustments, volume, and channel, displays channel selection, modes, and errors, provides credit card reader 121*d* and associated functions, and provides a telephone handset and associated functions.

The passenger entertainment system audio controller (PESC-A) 224*a* and the passenger entertainment system video controller (PESC-V) 224*b* are similarly designed and have similar capabilities. However, some features are implemented only in the PESC-A 224*a* or only in the PESC-V 224*b*. The passenger entertainment system controller software implements specific features particular to the PESC-A 224*a* or PESC-V 224*b*. The following items are general passenger entertainment system controller requirements. Not all capabilities are implemented in all types of passenger entertainment system controllers 224. The following table lists the types of passenger entertainment system controllers 224 acceptable to the system 100.

PESC Configurations

| Model | # Audio Channels | Telephone Interface | Definition |
|---|---|---|---|
| PESC-A | 32 | No | Primary Unit |
| PESC-A | 32 | No | Primary Unit w/ Fan |
| PESC-AA | 32 | No | Primary Unit plus Digital PA |
| PESC-A | 32 | Yes | Primary Unit w/ Fan and Phone |

-continued

PESC Configurations

| Model | # Audio Channels | Telephone Interface | Definition |
|---|---|---|---|
| PESC-A1 | 24 | No | Secondary Unit |
| PESC-A1 | 24 | No | Secondary Unit w/ Fan |
| PESC-AS | | No | Boeing 777 Standard Interface |
| PESC-ASP | | Yes | Boeing 777 Standard Interface w/ Phone |
| PESC-V | 32 | N/A | Primary Unit w/ VCR Audio |
| PESC-V | 32 | N/A | Primary Unit w/ PAT Volume Control |
| PESC-V | 32 | N/A | Primary Unit w/ Fan |
| PESC-VS | 32 | N/A | Primary Unit w/ Standard Interface |

Legend: A denotes audio, V denotes video, A1 denotes secondary to A, P denotes phone, AA denotes audio w/ PA, S denotes standard interface.

The passenger entertainment system controller 224 performs the following functions: digitizes up to 32 audio inputs from entertainment and video audio sources, RF modulates the digital data, mixes the RF digital audio data with the RF input from a VMOD or another passenger entertainment system controller 224, outputs the combined RF video carrier and RF digital audio information to the RF distribution system, inputs up to five analog inputs, and multiplex in any combination to a maximum of five analog outputs, provides programmable volume control of the five analog outputs, provides RS-232, RS-485, ARINC-429, and ARCNET communications interfaces, provides input discretes for the control and distribution of PA audio to the seats, provides input and output discretes for the control and distribution of video announcement audio to the overhead PA system of the aircraft 111, provides input discretes for passenger entertainment system controller type and address information, provides input discrete for aircraft status (in air/on ground), amplifies output RF, software monitorable and controllable, provides an external test/diagnostic communication port, provides indicators representing power, operation status, and communication status, provides telephone control and distribution (PESC-A 224*a* only), and provides a fault depository for BIT data (PESC-A primary 224*a* only).

The primary access terminal 225 provides the following functions: a flight attendant interface to the cabin sales capability, a flight attendant interface to the video entertainment capability, a flight attendant interface to the report and receipt printing capability, monitoring of video and audio output from the video reproducer 227, maintenance personnel interface to system diagnostics and status reports, power backup sufficient to allow an orderly shutdown of the primary access terminal operating system when primary power is removed, indicators representing power, operational status, and communication status, single and dual plug stereo audio jack, magnetic card reader 121*d*, and floppy disk drive.

The printer performs the following functions: prints flight attendant reports, passenger receipts, and maintenance reports, provides output to the networked primary access terminal 225 or cabin file server 268 on the aircraft 111, and provides indicators representing power, operational status, and communication status.

Various types of seat display units 133 are designed to meet specific aircraft configuration requirements. The following are general SDU requirements. Not all capabilities are implemented in all types of seat display units 133. Some seat display units 133 contain the tuner 135, control logic, and screen display 122 in one package, and others include a seat electronics box (not shown) and a separate display screen. The following table lists the types of seat display units 133 acceptable to the system 100:

SDU Configurations

| Model | Mounting Location | Display Size | Credit Card Reader | Touch-screen | Underseat Electronics Box |
|---|---|---|---|---|---|
| DUC-ITP6 | Console | 6-inch | Yes | No | Yes |
| DUC-IP6 | Console | 6-inch | Yes | Yes | Yes |
| DUS-IP6 | Seatback | 6-inch | Yes | No | No |
| DUS-ITP6 | Seatback | 6-inch | Yes | Yes | No |
| DUU-IP6 | Underseat (deploys to front of seat) | 6-inch | Yes | No | Yes |

Legend: DU denotes display unit 133, I denotes interactive capability, C denotes console, TP denotes touchpanel, S denotes seatback, # denotes inches, e.g., 6", C denotes console.

The seat display 122 performs the following functions: displays NTSC video, seat application software graphics, and game graphics for passenger viewing, tunes to the selected video entertainment channel, provides controllable brightness, allows viewing angle adjustment, provides optional touchscreen input, and provides indicators representing power, operational status, and communication status.

The tapping unit 261 provide the following functions: demodulate RF control of overhead and bulkhead-mounted video displays, communicate to and from the PESC-V 224*b*, and provide indicators representing power, operational status, and communication status.

The video reproducer 227 may also be known as or commonly called any of the following: video tape reproducer (VTR), video tape player (VTP), video cassette reproducer (VCR), video cassette player (VCP), video entertainment player (VEP) or video entertainment player. The video reproducer 227 provides the following functions: play video entertainment tapes for video distribution to seat displays 122 and display units, play video entertainment tapes for audio distribution to passenger audio jacks and passenger address system 222, communicate to/from the cabin file server 268 for player control, provide power backup sufficient to prevent the halt of a tape during aircraft power transitions of up to 200 milliseconds in duration, pause the tape when commanded, provide four audio track audio outputs, accept PAL (SVHS-4) and NTSC formats of video tape, support standard tape transport control functions, both remotely and from the video reproducer 227 front panel, provide random access of program segments (selected models), and provide indicators representing power, operational, and communication status.

The video modulator 212 provides the following functions: modulates composite video onto RF carriers from various sources, and digital data from various sources, outputs RF video to the audio-video units 231 via the RF distribution system, provides VMOD identification address, and provides indicators representing power, operational, and communication status.

The requirements for the system 100 may be verified by conducting a system verification test (SVT) procedure. The system verification test is conducted in accordance with a system test process (plan), ESE 20–40, a test and integration laboratory procedure overview, ESE20–41, and a test rack startup and shutdown procedures, ESE-WI04.

The test methods that are used include visual inspections, generation of analysis reports, execution of test procedure demonstrations, and execution of LRU acceptance test procedure. The selection and sequence of tests required is defined and approved at test readiness review, held prior to the execution of the system verification test.

Results of required tests are documented in a test procedures sequence and completion log.

Presented below are additional details and summaries regarding specific novel features of the total entertainment system 100, as they relate to in-flight entertainment systems.

As a primary novel feature, the total entertainment system 100 functions as an airborne radio frequency (RF) integrated network environment that integrates, manages and distributes video data, audio data, telecommunications data, voice data, video game data, satellite broadcast television data, provides video conferencing within and without the aircraft 111, passenger service ordering and processing. The satellite broadcast television data may be distributed to passengers when the aircraft 111 is in range of signals transmitted by the satellites and also when it is out of range. An in-flight gaming or gambling system may be integrated into the system 100. The system 100 can be dynamically configured to provide video and audio on demand by individual passengers, to groups of passengers, or to sections of the aircraft 111. The system 100 provides for video conferencing and communication of data between passengers on-board the aircraft 111, as well as people and computers at remote locations by way of the satellite link and Internet.

Figure 17A:
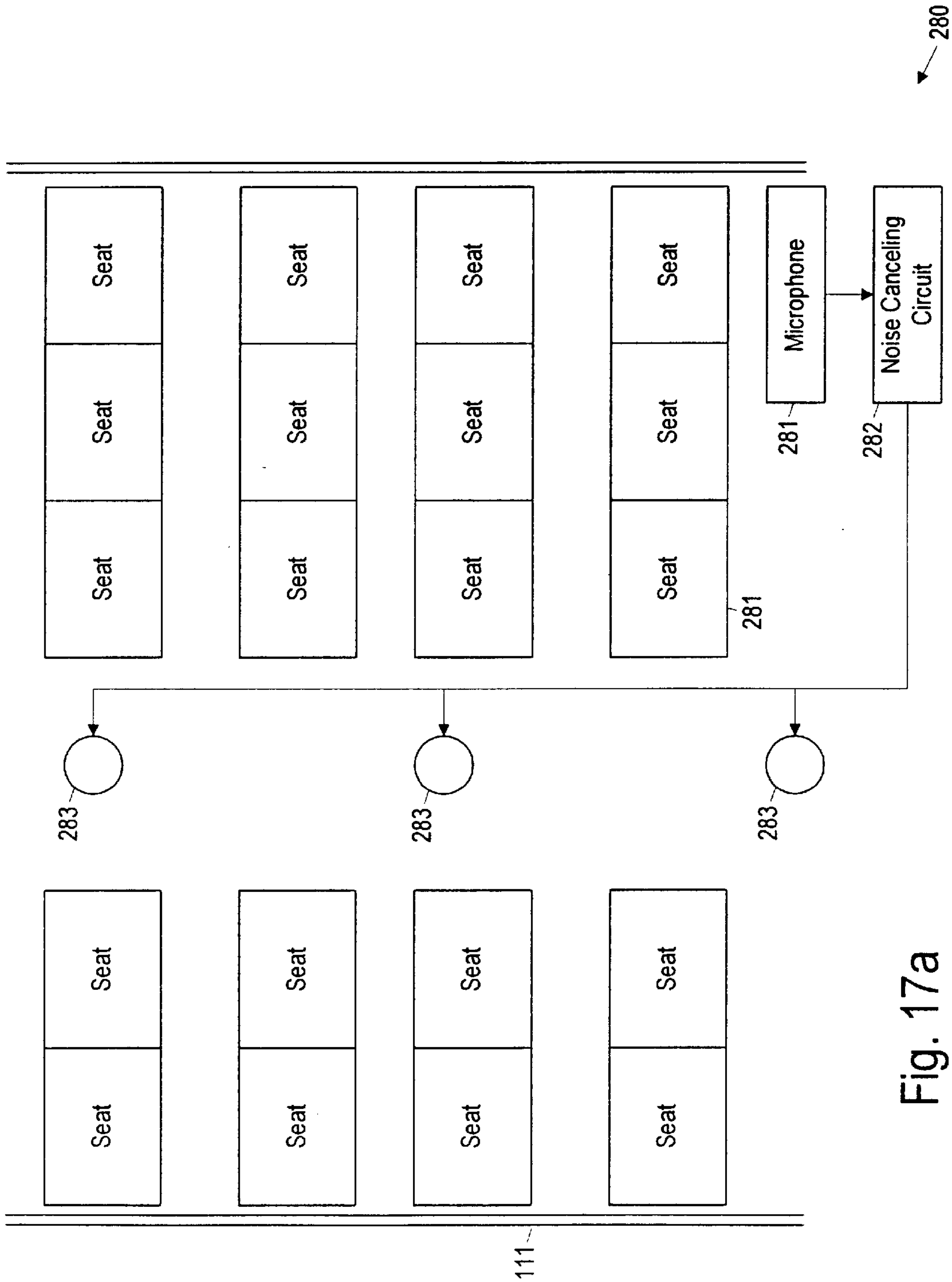
FIG. 17*a* illustrates noise canceling in accordance with a preferred embodiment.

Referring now to FIG. 17*a*, another feature of the system 100 is the use of ambient noise cancellation or noise filtering 280 employed in each zone or subzone of the aircraft 111. Ambient noise cancellation 280 involves the use of a microphone 281 and a noise canceling circuit 282 that samples the ambient noise caused by wind moving past windows and engines and the like, and noise generated in that zone or subzone within the cabin, and processes the sampled signal in real time to generate a noise canceling signal. The noise canceling signal is broadcast by way of a speaker 283, or speakers 283, and interferes with the noise signal to cancel and/or reduce the overall noise in the zone or subzone.

To prevent damage to electrical components of the system, another feature of the system provides for electrostatic discharge protection. The electrostatic discharge protection implemented by the present invention involves manufacturing techniques that ensure that joints of conductive enclosures overlap. Discharge paths are provided that cause a relatively slow discharge of electrostatic energy to ground from the components of the system. This may be achieved using semiconductive material to bleed off charge from the passenger and components to ground, such as using a semiconductive interface or contact in the headphones 132 and passenger control units 121 that contact the passenger and bleeds off charge from the body to ground through a relatively high impedance path. Thus, the present invention provides for the use of materials and construction techniques that provide for a controlled discharge of electrostatic energy through a relatively high impedance. Alternatively or in addition, the use of transient suppression diodes to clamp voltages present on components may be employed to provide electrostatic discharge protection. Components located within the cabin, such as the audio-video seat distribution units 231 located under passenger seats 123, are located so that there is no point-to-point adjacency between a corner of the unit and another conductive entity, such as a portion of the seat. Furthermore, pointed corners on conductive enclosures are eliminated in lieu of rounded corners. The last two aspects minimize or substantially eliminate point-to-point electrical discharge locations within the cabin. Implementing these techniques reduces the possibility of component damage due to electrostatic discharge.

As for another feature of the system, processors used in the system, and in particular those used in the audio-video unit 231, may be configured to implement an automatic reset sequence if their operation is disrupted due to an electrostatic discharge event. In particular, the use of the automatic sequencing feature allows a processor that is temporarily affected by an electrostatic discharge event to automatic reset, obtain a new line replaceable unit address, and reinitialize to provide continued service.

Another feature of the system provides for the use of a watchdog timer in the processors that provide for a "glitchless" restart of the processor in the event of a failure caused by an electrostatic discharge event or an software "failure", or the like. The watchdog timer operates in a manner wherein, when an event causes the watchdog timer to trigger, the processor is rebooted and brought back on-line using the automatic sequencing feature provided by the present invention.

Another feature of the system is employed in the audio-video seat distribution units 132 which include phase adjustment circuitry that keeps signals transferred over the RF link (the RF cable) in phase. Firmware is provided in the phase adjustment circuitry controls the relative phase of the signals received at each respective audio-video seat distribution unit 231.

In order to improve the loading time of the media server 211, the present invention implements organic loading (caching) of the media server 211. One way of implementing organic loading (caching) of the media server 211 in accordance with the present invention may be implemented by using an infrared "gatelink" which transfers the movie data from a broadcast location to a parked or waiting aircraft by way of an infrared communications link. A second way of implementing organic loading is by way of the satellite communications link. High speed data transfer by way of the satellite link, in a manner such as is provided by DirecPC data transfer services, achieves high speed data throughput. Using either method, the media server 211 may be loaded more rapidly than is conventionally done, and also may be achieved during flight.

Another feature of the system is the use of object-oriented databases to provide communication between the passenger control units 121 and the head end equipment 200. This will be discussed in more detail below in the discussion of the system software architecture.

Another feature of the system is the use of object-oriented targeted advertising based on passenger preferences. Passengers may use the product ordering features of the system or respond to questionnaires or surveys presented to them during flight. In such cases, response data is loaded into a file in an object oriented database. This database file may then be used as a driver that outputs data from another database or databases that present advertising and promotional materials to the passenger on the seat display based upon the contents of the database file.

The system 100 employs a software architecture that integrates processing performed by each of the subsystems. The software and firmware comprising the software architecture controls the system, manages the flow of analog and digital audio and video data to passenger consoles and displays, manages the flow of communications data, and manages service and order processing. Various subsystems also have their own software architectures that are integrated into the overall system software architecture.

Software and firmware employed in the present invention permits credit card processing, data collection processing, Internet processing for each passenger, gambling for each passenger, duty free ordering, transaction reporting, BITE tests, automatic reporting of seat availability, intra-cabin audio communication between passengers, video communication between passengers, passenger video conferencing, and display of flight information.

The system software includes parallel telephone system software, landscape camera management software, PESC system software, passenger address override software, passenger address emergency software, monetary transaction processing software, language support software, built-in-test software, user request processing software, database management software using a distributed configuration database, software for implementing interactive access, software for processing passenger orders, software for updating inventories, application software, media file encryption software, area distribution box software, audio-video unit programming software, telephone operation software, gatelink node and software, product service pricing software, passenger survey software, transaction reporting software, automatic seat availability reporting software, and video conferencing and data communications software.

The system may be placed in a number of states that include the configuration state, the ground maintenance state, and the entertainment state. The entertainment state is the primary state of the system. The system provides several entertainment modes. The system is modular in design, and any one or all modes may exist simultaneously depending on the configuration of the system. The system is configurable so that each zone of the aircraft can be in a different entertainment mode. In the entertainment state, the passenger address functions and passenger service functions function independent of the mode of operation.

The entertainment state is the primary state of the system. The system provides several entertainment modes. The system is modular in design, and any one or all modes may exist simultaneously depending on the configuration of the system. The system is configurable so that each zone of the aircraft 111 can be in a different entertainment mode. In the entertainment state, the passenger address functions and passenger service functions function independent of the mode of operation.

In the overhead video mode, video is displayed in the aircraft 111 on the overhead monitors 163. Different video entertainment may be distributed to different sections or zones of the aircraft 111. In the distributed video mode, multiple video programs are distributed to individual passengers of the aircraft 111 at their seats. The passenger selects the video program to view. The quantity of programs available depends upon system configuration. In the interactive video mode, the system provides a selection of features in a graphical user interface (GUI) presentation to the passenger. Depending on the system configuration, the features that are selectable in the graphical user interface may include language selection, audio selection, movie selection, video game selection, surveys, and display settings.

FIGS. 18–23 show data archival, data “offload” and disk space management in accordance with a preferred embodiment. The software architecture of the system 100 provides for data archival, data “offload” and disk space management. The design of the processes that accomplish data archival, data “offload” and disk space management are discussed below. FIGS. 18–23 are believed to be self-explanatory.

As used herein, a flight is the departure from one airport and arrival at another airport. Technically, from a database perspective, a flight doesn't begin until a flight data entry primitive is completed using the graphical user interface. Completing the flight data entry primitive, among other things, inserts a record into the Flight database table, designating the beginning of this flight. This record contains a unique FlightID number, and an EffectivityReference timestamp. This flight doesn't end until an IFE system off primitive is completed using the graphical user interface. Completing the IFE system off primitive, among other things, triggers the processes that archive the data for this flight.

As each flight ends, data that was generated during the flight is archived. This includes not only passenger orders and flight attendant access, but also BIT/BITE results and IFE system 100 and operating system messages. Each type of data is archived into either its own file on the cabin file server hard disk, or its appropriate tables in the cabin file server database. The table below shows the data that is archived for every flight, and its archive location.

Each flight has its own “offload” file. It is a file which is compressed and encrypted using PKZIP. It contains the five disk files listed in the table below, as well as a file called FLTSALES.CSV. The FLTSALES.CSV file contains text data extracted from the cabin file server database; specifically: Flight Information, Passenger Orders and Associated Data, Personnel Access Records, and Duty-Free Product Inventory.

The steps performed through the GUI which generate an “offload” file and write it to a diskette, which can then be taken off the aircraft 111.

Data Archived and Its Location

| DATA ARCHIVED | ARCHIVE LOCATION |
|---|---|
| Flight Information[1] | CFS database tables (tagged by FlightID) |
| Passenger Orders and Associated Data | CFS database tables (tagged by FlightID) |
| Personnel Access Records | CFS database tables (tagged by FlightID) |
| Duty-Free Product Inventory | CFS database tables (tagged by FlightID) |
| Passenger Survey Responses[2] | CFS database tables (tagged by FlightID) |
| Currency Exchange Rates | CFS database table (tagged by EffectivityDate) |
| PAT System NT event log | Disk file on CFS hard drive |
| PAT Application NT event log | Disk file on CFS hard drive |
| CFS System NT event log | Disk file on CFS hard drive |
| CFS Application NT event log[3] | Disk file on CFS hard drive |
| Free disk and database space | Disk file on CFS hard drive |

[1]Flight number, departure and arrival airports, beginning date and time, etc.
[2]Planned for future.
[3]Includes BIT/BITE data for the entire IFE system.

These processes provide for the following: point-of-sale transaction records, duty-free inventory, and personnel access activity data on a per flight basis (that is, per take-off and landing); system and application NT event log data (which includes BIT/BITE data) on a per flight basis; minimize “end-of-flight” processing time; ensures that no data is "overwritten"; keeps transaction data for the most recent 20 flights "on-line"; has greater than a "two week" data archive period; and provides the ability to "offload" either all "new" flights or to go back and "re-offload" selected flights at a latter date.

The data archive approach is as follows. Point-Of-Sale transaction records are maintained in the cabin file server database 493 (FIG. 27) on a per flight basis. Each flight has its own unique ID and timestamp (the FlightID and EffectityReference fields of the Flight table, respectively). That data which is specific to a given flight is tagged in the database with its unique FlightID. Objective 2 is met by "Archiving" the NT event logs at the conclusion of each flight. This archive includes the following 5 steps:

a) Copying a "snapshot" of the duty-free inventory into the InventoryLog database table and tagging it with the current FlightID.
b) Determining a unique archive name for each flight.
c) Dumping the NT event logs to files having the unique archive name.
d) Clearing the NT event logs in preparation for the next flight.
e) Determining the amount of free disk and database space and writing these quantities to a disk file.

In Windows API parlance, steps 3 and 4 are accomplished with a single call to ClearEventLog. A total of four NT event logs are archived for each flight:

a) The cabin file server system event log.
b) The cabin file server application event log.
c) The primary access terminal system event log.
d) The primary access terminal application event log.

Figure 18:
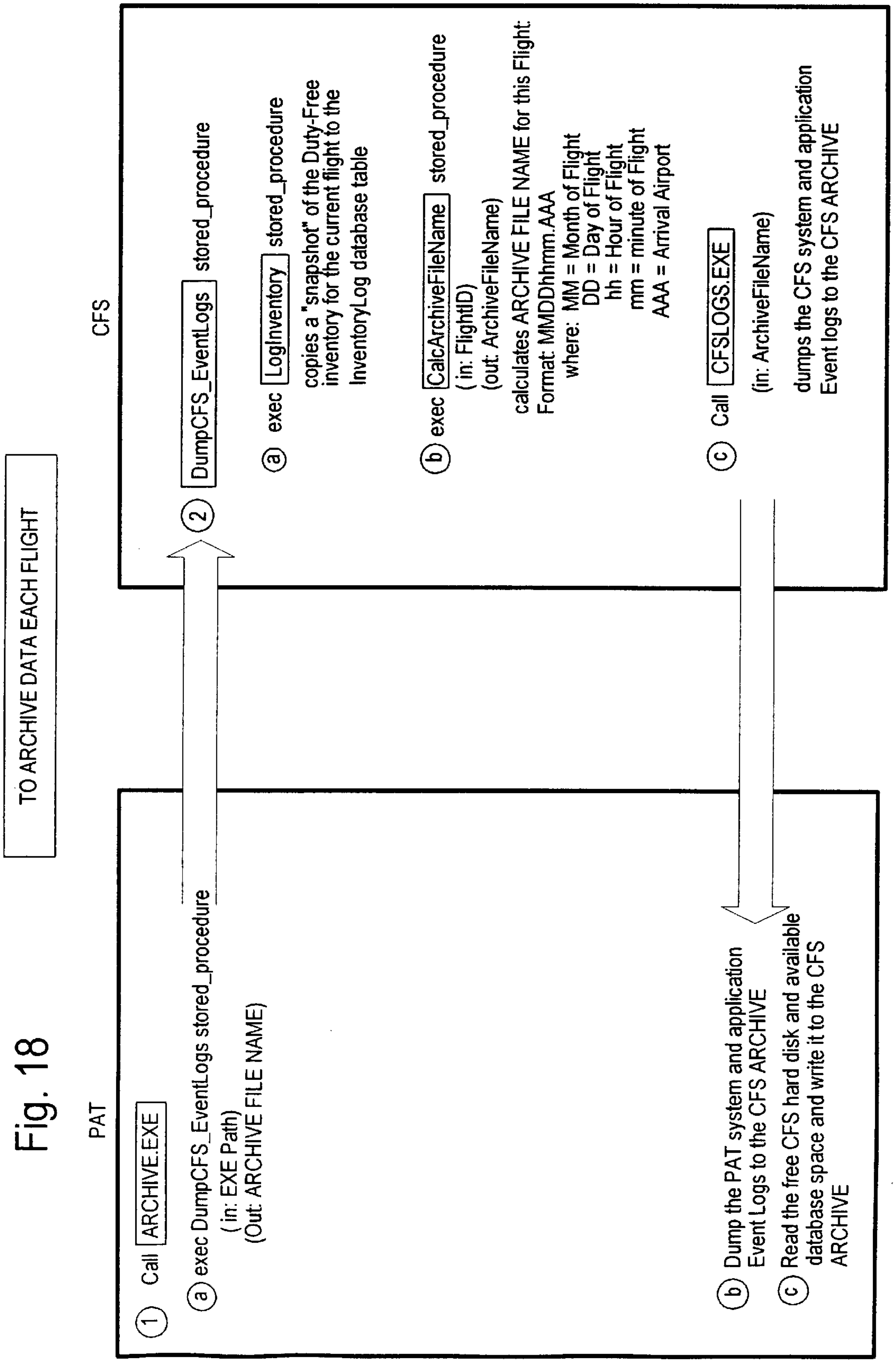
FIG. 18 shows the flight data archive scheme employed in a software architecture in accordance with a preferred embodiment.

FIG. 18 shows the flight data archive scheme employed in software architecture in accordance with a preferred embodiment. As is shown in FIG. 18, the archive sequence of events is as follows. When the user completes the IFE system off primitive using the GUI, the GUI calls the ARCHIVE.EXE executable that runs on the primary access terminal 225. The boxes reflect where each process runs. ARCHIVE.EXE makes a call to the DumpCFS__EventLogs stored procedure, passing it the path name of where to find the executables on the cabin file server 268.

DumpCFS__EventLogs calls the LogInventory stored procedure. This procedure copies a "snapshot" of the duty-free inventory for the current flight into the InventoryLog database table, tagging it with the current FlightID. This allows the duty-free inventory to be tracked on a per flight basis, regardless of whether the inventory is replenished or carried over on subsequent flights. DumpCFS__EventLogs then calls the CalcArchiveFileName stored procedure passing in the current FlightID.

CalcArchiveFileName determines the unique archive name for the current flight using the following format:

| | | |
|---|---|---|
| Archive File Name: | | MMDDhhmm.AAA |
| where: | MM = | Month of EffectivityReference |
| | DD = | Day of EffectivityReference |
| | hh = | Hour of EffectivityReference |
| | mm = | Minute of EffectivityReference |
| | AAA = | Arrival Airport |

DumpCFS__EventLogs then calls the CFSLOGS.EXE executable, passing it the name to use when "dumping" the NT event logs that reside on the cabin file server 268.

CFSLOGS.EXE "dumps" (backs-up then clears) the cabin file server's NT event logs to the cabin file server hard disk using the same archive file name for both files. This is possible using the directory structure shown in FIG. 19. When CFSLOGS.EXE completes, the DumpCFS__EventLogs stored procedure returns control back over to ARCHIVE.EXE, passing it back the archive file name for the current flight. ARCHIVE.EXE then dumps the primary access terminal's NT event logs from the to their appropriate directories on the cabin file server hard disk, using the same name passed back from the DumpCFS__EventLogs stored procedure.

Then ARCHIVE.EXE reads the amount of free disk space on the cabin file server hard drive, and the amount of unused database space and write this information to the SPACE archive sub-directory on the cabin file server hard drive. This information allows monitoring system use and fine tune disk and database space utilization. The entire archive process took 10 seconds when unit tested using the RED__NT file server playing the role of the primary access terminal 225, with a Pentium computer playing the role of the cabin file server 268. This means that after each flight concludes, all of the NT event logs exist in the archive directory on the cabin file server hard disk. They are in an unzipped format making them easy to view using the NT EventViewer, available on the primary access terminal 225. The transaction data, flight attendant activity, and Duty-Free inventory are "archived" in the cabin file server database.

The data offload approach is as follows. The "offloading" of data from the aircraft 111 basically satisfies two needs: Revenue collection, and system performance evaluation. For each flight the point-of-sale transactions, flight attendant activity, and duty-free inventory (if applicable) is extracted from the cabin file server database 493, along with the data identifying this flight, and written to a file named FLTSALES.CSV. This file is used by the ground system (formerly AMS) in their tasks of revenue collection and accounting. The NT event logs can be used by field support personnel ("off-line" reviewing of BIT/BITE data for example) and by engineering to evaluate system performance.

Figures 20, 26:
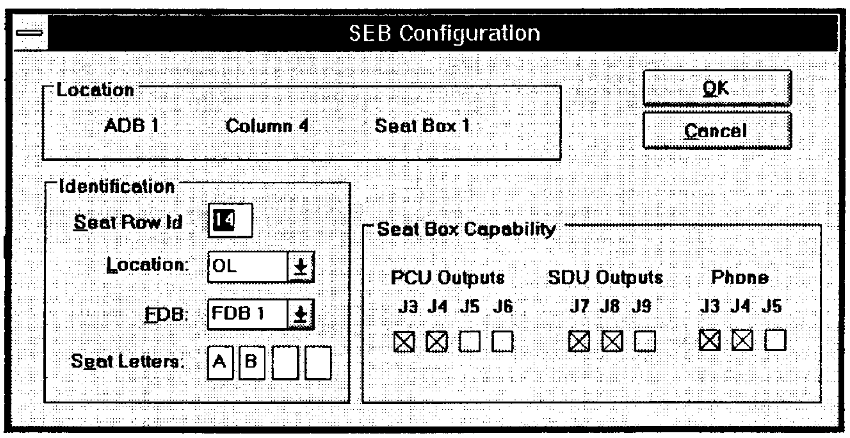

FIG. 20 shows an example "offload" scenario employed in software architecture of the present system 100. There is not necessarily an "offload" process performed following every flight. As each flight starts, a new record is inserted into the Flight database table, designating the beginning of this flight. This record contains a unique FlightID number, and an EffectuityReference time-stamp. The Flight database table also has its Offload flag set to TRUE, indicating that this flight has yet to be "offloaded".

The "offload" process includes the following steps. Step 1 identifies the flight(s) to be "offloaded". Step 2 reads the data for the identified flight from the cabin file server database 493 and writes it to FLTSALES.CSV. Step 3 Zips the FLTSALES.CSV file together with the Archived NT event logs and SQL Errorlog archive that corresponds to this flight. Step 4 outputs the "offload" file to the primary access terminal floppy drive. In Step 5, if more than 1 flight was identified in step 1, then Steps 2–4 are repeated.

The GUI orchestrates the "offload" process by first identifying what flight(s) are to be "offloaded". In order to satisfy objective 7: "Ability to 'Offload' either all 'new' flights or to go back and 'Re-Offload' selected flights at a latter date," there are two choices for identifying the flight(s): either "Auto" or "Manual". In "Auto" mode, the GUI makes the necessary CAPI calls for each flight having Offload=TRUE in the Flight database table. In "Manual" mode, the operator must identify, by selecting from a list box, the flight(s) to be "offloaded". The GUI then makes the necessary CAPI calls for each flight selected.

The GUI makes use of two CAPI calls to accomplish the "offload" process: MakeOffloadFile, and FetchOffloadFile. MakeOffloadFile is called, passing in the FlightID and returning a Boolean SUCCESS/FAIL indicating whether or not the "offload" file was created on the cabin file server hard drive. When SUCCESS is returned, the GUI can then call FetchOffloadFile, again passing in the FlightID. This call returns an unsigned long completion code, indicating the status of copying the "offload" file from the cabin file server hard drive to the primary access terminal floppy disk. Possible completion codes include:

| | | |
|---|---|---|
| ERROR_SUCCESS | 0 | File successfully Offloaded |
| ERROR_FILE_NOT_FOUND | 2 | Offload file not found |
| ERROR_PATH_NOT_FOUND | 3 | Archive or Offload path not found |
| ERROR_WRITE_PROTECT | 19 | Diskette is write protected |
| ERROR_NOT_READY | 21 | No diskette in drive |
| ERROR_DISK_FULL | 112 | Offload file does not fit on diskette |

This allows the GUI to notify the user of any errors, and then retry just the file copy (FetchOffloadFile) without having to go through the process of regenerating the "offload" zip file.

Figures 21, 26:
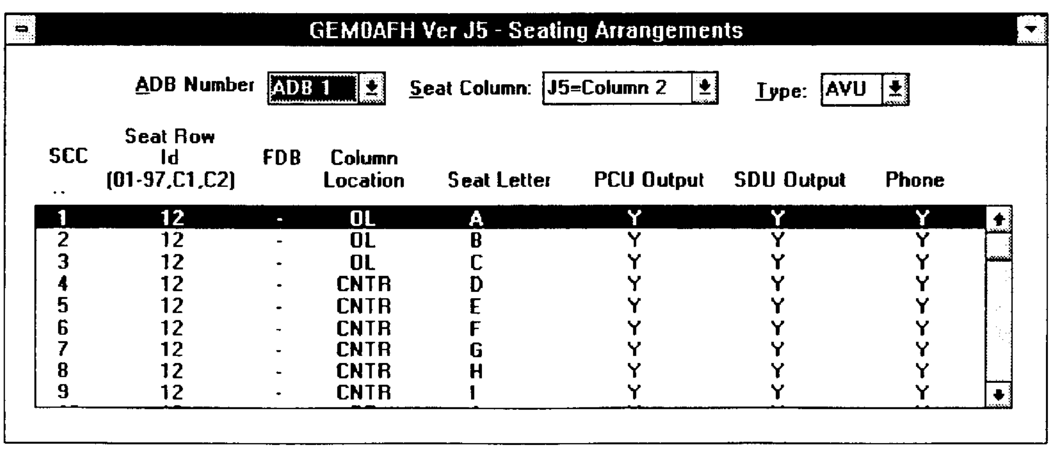

FIG. 21 depicts generating a zipped "offload" file. To generate the zipped "offload" file, the GUI issues a MakeOffloadFile CAPI call, passing in the FlightID. The CalcZipFileName stored procedure is called by the CAPI, passing in the FlightID, and returning the name of the "offload" zip file. The unique Zip File name for this flight is determined using the following format:

| | | |
|---|---|---|
| Zip File Name: | | FFFFFAAA.JJJ |
| where: | FFFFF = | The FlightNumber of the flight |
| | AAA = | Arrival Airport |
| | JJJ = | Julian date representation of EffectivityReference |

Next the CAPI calls the DUMP_POS.EXE executable, passing in the FlightID.

DUMP_POS.EXE reads the point-of-sale transactions, flight attendant activity, and duty-free inventory records for the indicated flight from the cabin file server database 493 and writes them to the FLTSALES.CSV file in the appropriate archive sub-directory on the cabin file server hard disk.

The CAPI then calls the CalcArchiveFileName stored procedure giving it the FlightID and getting back the name of the corresponding archive files.

Finally the CAPI calls the PKZIP utility passing it the following arguments:

output file name: The previously derived "offload" file name, path'ed to the archive sub-directory on the cabin file server hard disk.

input file list: FLTSALES.CSV and the previously derived archive file name options: recurse sub-directories; store sub-directories recursed into; scramble with password.

Figures 22, 26:
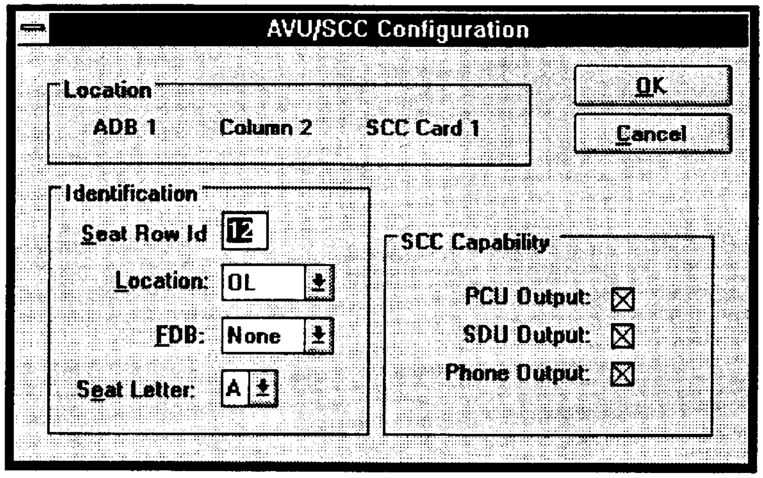

To copy the zipped "offload" file from the cabin file server hard drive to the primary access terminal floppy drive, the GUI issues a FetchOffloadFile CAPI call, passing in the FlightID. Referring to FIG. 22, it illustrates transferring the "offload" file.

The CalcZipFileName stored procedure is called by the CAPI, passing in the FlightID, and returning the name of the "offload" zip file.

The CAPI then checks to see that there is enough space on the diskette before performing the copy.

Having successfully copied the "offload" file, the CAPI next resets the Offload flag for this flight in the Flight database table to FALSE, indicating that this flight is no longer to be considered for "automatic offload".

Finally the CAPI deletes the zip file from the archive directory on the cabin file server hard drive.

This scheme leaves the NT event logs for each flight intact on the cabin file server hard drive, where they can be easily viewed using the NT Event Viewer on the primary access terminal 225. It also leaves the FLTSALES.CSV file, which is overwritten each time the "offload" process is run.

During unit testing of the "offload" process, a 294,952 byte system event log was used to represent a "worst case" event log. It zipped down to 18,658 bytes. The actual size of each NT event log for a single flight is on the order of 65 KB, which zips down to about 1 KB. A "worst case" FLTSALES.CSV file was generated having 1500 transactions (600 cash, 900 credit card) and 60 duty-free products. The resulting file was 184,842 bytes, and zipped down to 2,373 bytes. Fitting "offload" zip files onto a 1.44 MB diskette (actually 1.38 MB after formatting) would be as follows:

| | WORST CASE | GENEROUS PROJECTION |
|---|---|---|
| FLTSALES.CSV | 5 KB | 2 KB |
| 4 NT event logs | 80 KB | 10 KB |
| TOTAL | 85 KB | 12 KB |
| Number of Flights/Diskette | 16 | 115 |

Elapsed execution times were also observed during unit testing. It took 10 seconds to archive the files, and 1 minute 10 seconds to "offload" 1 flight.

Unit Test Conditions:

65 KB event logs

185 KB FLTSALES.CSV file

NT file server acting as the primary access terminal (486@66 MHz)

NT workstation acting as the cabin file server (Pentium@90 MHz)

"Offload" copied to hard drive, not diskette.

The disk space management approach is as follows. Besides the basically static portion of the database (like the airport, airline and LRU tables to name a few) the database grows in size depending on three activities:

a) Passenger usage (placing orders, answering surveys, etc)

b) Flight overhead each flight the system gets used c) Each time the entertainment data is updated (movie titles, inventory, etc)

The database tables that grows in size depending on these three activities are identified in The table below.

Database Tables vs. Growth Activities

| PASSENGER USAGE | FLIGHT OVERHEAD | MONTHLY UPDATES |
|---|---|---|
| Order_ | Flight | Exchange |
| OrderHistory | InventoryLog | Price |
| PAT_History | Access | ProductEffectivity |

-continued

Database Tables vs. Growth Activities

| PASSENGER USAGE | FLIGHT OVERHEAD | MONTHLY UPDATES |
|---|---|---|
| CreditCard | Product | |
| Commitment | | AudioDetail |
| Address[1] | | GameDetail |
| SurveyAnswer | | VideoMedium |
| Commitment | | VideoSegment |
| | | VideoUse |

[1][not applicable until catalog is added]
[2][not applicable until surveys are added]

Microsoft SQL Server documentation provides several equations that can be used to estimate the size of each table. In order to project the cabin file server database disk space requirements as it becomes filled through use, a "worst case" scenario could be defined, and then the equations supplied by Microsoft applied. A "theoretical worst case" would fill each record to its maximum size, and includes the necessary conditions to fill the maximum number of tables. For example, the "theoretical worst case" would have every single passenger order by credit card 257, because this would then include a record in the CreditCard table. Each of these credit card orders would be for catalog purchases, because this would then include records in the Address table for each order.

Orders would be placed by the flight attendant, and then subsequently refunded, as this would result in the maximum number of records in the PAT_History and OrderHistory tables. And of course each passenger's name and address would be as long as the maximum field size. One can immediately see that this "worst case" is truly "theoretical" but at the same time improbable. What is of more value would be a conservative projection of system use, which could then be padded to what ever extent necessary to allow us all to sleep at night.

The table below defines the parameters and values used to develop a conservative projection of "worst case" system use. The values used were influenced by discussions with service support and a lead flight attendant, but nonetheless are still subjective.

Projected System Use

| | | | |
|---|---|---|---|
| Number Of Orders | 1500 | Number of Monthly Updates[2, 3] | 4 |
| Percent Credit Card Orders | 55% | Number of Non-Duty-Free Products | 20 |
| Percent Duty-Free Orders | 20% | Number of Duty-Free Products | 128 |
| Percent Catalog Orders | 0% | Number of Catalog Products | 0 |
| Percent Orders Refunded | 2% | Number of Foreign Currencies | 30 |
| Percent Orders at the PAT | 2% | Number of Game Titles | 20 |
| Order Reconcile Factor[1] | 15 | Number of Movie Titles | 24 |
| Number Completed Surveys | 400 | Number of Audio Titles | 16 |
| Number of Flights Archived[3] | 100 | Number of Random Access Tapes | 5 |
| Percent Duty-Free Flights | 60% | Avg Number of Segments per Tape | 10 |

[1]The average number of cash orders/duty-free orders that would be reconciled by a flight attendant at one shot.
[2]This represents the current month's data, the next month's data, plus an Archive Period of 2 months.
[3]In order to meet objectives 5 and 6 "Exceed 20 flights/two week archive," the targets of 100 flights with an Archive Period of 2 months were established.

Using the equations provided by Microsoft, and the parameters and values in the table below, the size of each database table was estimated. These estimated database table sizes appear in the table below. Clearly the passenger use data dominates the disk space requirement.

Projected "Worst Case" Database Table Sizes vs. Growth Activities for 100 Flights and Four Monthly Updates

| PASSENGER USAGE | | FLIGHT OVERHEAD | | MONTHLY UPDATES | |
|---|---|---|---|---|---|
| TABLE | SIZE (MB) | TABLE | SIZE (MB) | TABLE | SIZE (MB) |
| Order_ | 61.4 | Flight | 0.022 | Exchange | 0.014 |
| OrderHistory | 40.0 | Inventory-Log | 0.422 | Price | 0.060 |
| PAT_History | 14.2 | Access | 0.462 | Product-Effectivity | 0.038 |
| CreditCard | 13.0 | | | Product | 0.058 |
| Address | 0.2 | | | AudioDetail | 0.014 |
| SurveyAnswer | 6.8 | | | GameDetail | 0.018 |
| Commitment | 7.0 | | | VideoMedium | 0.034 |
| | | | | VideoSegment | 0.024 |
| | | | | VideoUse | 0.070 |
| Sub-Total | 142.6 | | 0.906 | | 0.330 |
| Grand Total | 143.8 | | | | |

In an effort to validate the Microsoft equations for estimating the table sizes, a test was conducted in which the Order_ table was filled with 1500 orders. The resulting size was then determined through the use of a Microsoft supplied stored procedure. The estimated size was 614 KB while the "measured" size was 850 KB. This is a large and unacceptable error. There is an ongoing activity to resolve this error. In the case that the estimates are bad, the number of flights that are archived can simply be cut back, since the target of 100 flights is five times the requirement, there is plenty of margin.

In order to meet objective 8: "Not running out of hard disk space at the worst possible time," a three pronged approach is employed. First, limit the number of flights that are archived. Allow flights to be accumulated for 2 months, but not to exceed 100 flights. Before each flight is started, delete database records for the 100th oldest flight, or all flights that are more than 2 months old. The archive period of 2 months, and the Archive Limit of 100 flights are typical numbers and are not to be taken as limiting.

The second prong to this approach involves managing those tables that contain "perishable" data, that is data such as currency exchange rates, or movie titles. Minimize the size of each database table that has an EffectvityDate by keeping around only those records necessary to support the oldest flight in the Flight database table.

The "purging" of flights older than the ArchivePeriod, or flights beyond the ArchiveLimit (and the management of the "perishable" data) is accomplished through several SQL stored procedures. The algorithms employed are as follows:

a) Establish the CutOffDateTime by subtracting the ArchivePeriod from the current date/time.

b) Establish the CutOffFlightID by subtracting the (ArchiveLimit+1) from the most recent FlightID (thus when the next flight is started, ended, and archived, there are ArchiveLimit number of flights archived).

c) Delete the flights from the Flight database table with FlightIDs that are less than the CutOffFlightID or have an EffectivityReference that is less than the CutOffDateTime.

The cabin file server database schema incorporates "Cascaded Deletes" for certain tables, meaning that when a record from a table is deleted, and that record has an identifying relationship with record(s) in other table(s), the records in the other table(s) are also deleted, providing that their deletion does not break any other relationships. The cabin file server database was set up to cascade deletes as follows:

Thus by deleting a single record from the Flight database table, all of the data that is "archived" in the database with the same FlightID are also deleted, thus freeing up room in the database.

d) Establish the OldestFlightDateTime that is now in the database by selecting the minimum EffectivityReference from the Flight database table.

Now manage the "perishable" database tables one at a time:

e) Establish the CutoffEffectivityDate for each table by selecting the maximum EffectivityDate that is less than or equal to the OldestFlightDateTime.

f) Delete all of the records with an EffectivityDate that is less than the CutoffEffectivityDate for that table. This ensures that at least one EffectivityDate remains in each "perishable" table.

As in step 3 above, "Cascaded Deletes" are employed as follows:

VideoMedium table→VideoUse table
VideoSegment table g) For each of the flights that are deleted from the database, call the CalcArchiveFileName stored procedure, and then the PARCHIVE.EXE executable, passing in the archive file name. This executable deletes the archive files for the identified flight from the cabin file server hard disk.

The third "prong" involves the management of the Commitment database table. The Commitment database table is used to "hold" specific duty-free products as they are being requested for purchase, as well as to track which cart(s) can supply each duty-free order. In order to maintain data integrity in the situation where a plane's duty-free inventory is carried over to another flight, the Commitment table should not be purged on a per flight basis. Instead, old Commitment records is deleted through a separate stored procedure that is used to reset the Duty-Free inventory to the defaulted quantities.

Figures 23, 26:
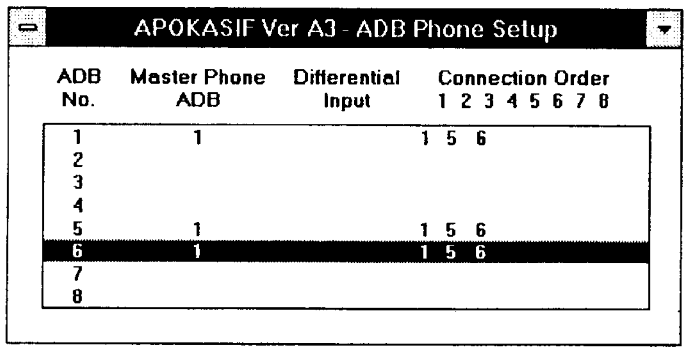
Figures 24, 26:
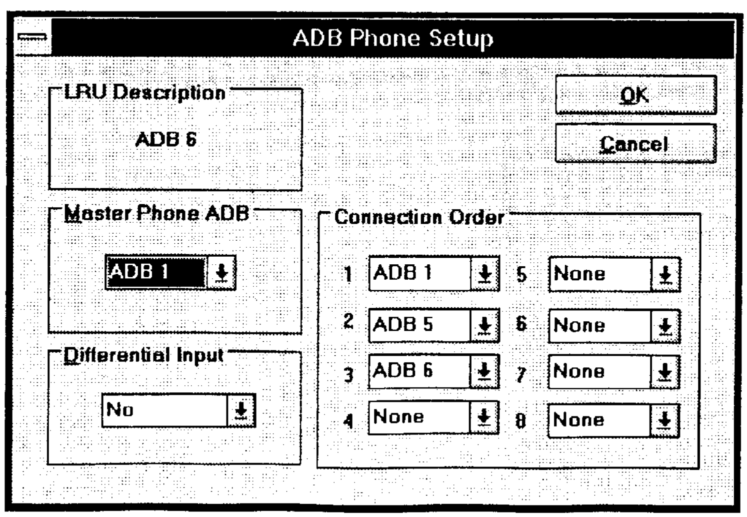

FIG. 23 illustrates a calling sequence involved in managing cabin file server disk space. In an effort to keep this "background" task truly in the background (at least from a flight attendant's point of view), the process is initiated by the "weight-off-wheels" event upon take off. When the CabinService executable writes to the WeightOffWheelTime in the Flight database table, the SQL update trigger calls the PurgeOldArchives stored procedure, which in turn coordinates the freeing up of disk space on the cabin file server hard drive. Unit tests in which a flight with 1500 Orders, and 1500 "OrderHistories" took less than 25 seconds to "purge" (including the file deletes).

The following two tables summarize the installation requirements for the data archive, data "offload" and disk management processes. The first table shows Registry requirements (HKEY_LOCAL_MACHINE\HAI\Software\Paths).

Registry requirements

| Computer | Named Value | Value | Used By |
|---|---|---|---|
| CFS | CFS_LOCAL_ARCHIVE | D:\archive | dump_pos.cpp, cfslogs.cpp offloadr.cpp, parchive.cpp |
| CFS | OFFLOAD | PATx | offloadr.cpp |
| PAT | CFS_REMOTE_ARCHIVE | F:\archive | archive.cpp |

1/Where 'x' is PAT ID: example PAT1, PAT2, PAT3 etc.
2/Where 'F' is the local drive letter on the primary access terminal 225 which is connected to the cabin file server D: drive.

Installation Requirements

| Object | Source File | Destination |
|---|---|---|
| ARCHIVE.EXE | archive.cpp | EXE path on the PAT **225** |
| CFSLOGS.EXE | cfslogs.cpp | EXE path on the CFS |
| DUMP_POS.EXE | dump_pos.cpp | EXE path on the CFS |
| PARCHIVE.EXE | parchive.cpp | D:\WINNT35\System32 on the CFS |
| MakeOffloadFile (CAPI call) | offloadr.cpp | Installed as part of SERVICE.EXE |
| FetchOffloadFile (CAPI call) | offloadr.cpp | Installed as part of SERVICE.EXE |
| DumpCFS_EventLogs | dmpcfslg.sql | Installed as part of CFS database schema |
| CalcArchiveFileName | arc_name.sql | Installed as part of CFS database schema |
| LogInventory | inv_log.sql | Installed as part of CFS database schema |
| CalcZipFileName | zip_name.sql | Installed as part of CFS database schema |
| Flight_UTrig | fltutrg.sql | Installed as part of CFS database schema |
| Flight_ITrig | fltitrg.sql | Installed as part of CFS database schema |
| PurgeOldArchives | prg_arc.sql | Installed as part of CFS database schema |
| PurgeAudioDetailTable | prgaudio.sql | Installed as part of CFS database schema |
| PurgeExchangeTable | prgexchg.sql | Installed as part of CFS database schema |
| PurgeGameTable | prg_game.sql | Installed as part of CFS database schema |
| PurgePriceTable | prgprice.sql | Installed as part of CFS database schema |
| PurgeProduct-EffectivityTable | prgprdef.sql | Installed as part of CFS database schema |
| PurgeVideoTables | prgvideo.sql | Installed as part of CFS database schema |
| PurgeCartInventory-Table | prg_inv.sql | Installed as part of CFS database schema |
| SpaceSunmmary | space.sql | Installed as part of CFS database schema |
| CalcJulianDate | julian.sql | Installed as part of CFS database schema |

Software in accordance with a preferred embodiment specifically employed with an aircraft-type vehicle 111 includes an airplane configuration functional database tool, referred to as an ACS tool. An ACS tool allows modification of audio, game, and video titles within the airplane configuration database.

The ACS tool is a Windows-based computer software application that is used to configure the system 100. It provides a means of telling the entertainment/service system about aircraft layout and the configuration of cabin entertainment and passenger services. It provides this information via downloadable data files.

Aircraft configuration includes the seating configuration, audio/video arrangement, and other information concerning the layout of a particular aircraft. The system 100 offers options, including a basic audio entertainment/passenger service system and two video systems—the overhead video system and the in-seat video system. The system 100 has the capability to interface with a number of different types of Cabin Management Systems.

The total entertainment system 100 utilizes the audio-video unit 231 in place of a seat electronics box (SEB) 231 used in the APAX-150 system. Since the ACS tool accommodates both the TES and APAX-150 systems, this document references the audio-video units 231 and the seat electronics boxes 231.

Figure 24:
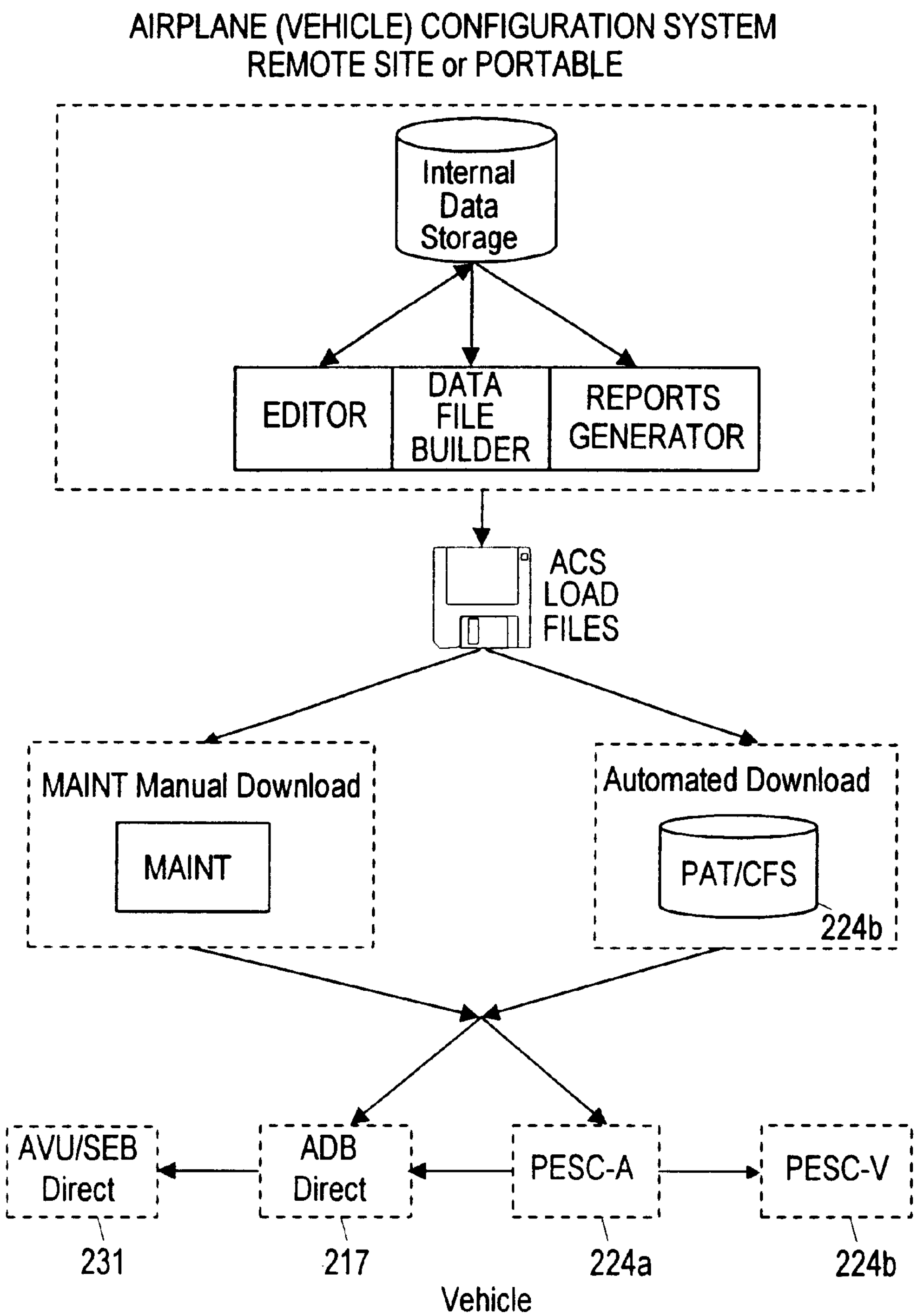
FIG. 24 is a block diagram of an Airplane Configuration System (ACS) tool used in accordance with a preferred embodiment.

FIG. 24 is a block diagram of the ACS tool and shows its functionality. The ACS tool provides hardware, user, software, and database interfaces as described below. The ACS tool supports the following hardware interfaces. The ACS tool supports a standard 101 key PC keyboard for the PC application and the primary access terminal standard keyboard. The ACS tool supports a standard Microsoft mouse, or equivalent, for the PC application. The ACS tool uses a 386 computer with at least 8 MB of RAM that supports Windows 3.1.1.

The ACS tool may be run using any system exceeding the recommended minimum hardware configuration. The most powerful PC with the most memory available would be the best choice. Later versions of Windows are also supported.

The ACS tool provides the following user interfaces. In general, the graphical user interface includes a series of screens with buttons and other controls and indicators. Screens, buttons, other controls, and indicators follow the general conventions for Windows screens as described in The Windows Interface Guidelines for Software Design. The GUI provides user access to the ACS tool's functions via keyboard and mouse inputs.

All mouse activated functions may be performed from the keyboard. Underlined characters are indicated on buttons on all screens that correspond to hot keys. These keys are activated by pressing the hot key and the ALT key simultaneously. Hot keys are not case sensitive. Screens have the same look and feel.

The ACS tool provides the following interfaces to other software components. The ACS tool operates under either the Windows NT operating system, or the Windows 3.1 or later operating system without noticeable performance differences. The ACS tool requires interaction with other databases as described below.

The ACS tool provides the functionality to maintain multiple configurations for all the aircraft types the TES 100 and APAX-150 systems support. The ACS tool is a single executable, regardless of aircraft type. This single executable utilizes a configuration file for pre-initialization of aircraft configuration data (.CFG). It also utilizes a Windows .INI file for ACS tool-specific parameter definition.

The ACS tool generates configuration data files that can be distributed to the TES line replaceable units. The applicable data files may be downloaded upon operator request via the MAINT Utility.

The ACS tool provides the ability to create and change an aircraft configuration by the use of menus, list boxes, data entry screens, utilities, error messages and help functions. An aircraft configuration defines what TES devices are installed on the aircraft, where those devices are located and what functions those devices perform.

The PESC-A 224*a*, PESC-V 224*b*, area distribution box 217, ADB local area controller (ALAC) (not shown), AVU/SEB 231, and overhead electronic box (not shown) line replaceable units, as well as the primary access terminal 225 and cabin file server 268, the MAINT and Config/Status utilities all require knowledge of the aircraft configuration. The database created by the ACS tool that can be downloaded into the PESC-A 224*a* and contains the configuration data needed by the PESC-A 224*a*, PESC-V 224*b*, area distribution boxes 217, ALACs, AVUs/SEBs 231, tapping units 261, and overhead electronics boxes. The ACS tool has the capability to create separate configuration data files for the primary access terminal 225 and cabin file server 268 and the MAINT and Config/Status Utilities.

The ACS tool also has the capability to create downloadable data files that can be loaded directly into the Area distribution boxes 217. The data files that the ACS tool creates for the primary access terminal 225 and cabin file server 268 are able to be imported by the primary access terminal 225 and cabin file server 268 into its database 493. These files provide information about the aircraft 111 so that interactive services can be provided to the passengers.

The ACS tool creates a downloadable data file (.INT File) that is able to be used by the MAINT and Config/Status Utilities to determine system-wide LRU status, software configuration, and diagnostic information. These utilities require system configuration definition data.

The ACS tool provides a configuration editor function that allows the user to modify an existing aircraft configuration or generate a new aircraft configuration by entering values into displayed data fields or by selecting values from drop-down menus, if applicable.

The configuration editor allows the user to import, or copy, selected aircraft configuration data from one configuration to another. "cut" and "paste" operations are provided so that similar or identical configuration entries may be copied from one configuration to another.

The configuration editor validates the value entered for each data field. The ACS tool generates error messages when the user enters invalid data in dialog boxes. The ACS tool allows the system 100 to be configured.

The configuration editor provides the capability to save a configuration to disk. The ACS tool provides the capability to initiate a configuration validation test. If the validation test finds errors with the data, a detailed error report is displayed. The ACS tool allows a configuration that is INVALID to be saved to disk (.CFG), but the ACS tool does not allow a downloadable database to be built from a configuration that is INVALID.

A configuration data builder function of the ACS tool System provides the capability to generate downloadable configuration data files for use with the system 100 and peripherals. When the user attempts to create the downloadable data files, the ACS tool performs a validation check and tests for limits.

A reports generator function of the ACS tool provides the capability to generate, for a specified configuration, a validation report and a configuration report.

A validation report contains information defining the validity of a specified configuration, including appropriate messages for entries in the configuration which are currently invalid. A validation report may be generated upon user request or upon request to generate download files.

The configuration report provides a detailed report which describes the current configuration. The configuration report is generated only when a request to generate download files is made and the current configuration is determined to be valid.

A create floppy disk function of the ACS tool provides the capability to generate a disk that contains all files generated by the ACS tool. These downloadable configuration files are loaded to the various line replaceable units in the system. The diskette also contains a setup utility that can be run from the primary access terminal 225 to reinitialize the database on the cabin file server 225 with a new configuration.

The ACS tool is a Windows API (Windows Version 3.1 or later) with multiple document view capability. This provides the user the opportunity to manage multiple configurations concurrently.

The ACS tool software allows operators the ability to maintain aircraft configurations and contains the features that provide the ability to dynamically change the data that describes the aircraft configuration. This data includes:

TES Installed line replaceable units, RF leveling data, system parameters such as ARCNET bus termination, system flags, entertainment options installed, available Si display languages, high speed download channel, VMOD type, etc., seat layout, ADB setup information, reading lamps[1], master call lamps[1], attendant chimes[1], optional overhead electronics box light output definition[1], ALAC information[1], SEB/SEU mapping[1], cabin intercommunication data system (CIDS) information[1], standard interface information[1], display controller settings information, configurable zones: channel arrangement zones, PA zones, seating classes, etc., and audio and video channel mapping and assignments. The features identified by superscript "1" are available only for the definition of specific aircraft types.

Many different configurations can be stored for an aircraft 111. Each contains slightly different options, such as the seating configuration. The ACS tool enables the different configurations, after established, to be recalled season after season by allowing the user to select an existing configuration to edit when a change is made to the aircraft 111 during re-configuration. The ACS tool allows the user to create a new configuration that can subsequently be saved. The following paragraphs provide information about the editable fields provided by the configuration editor.

The ACS tool provides the capability to define aircraft configuration information. The table below lists the information that the user can specify when defining the aircraft configuration:

| Field | Characteristics | Description |
|---|---|---|
| Part Number | Up to 20 alphanumeric characters. | The part number identifying a system configuration. |
| Version String | One to four alphanumeric characters. | A code specifying the current version of the system configuration. |
| Airline Name | An ASCII text string. | The name of the airline for which the specified configuration is valid. |
| Aircraft Maker | Menu selection of: Airbus, Boeing, McDonnell Douglas, Gulfstream, Ilyushin, Lockheed, Tupolev. | The maker of the aircraft for which the specified configuration is valid. |

-continued

| Field | Characteristics | Description |
|---|---|---|
| Aircraft Type | Menu selection of: A300, A310, A320, A321, A330, A340, DC-10, MD-11, 737, 747-100, 747-200, 747-400, 757, 767, 777, I1-96M, L1011, Gulfstream, G4/5, TU-214, Other. These menu selections are based on the Aircraft Maker selection to provide only valid aircraft types. | The model of the aircraft for which the specified configuration is valid. The Aircraft Type must correspond to the following list of Aircraft makers:<br>Airbus: A300, A310, A320, A321, A330, A340<br>Boeing: 737, 747-100, 747-200, 747-400, 757, 767, 777<br>McDonnell Douglas: DC-10, MD-11<br>Gulfstream: Gulfstream, G4/5<br>Ilyushin: IL-96M<br>Lockheed: L1011<br>Tupolev: TU-214 |
| Overhead Type | Menu Selection of None, OEBs, OEUs, CIDS, DC10, and STAN, APAX-120. These menu selections are based on the Aircraft Type selection to provide only valid Overhead Types. | The type of Overhead Units installed on the configuration being specified. The overhead types must correspond to the following list of aircraft types:<br>OEBs: 737, 747-100, 747-200, 757, 767<br>OEUs: 747-400<br>CIDs: A300, A310, A320, A321, A330, A340<br>DC10: DC-10, MD-11<br>STAN: 747-400, 757, 767, 777<br>APAX-120: A330, 737, 747-100, 747-200, IL-96M, TU-214, L-1011, G4/5 |
| File Prefix | 6 character ASCII string. | Defines what the first six letters of the output files are. |
| Description | 20 character ASCII string. | Brief description of configuration. |
| Creator Name | 20 character ASCII string. | Name of configuration creator. |

The ACS tool allows the user to define where ARCNET terminations are to be handled for a specified configuration. The modifiable information is as defined below:

| Field | Charac-teristics | Description |
|---|---|---|
| ADB ARCNET (1) | Yes(X)/ No(Blank) | A legend for the PESC-As (Primary and Secondary) is provided to indicate which PESCs have ARCNET terminations. Selecting the box adjacent to the legend places an "X" in the box, indicating that the PESC has an ARCNET termination. |
| PESC ARCNET (2) | Yes(X)/ No(Blank) | A legend for both PESC-As (Primary and Secondary) and PESC-V is provided to indicate which PESCs have ARCNET terminations. Selecting the box adjacent to the legend places an "X" in the box, indicating that the PESC has an ARCNET termination. |

The ACS tool allows the user to update system flags that pertain to the overall aircraft configuration. These include enable of APAX-140 PA All to PA Zone 4, auto-sequence disable flags, decompression ADB column turn off flag, a RF tuner flag, and an SI language Rollover flag. The modifiable fields are shown below.

| Field | Charac- teristics | Description |
|---|---|---|
| PA All for Zone 4 | Yes(X)/ No(Blank) | If selected, indicates the PA All should be routed to Zone 4. |
| Auto Sequence Disable | Yes(X)/ No(Blank) | If selected, indicates AVU/SEB auto-sequencing is to be disabled. |
| Decomp ADB Col Power Turn Off | Yes(X)/ No(Blank) | If selected, indicates ADB Column power is to be turned off if a decompression discrete is received. |
| RF Tuner Includes Audio | Yes(X)/ No(Blank) | If selected, indicates a RF tuner is installed. |
| SI Language Rollover | Yes(X)/ No(Blank) | If selected, indicates that more than two audio languages can be used. |
| VMOD Type | Selection of 8 or 24 channnels | Indicates of type of VMOD installed (8 or 24 channels) |

The ACS tool provides the capability to define system configuration information. The user may identify what units are installed in a particular configuration, what entertainment options are available, and what version of the cabin file server database 493 is to be used on this particular aircraft 111. The modifiable fields are defined below.

| Field | Characteristics | Description |
|---|---|---|
| Installed PESCs | Yes(X)/No(Blank) | A legend for the PESC-As (Primary and Secondary) and the PESC-V is provided to indicate the PESC configuration of the aircraft. Selecting the box adjacent to the legend places an "X" in the box, indicating that PESC is installed in this configuration. |
| Enter-tain-ment Options | Check boxes to indicate what options are installed. | Legends for Interactive, Distributed Video Only (DVO), and Distributed Video Only - Scroll are provided. Only one of these options is selectable at a time. |
| PAT/CFS Config-uration | Check box to indicate PAT printer is installed. Also menu to select which CFS database type is used, and the Download Channel. | If Interactive is selected as the Entertainment Option, the CFS database revision, High-Speed Download channel, PAT printer and Movie Preview Source are defined here. |
| Movie Preview | Check boxes to indicate what configuration are applied or none | If PAT SEB is selected, the PAT receives the RF signal from SEB, local SEB attached to the brick. If PAT AVU is selected, the PAT receives the RF signal from an AVU. The AVU must be identified. |

The ACS tool provides the user the ability to define or modify the languages available for display on the overlay for the seat display units 133. Due to current system implementation, if "None" is selected for all languages, then English is the only language for the text overlay. If any language is specified, then all languages are available. Available language selection options include English, Japanese, Chinese and Spanish. The modifiable fields are defined below.

| Field | Characteristics | Description |
|---|---|---|
| Language 1 | None, English, Chinese, Japanese, or Spanish. | Indicates the first language selection for SI Overlay Text. |
| Language 2 | None, English, Chinese, Japanese, or Spanish. | Indicates the second language selection for SI Overlay Text. |
| Language 3 | None, English, Chinese, Japanese, or Spanish. | Indicates the third language selection for SI Overlay Text. |
| Language 4 | None, English, Chinese, Japanese, or Spanish. | Indicates the fourth language selection for SI Overlay Text. |

The ACS tool provides the capability to define RF Level information. The user may define the RF Levels for the PESC-V 224*b*, PESC-As 224*a*, and the Area distribution boxes 217. The modifiable fields are defined below. For AVU systems, an AVU/SCC RF Window reference level can also be defined.

| Field | Characteristics | Description |
|---|---|---|
| RF Control Value | A number from 0 to 255. | The radio frequency (RF) control value for the specified device. |

The ACS tool provides the capability to define the Seating Arrangement information. For a specified area distribution box 217, Column, and AVU/SEB, the user may define which seat row and column location is associated with the AVU/SEB, AVU/SEB input/output assignments (i.e., seat letter, PCU number, SDU output, and phone, if applicable) is associated with each seat, and from which floor junction box 219 the column originates.

| Field | Characteristics | Description |
|---|---|---|
| Seat Row ID | A text string containing two ASCII characters | ID that identifies the seat row for which the seating arrangements are to be specified. |
| Column Loca-tion | Menu selection of: None, OL, CNTR, OR | Specifies the physical position (left, right or center) of the seat that the AVU/SEB (SCC) controls. |
| FDB | Menu selection of None, FDB 1, FDB 2 | Specifies the Floor Distribution Box from which this column originates. |
| Seat Letters | SEB: Four fields of one ASCII character each. AVU: One field of one ASCII character | Indicates what letter seats on the specified row are connected to the specified AVU/SEB (SCC). |
| PCUs | SEB: Four indicators with the states: Yes(X)/No (Blank). AVU: One indicator with the states: Yes(X)/No(Blank) | Indicates if a PCU is connected to the specified AVU/SEB (SCC) |
| SDUs | SEB: Three indicators with the states: Yes(X)/No(Blank). AVU: One indicator with the states Yes(X)/No(Blank) | Indicates if a seat display unit is connected to the specified AVU/SEB (SCC). |
| Phone | SEB: Three indicators with the states: Yes(X)/No(Blank). AVU: One indicator with the states: Yes(X)/No(Blank) | Indicates if a phone is connected to the specified AVU/SEB (SCC). |

The ACS tool provides the user the capability to modify ADB phone setup information for a specified area distribution box 217. The modifiable fields are defined below.

| Field | Characteristics | Description |
|---|---|---|
| Master Phone ADB | None, ADB1 - DB8. | Specifies which ADB serves as Master in the Phone Loop. |
| Phone Differential Input | Yes/No. | Indicates whether the phone input is differential or not. |
| Phone Connection Order | None, ADB1 - DB8. | Up to 8 ADBs may be daisy chained in the phone loop. Connection order is specified here. |

The ACS tool provides the user the capability to modify ADB discrete information for a specified area distribution box 217. Each area distribution box 217 has two input and two output discretes. The modifiable fields are defined below.

| Field | Characteristics | Description |
|---|---|---|
| Input Discrete 1 | 'Not Used', 'Air/Ground', 'PA Override' or 'MC Reset'. | Select from the list to define discrete input #1 for the specified ADB. |
| Input Discrete 2 | 'Not Used', 'Air/Ground', 'PA Override' or 'MC Reset'. | Select from the list to define discrete input #2 for the specified ADB. |
| Output Discrete 1 | 'Not Used' | Not Used. |
| Output Discrete 2 | 'Not Used' | Not Used. |

For configurations defined with an aircraft type of 747-200, the ACS tool provides the capability to define seat lamp assignments for a specified seat row and seat letter. The modifiable fields are defined below.

| Field | Characteristics | Description |
|---|---|---|
| Reading Lamp | None or Lamp 1 - Lamp 4. | Defines which reading lamp, if any, is turned on in this row if the specified seat presses the reading lamp button on their EPCU. |
| Master Call Lamp | None or Lamp 1 - Lamp 2. | Defines which master call lamp, if any, is turned on in this row if the specified seat presses the call button on their EPCU. |

For configurations defined with an Aircraft type of 747-200, the ACS tool allows for the definition of master call lamps and resets. For each defined master call zone identified and for each area distribution box 217, the ACS tool allows the user to indicate if the selected area distribution box 217 provides outputs to the left and right master call lamps and if the specified area distribution box 217 accepts left and right master call reset discretes. The modifiable fields are defined below.

| Field | Characteristics | Description |
|---|---|---|
| Master Call Lamp | Check box for Left and/or Right. | Defines, for the specified master call zone, whether the selected ADB is to provide outputs to the call lamps in the zone. |
| Master Call Reset | Check box for Left and/or Right. | Defines, for the specified master call zone, whether the selected ADB is to accept master call reset discretes from the zone. |

For configurations defined with an Aircraft type of 747-200, the ACS tool allows for the definition of attendant chime assignments. For each chime zone identified and for each area distribution box 217, the ACS tool allows the user to indicate if the selected area distribution box 217 provides outputs to the left and attendant chimes in that zone. The modifiable fields are defined below.

| Field | Characteristics | Description |
|---|---|---|
| Attendant Chime | Check box for Left and/or Right. | Defines, for the specified chime zone, whether the selected ADB is to provide outputs to the chimes in the zone. |

For configurations defined with an Aircraft type of 747-200, the ACS tool allows for the definition of overhead electronics box information. For a specified area distribution box 217 and OEB Column, the ACS tool allows the user to indicate, for the selected overhead electronics box, what seat row and column ID it serves, and the reading lamps and row call lamps for which it provides outputs. The modifiable fields are defined below.

| Field | Characteristics | Description |
|---|---|---|
| Seat Row ID | 1 to 99. | Identifies which seat row the selected OEB serves. |
| Col ID | None, OL, CNTR, and OR. | Identifies the column location for the OEB. If "None" is specified, all lamp outputs are cleared. |
| Reading Lamp | Check box for any combination of Lamp1–Lamp4. | Defines which reading lamp, if any, are turned on in this row if the specified seat presses a reading lamp button on their EPCU. |
| Row Call Lamp | Check box for Lamp 1 and/or Lamp 2. | Defines, for a specified master call zone, whether the selected ADB is to provide outputs to call lamps in the zone. |

For configurations defined with an Aircraft type of 747-400, the ACS tool provides the capability to define ALAC information. For a specified ADB number, the user may define which local area controller the area distribution box 217 interfaces with, and the column length of each of the applicable columns. The modifiable fields are defined below.

| Field | Characteristics | Description |
|---|---|---|
| LAC Number | none, or LAC 1–LAC5 | Identifies which LAC the specified ADB interfaces with. |
| Col 1 Length | 0–31 | Identifies the length of column 1 for the specified LAC. |
| Col 2 Length | 0–31 | Identifies the length of column 2 for the specified LAC. |

-continued

| Field | Characteristics | Description |
|---|---|---|
| Col 3 Length | 0–31 | Identifies the length of column 3 for the specified LAC. |
| Col 4 Length | 0–31 | Identifies the length of column 4 for the specified LAC. |

For configurations defined with an Aircraft type of 747-400, the ACS tool provides the capability to define SEB/SEU mapping information. For a specified LAC number, column number, and SEU number, the user may define which seat row is associated with the SEU and which seats in that seat row the four (4) PCU interfaces provided by that SEU service. The modifiable fields are defined below.

| Field | Characteristics | Description |
|---|---|---|
| Seat Row ID | 1–99 | Identifies which seat row the specified SEU is associated with. |
| PCU-1 | none, or A–L | Identifies the seat letter on the identified seat row which corresponds to the PCU-1 interface from the specified SEU. |
| PCU-2 | none, or A–L | Identifies the seat letter on the identified seat row which corresponds to the PCU-2 interface from the specified SEU. |
| PCU-3 | none, or A–L | Identifies the seat letter on the identified seat row which corresponds to the PCU-3 interface from the specified SEU. |
| PCU-4 | none, or A–L | Identifies the seat letter on the identified seat row which corresponds to the PCU-4 interface from the specified SEU. |

For configurations defined with an aircraft maker of Airbus, the ACS tool provides the capability to define CIDS Seat Row information. For a specified seat row, the user may enter the CIDS Seat Row Counter number. The modifiable fields are defined below.

| Field | Characteristics | Description |
|---|---|---|
| Airbus CIDS seat row counter. | 1–99 | Identifies which value of the CIDS seat row counter associated with specified seat row. |

For configurations defined with an aircraft type of 777, the ACS tool provides the capability to define standard interface information. In the event that a ASIF is to provide service to seats which are not in a continuous area, the ACS tool provides the capability to define up to 12 continuous seat zones which are to be serviced by the selected ASIF. For a specified ASIF number and index, the user may define a zone of seats to be serviced by the ASIF. Also, an area distribution box 217 which interfaces with the ASIF may be specified. The modifiable fields are defined below.

| Field | Characteristics | Description |
|---|---|---|
| ASIF | 1–5 | Identifies which ASIF the specified ADB interfaces with. |
| Starting Seat Row | 0–99 | 1st seat row in the zone which the ASIF provides service for. |
| Ending Seat Row | 0–99 | Last seat row in the zone which the ASIF provides service for. |
| Starting Seat Letter | A–L | 1st seat letter in the zone which the ASIF provides service for. |
| Ending Seat Letter | A–L | Last seat row in the zone which the ASIF provides service for. |
| ASIF Location | Selection for ADB 1 to ADB 8. | Identifies which ADB is to interface with the specified ASIF. |

The ACS tool provides the capability to define the display controller settings information for up to 20 zones. Each zone is capable of containing 12 unique display controller definitions. For a specified range of seats/rows. the user may define a resolution of the touchscreen (if applicable), the time-out of the IR sensor (if enabled) and the defaults of the brightness and volume.

| Field | Characteristics | Description |
|---|---|---|
| Start Seat Row | 0–99 | First seat row in the zone which the display controller settings apply. |
| End Seat Row | 0–99 | Last seat row in the zone which the display controller settings apply. |
| Start Seat Letter | A–L. | 1st seat letter in the zone which the LAC provides service for. |
| End Seat Letter | A–L | Last seat letter in the zone which the controller settings apply. |
| Touchscreen Resolution | Check box for Disabled or Enabled | Indicates that the seat display unit 133 does or does not have touchscreen capability. If enabled selected, the user can select number of columns and rows on the touchscreen. |
| IR Sensor | Check box for Default, Disabled or Enabled | Indicate whether an IR sensor is to be enabled or disabled. If enabled, the time-out field is enabled for entering the number of minutes before the seat display unit 133 turns off after it is returned to the seat back. Valid range of 1–254. If Default is selected, value is 0, and if Disabled is selected, the value is 255. |
| Brightness | 0–100 | Indicates percentage of full brightness range. |
| Volume | 0–100 | Indicates percentage of full volume range available. |

The ACS tool provides the capability to define the audio source information. For a selected channel (1 to 20), the user may specify the timeslot associated with the left and right sides. The modifiable fields are defined below.

| Field | Characteristics | Description |
|---|---|---|
| Left | Integer from 1 to 90 | Indicates the time slot of the left audio source for the given channel. |
| Right | Integer from 1 to 90 | Indicates the time slot of the right audio source for the given channel. |

The ACS tool provides the capability to define video source information. The actual number of channels made available to each passenger depends on the configuration defined in the database. The audio channels are the same throughout the aircraft. There are a maximum of 24 video programs available that may use up to 32 video audio channels (for multi-language capability) and 24 video channels. The modifiable fields are defined below.

| Field | Characteristics | Description |
|---|---|---|
| Video Channel | Integer from 1 to 24. | Indicates the channel on which this video output is to be broadcast. |
| Source Type | Menu selection of: Movie, Skymap, Skymap/Movie, SkyCamera. | Specifies the type of the source of the video output. The selection "Movie" would configure the system so that the output of the VCP assigned to the "Source" field be broadcast on the channel specified in the "Video Channel" field. A selection of "Skymap" would result in the PFIS video output being sent to the channel. A selection of "SkyCamera" would result in the underbelly camera video output being sent to the channel. |
| Player Type | Menu selection of: SVHS, Sony, TEAC - Triple, TEAC - Single. | Specifies the type of player being utilized for the video output. This option is only available for the Movie or Skymap/Movie Source Types. |
| Deck | Menu selection of: 1 to 3. | Where applicable, indicates which deck is being defined in the player. For example, on a TEAC triple deck, a definition of 2 maps deck 2 on the player. This option is only available for the TEAC Triple Deck players. |
| Port | Menu selection of: 1 to 16. | Where applicable, indicates which RS-485 communication port from the CFS is being used to communicate with the player, Skymap, or SkyCamera unit. Not applicable to SVHS players or Skymap unit. |
| TU Column: | Menu selection of N/A or True. | Specifies if the Skymap unit is controlled by the PESC-V column 2. True indicates that it is. |
| Language 1 (L/R) | Two fields of integers from 0 to 90. | Indicates the frequency at which the left and right stereo audio from the video source is to be broadcast for Language 1. |
| Language 2 (L/R) | Two fields of integers from 0 to 90. | Indicates the frequency at which the left and right stereo audio from the video source is to be broadcast for Language 2. |
| Language 3 (L/R) | Two fields of integers from 0 to 90. | Indicates the frequency at which the left and right stereo audio from the video source is to be broadcast for Language 3. |
| Language 4 (L/R) | Two fields of integers from 0 to 90. | Indicates the frequency at which the left and right stereo audio from the video source is to be broadcast for Language 4. |

The ACS tool provides the capability to define the audio channel information. For a specified zone, the user may identify the PCU display channel number, the audio source channel, and whether the source is an audio channel, video language 1, or video language 2. The modifiable fields are defined below.

| Field | Characteristics | Description |
|---|---|---|
| PCU Display | Text string of two ASCII characters. | Indicates what channel number the PCU display indicates for this audio channel. |
| Default | Yes(X)/No(Blank). | Indicates whether or not this audio is the default for the PCU display. |

-continued

| Field | Characteristics | Description |
|---|---|---|
| Audio Source | Text string of two ASCII characters. | In conjunction with the Source definition, Indicates which audio channel is to be mapped to this PCU display channel. |
| Source | Selection of: Audio Source, Video Language 1, Video Language 2. | Indicates the source of the audio to be assigned to this display channel. |

The ACS tool provides the capability to define the in-seat video channel arrangement information. For a specified zone, the user may identify the PCU display channel for an identified video source, indicate whether the channel is pay or free, and which language (of those defined for the video source) is assigned to the channel. The modifiable fields are defined below.

| Field | Characteristics | Description |
|---|---|---|
| PCU Display | Text string of two ASCII characters. | Indicates the channel number to appear on the PCU display. |
| Default | Yes(X)/No(Blank) | Indicates whether or not the selected channel is the default channel for the PCU display. |
| Free Movie Mode | Selection of Pay or Free. | Indicates whether or not the specified channel is free or must be paid for. |
| Player | Menu selection of VTR 1 to VTR 24. | Indicates which video player is to be assigned to this channel. |
| Language | Selection of Language 1 to Language 4. | Specifies the language to be broadcast on the given channel. |

The ACS tool provides the capability to define the tapping unit information. For a specified column and tapping unit 219, the user may identify up to three overhead display units that the tapping unit serves. For each overhead display unit, the user may identify the passenger announcement/video announcement zone to be served, the seating class, the type of overhead display unit, and the description. The modifiable fields are defined below.

| Field | Characteristics | Description |
|---|---|---|
| PA/VA Zone | Choice between eight zones or "None". | Indicates the PA/VA zone corresponding to the specified overhead unit. |
| Seat Class | Choice between eight classes or "None". | Indicates the seat class corresponding to the specified overhead unit. |
| Display Unit Type | Selection of: None, CRT,LCD,CRT Retract, LCD Retract or Projector. | Indicates the kind of display to which the Tapping unit is connected. |
| Description | Up to 20 ASCII characters | Unique identifier describing the location of the specified display unit. |

The ACS tool provides the capability to define zone definition information. For a specified zone type and zone name, the user may define the seating areas associated with that zone. In the event that a given zone is to be defined which includes seating areas which are not continuous, the ACS tool allows the user to identify up to 12 continuous seating areas which make up a single zone. The modifiable fields are defined below.

| Field | Characteristics | Description |
|---|---|---|
| Starting Seat Row | Two-digit positive integer. | Indicates the first seat row defining the specified zone. |
| Ending Seat Row | Two-digit positive integer. | Indicates the last seat row delining the specified zone. |
| Starting Seat | Character from A to L | Indicates the first seat position defining the specified zone. |
| Ending Seat | Character from A to L | Indicates the last seat position defining the specified zone. |

The ACS tool provides the capability to define the zone name information. The user may identify Zone Names for the zone types indicated below, with the appropriate limits as indicated:

A) Channel arrangements—specify a group of seats, such as First Class, that is associated with audio and video privileges. The ACS tool defines up to twenty channel arrangement zones on the aircraft 111.

B) PA areas—specify the seats that receive certain PA announcements. The ACS tool defines up to eight Passenger Address areas on the aircraft.

C) General service zones—The ACS tool defines up to eight general service zones on the aircraft.

D) Duty free areas—The ACS tool defines up to eight duty free areas on the aircraft.

E) Seat areas—specify a group of seats, such as first class. The ACS tool defines up to eight seating areas.

F) Master call/attendant chime zones—define a group of call lights associated with the passenger to attendant calls for a 747-200. The ACS tool defines up to sixteen zones for master call lamps and attendant chime zones.

The modifiable fields are as defined below.

| Field | Characteristics | Description |
|---|---|---|
| Zone Name | Up to 20 ASCII characters. | Identifies a unique name for a zone within the selected zone type. |

The ACS tool generates output as defined below.

The ACS tool also provides the capability to generate a validation report (.VAL). This report provides information pertaining to the validity of the configuration currently loaded in the ACS tool. If errors are detected, they are logged in the validation report. In addition to the validation of LRU limits, the ACS tool also performs validation checks as described below.

Figure 25A:
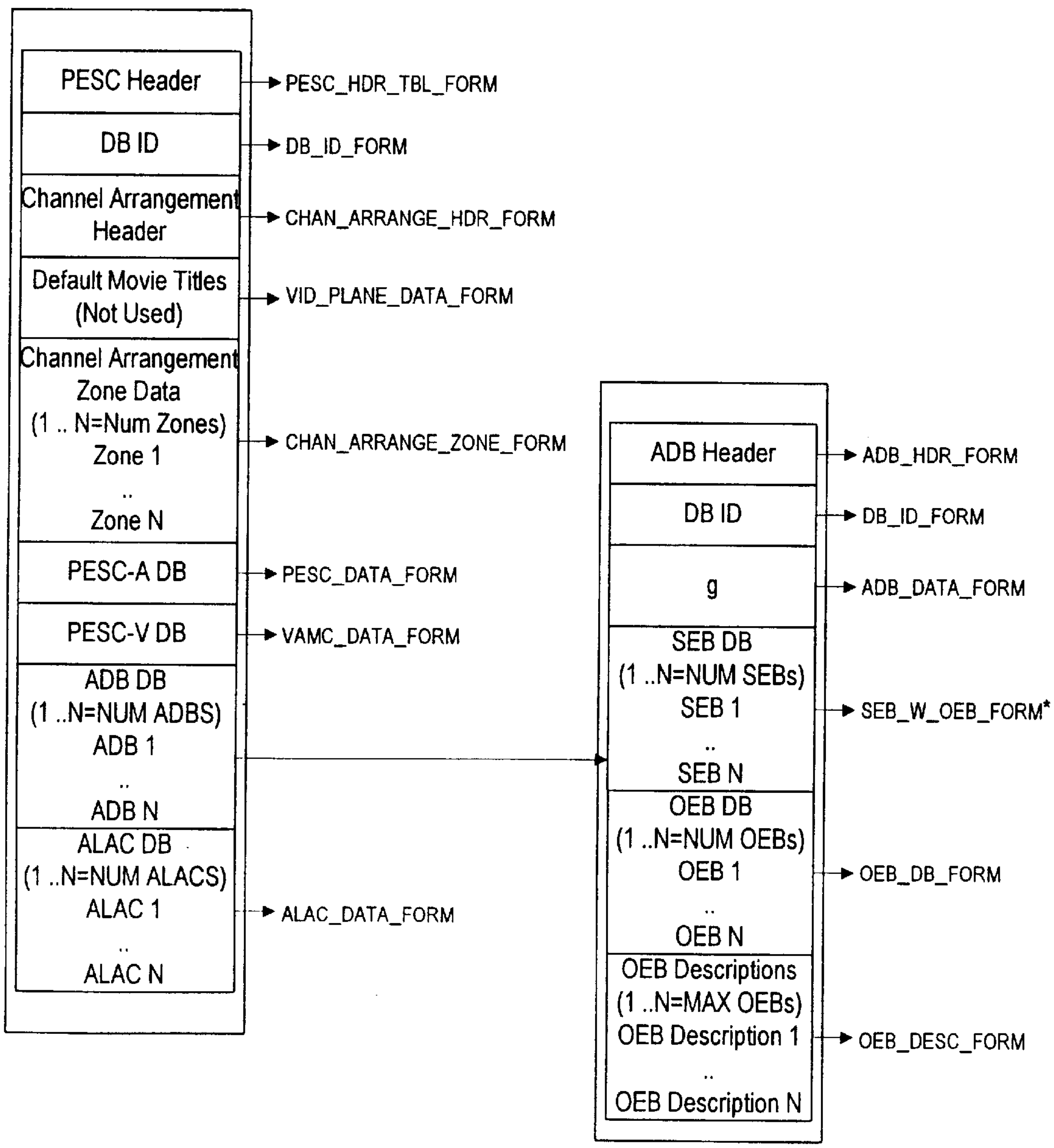
FIG. 25*a* illustrates a CDH file used in the system.

The ACS tool performs the following configuration validation. The ACS tool verifies that Format IDs exist. The ACS tool verifies starting address information for a CDH file shown in FIG. 25*a*. The ACS tool verifies that at least one area distribution box 217 is configured. The ACS tool performs the following channel arrangement validation. The ACS tool verifies that at least one channel arrangement zone is defined (either video and/or audio). The ACS tool verifies that there are no port numbers are duplicated (or port/deck number combinations). The ACS tool verifies that each RF channel is assigned to one and only one video source. The ACS tool verifies there are no gaps in channel arrangement zones. The ACS tool verifies there are no gaps in the audio and video records for each channel arrangement zone. The ACS tool verifies for each audio record in every channel arrangement zone that the audio source is configured. The ACS tool verifies for each video record in every channel arrangement zone that the video source is configured. The ACS tool verifies for each In-Seat Video channel arrangement zone, that each VTR/language is used only once. The ACS tool verifies that there are no tapping units 261 on column 2 if a Skymap unit is to be controlled by the PESC-V column 2. The ACS tool verifies that no players are assigned to the same channel as the high-speed download channel. The ACS tool verifies that no more than 2 Skymap entries are listed in the video records. The ACS tool verifies that only one SkyCamera is listed in the video sources. The ACS tool verifies that all players have at least one pair of timeslots defined.

The ACS tool performs the following seating arrangement validation. The ACS tool verifies that for each seat column, there are no gaps between the first and the last AVU/SEB. The ACS tool verifies that for each AVU/SEB, all seats have the same zone assignments. The ACS tool verifies no seats use the same seat row ID/letter (defined by configured PCUs). The ACS tool verifies that each seat configured with overhead electronics boxes has an assigned reading lamp. The ACS tool verifies that each seat configured with OEBs has an assigned master call lamp. The ACS tool verifies that each seat configured with OEUs has an assigned SEU mapping. The ACS tool verifies that each seat configured with CIDS has an assigned CIDS seat row counter. The ACS tool verifies that the seat used for the primary access terminal preview is valid The ACS tool performs the following zone definition validation. The ACS tool verifies that each zone definition has no gaps in the zones. The ACS tool verifies that for each zone definition, there are no gaps in the records. The ACS tool verifies that each zone definition does not overlap.

The ACS tool provides the capability to generate a detailed configuration report (.RPT) for any valid aircraft configuration which has been opened by the user. This report describes the aircraft seating configuration, channel arrangements, zoning information, RF leveling, etc. This report is very useful when diagnosing problems with the aircraft 111 during installation.

The ACS tool has the capability of generating a downloadable data file (.CDH File), which can be loaded into the PESC-A 224*a* via the MAINT utility. The CDH file contains the PESC-A data plus the data to be downloaded to the PESC-V 224*b*. The CDH File also contains the data to be downloaded to each installed area distribution box 217, which contains its data, in addition to the data to be downloaded to the audio-video units 132 or seat electronics box, the overhead electronics boxes, and the ADB local area controllers (ALACs) in its columns (if installed).

Figure 25B:
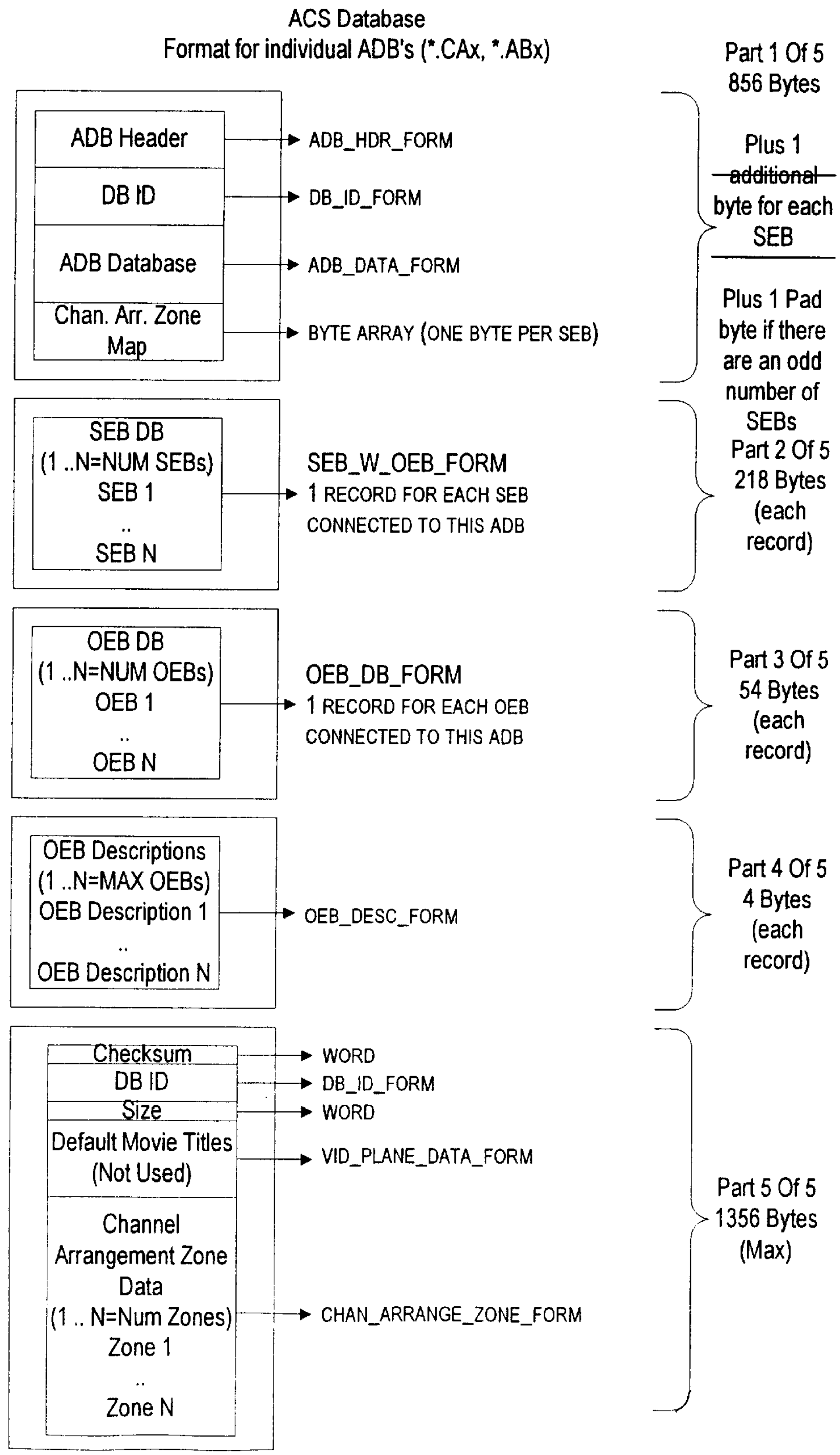
FIG. 25*b* illustrates an ACS database file format the individual area distribution boxes.
Figure 25C:
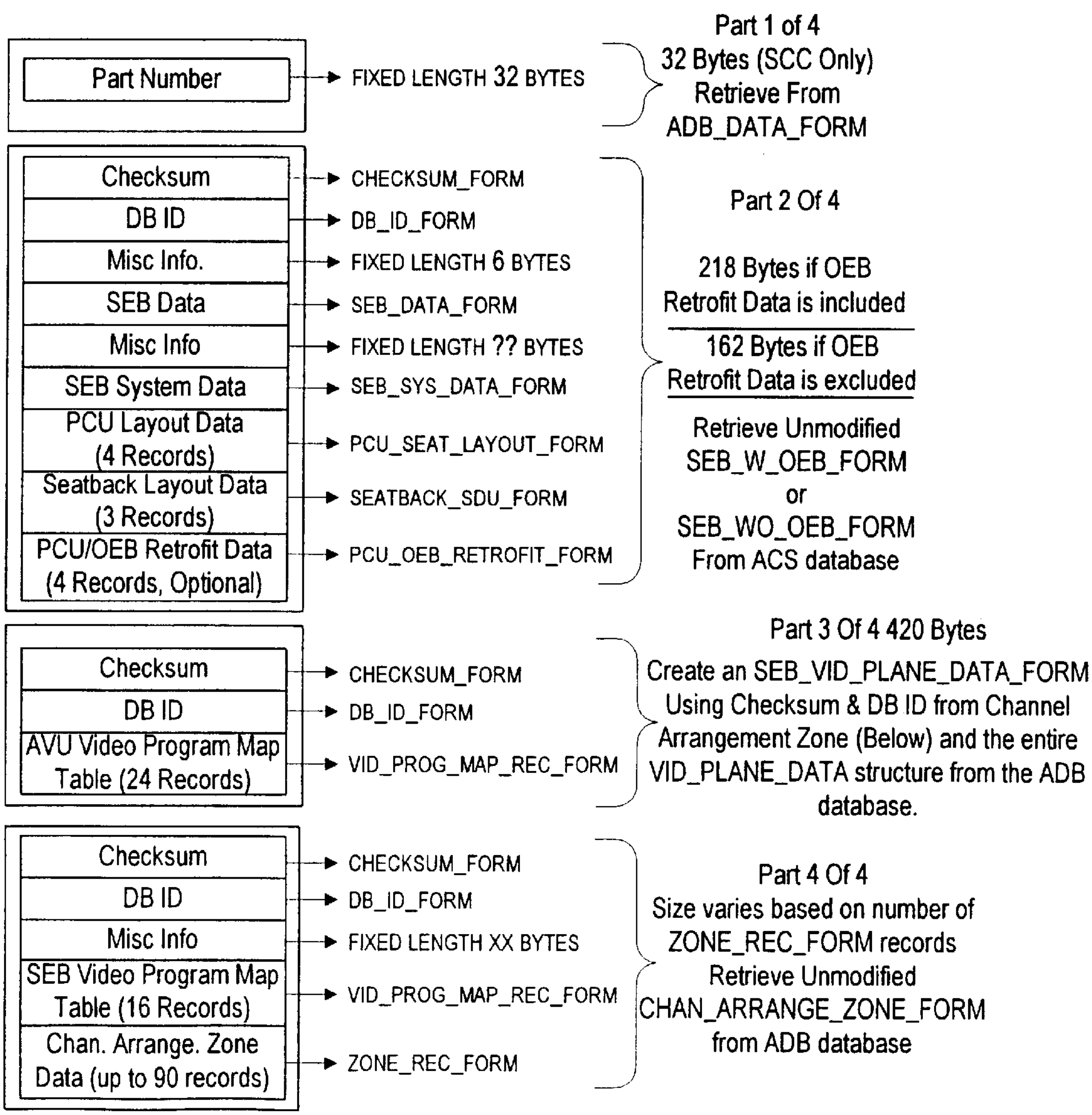
FIG. 25*c* illustrates an ACS database file format for individual audio-video units.

For TES systems that do not contain a PESC-A 224*a*, the capability is provided to generate Load Files that can be directly loaded into the area distribution boxes 217. These files contain the same configuration information that would be present in the CDH file, but instead, the ACS tool creates a separate data file (.CAX, where X=1 through 8) to contain the pertinent information for each of the area distribution boxes 217 present in the configuration. The ACS database format for individual area distribution boxes 217 is shown in FIG. 25*b*. The ACS database format for individual AVUs/SEBs is shown in FIG. 25*c*.

The ACS tool creates an uncompressed data file for the area distribution box 217 that is used to download the configuration to systems with audio-video units 231 from the file server. These uncompressed files (.Abx, where x=1 through 8) contain the pertinent information for each of the Area distribution boxes 217 in the configuration.

The ACS tool also provides the capability to create two (2) data files for the new primary access terminal 225 and cabin file server 268. One file contains a listing of all the addressable units that are configured by the ACS tool (.LRU File). The other is a video tape reproducer 227 description file that contains the video channel, audio timeslots and video data record number for each installed video player (.VTR file).

The ACS tool also provides the capability to create a single data file (.INT File) for the MAINT and Config/Status utilities. This file, loaded upon program execution, contains information that allows configuration diagnostics to be performed that provide "trouble shooting" capability to lab and field personnel.

The ACS tool generates a single data file (.CFG File) that stores all the data currently entered in a particular ACS tool editing session. If the configuration being defined is complete and valid, or in some intermediate stage of development, the CFG file stores all the information currently defined for a specified configuration. The file is not for use on the TES 100. Rather, it is used by the ACS tool in opening a configuration (to either continue definition of a configuration, modify an existing configuration, or, if applicable, generate the TES download files for an existing configuration).

Before the configuration can be used to generate downloadable data files, the data must be entered in a valid format. Prior to generation of downloadable data files, a check for the validity of the configuration is performed to ensure that downloadable data files are not created for the TES line replaceable units that might cause the units problems from operating correctly.

The ACS tool can create, upon user request, downloadable data files that can be loaded into the following units of the system 100:

| Destination LRU | File Type | File Extension |
|---|---|---|
| PESC-A | PESC Downloadable Data File | CDH |
| ADB | ADB Downloadable Data File (compressed) | CA1–CA8 |
| ADB | ADB Downloadable Data File (uncompressed) | AB1–AB8 |
| CFS | 1501 Cabin File Server Files | LRU, VTR |
| N/A | MAINT and Config/Status File | INT |
| N/A | Data File for use with the ACS tool | CFG |

It is important for the system line replaceable units to know what other line replaceable units or devices are installed. Each line replaceable unit must know which units are expected to respond to or provide service requests, and when not to communicate with a line replaceable unit that is not installed to avoid nuisance error messages. The configuration data files created by the ACS tool informs the various controllers about what equipment is installed in the system and is constrained by maximum, as well as the practical limits, identified hereinafter. The limits are a maximum of 8 area distribution boxes 217, a maximum of 5 seat columns per area distribution box 217, a maximum of 30 SEBs (seat controller cards 269) per seat column (APAX-150 system only), a maximum of 4 PCUs 121 per AVU/SEB (or 3 with phone), a maximum of 1 PCU 121 per seat controller card 269, a maximum of 3 seat display units 133 per AVU/SEB, a maximum of 1 seat display unit 133 per seat controller card 269, a maximum of 3 phones per AVU/SEB, a maximum of 1 phone per seat controller card 269, a maximum of 1 FDB per seat column, a maximum of 3 OEB columns per area distribution box 217, a maximum of 30 overhead electronic boxes per OEB column, a maximum of 4 reading lamps per overhead electronic box, a maximum of 2 row call lamps per overhead electronic boxes, a maximum of 2 columns of tapping units 261, a maximum of 16 tapping units 261 per tapping unit column, and a maximum of 3 display units per tapping unit 261.

Details of the graphical user interface (GUI) of the airplane configuration system are described below with reference to FIGS. **26*a*-1 through 26*a*-58**. The airplane configuration system is a Windows-based computer software application provides a means of telling the entertainment/service system about airplane layout and the configuration of cabin entertainment and passenger services. It provides this information via downloadable data files.

Each line replaceable unit that uses the database contains electrically erasable programmable read-only memory (EEPROM) which are "downloaded" with the database. This means that the database which contains information about the airplane configuration can be passed to each controller (i.e., downloaded). These controllers include the PESC-A **224*a*, PESC-V 224*b*, area distribution boxes 217**, ALACs, SEBs (AVUs) and overhead electronic boxes.

The airplane configuration system includes the seating configuration, audio and video arrangement and other information concerning the layout of a particular airplane. The system 100 has an audio entertainment system, passenger service system, and two video systems, including the overhead video system and the in-seat video system. The system 100 has expanded features such as a retrofit feature for wide-body aircraft, a retrofit feature for Airbus aircraft, a retrofit feature for McDonnell Douglas DC-10 aircraft, a passenger telephone feature, and a cabin and passenger management feature.

The modular concept of the system allows for a wide variety of configurations. This allows individual airlines to choose configurations most suited to their individual needs and budgets.

The following minimum hardware configuration is required to operate the airplane configuration system: a personal computer with a 386 processor and Windows 3.11 operating system, eight Megabytes of random access memory (RAM), and a 3.5-inch disk drive. Performance is marginal with the aforementioned minimum requirements. A 486 PC with at least 16 MB of RAM is preferred for reasonable performance. Windows NT (3.51) is the current operating system of choice.

The following procedure instructs a user on how to install the airplane configuration system to a PC from an installation diskette. The user first verifies that no other Windows applications are running. The user then inserts disk 1 (3.5-inch) into the disk drive. From the program manager the user selects file then run and types A:\Setup. On-screen instructions are provided for the remainder of the setup.

From the program manager window, the user selects the tools group icon and presses Enter. From tools group, the user selects the program icon and presses Enter (or double-clicks on the icon with the left mouse button). The airplane configuration system is exited by selecting Exit from the file menu.

The airplane configuration system is a Microsoft Windows (3.1 or later) multiple document interface (MDI) application. The airplane configuration system gives the user the ability to create an aircraft configuration and save the configuration to disk so that it can be called up at a later date to perform updates if the configuration for an aircraft changes. When the airplane configuration system is executed, the application presents a window, which is an airplane configuration system main screen shown in FIG. 26-1.

After a configuration has been established by either creating a new configuration or calling up an existing configuration from disk, data files can be created that can be loaded onto the aircraft. Reports can be generated for a configuration that can be used to verify the data that is inputted into the configuration matches the actual aircraft.

A common menu bar provides the following selections; File, Data, Options, Window, and Help. The File and Help selections support common/standard windows choices. The Windows selection allows you to switch between active windows within the Aircraft Configuration System program, as well as change the viewing of these windows to Cascade or Tile. Once a configuration is opened or created, the Data menu provides access to the various forms used to add or modify configuration information.

Selecting the File menu displays File Functions that include the following options:

a) New—This option allows the user to create a new configuration.

b) Open—This option allows the user to edit a configuration by selecting from existing configurations.

c) Close—This option allows the user to close the database that is currently in focus. The user is given the option of saving the current changes to the configuration in question, or cancel the close request.

d) Save—This option allows the user to save the current configuration in focus without closing.

e) Save As—This option allows the user to save the current configuration in focus and use different identification in doing so. When this option is selected, the user is prompted with a form identical to the form used in defining a new configuration, except all the current information for the open file (i.e., part number, dash number, revision, description, creator) is shown. All of this information may be changed during a "Save As" operation.

f) Delete—This option allows the user to delete the configuration in focus.

g) Generate Download Files—This option allows the users to generate the downloadable data files which define a configuration for use in installation on an APAX-150 system.

h) Validate Configuration—This option allows the user to execute the validation option. The validation status of the configuration is indicated upon completion of the execution of this option, and the validation report is displayed.

i) Create Release Floppy Disk—This option allows the user to create a floppy diskette containing all of the downloadable database files along with a setup program. When this option is selected, the user is prompted to specify the diskette location and which configuration files are included.

j) Print—This option allows the user to print the configuration report. The configuration report is not generated if the current configuration in focus has not had download files generated first. Consequently, the configuration must be valid and the download files must be generated prior to exercising this option.

k) Exit—This option allows the user to end an airplane configuration system session. If changes have been made during this editing session, the user is prompted to accept or decline changes made to each configuration currently open which contains changes. Use of this option does not generate download files automatically, but if changes are saved, they are present the next time the user opens this configuration.

The following paragraphs describe the functions of the user interfaces associated with exercising options which fall under the File function.

In order to create a new configuration from scratch, the user selects the "New" option from the "File" menu. When this is done a screen is presented to capture a valid part number, version, aircraft configuration description and the creator's name. FIG. 26-2 shows the Create New Configuration screen that is presented to the user. When a user "creates" a new configuration, a file (.CFG file) is created and saved on the hard disk where information that pertains to the aircraft configuration is stored. Upon request, a user can open a configuration that has been previously created. The user can then modify the configuration, generate download files or produce reports.

All fields on the "Create New Configuration" require data. Valid part numbers and their association are defined in the Application.INI File. The airline name, airplane maker, airframe maker, overhead type and data file prefix designator is retrieved from the .INI file when a valid part number is entered. If it is desired to create a new part number or change the definition of an existing part number, select the "Part Numbers" option on the "Create New Configuration" menu. The menu shown in FIG. 26-3 is then displayed. The following paragraphs describe functions available on this screen.

The Part Number option is a required field used to select the part number for the configuration being created. For a given airline, a unique part number identifies a certain type of aircraft (e.g., 747-400, A330, etc.). Selecting the arrow next to the list box for the part number displays a menu of existing part numbers to choose from. This list is kept in the .INI file which is installed when the utility is installed. If it is desired to create a new (unique) part number, the user may select the "Part Numbers" button on the lower right corner of this screen. If changes are made to a database, they should be identified by changing either the part number or the version.

The Version option is a required field used to define which version to this configuration the data represents and is useful for configuration control purposes. The version string can include from one to four alphanumeric characters. If changes are made to a database, they should be identified by changing either the part number or the version.

The Description option is a required field used to provide up to twenty characters of narrative text to briefly describe the configuration.

The Creator Name option is a required field used to identify who created the configuration.

The OK button is used to accept the new configuration identification. If all the required data is entered on the "Create New Configuration" screen when OK is selected, the Data, Options, and Window menu selections are presented, along with the Part Number Information. The user may now begin to define the configuration. In practical use, this function is not used due to the fact that, if selected, all data fields are blank for a new configuration (i.e., all information must be entered from scratch). It is much more practical to take an existing, similar configuration, make modifications and use the "Save As" file function than it is to start with nothing.

The Cancel button is used to abandon the creation of a new configuration. All part number information entered an the "Create New Configuration" screen is lost if this option is exercised.

The Part Numbers button allows the user to access the Part Number Information screen to create new part number definitions, edit existing part number definitions, and delete existing part number definitions.

The Directory button allows the user to set the working directory where additional configurations (i.e., .CFG files)

may be found. The part numbers available for use may be stored in different directories, and using this option to specify a directory makes available the part numbers corresponding to the .CFG files found in the directory.

The Part Number Information screen shown in FIG. 26-3 is used to create new part number definitions, edit existing part number definitions, and delete existing part number definitions. The following paragraphs define the functions available from this screen.

When a part number in the list is selected, selecting the Edit button takes the user to the Part Number Information editing screen shown in FIG. 26-4, where all the information for the selected part number is displayed. From this screen, the user may edit all information except the part number itself.

The Insert button allows the user to define a new part number. Selecting the Insert button takes the user to the Part Number Information editing screen shown in FIG. 26-4, where all fields are blank except for the default aircraft maker (Boeing), aircraft type (747-400), and overhead type (OEUs). From this screen, all fields may be edited to create a new part number.

When a part number in the list is selected, selecting the Delete button deletes the part number.

Selecting the Exit button returns the user to the "Create New Configuration" screen.

The Part Number Information Editing screen (as shown in FIG. 26-4) allows the user to edit information for an existing part number or define a new part number. The following paragraphs define the functions available from this screen.

If editing an existing part number, the part number which was selected is displayed, but is not modifiable. If creating a new part number, this field is blank and data entry is allowed. A part number comprises free form text up to twenty alphanumeric characters.

If editing an existing part number, the airline name associated with the part number is displayed. If creating a new part number, this field is blank. Modification of the airline name may be accomplished through direct text entry. An airline name may be up to twenty characters, but must be at least one character.

If editing an existing part number, the aircraft maker associated with the part number is displayed. If creating a new part number, this field defaults to "Boeing". Modification of the aircraft maker may be accomplished through selection from a menu. By selecting the arrow to the right of the text box, a menu of aircraft makers defined by the tool (Airbus, Boeing, McDonnell Douglas, Gulfstream, Ilyushin, Lockheed, and Tupolev) is displayed for selection.

If editing an existing part number, the aircraft type associated with the part number is displayed. If creating a new part number, this field defaults to "747-400". Modification of the aircraft type may be accomplished through selection from a menu. By selecting the arrow to the right of the text box, a menu of aircraft types defined by the tool is displayed for selection. The tool mandates that certain aircraft makers is specified for certain aircraft types, as indicated below.

| Aircraft Maker | Aircraft Type |
|---|---|
| Airbus | A300, A310, A320, A321, A330, A340 |
| Boeing | 737, 747-100, 747-200, 747-400, 757, 767, 777 |
| McDonnell Douglas | DC-10, MD-11 |
| Gulfstream | Gulfstream, G4/5 |
| Ilyushin | IL-96M |
| Lockheed | L1011 |
| Tupolev | TU-214 |

If editing an existing part number, the overhead type associated with the part number is displayed. If creating a new part number, this field defaults to "OEUs". Modification of the overhead type may be accomplished through selection from a menu. By selecting the arrow to the right of the text box, a menu of overhead types defined by the tool is displayed for selection. The tool mandates that certain overhead types are specified for certain aircraft types, as indicated below.

| Aircraft Type | Overhead Type |
|---|---|
| 737, 747-100, 747-200, 757, 767 | OEBs |
| 747-400 | OEUs |
| A300, A310, A320, A321, A330, A340 | CIDs |
| DC-10, MD-11 | DC10 |
| 747-400, 757, 767, 777 | STAN |
| None | ALL |

If editing an existing part number, the file prefix associated with the part number is displayed. If creating a new part number, this field is blank. Modification of the file prefix may be accomplished through direct text entry and must be six characters long. These six characters are used as the first six characters of all output files which are related to this configuration.

The OK button is used to accept the changes made to the part number information and return to the "Part Number Information" screen. The Cancel button is used to abandon any changes made to the part number information and return to the "Part Number Information" screen.

The Open option of the File menu allows the user to select a configuration that has been previously created for editing. When this option is selected, the Select From Available Configurations screen shown in FIG. 26-5 is displayed, with the relevant information pertaining to each previously defined configuration displayed in the list box. The Application.INI File stores the location of the data files. Using the "Directory" option, the user also has the option of identifying a directory where additional configurations may be accessed. After the user selects a configuration, the configuration is then loaded into system RAM from disk. After the configuration has been loaded, all edit features are available to the user. The following paragraphs define the functions available from this screen.

The OK button is used to select the configuration which is currently highlighted. When a configuration is highlighted and OK is selected, the Data, Options, and Window menu selections are presented, along with the Part Number Information screen (reference—As for Configuration Information). The user may now edit the configuration.

The Cancel button is used to abandon the selection of a configuration, and returns the user to the Aircraft Configuration System Main Screen with no configuration selected (unless another configuration had been previously selected).

The Directory button allows the user to identify a directory where additional configurations (i.e., .CFG files) may be found. The part numbers available for use may be stored in different directories, and using this option to specify a directory makes available the part numbers corresponding to the .CFG files found in the directory.

The Save As option of the File menu is used to save the current configuration in focus and allow the user to define new configuration information while doing so. This function is especially useful for creating a new configuration which is similar to a configuration already defined. To do this, the user would open the desired configuration using the Open option of the File menu, then select Save As. When this is done, the Save Configuration With New Part Number screen shown in FIG. 26-6 is displayed. The functionality available from this screen is identical to that discussed with reference to Creating A New Configuration.

The Delete option of the File menu is used to remove a configuration from the disk. Upon selection, the Delete Confirmation pop-up screen of FIG. 26-1 is displayed. Selecting Yes removes the configuration, and No canceled the operation.

The Generate Download Files option accesses the Generate Data Files screen shown in FIG. 26-8. This option allows the users to generate the downloadable data files which define a configuration for use in installation on the system. The validation option is automatically executed when this option is exercised, and download files are not generated unless the configuration is determined to be valid. The following downloadable data files (and the line replaceable units or utilities which they are loaded into) are written to the current working directory.

.CDH File (PESC-A)—Indirect download of the distributed system through the PESC-A.

.CA1–.CA8 Files (ADBs)—Direct download to individual ADBs.

.AB1–.AB8 Files (ADBS)—Absolute download files for ADBs with AVUs.

LRU/VTR Files (CFS)—LRU and VTR information used as input into the CFS database.

.INT File (MAINT and Config/Status)—LRU information used as input into MAINT and Config.

Any time the validation function is exercised, the tool first writes out the .CFG file that defines the configuration. When this is done, the initial configuration that the user began with is lost and that configuration is now defined by whatever changes have been made during this editing session. For this reason, it is suggested that all .CFG files be stored somewhere other than the working directory for configuration control purposes. When it is desired to edit a configuration, the user should make a copy of the .CFG file and place it in the working directory for editing. When the editing has been accomplished and a valid configuration has been created, the user should then return the .CFG file to a configuration control storage directory.

The OK button is used to initiate the generate function. The airplane configuration system first executes the validation function to verify that the configuration represents a valid configuration. If the configuration is valid, the function generates the download files and display the Configuration Report. If the configuration is not valid, the user is prompted to use the Validation Report to correct errors, then the validation report is displayed.

The Cancel button is used to abandon the initiation of the Generate Download Files option and returns the user to the Aircraft Configuration System Main Screen.

The Create Release Floppy option is used to copy the database files onto a floppy disk and generate an setup program that loads the new database information onto the cabin file server 268 and reinitialize the cabin file server database 493. When accessed, the Create Release Floppy screen shown in FIG. 26-9 is displayed.

The Drive selection box allows the user to select the floppy drive to be used to generate the release diskette. The available options are A and B.

The Configuration Files area allows the user to select which files are to be copied onto the floppy. As a default, all files used for downloading to the line replaceable units and the cabin file server 268 are selected.

The OK button is used to initiate the creation process. Another utility is then launched to create a compressed file that contains all of the database files. Then the setup, database, and compressed files are copied onto the floppy. The Cancel button is used to abandon initiation of the Create Release Floppy option and returns the user to the Aircraft Configuration System Main Screen. The Print option displays the Print Configuration Report pop-up shown in FIG. 26-2. Selecting Yes sends the configuration report to the printer, and No cancels the operation.

The Exit function closes the ACS tool. If the open database has changes that have not been saved, the Save changes pop-up screen of FIG. 26-3 is displayed. Selecting Yes saves the changes that have been made, and No does not save the changes and close the tool.

Once a configuration has been initialized by either loading an existing configuration or creating a new configuration, the values in the configuration can be modified to fit the requirements specified by the customer. The availability of a configuration to edit or create is indicated by the presence of the Data, Options, and Window menu selections at the top of the Main screen. Selecting the Data menu displays the following options:

a) Part Number Info—This option allows the user to view the configuration information.

b) System Information—This menu option is a branch which makes available the four options listed below.

c) ARCNET Terminations—This option allows the user to edit which installed units have ARCNET Terminations.

d) System Flags—This option allows the user to edit various system flags.

e) System Configuration—This option allows the user to define various aspects of the System Configuration.

f) SI Languages—This option allows the user to define languages to be available for the SI Overlay Text.

g) RF Levels—This option allows the user to set RF levels for the various line replaceable units which make up the RF network.

h) Seating Arrangements—This option allows the user to edit relationships between area distribution boxes 217, seat columns, SEBs (AVUs), seat display units 133, PCUs, Phones (if applicable), and Seats.

i) ADB Phone Setup—This option allows the user to define information for ADB setup if the configuration in question has phones at the seat. It allows definition of a master phone area distribution box 217 and allows for definition of the connection order for area distribution boxes 217 in a phone loop.

j) ADB Discretes—This option allows the user to edit the definition of ADB input and output discrete assignments. Each area distribution box 217 has two input and two output discretes, although the output discretes are not currently defined to serve any purpose. The input discretes for each area distribution box 217 may be assigned to accept an Air/Ground input, a Passenger Address (PA) override input, a Master Call reset input, or no connection.

k) Overhead Interface—The screens available to the user for the editing of overhead interface information depend on the type of aircraft being defined in this configuration. The overhead interface screens and which aircraft they apply to are defined below.

l) Seat Lamps—This option is available for configurations which are defined for 747-100 and -200 Aircraft types. This option allows the user to edit fields which identify which seats on a given row are assigned to which reading lamp and which row call lamp.

m) Master Call Lamps—This option is available for configurations which are defined for 747-100 and -200 Aircraft types. For each of up to sixteen master call zones, this option allows the user to edit the information that defines which area distribution box 217 is to provide lamp outputs to each of two master call lamps for that zone and which area distribution box 217 is to accept the reset discrete for those two lamps.

n) Attendant Chimes—This option is available for configurations which are defined for 747-100 and -200 Aircraft types. For up to sixteen attendant chime zones, this option allows the user to edit the information that defines which area distribution box 217 is to provide the outputs to each of two chimes in that zone.

o) Overhead Units—This option is available for configurations which are defined for 747-100 and -200 Aircraft types. This option allows the user to edit the information which defines the relationships between area distribution boxes 217, OEBs, the seat rows they service, and the reading lamps and row call lamps associated with that seat row.

p) ALAC Information—This option is available for configurations which are defined for 747-400 Aircraft types. This option allows the user to edit the information which defines the ADB to ALAC interface.

q) SEB/SEU Mapping—This option is available for configurations which are defined for 747-400 Aircraft types. For each ALAC, this option allows the user to edit the information which defines the LAC to SEU interface and identifies the SEU to PCU interface.

r) CIDS Seat Rows—This option is available for configurations which are defined for A330 and A340 Aircraft types. This option allows the user to edit the information which defines the CIDS Seat Row Counter relationship to the actual Seat Row ID.

s) Standard Interface—This option is available for configurations which are defined for 777 Aircraft types. This option allows the user to edit the information which defines the connections between area distribution boxes 217 and LACs and identifies which seats are serviced by the LAC.

t) Audio Sources—For each of up to 20 audio channels, this option allows the user to edit the audio time slot assignment to the audio channels.

u) Video Sources—For each of up to 24 video channels, this option allows the user to edit the information which defines each of the video sources, including audio time slot assignment to the video/audio channels.

v) Audio Channels—For each of up to 32 Audio Channels and for each of up to 20 unique channel arrangement zones, this option allows the user to edit the information which defines what audio sources are mapped to the PCU display channel numbers.

w) In-Seat Video Channels—For each of up to 32 Video Channels and for each of up to 20 unique channel arrangement zones, this option allows the user to edit the information which defines what video/audio sources are mapped to the PCU display channel numbers.

x) Tapping Units—For up to 2 columns of up to 16 tapping unit connections and logical zones.

y) Zone Definitions—This option allows the user to edit the information which indicates what seats are assigned to a particular zone.

z) Zone Names—This option allows the user to edit the names assigned to logical zones.

As for Configuration Information, when the Part Number Info option of the Data Menu is selected, the Configuration Information screen shown in FIG. 26-12 is displayed. This is a Read-only screen which displays part number, including version string, airline name, aircraft type, description, creator, date created, and overhead type. At least one window must stay open to keep a configuration open. However, this window can be minimized for convenience.

When the user selects System Information, then ARCNET Terminations from the Data Menu, the ARCNET Termination Flags screen shown in FIG. 26-13 is displayed. This screen allows the user to define how the ARCNET is to be configured. The functions available on this screen are defined in the following paragraphs.

The PESC ARCNET function is used to define which line replaceable units on the PESC ARCNET are to be terminated. Clicking on a box toggles between selected and not selected. Selecting the box next to one of the line replaceable unit name (PESC-AP, PESC-As, and PESC-V) indicates that the ARCNET is to have termination at this line replaceable unit. Depending on what line replaceable units are installed in a particular system, there may be two PESC-As (a primary and a secondary).

The ADB ARCNET function is used to define which line replaceable units on the ADB ARCNET are to be terminated. Clicking on a box toggles between selected and not selected. Selecting the box next to one of the line replaceable unit names (PESC-AP and PESC-As) indicates that the ARCNET is to have termination at this line replaceable unit. Depending on what line replaceable units are installed in a particular system, there may be two PESC-As (a primary and a secondary).

The OK button is used to accept the changes made and close the screen. The Cancel button is used to abandon the changes made, close the screen, and return the user to the aircraft configuration system main screen.

When the user selects System Information, then System Flags from the Data Menu, the System Flags screen shown in FIG. 26-14 is displayed. System Flags enables certain built-in features of the APAX-150 system to be utilized. Clicking on a box toggles between selected and not selected. The functions available on this screen are defined in the following paragraphs.

If selected, the PA All for Zone 4 function indicates to the system that a Passenger Address to all Zones should also go to Zone 4 (which is generally identified as the crew rest). If this Flag is not set, a PA All does not include Zone 4 (this does not apply to Priority Passenger Address).

When the system 100 is powered on, an auto-sequencing function is performed where each line replaceable unit reports its communication status and is integrated onto the bus. Selecting the Auto-Sequence Disable function disables this function. In general, it is not recommended that this flag be selected.

If selected, the Decomp ADB Col Power Turn Off flag causes the APAX-150 to remove power to all ADB columns upon receipt of a decompression discrete.

If selected, the RF Tuner Includes Audio function indicates that the RF tuners at the seat are both audio and video tuners.

If selected, the SI Language Rollover function allows more than two audio languages to be used. If it is not selected, this function allows timeslot information to be entered for use in Canadian-style overhead configurations.

The VMOD Type function is used to define the type of Video Modulator installed in the system. This selection depends on the number of RF signals required.

The OK button is used to accept the changes made and close the screen. The Cancel button is used to abandon the changes made, close the screen, and return the user to the Aircraft Configuration System Main Screen.

To define System Configuration Information, the user selects System Information, then System Configuration from the Data Menu, the System Configuration screen shown in FIG. 26-15 is displayed. The system configuration information identifies, if appropriate, that certain available features are present for the configuration in question. Clicking on a box toggles between selected and not selected. Under the Entertainment Options, only one of the three categories on the left (Interactive, DVO, and DVO-Scroll) may be selected at a time. Additionally, the options listed on the right (Card Reader, SI Interface, SEB (AVU) Installed, and Tuner Installed) are only applicable if "Interactive" is the option selected. Consequently, none of the options on the right are selectable or indicate "selected" if the option on the left is not "Interactive". The functions available on this screen are defined in the following paragraphs.

The installed passenger entertainment system controller's function allows the user to indicate what the passenger entertainment system controller configuration is. Select each of the passenger entertainment system controllers 224 in the configuration as is appropriate.

The Entertainment Options function defines what kind of entertainment system is being defined. Selecting one of the available options (Interactive, Distributed Video, or Distributed Video-Scroll) deselects the others (only one type of system can be defined per configuration). The difference between the Distributed Video modes is that the DVO-Scroll function allows the PCU channels to increment two channels at a time. If a Distributed Video System supports two languages, and the seat display unit 133 (AVU/DC) prompts the user for "Language 1" and "Language 2", with this option selected the PCU skips every other channel so that only programs of a certain language are included. This requires that the specified language is always in the same slot for all tapes (i.e., English is always Language 1, Japanese is always Language 2, etc.). This only works for tapes configured with two languages.

The PAT/CFS Configuration function is only available for definition if the Entertainment Option selected is "Interactive". This function allows the user to identify the presence of a PAT Printer. Also provided is a menu to select the database format of the cabin file server database 493. In general, this field should never be changed. If creating a configuration for a new aircraft, this field should be set to "DB Rel 2.3" if the software on the system 100 is a Build 3.0 or later. The High-Speed Download channel can also be selected here. If N/A is selected for the download channel, the system defaults to 8 as the download channel.

The Movie Preview function defines where the RF signal for the movie preview on the primary access terminal 225 is derived from. Depending upon airplane configuration, SEB or audio-video unit 231 or none must be selected. If the audio-video unit 231 is selected, an AVU identifier must be defined. The AVU identifier is required and must be 3 digit seat row and a seat letter (i.e., 001A).

The OK button is used to accept the changes made and close the screen. The Cancel button is used to abandon the changes made, close the screen, and return the user to the Aircraft Configuration System Main Screen.

When the user selects System Information, then SI Languages from the Data Menu, the SI Language Display Options screen shown in FIG. 26-16 is displayed. This screen provides the ability to indicate which languages are supported by the SI Overlay text on the seat display unit 133 (display console). The functions available on this screen are defined in the following paragraphs.

The Display Order function is applicable to APAX-150 systems that are distributed video systems. Due to current system implementation, if "None" is selected for all languages, then English is the only language for the text overlay. If any language is specified, then all languages are available. Available language selection options include English, Chinese, Japanese, and Spanish.

The OK button is used to accept the changes made and close the screen. The Cancel button is used to abandon the changes made, close the screen, and return the user to the Aircraft Configuration System Main Screen.

When the user selects RF Levels from the Data Menu, the RF Levels screen shown in FIG. 26-17 is displayed. This screen displays all the current settings for RF levels for all line replaceable units that are part of the RF Distribution Network and provides the ability to select a line replaceable unit to modify the RF Control Value.

To close this screen, the button in the top left hand corner is double clicked, or Close is chosen from the menu that is pulled down by 'single clicking' the button in the top left hand corner of the view. By placing the cursor over the line to be edited and double-clicking, or selecting the line and pressing Enter on the keyboard, the LRU RF Settings screen shown in FIG. 26-18 is displayed. The functions available on this screen are defined in the following paragraphs.

The RF Values function displays the allowable maximum and minimum values for the RF level and displays the current value set for the selected line replaceable unit. This value may be modified by selecting the field and typing in a new value. The legal range of values is between 0 and 255.

The OK button is used to accept the changes made, close the screen, and return to the screen shown in FIG. 26-17. The Cancel button is used to abandon the changes made, close the screen, and return the user to the screen shown in FIG. 26-17.

Figure 19:
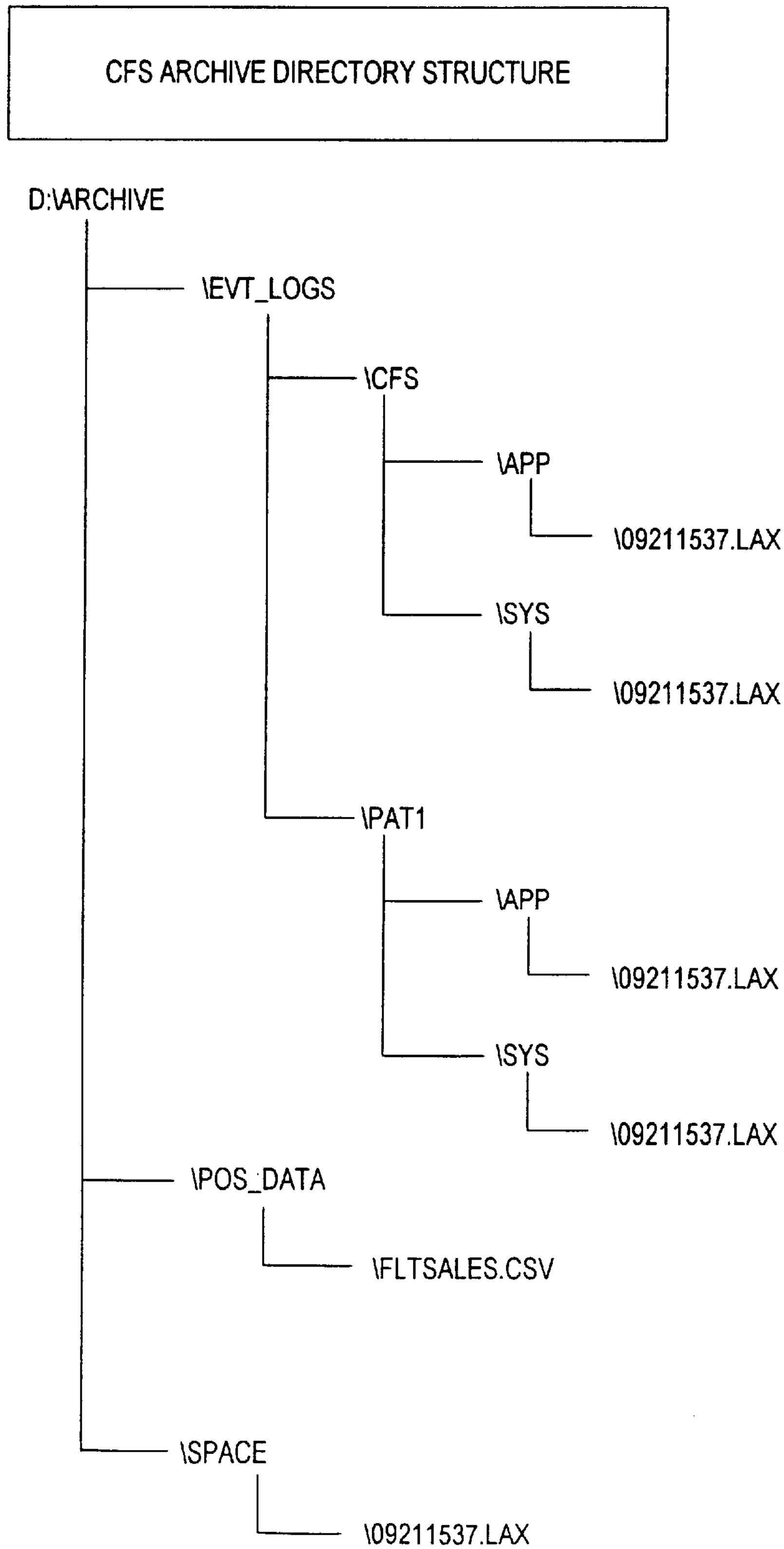
FIG. 19 shows the cabin file server directory structure employed in the software architecture of a preferred embodiment.

When the user selects Seating Arrangements from the Data Menu, the Seating Arrangements screen shown in FIG. 26-19 is displayed. This screen displays all the seating arrangement information for a selected area distribution box 217 and Column. The user may chose any area distribution box 217 (1–8) and any Column (1–5) and either type SEB or audio-video unit 231 by selecting from the lists provided for these functions. If type SEB selected, FIG. 26-19 is displayed. This screen displays the SEB definitions for the appropriate area distribution box 217 and column and provides the ability to select an SEB to edit its definition.

To close this screen, the button in the top left hand corner is double clicked, or Close is chosen from the menu that is pulled down by single clicking the button in the top left hand corner of the view. By placing the cursor over the line to be edited and double-clicking, or selecting the line and pressing "Enter" on the keyboard, the SEB configuration screen shown in FIG. 26-20 is displayed. The functions available on this screen are defined in the following paragraphs.

If type AVU selected, the Seating Arrangements Screen shown in FIG. 26-21 is displayed. This screen displays the AVU definitions for the appropriate area distribution box 217 and column and provides the ability to select a seat controller card 269 to edit its definition.

By placing the cursor over the line to be edited and double clicking, or selecting the line and pressing "Enter" on the keyboard, the AVU/SCC Configuration screen shown in FIG. 26-22 is displayed. The functions available on this screen are defined in the following paragraphs.

The Identification function is used to assign the seat box (SEB or SCC) to a specific set of seats. The Seat Row may be identified by selecting Seat Row ID and entering the value for the seat row. The Location field is used to identify whether the column is Outboard Left, Center, Outboard Right, Center Left, or Center Right (or None). Selections are made through a list of the available values. If an FDB is used to split this Seat Column, the FDB field is used to identify which FDB column the Seat Box or seat controller card 269 is on. The available settings are FDB1, FDB2, or None. Selections are made through a list of the available values. The Seat Letter fields are used to identify which specific seats on the designated Seat Row are to interface with this Seat Box. A Seat Box can interface with up to 4 PCUs, 3 seat display units 133, and 3 Phones. Four fields are provided to enter a Seat Letter between A and L. The Aircraft Configuration System allows any text to be entered in these four fields, but when an attempt is made to accept the changes on the screen by selecting "OK", the tool validates the fields. A seat controller card 269 can interface with PCU, seat display unit 133 and phone. One field is provided to enter seat letter between A and L.

The Seat Box (SCC) Capability fields identify the specific interfaces between the seats specified and the Seat Box. When selected, the check boxes indicates the presence of PCUs, seat display units 133, and Phones in the specified seats. The check boxes may only be selected if a Seat Letter has been identified for that field.

The aircraft configuration system is designed to support a system with maximum capability. For example, some Seat Boxes allow connections to up to 4 PCUs (the most common only support 3). Depending on what kind of Seat Boxes are used on your system, the number of connections available may not be as many as are allowed in the tool. The SCC Capability fields identify interfaces between the seats specified and the seat controller card 269. When selected, the check boxes indicates the presence of PCU, seat display unit 133, and phone in the specified seats. The check boxes may only be selected if a seat letter has been identified for that field.

The OK button is used to accept the changes made, close the screen, and return to the screen shown in FIG. 26-19. The Cancel button is used to abandon the changes made, close the screen, and return the user to the screen shown in FIG. 26-19.

To Define ADB Phone Information, when the user selects ADB Phone Setup from the Data Menu, the screen shown in FIG. 26-23 is displayed. This screen displays all the ADB Phone Connection information and provides the ability to select an area distribution box 217 to edit its definition. For each area distribution box 217 in the Phone "Daisy-Chain", the Master Phone and the Connection Order must be specified. For example, as shown in the ADB Phone Setup Screen of FIG. 26-23, the configuration being defined has a Phone "Daisy-Chain" where ADB 1 is the master and ADB 5 and ADB 6 are also connected in the "Daisy-Chain". The same information has to be entered for each area distribution box 217 (1, 5, and 6) in the "Daisy-Chain".

To close this screen, the button in the top left hand corner is double clicked, or Close is chosen from the menu that is pulled down by single clicking the button in the top left hand corner of the view. By placing the cursor over the line to be edited and double-clicking, or selecting the line and pressing "Enter" on the keyboard, the ADB Phone Setup Editing Screen shown in FIG. 26-24 is displayed. The functions available on this screen are defined in the following paragraphs.

The Master Phone ADB function allows the user to define which area distribution box 217 is defined as the Master Phone area distribution box 217. Data entry is accomplished by selecting from a list.

The Differential Input function is used to specify whether the type of phone input to the area distribution box 217 is differential or not.

For each area distribution box 217 in the "Daisy-Chain" the user must specify in which order they are connected. Data entry is accomplished through selection from a list.

The OK button is used to accept the changes made, close the screen, and return to the screen shown in FIG. 26-23. The Cancel button is used to abandon the changes made, close the screen, and return the user to the screen shown in FIG. 26-23.

Figures 25, 26:
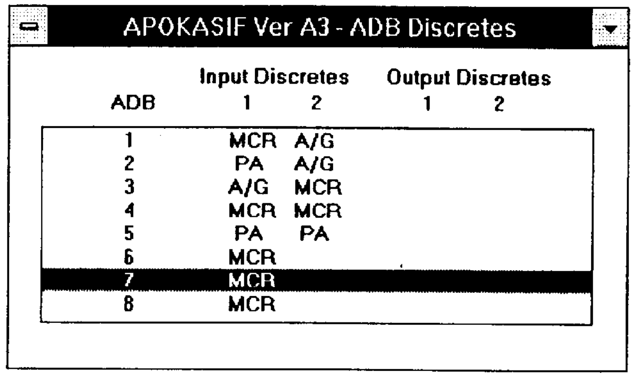
Figure 26:
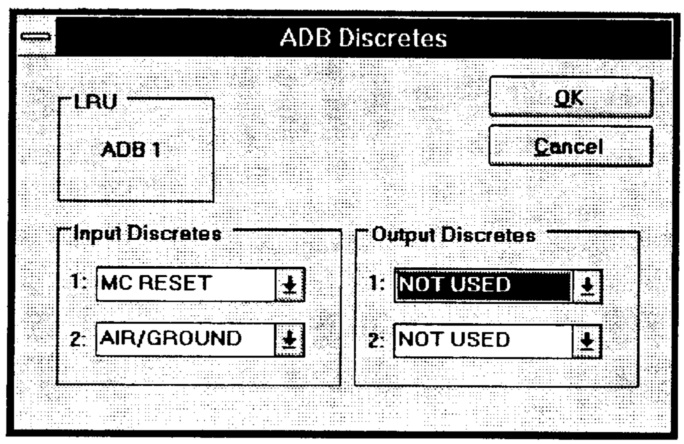

A Defining ADB Discretes function is chosen when the user selects ADB Discretes from the Data Menu, the ADB Discretes screen shown in FIG. 26-25 is displayed. This screen displays all the ADB Discrete information and provides the ability to select an area distribution box 217 to edit its definition. For each area distribution box 217, two input discretes and two output discretes are available for definition.

To close this screen, the button in the top left hand corner is double clicked, or Close is chosen from the menu that is pulled down by single clicking the button in the top left hand corner of the view. By placing the cursor over the line to be edited and double-clicking, or selecting the line and pressing "Enter" on the keyboard, the ADB Discretes Editing Screen shown in FIG. 26-26 is displayed. The functions available on this screen are defined in the following paragraphs.

The Input Discretes function allows the user to define what type of Input Discretes are processed by the selected area distribution box 217. Data entry is accomplished through selection from a list of available choices (NOT USED, AIR/GROUND, PA OVERRIDE, or MC RESET).

The Output Discretes function allows the user to define what type of Output Discretes are processed by the selected area distribution box 217. At this point in time, there has been no use determined for the two available ADB output discretes, so NOT USED is the only available selection.

The OK button is used to accept the changes made, close the screen, and return to the screen shown in FIG. 26-25. The Cancel button is used to abandon the changes made, close the screen, and return the user to the screen shown in FIG. 26-25.

Figures 26, 27:
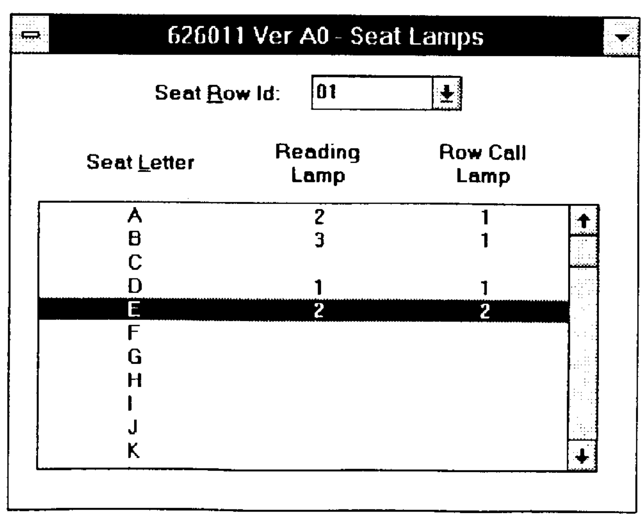

The Defining Seat Lamp Assignments function is only available for configurations which are defined for 747-100 and -200 Aircraft types. When the user selects Seat Lamps from the Data Menu, the Seat Lamps screen shown in FIG. 26-27 is displayed. This screen displays all the Seat Lamp information for a selected Seat Row and provides the ability to select a seat to edit its definition.

Figures 26, 27, 28:
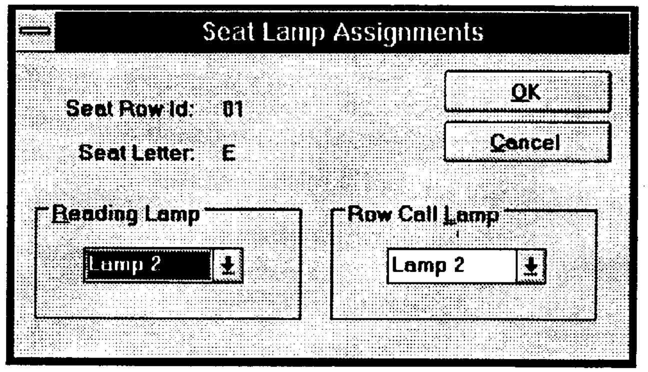

To close this screen, the button in the top left hand corner is double clicked, or Close is chosen from the menu that is pulled down by single clicking the button in the top left hand corner of the view. By selecting a Seat Row ID from the list function provided at the top of the screen, then placing the cursor over the line to be edited and double-clicking, or selecting the line and pressing "Enter" on the keyboard, the Seat Lamp Assignments Screen shown in FIG. 26-28 is displayed. The functions available on this screen are defined in the following paragraphs.

The Reading Lamp function allows the user to identify which of the four Reading Lamps (or none) in the overhead column is illuminated when the Reading Lamp button is pressed on the passenger control unit 121 for a specified seat. Data entry is accomplished through selection from a list of available choices (None, Lamp 1, Lamp 2, Lamp 3, or Lamp 4).

The Row Call Lamp function allows the user to identify which of the two Row Call Lamps (or none) in the overhead column is illuminated when the Attendant Call button is pressed on the passenger control unit 121 for a specified seat. Data entry is accomplished through selection from a list of available choices (None, Lamp 1, or Lamp 2).OK The OK button is used to accept the changes made, close the screen, and return to the screen shown in FIG. 26-27. The Cancel button is used to abandon the changes made, close the screen, and return the user to the screen shown in FIG. 26-27.

The Defining Master Call Lamps Information function is only available for configurations which are defined for 747-100 and -200 Aircraft types. When the user selects Master Call Lamps from the Data Menu, the Master Call Lamps screen shown in FIG. 26-29 is displayed. This screen displays all the Master Call information for a specified Master Call Zone and provides the ability to select an area distribution box 217 to edit its definition. For each area distribution box 217, two master call lamp outputs and two Master Call Reset discrete inputs may be defined.

To close this screen, the button in the top left hand corner is double clicked, or Close is chosen from the menu that is pulled down by single clicking the button in the top left hand corner of the view. By selecting a Zone from the list function provided at the top of the screen, then placing the cursor over the line to be edited and double-clicking, or selecting the line and pressing "Enter" on the keyboard, the ADB Master Call Lamps Editing Screen shown in FIG. 26-30 is displayed. The functions available on this screen are defined in the following paragraphs.

The Master Call Lamp function allows the user to indicate that the specified area distribution box 217 is to provide a lamp output for the left and/or right Master Call Lamp in the specified zone. Selection is accomplished via a check box for Left and Right.

The Master Call Resets function allows the user to indicate that the specified area distribution box 217 is to accept a discrete for the left and/or right Master Call Resets in the specified zone. Selection is accomplished via a check box for Left and Right.

The OK button is used to accept the changes made, close the screen, and return to the screen shown in FIG. 26-29. The Cancel button is used to abandon the changes made, close the screen, and return the user to the screen shown in FIG. 26-29.

The Defining Attendant Chimes function is only available for configurations which are defined for 747-100 and -200 Aircraft types. When the user selects Attendant Chimes from the Data Menu, the Attendant Chimes screen shown in FIG. 26-31 is displayed. This screen displays all the Attendant Chimes information for a specified Attendant Chime Zone and provides the ability to select an area distribution box 217 to edit its definition. For each area distribution box 217, two Attendant Chime outputs may be defined.

To close this screen, the button in the top left hand corner is double clicked, or Close is chosen from the menu that is pulled down by single clicking the button in the top left hand corner of the view. By selecting a Zone from the list function provided at the top of the screen, then placing the cursor over the line to be edited and double-clicking, or selecting the line and pressing "Enter" on the keyboard, the Attendant Chimes Editing Screen shown in FIG. 26-32 is displayed. The functions available on this screen are defined in the following paragraphs.

The Attendant Chime function allows the user to indicate that the specified area distribution box 217 is to output a discrete for the left and/or right Attendant Chimes in the specified zone. Selection is accomplished via a check box for Left and Right.

The OK button is used to accept the changes made, close the screen, and return to the screen shown in FIG. 26-31. The Cancel button is used to abandon the changes made, close the screen, and return the user to the screen shown in FIG. 26-31.

The Defining Overhead Electronics Box Connections function is only available for configurations which are defined for 747-100 and -200 Aircraft types. When the user selects Overhead Units from the Data Menu, the Overhead Electronic Box screen shown in FIG. 26-33 is displayed. This screen displays all the OEB information for a specified area distribution box 217 and overhead column and provides the ability to select an overhead electronic box to edit its definition. For each overhead electronic box, the user may identify the Seat Row and Column and identify whether an output is provided for up to four Reading Lamps and up to two Row Call Lamps.

To close this screen, the button in the top left hand corner is double clicked, or Close is chosen from the menu that is pulled down by single clicking the button in the top left hand corner of the view. By selecting a Zone from the list function provided at the top of the screen, then placing the cursor over the line to be edited and double-clicking, or selecting the line and pressing "Enter" on the keyboard, the OEB Seat Lamp Information Screen shown in FIG. 26-34 is displayed. The functions available on this screen are defined in the following paragraphs.

The OEB Location function allows the user to define the location of the specified overhead electronic box. Seat Row data entry is accomplished through direct text entry, with valid values of 01 through 99. Column ID data entry is accomplished through selection from a list of available values (None, Outboard Left (OL), Center (CNTR), or Outboard Right (OR)).

The Available Lamps function is used to define which lamps in the specified location are to receive outputs from the selected overhead electronic box. Data entry is accomplished with a check box for each of four Reading Lamps and for each of two Row Call Lamps.

The OK button is used to accept the changes made, close the screen, and return to the screen shown in FIG. 26-33. The Cancel button is used to abandon the changes made, close the screen, and return the user to the screen shown in FIG. 26-33.

The Defining ALAC Connections function is only available for configurations which are defined for 747-400 Aircraft types. When the user selects ALAC Information from the Data Menu, the ALAC Configuration screen shown in FIG. 26-35 is displayed. This screen displays ALAC Information and provides the ability to select an area distribution box 217 to edit its definition. For each area distribution box 217, the user may identify the Local Area Controller (LAC) the area distribution box 217 is to interface with and identify the Column lengths for each of four columns.

To close this screen, the button in the top left hand corner is double clicked, or Close is chosen from the menu that is pulled down by single clicking the button in the top left hand corner of the view. By placing the cursor over the line to be edited and double-clicking, or selecting the line and pressing "Enter" on the keyboard, the ALAC Column Length Screen shown in FIG. 26-36 is displayed. The functions available on this screen are defined in the following paragraphs.

The LAC Number function is used to define which LAC is to interface with the selected area distribution box 217. Selection is accomplished by selecting from a list of allowable values (None, LAC 1, LAC 2, LAC 3, LAC 4, or LAC 5).

The Column Lengths function is used to define the length of up to four columns of LACs. Definition is accomplished for each column through selection from a list of allowable values (0 through 31).

The OK button is used to accept the changes made, close the screen, and return to the screen shown in FIG. 26-35. The Cancel button is used to abandon the changes made, close the screen, and return the user to the screen shown in FIG. 26-35.

The Assigning SEB/SEU Mapping function is only available for configurations which are defined for 747-400 Aircraft types. When the user selects SEB/SEU Mapping from the Data Menu, the SEB/SEU Mapping screen shown in FIG. 26-37 is displayed. This screen displays SEU Information for a specified ALAC and Column and provides the ability to select an SEU to edit its definition. For each SEU, the user may identify the Seat Row it services and the Seat Letters in the row for up to four passenger control unit connections.

To close this screen, the button in the top left hand corner is double clicked, or Close is chosen from the menu that is pulled down by single clicking the button in the top left hand corner of the view. By selecting a LAC Number and the Column from the list functions provided at the top of the screen, then placing the cursor over the line to be edited and double-clicking, or selecting the line and pressing "Enter" on the keyboard, the SEU Configuration Screen shown in FIG. 26-38 is displayed. The functions available on this screen are defined in the following paragraphs.

The Seat Assignment function is used to define which seats are to be serviced by the specified SEU. The Seat Row ID is specified through direct text entry, with valid values of 1 through 99. Seat assignments to passenger control unit interfaces are accomplished by selecting from a list of allowable values (None, or A through L) for each of four passenger control units 121.

The OK button is used to accept the changes made, close the screen, and return to the screen shown in FIG. 26-37. The Cancel button is used to abandon the changes made, close the screen, and return the user to the screen shown in FIG. 26-37.

The Defining CIDS Seat Row Mapping function is only available for configurations which are defined for Airbus aircraft (A330s and A340s). When the user selects CIDS Seat Rows from the Data Menu, the CIDS screen shown in FIG. 26-39 is displayed. This screen displays the relationship between Seat Row Ids and the CIDS Seat Row Counter and provides the ability to select a Seat Row to edit the CIDS Seat Row Counter information.

To close this screen, the button in the top left hand corner is double clicked, or Close is chosen from the menu that is pulled down by single clicking the button in the top left hand corner of the view. By placing the cursor over the line to be edited and double-clicking, or selecting the line and pressing "Enter" on the keyboard, the CIDS Seat Row Identifier Screen shown in FIG. 26-40 is displayed. The functions available on this screen are defined in the following paragraphs.

The Seat Row function is used to define the relationship between the CIDS Seat Row Counter and the selected Seat Row ID. Data entry is accomplished through text entry, with valid values of 1 through 99.

The OK button is used to accept the changes made, close the screen, and return to the screen shown in FIG. 26-39. The Cancel button is used to abandon the changes made, close the screen, and return the user to the screen shown in FIG. 26-39.

The Define Standard Interface Information function is only available for configurations which are defined for 777 aircraft types. When the user selects Standard Interface from the Data Menu, the Standard Interface screen shown in FIG. 26-41 is displayed. This screen displays seat coverage information for a specified ASIF and provides the ability to define up to 12 areas of continuous seats which are serviced by the specified ASIF and to define which area distribution box 217 interfaces with the ASIF. After defining the seats that are covered by the ASIF, the location is defined by selecting the area distribution box 217 in which the ASIF card is installed.

To close this screen, the button in the top left hand corner is double clicked, or Close is chosen from the menu that is pulled down by single clicking the button in the top left hand corner of the view. By selecting an ASIF Number from the list functions provided at the top of the screen, then placing the cursor over the line to be edited and double-clicking, or selecting the line and pressing "Enter" on the keyboard, the Standard Interface Seat Range Screen shown in FIG. 26-42 is displayed. The functions available on this screen are defined in the following paragraphs.

The Seat Range function is used to define the (continuous) range of seats for the selected Index and ASI F. Data entry is accomplished through direct text entry and valid values are 1 through 99 for Rows and A through L for Seats.

The OK button is used to accept the changes made, close the screen, and return to the screen shown in FIG. 26-41. The Cancel button is used to abandon the changes made, close the screen, and return the user to the screen shown in FIG. 26-41.

When the user selects Display Controller Settings from the Data Menu, the Display Controller Settings screen shown in FIG. 26-43 is displayed. This screen displays the range of seats defined in the selected zone, along with the touchscreen resolution, volume, brightness, and IR sensor settings.

By clicking on the selected line or pressing "Enter" on the keyboard, the Seat Range Definition Screen shown in FIG. 26-44 is displayed. The functions available on this screen are defined in the following paragraphs.

The Seat Range function is used to identify the group of seats defined for the selected zone. Valid values of 1–99 may be entered in the Seat Row and End Row fields, and A–L may be selected for the start seat and end seat fields.

The Touchscreen Resolution area allows the resolution of the touchscreens for the seats selected to be defined. By selecting the Enabled option, the columns and rows may be entered. If there is no touchscreen in the selected seats, Disabled is chosen.

The IR Sensor area allows the time-out for the IR sensor to be defined. The IR sensor is physically located on the back of the display unit and detects when the unit is placed in the seat back. By choosing the Enabled option, the time-out (in minutes) can be entered with a valid range of 1–254. If the Default value is 0, and the display unit shuts off after 5 minutes. To disable the IR sensor, select the Disabled option.

The Defaults area allows the default value for the Brightness and Volume to be selected. Valid values are between 1–100 to represent the full scale percentage.

To map audio sources, when the user selects Audio Sources from the Data Menu, the screen shown in FIG. 26-45 is displayed. The Audio Sources screen displays the relationship between Audio Channels and Timeslot assignments and provides the ability to select an Audio Channel to edit the Timeslot assignment information.

To close the Audio Sources screen, the button in the top left hand corner is double clicked, or Close is chosen from the menu that is pulled down by single clicking the button in the top left hand corner of the view. By placing the cursor over the line to be edited and double-clicking, or selecting the line and pressing "Enter" on the keyboard, the Audio Channel Arrangement Screen shown in FIG. 26-46 is displayed. The functions available on this screen are defined in the following paragraphs.

The Audio Timeslots function is used to assign the Audio Timeslots to the selected Audio Channel. Data entry is accomplished through direct text entry and valid values are 1 through 90.

The OK button is used to accept the changes made, close the screen, and return to the screen shown in FIG. 26-45. The Cancel button is used to abandon the changes made, close the screen, and return the user to the screen shown in FIG. 26-45.

To assign Video Players, when the user selects Video Sources from the Data Menu, the Video Players screen shown in FIG. 26-47 is displayed. This screen displays the relationship between Video Channels and Timeslot assignments and provides the ability to select a Video Channel to edit the Timeslot assignment information.

To close this screen, the button in the top left hand corner is double clicked, or Close is chosen from the menu that is pulled down by single clicking the button in the top left hand corner of the view. By placing the cursor over the line to be edited and double-clicking, or selecting the line and pressing "Enter" on the keyboard, the Video Source Setup Screen shown in FIG. 26-48 is displayed. The functions available on this screen are defined in the following paragraphs.

The Video Information function is used to define which video channel the selected player is assigned to and to indicate what type of video source and type it is. The video channel field is modified through text entry, with a valid range of 1 through 16. The Source Type is modified by selecting from a range of allowable values (Movie, Skymap, Skymap/Movie, SkyCamera). The Player Type is modified by selecting from a range of allowable values (SVHS, Sony, TEAC—Triple, TEAC—Single).

The Deck and Port fields are used to define player communications. The Deck field is defined by selecting from a range of allowable values (1 to 3). The Deck field represents which player is being used on the video player. For example, the TEAC triple deck has three players; therefore, if 2 is selected, then the definition is for the second player on the TEAC triple deck. This field is only required for the TEAC triple deck player. If the selected Player Type is not the TEAC triple deck and a value for the Deck field is selected, then the Deck selection window is closed and no value is entered in the Deck field. The Port field is defined by selecting from a range of allowable values (1 to 16). The Port field represents which RS-485 communications port from the cabin file server 268 is being used to communicate with the player. The Port field is required for all of the player types except for the SVHS. If the selected Player Type is SVHS and a value for the Port field is selected, then the Port selection window is closed and no value is entered in the Port field.

The Audio Timeslots function is used to define which audio timeslots are assigned to the audio outputs of the video player 227. The player may output up to four tracks of audio. These tracks could contain any combination of mono and stereo sound for up to 4 languages (2 languages-stereo, to 4 languages—mono, or some combination thereof). Timeslot assignments are accomplished through direct text entry, with valid values from 1 through 90. If a timeslot is assigned to one channel (left or right), a timeslot must also be assigned to the other channel for a given language (if the output of the video players for a given language is mono, assign the same timeslot to left and right).

The OK button is used to accept the changes made, close the screen, and return to the screen shown in FIG. 26-47. The Cancel button is used to abandon the changes made, close the screen, and return the user to the screen shown in FIG. 26-47.

To define Audio Channel Arrangements, when the user selects Audio Channels from the Data Menu, the Audio Channel screen shown in FIG. 26-49 is displayed. This screen displays up to 32 lines of Audio Channel information for a specified Zone and provides the ability to select an index to edit its definition.

To close this screen, the button in the top left hand corner is double clicked, or Close is chosen from the menu that is pulled down by single clicking the button in the top left hand corner of the view. By selecting a Zone Name from the list function provided at the top of the screen, then placing the cursor over the line to be edited and double-clicking, or selecting the line and pressing "Enter" on the keyboard, the Audio Channel Arrangement Screen shown in FIG. 26-50 is displayed. The functions available on this screen are defined in the following paragraphs.

The Channel Information function is used to define which value is to be shown on the PCU display for this channel and whether or not this is the default channel for Audio Programming. The data entry for the PCU Display field is accomplished through text entry. A check box is used to define whether the channel being edited should be the default channel. Only one audio channel should be assigned as the default.

The Audio Source function is used in conjunction with the Source function (below) to define which channel is to be mapped to this PCU display channel. Data entry for this field is accomplished through text entry. Valid values are determined by the number of configured channels. When a value is entered in the channel field, and "Enter" is selected on the keyboard, values should appear next to the "Timeslots" legend on this screen. If no timeslot assignments appear, the user should return to the "Audio Sources" or "Video Sources" screen, as is applicable, to verify that the channel entered here has been defined.

The Source function is used in conjunction with the Audio Source function (discussed in the previous paragraph) to define which channel is to be mapped to the selected PCU Display Channel. Data entry for this function is accomplished by clicking on one of the circles adjacent to the available options (Audio Source, Video Language 1, or Video Language 2). As indicated in the previous paragraph, when this selection is made, values should appear next to the "Timeslots" legend on this screen. If no timeslot assignments appear, the user should return to the "Audio Sources" or "Video Sources" screen, as is applicable, to verify that the channel entered here has been defined.

The OK button is used to accept the changes made, close the screen, and return to the screen shown in FIG. 26-49. The Cancel button is used to abandon the changes made, close the screen, and return the user to the screen shown in FIG. 26-49.

To define Video Channel Arrangements, when the user selects In-Seat Video Channels from the Data Menu, the In-Seat Video Channels screen shown in FIG. 26-51 is displayed. This screen displays up to 32 lines of Video Channel information for a specified Zone and provides the ability to select an index to edit its definition.

To close this screen, the button in the top left hand corner is double clicked, or Close is chosen from the menu that is pulled down by single clicking the button in the top left hand corner of the view. By selecting a Zone Name from the list function provided at the top of the screen, then placing the cursor over the line to be edited and double-clicking, or selecting the line and pressing "Enter" on the keyboard, the In-Seat Video Channel Arrangement Screen shown in FIG. 26-52 is displayed. The functions available on this screen are defined in the following paragraphs.

The Channel Information function is used to define which value is to be shown on the PCU display for this channel and whether or not this is the default channel for Video Programming. The data entry for the PCU Display field is accomplished through text entry. A check box is used to define whether the channel being edited should be the default channel. Only one video channel should be assigned as the default.

The Player function is used in conjunction with the Language function (below) to define which channel is to be mapped to the specified PCU display channel. Data entry for this field is accomplished through selection from a list of available values (None, or VTR 1 through VTR 16). A video tape reproducer 227 should only be assigned if it has been configured. When a value is selected for Player Number, values should appear next to the "Timeslots" legend on this screen. If no timeslot assignments appear, the user should return to the "Video Sources" screen, to verify that the player entered here has been configured.

The Language function is used in conjunction with the Player function (discussed in the previous paragraph) to define which channel is to be mapped to the selected PCU Display Channel. Data entry for this function is accomplished by clicking on one of the circles adjacent to the available options (Video Language 1, Video Language 2, Video Language 3, or Video Language 4). As indicated in the previous paragraph, when this selection is made, values should appear next to the "Timeslots" legend on this screen. If no timeslot assignments appear, the user should return to the "Video Sources" screen, to verify that timeslots have been assigned for the language selected here.

Free Movie Mode was originally intended to provide status to indicate whether or not to charge for a particular channel if the system configuration included revenue functions. Since then, it was decided that this function would be handled with other revenue functions in the cabin file server database 493. However, this field is used if a system is in distributed video mode. If distributed video mode is used, then only those movies that are marked as free will play.

The OK button is used to accept the changes made, close the screen, and return to the screen shown in FIG. 26-51. The Cancel button is used to abandon the changes made, close the screen, and return the user to the screen shown in FIG. 26-51.

In order to define tapping unit information, when the user selects tapping units from the Data Menu, the tapping units information screen shown in FIG. 26-53 is displayed. This screen displays up to 16 lines of tapping unit information for a specified column and provides the ability to select a tapping unit to edit its definition.

To close this screen, the button in the top left hand corner is double clicked, or Close is chosen from the menu that is pulled down by single clicking the button in the top left hand corner of the view. By selecting a Column from the list function provided at the top of the screen, then placing the cursor over the line to be edited and double-clicking, or selecting the line and pressing "Enter" on the keyboard, the tapping unit editing Screen shown in FIG. 26-54 is displayed. The functions available on this screen are defined in the following paragraphs.

The Overhead Display Units function is used to provide definition for the specified tapping unit for an interface up to 3 overhead display units. For each overhead display unit, a PA/VA Zone, a Seat Class, and the Type of unit must be defined. Data entry for all these fields is accomplished by selection from a list of available choices. The Description field is required only if the airline customer requires control of individual overhead monitors. In this situation, the data in this field is defined by the customer. The data entered is displayed in the airline-specific GUI so that the flight attendants know which overhead monitors they are controlling. The choices available for selection are defined below.

| Field Type | Selectable Values |
|---|---|
| PA/VA Zone | None or 1 through 8 |
| Seat Class | None or 1 through 8 |
| Type | None, CRT, LCD, CRT Retract, LCD Retract, or Projector |
| Description | Up to 20 ASCII characters |

The OK button is used to accept the changes made, close the screen, and return to the screen shown in FIG. 26-53. The Cancel button is used to abandon the changes made, close the screen, and return the user to the screen shown in FIG. 26-53.

In order to edit Zone Definitions, when the user selects Zone Definitions from the Data Menu, the Zone Definitions screen shown in FIG. 26-55 is displayed. This screen displays Zone Definition information for a specified Zone Type and Zone Name and provides the ability to select an Index within a Zone for editing. Each Zone Type can be broken up into an allowable number of Zones, which are defined by their Zone Name. Additionally, each Zone defined by a Zone Name can be made of up to twelve continuous groups of seats. The various Zone Types, and the allowable number of Zones within the type are defined below.

| Zone Type | Number of Zones |
|---|---|
| Channel Arrangements | 20 |
| Passenger Announcements | 8 |
| General Service | 8 |
| Duty Free Areas | 8 |
| Seating Classes | 8 |
| Master Call Lamps | 16 |
| Attendant Chimes | 16 |

Channel Arrangement zones define the audio channels for all zones. Passenger Announcement zones define which seats are associated with each PA zone. General Service and Duty Free zones are currently not used. Seating Class zones define which seats are associated with each seat class (i.e., upper class, economy class, etc.). Master Call Lamps zones define which seats are associated with each master call lamp zone. Attendant Chime zones define which seats are associated with each attendant chime zone.

To close the Zone Definitions screen, the button in the top left hand corner is double clicked, or Close is chosen from a menu that is pulled down by single clicking the button in the top left hand corner of the view. By selecting a Zone Type and a Zone Name from the list functions provided at the top of the screen, then placing the cursor over the line to be edited and double-clicking, or selecting the line and pressing "Enter" on the keyboard, the Seat Range Definition Screen shown in FIG. 26-56 is displayed. The functions available on this screen are defined in the following paragraphs.

The Seat Range function is used to identify the group of seats which defines the selected Index for specified Zone Name and Zone Type. Data entry is accomplished through direct text entry, and valid values for Rows are 1 through 99 and valid values for seats are A through L. The OK button is used to accept the changes made, close the screen, and return to the screen shown in FIG. 26-55. The Cancel button is used to abandon the changes made, close the screen, and return the user to the screen shown in FIG. 26-55.

Defining Zone Names will now be discussed. When the user selects Zone Names from the Data Menu, the Zone Names screen shown in FIG. 26-57 is displayed. This screen displays Zone Name information for a specified Zone Type and provides the ability to select an Index within a Zone Type for editing. Each Zone Type can be broken up into an allowable number of Zones, which are defined by their Zone Name. The different Zone Types and allowable number of zones within the type are defined as discussed above.

To close this screen, the button in the top left hand corner is double clicked, or Close is chosen from the menu that is pulled down by single clicking the button in the top left hand corner of the view. By selecting a Zone Type from the list function provided at the top of the screen, then placing the cursor over the line to be edited and double-clicking, or selecting the line and pressing "Enter" on the keyboard, the Zone Name Definition Screen shown in FIG. 26-58 is displayed. The functions available on this screen are defined in the following paragraphs.

The Zone Name function is used to assign a Zone Name to an Index within a Zone Type definition. Data entry is accomplished through text entry. The field is free form and allows the use of any 20 characters. The OK button is used to accept the changes made, close the screen, and return to the screen shown in FIG. 26-57. The Cancel button is used to abandon the changes made, close the screen, and return the user to the screen shown in FIG. 26-57.

The software design for the system 100 will now be described in detail. Relevant software modules of an exemplary software architecture used in the system 100 are shown in FIG. 27 and include the camera control CAPI service calls and the ARINC-485 network addressable unit (NAU) in a Common Executive running on the cabin file server 268. Software in the cabin file server 268 interfaces to an ARINC-485 driver by way of an ARINC-485 network addressable unit (NAU) in the software running on the cabin file server 268. Commands are entered at the primary access terminal 225 are sent to the cabin file server 268 over the 100 Base-T Ethernet network 228. These commands are then forwarded to the landscape cameras 213 to turn them on and off and control their pointing directions.

To provide control from passenger seats 123, the microprocessor 269 in the audio-video unit 231 includes software that performs substantially the same functions as those in the primary access terminal 225. This may be achieved by selectively downloading a software module to the microprocessor 269 in the audio-video unit 231 when the passenger 117 requests this service. The downloaded software module operates in the same manner as the software on the primary access terminal 225. However, the RS-485 interface is used to send commands to the cabin file server 268 that control the ARINC-485 driver. Alternatively, and preferably, use of an Ethernet network 228 to interconnect the audio-video units 231 provides a readily implemented control path directly to the primary access terminal 225 and cabin file server 268, since they are normally connected by way of the Ethernet network 228.

Another way in which control of the landscape cameras 213 may be provided in accordance with the present invention is by using a networked software implementation with the software control application running on the "server", which may be either the primary access terminal 225 or the cabin file server 268. Again, using the 100 Base-T Ethernet network 228 provides for a simple means to network the processors. Because there are a limited number of landscape cameras 213 (typically three) that are controllable, only three client processors would need to access the server processor to operate the control software.

Presented below is detailed software design information for a set of programs common to the cabin file server 268 and primary access terminal 225 LRUs of the system 100. It forms the fundamental mechanism of moving application information through the system 100. The following description will be readily understood to those familiar with C++ and the Windows NT development environment. Reference is made to FIG. 27, which illustrates a block diagram of the software architecture in accordance with a preferred embodiment. The architecture facilitates a control center runtime that is implemented in C++ for the primary access terminal 225 and the cabin file server 268 of an in-flight entertainment system 100 in accordance with a preferred embodiment.

As for the primary access terminal 225, an uninterruptable power supply 400 is used to provide power to the primary access terminal 225 and is in communication with the programs in the software architecture using a serial NT driver 401. A PI board 402 provides a communication port for the magnetic card reader **121*d* and video tuner and interfaces to the serial NT driver 401. The tuner 235 in the audio-video unit 231 also interfaces to the serial NT driver 401. The video camera 267 coupled to the audio-video unit 231 is also coupled to the serial NT driver 401. The serial NT driver 401 also interfaces with the PESC-V 224*b*. An ARCNET driver 408 interfaces to the ARCNET network 216**.

The serial NT driver 401 and ARCNET driver 408 interface to the I/O handler 403 to provide selective communications between a message processor 404 and the various communications devices (400, 401, 235, 267). The message processor 404 is responsible for processing messages and putting them into a common format for use by a transaction processor 421. An I/O handler 403 is used to interface between the serial NT driver 401, the ARCNET driver 408 and the message processor 404. A pipe processor 405 is utilized to move common format messages from the message processor 404 through a primary access terminal network addressing unit (NAU) program 409 and through another pipe processor 420 into a transaction manager 421. The message processor 406 also interfaces to a system monitor 412 that is coupled to a watch dog timer 410 that is used to automatically reset the primary access terminal 225 if no activity is detected in a given time interval, and a power down module 414 that performs graceful power down of the primary access terminal 225. The transaction dispatcher 421 interfaces with a CAPI Library DLL 427 by means of a CAPI message service handler 422.

A touch panel NT driver 424 interfaces with runtime utilities 425 and a graphical user interface (GUI) 426 to provide operator control over the software. The runtime utilities 425 and graphical user interface 426 interface to the CAPI Library DLL 427, a Reports DLL 429 and a video driver DLL and system (SYS) 430.

The Ethernet network 228 is used for messaging between the primary access terminal 225 and the cabin file server 268. The Ethernet network 228 interfaces to the primary access terminal network addressing unit 409, the transaction dispatcher 421, the CAPI Library DLL 427, and the Reports DLL 429.

As for the cabin file server 268, an uninterruptable power supply 440 is used to provide power to the cabin file server 268, and is in communication with the programs in the software architecture using a serial NT driver 447. The serial NT driver 447 is also coupled to an auxiliary port 441 and the video reproducers 227. An ARINC-429 NT driver 440 is coupled to the satellite broadcast receiver 240 and the satellite communication system 241. An ARCNET driver 450 interfaces to the ARCNET network 216. A high speed data link (HDSL) NT driver 449 interfaces to the video modulator 212*b*.

The serial NT driver 447, ARCNET driver 450 and ARINC-429 NT driver 448 interface to the I/O handler 451 to provide selective communications between the message processor 452 and the various communications devices (440, 441, 227, 216, 212*b*). A message processor 452 is responsible for processing messages and putting them into a common format for use by a transaction processor 473. An I/O handler 452 is used to interface between the serial NT driver 447, the ARCNET driver 408, the ARINC-429 NT driver 440 and the message processor 452. A pipe processor 454 is utilized to move common format messages from the message processor 452 through various network addressing units 460–464 and through another pipe processor 470 into a transaction manager 473. The network addressing units 460–464 include a Test Port NAU program 460, a VCP NAU program 461, a Backbone NAU program 462, an ARINC-485 NAU program 463 and a Seat NAU program 464.

The message processor 406 also interfaces to a system monitor 412 that is coupled to a watch dog timer 410 that is used to automatically reset the primary access terminal 225 if no activity is detected in a given time interval, and a power down module 414 that performs graceful power down of the primary access terminal 225. Each of the network addressing units 460–464 are coupled to the system monitor 412. The system monitor 412 is also coupled to the transaction dispatcher 421. The transaction dispatcher 421 interfaces with CAPI services 477 that are called from the CAPI message service handler 422 in the primary access terminal 225. The transaction dispatcher 421 also interfaces to the primary access terminal 225 by way of the Ethernet network 228.

Cabin Application Programming Interface (CAPI) calls 476 are used to communicate information (as shown by arrow 475) between various cabin services 477 and the primary access terminal 493 via the Ethernet network 228 and various service interfaces 432, 478, 423, 416. The separate communication link for the crystal reports 429 is enabled through object oriented data base calls 434 to the Standard Query Language (SQL) server 492. The cabin services 477 include CAPI calls 476 with predefined formats for various services. The services include in-flight entertainment (IFE) control 478, movie cycle 479, video services 480, video announcement 481, game rental 482, movie sales 483, catalog sales 484, drink sales 485, duty-free sales 486, landscape camera 487, media server 488, Internet 489 and teleconferencing 490. Each of these services are controlled by way of the SQL server 492 which is coupled to a relational database 493 and are configured by means of runtime database utilities 491. The various services 478–490 are routed by way of the pipe processor 474 to the transaction dispatcher 473, through the associated NAU program 160–164, the message processor 253, and the relevant driver 247, 248, 249, 250, to the appropriate device 240, 241, 227, 240, 241, 216, 212*b*.

More specifically, the software comprises a Control Center Common Executive that includes the Message Processors 406, 453, Transaction Dispatcher 421, 474, and Network Addressable Unit programs 409, 460–464 that together manage communications flow among line replaceable units and applications, and record or log system irregularities for subsequent analysis. The executive efficiently moves information from source to destination with a minimum of system resources, provides real-time expense or over-handling, provides a means to allow communications to originate at any source, including periodic status messages such as those to the primary access terminal 225 from the video players 227, and provides a consistent method of handling existing line replaceable units while allowing for additional line replaceable units.

The System Monitors 412, 465 are provided that launch all application programs and shuts them down as needed. In addition, the Common Executive stores drivers that are not already part of the operating system. Each line replaceable unit type that communicates with the Control Center has a corresponding Network Addressable Unit (NAU) program 460–464. For example, any seat 123 that must communicate routes to the seat NAU program 464, any video cassette player 227 routes to the VCP NAU program 461, etc.

Each time a line replaceable unit communicates with an NAU program 460–464, a Virtual LRU is used to maintain cohesion between the application (service) and the device (driver). The Virtual LRU is in fact a state machine, one for each physical device associated to this NAU type. For example, if two seats "001A" and "021J" are communicating with the control center, two virtual Seat LRUs exist within the seat NAU program 460–464. It is within this state machine that the actual conversion between IFE-Message and native messages takes place. Status and other information regarding each line replaceable unit is maintained in the VLRU.

In addition to the device-initiated VLRUs, several VLRUs are provided whose function is to maintain the status of related devices. For example, the primary access terminal 225 must constantly monitor the status of the printer, so a VLRU for the printer was developed in primary access terminal NAU program 409 to do the job. Similarly, the seats must be kept apprised of changes to the states of the system, so a VLRU for broadcasting this information was created in the seat NAU program 464.

The detailed aspects of the software will now be discussed. All NAU programs have two classes in common, and which are kept in a NAULIB.LIB file, along with RPC Client support software, in the following source files:

NDSPATCH.CPP NAUDispatch Class

NAU.CPP NAU Class for VLRU support

CAPI_C.C RPC Client Support Utilities

In general, a Network Addressable Unit program must first construct an NAUDispatch object and then construct one or more NAU objects, one for each VLRU that it supports. Certain VLRU-specific functions (such as NAU::StartItUp( )) must be created for each VLRU type. The network addressable units function and data paths are shown in FIG. 28.

Referring to FIG. 28, the message processor (MP) 404 and the transaction dispatcher (TD) 421 communicate by way of a Network Addressable Unit (NAU) dispatcher 500 that comprises NAU Dispatch. NAUDispatch is a base class that contains the code necessary to open a framework for a new Network Addressable Unit. It contains the following global objects:

| | |
|---|---|
| Qpair MP_Fifos | Qpair MP_Fifos keep track of traffic between the NAU and the Message Processor. The NAU Object Ids are stored in these two queues. |
| Qpair TD_Fifos | Qpair TD_Fifos keep track of traffic between the NAU and the Transaction Dispatcher. The NAU Object Ids are stored in these two queues. |
| Queue RunImmediateFifo | The Queue RunImmediateFifo keeps track of NAUs which require immediate attention, regardless of outside messages. |
| Queue TimedOutFifo | The Queue TimedOutFifo allows an NAU VLRU to time out, thus giving processing over to others until the time out occurs. |
| Queue DestructFifo | The Queue DestructFifo is used by shutItDown( ) to cause each VLRU to shut down. |
| Queue AuxFifo | The Queue AuxFifo is used in Session.cpp of Seat.exe only. |

Only the first constructor call per program uses InitNAUDispatch( ) to start all session threads 507 (one for each VLRU plus 2 up to a maximum of 14) for the NAU. It opens Named Pipes 519 between the message processor 404 and the transaction dispatcher 421 Fifos 501, 502 and the session threads 507 to manage I/O between them. It then initiates threads 511–514 that manage input and output between the message processor 404 and the transaction dispatcher 421 (MPLef( )) 511, MPRight( ) 512, TDLeft( ) 513 and TDRight( ) 514). Once these initialization steps have been accomplished, the main program constructs NAU state machine objects 510 (also called VLRUs).

In addition, this class contains the following utility functions:

| | |
|---|---|
| AddNAU( ) | This routine adds a VLRU object ID to an array for later lookup (to send it a message or shut it down, for example). |
| AddNAUMAP( ) | This routine adds a VLRU object ID and its text name to an array for later lookup. |
| FindNAU( ) | Returns the VLRU object ID based on the text name passed to it. |
| GetNthNAU( ) | Returns the VLRU object ID in the 'nth' position in the array. |
| GetNumberOfNAUs( ) | Returns the number of VLRU object Ids in the array. |
| RemoveNAUFromMap( ) | This routine removes a VLRU object ID and its text name from the array. |
| SendToAllVLRUs( ) | This routine sends the same message to all VLRUs via their MPRight.queue, as if it was sent via the MP. It uses MP logic as a short-cut, rather than developing more routines for intra-process communication. |
| SendToOneVLRU( ) | This routine sends a message to a single VLRU via its MPRight.queue, as if it was sent via the MP. It uses MP logic as a short-cut, rather than developing more routines for intra-process communication. |
| shutItDown( ) | This routine is used to turn off all VLRUs, typically called because a message was sent by the System Monitor to the main( ) routine to do so. |
| startItUp( ) | The startItUp( ) routine is used to start up all VLRUs. |

The MPRight( ) Thread routine 512 continuously waits for incoming messages from the Message Processor 404 via the Named Pipe 519. The term 'right' indicates that the data moves from left-to-right in FIG. 28.

The MPRight( ) Thread 512 uses the IFE Message Class routines to deal with the data received. Once a message is received using IFE_Message::GetData( ), it looks up the appropriate VLRU name (IFE_Message::GetAddress( )) and uses it to look up the appropriate NAU object ID (FindNAU( )). Then it stores the incoming message in that NAU's MPQueue.Right queue 516*a* and places the NAU's ID into the Dispatcher's MP_Fifos.Right queue (MPPutNAU( )) 501. This ID is then used by the Session threads 507 that are constantly running to decide which VLRU needs to be processed.

A "hook" function pointer is provided with this thread to allow applications to pre-process the message prior to MPRight( )'s storage. If no hook function is defined, this is ignored.

The M PLeft( ) Thread routine 511 continuously waits for outgoing messages for the Message Processor 404. The term "left" indicates that the data moves from right-to-left in FIG. 28. It uses the IFE Message Class routines to deal with received data.

Using Queue::Get( ) it reads the NAU ID from the MP_Fifos.Left queue 501 then uses that NAU's MPGetNAU( ) function to read the data from its MPQueue.Left 517*a*, and uses IFE_message::PutData( ) to output the message via the Named Pipe 519.

The TDLeft( ) Thread 513 behaves like MPRight( ), except that the input comes from the Transaction Dispatcher 421. The TDRight( ) Thread 514 behaves like MPLeft( ), except that the output goes to the Transaction Dispatcher 421.

It is sometimes impractical for all VLRUs to be running at once (for example, the seat NAU can contain more than 500 VLRUs), so a maximum number of processing threads has been established as 14. These threads 511–514 each execute a Session( ) function 507 which waits for an event such as input from any source (message processor 404, transaction dispatcher 421, TimeOut, etc.), then determines which VLRU state machine needs to be run to process the message and executes it via the VLRU's StartItUp( ) function 518 called by NAU::EntryPt( ). When EntryPt( ) returns, the message is fully processed, and Session( ) loops to get another one.

The NAU class contains foundation routines and data for any VLRU. It is derived from the timed Callback class and Cobject class (from a C++ Foundation Class Library). The NAU constructor makes an object that has TDQueue and MPQueue, two Qpair objects. These queues are used to store the actual data or IFE_Message needed by the VLRU state machine. The NAU constructor also creates three Event Semaphores, including a RunImmediateEvent semaphore, a TimeOutEvent semaphore and an AuxEvent semaphore, which allow it to control processing via the related Queues in the NAU dispatcher 500. Finally, the NAU constructor creates one mutex, DispatchMutex which coordinates which Session thread can access the data for a given VLRU (in case two threads try to handle messages for the same VLRU).

The StartItUp( ) function 518 (not the same as NAUDispatch::startItUp( )) is called by NAUDispatch::Session( ) when a message is ready to be processed by the VLRU. The StartItUp( ) function 518 typically varies per VLRU, but it's job is to fully process one message received from any source. That may simply mean passing the message on, say from message processor 404 to transaction dispatcher 421 or vice-versa.

Data Movement Functions will now be discussed. The NAU class contains the following members used to move data to and from the message processor 404 and the transaction dispatcher 421:

MPGetNAU( ) Moves data from MPQueue.Left for output to the MP.

MPPutNAU( ) Moves data from input from MP to MPQueue.Right.

NAUGetMP( ) Moves data from MPQueue.Right into StartItUp( ) for processing.

NAUGetTD( )Moves data from TDQueue.Left into StartItUp( ) for processing.

NAUPuTMP( ) Moves data from StartItUp( ) into MPQueue.Left for later output.

NAUPutTD( ) Moves data from StartItUp( ) into TDQueue.Right for later output.

TDGetNAU( ) Moves data from TDQueue.Right for output to the TD.

TDPutNAU( ) Moves data from input from the TD to TDQueue.Left.

Other generic NAU functions include:

| | |
|---|---|
| bOKToRun( ) | Reports to NAU Dispatch whether a VLRU is ready to run. The base version of this always returns TRUE. |
| EntryPt( ) | This launches the VLRU's own StartItUp( ) function. |
| get_hTimeOutEvent( ) | Returns the value of the Time Out Event handle. |
| get_hVLRUEvents( ) | Returns a pointer to all the Event Handles used by this session to get Input. |
| get_NAUState( ) | Returns the current state of the VLRU. If "Active", the VLRU is capable of processing information. If "Inactive", it can't take any messages. For example, if the system is not currently allowing game play, the HSDL VLRU would be "Inactive". |
| GetBITEStatus( ) | This function varies from VLRU to VLRU and is only a placeholder in the base class. |
| GetMPQPair( ) | Returns a pointer to the MP Queues - lets the user bypass the entire message traffic philosophy. |
| GetName( ) | Returns the text name of the current NAU VLRU. |
| GetTDQPair( ) | Returns a pointer to the TD Queues - lets the user bypass the entire message traffic philosophy. |
| GetUseMessageCounter( ) | Retrieves a flag set with SetUseMessageCounter( ). |
| set_NAUState( ) | Used to control the state of the VLRU state machine. Currently, the two states used are "Active" and "Inactive". |
| SetUseMessageCounter( ) | Sets a flag used by NAUDispatch::Session( ). If TRUE, Session( )counts messages for the VLRU. |

Figures 26, 27, 28, 29:
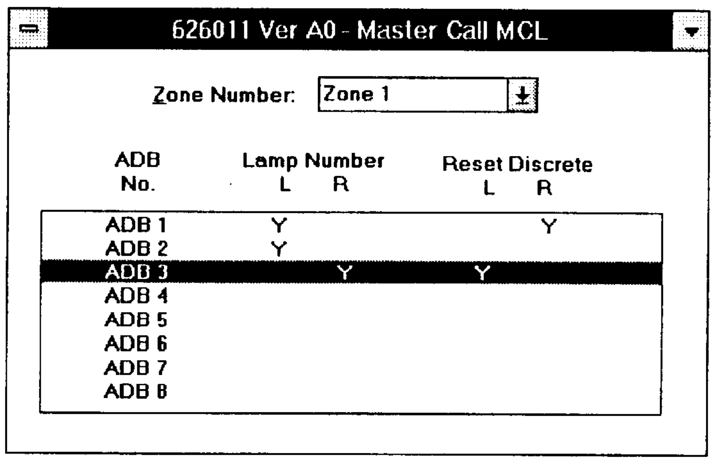

The Message Processor 404 will now be discussed with reference to FIG. 29, which illustrates the Message Processor Function and Data Paths. The primary duty of the Message Processor 404 is to move communications between various I/O devices and their appropriate logical devices, the Network Addressable Unit (NAU) 533. This duty is assigned to the Message Processor 404 instead of residing with the NAUs 533 because there is no one-to-one correspondence between the NAUs 533 and the device drivers 431. For example, several devices' communications may arrive via an ARCNET driver 431*a* (i.e., passenger entertainment system controller 224, seat 123, area distribution box 217, and AVU/SEB 231).

To support this duty, the Message Processor 404 includes the following sub-functions. Using an I/O Handler 432, the Message Processor 404 receives messages from the device drivers 531. Each message, regardless of original format must contain a destination or Network Address for routing purposes. Using this Network Address, coupled with the Device Type (i.e., ARCNET, RS-232, etc.) it determines the appropriate NAU via a look-up table 434 and routes the message to that NAU. Since communications from the devices employ a variety of protocols, they are bundled into an IFE-Message upon receipt from the physical device, and unbundled after receipt from the application services (via the NAUS). In this way, the Message Processor 404 acts as a system translator. Using Named Pipes 535, the Message Processor 404 receives messages from the NAUs. It determines the appropriate Device Driver 431 and Network Address and routes the message to the device. As NAUs demand, the Message Processor 404 creates two Named Pipes 535 (input and output) for each NAU, maintaining the table 534 of pipe names (or handles) and their corresponding NAU IDs. The Message Processor 404 logs invalid destination address errors. The Message Processor 404 registers with the system monitor 412 for coordinated system operation.

The Message Processor 404 comprises a plurality of device drivers 531, including an ARCNET driver 531*a* and a serial NT driver 531*b*. The device drivers 531 are coupled to a plurality of device handlers 532. The device drivers 531 include MessageFromDrivers( ) 532*a* and MessageToDrivers( ) 532*b*. The MessageToDrivers( ) 532*b* associated with the serial NT driver 531*b* is coupled to a ToDriverQueue 532*c*, and the MessageToDrivers( ) 532*b* associated with the serial NT driver 531*a* is coupled to an ArcnetHandler FIFO 532*d*.

A NAU server 535 is provided that includes two Named Pipes 535 having a plurality of InPipeProcessors( ) 535*a* and OutPipeProcessors( ) 535*b*. The InPipeProcessors( ) 535*a* and OutPipeProcessors( ) 535*b* are coupled by way of a plurality of pipes 537 to NAU clients 533. The respective InPipeProcessors( ) 535*a* are coupled to a corresponding plurality of NAU out FIFO Queues 538.

A plurality of routers 537 coupled the device handlers 532 to the NAU server 535. The plurality of routers 537 include the AddMessageToPipeProcessor( ) 536, an AddMessageToOutQueue( ) 539*a*, and a MessageToHander( ) 539*b*. The MessageFromDrivers( ) 532*a* of the device handlers 532 are coupled to the MessageToPipeProcessor( ) 536. The InPipeProcessors( ) 535*a* are coupled to the MessageToHander( ) 539*b*. The AddMessageToPipeProcessor( ) 536 and the MessageToHander( ) 539*b* are coupled to the LRU table 534.

The detailed design of the Message Processor 404 will now be discussed. MP.EXE is the Message Processor and comprises the following files:

ARCNTCLS.CPP The ARCNET interface Class

ARCSMCLS.CPP The ARCNET Simulator Class for testing

DVCHNDLR.CPP The Device Handler Class

MSSGPRCS.CPP The Message Processor Class and Main( )

PPPRCSSR.CPP The Pipe Processor Class

SRLCLASS.CPP The Serial Driver Class

WNRTTLCL.CPP The WinRTUtil Class

ARCNTDRV.RT The ARCNET User-side Driver

A Main( ) function used in the message processor 404 initializes its processing threads using StartHandlers( ) and PipeProcessorClass::StartNAUThreado( ) functions. These threads operate continuously to move data from source to destination. Main( ) also registers its existence with the system monitor 412 program (using MessageProcessorClass:Register( )) and waits for a shutdown signal from the system monitor 412, after which it performs an orderly shutdown of all its threads.

For each device driver, a Device Handler Class member is created. ArcnetClass defines Device Handler routines for the ARCNET driver 531*a*. SerialIOClass defines the Device Handler routines 532 for a serial device driver 531*b*. All Device Handlers in the Message Processor 404 provide the following capability. Two Input-Driven threads are provided to control I/O. The names vary from handler to handler, but these functions launch the infinitely looping threads that constantly wait for data to move between the device (or queue) and the Message Processor 404:

| Handler | Launch Function Name | Thread Function |
|---|---|---|
| Serial Device | SerialInputInterface( ) | MessageFromDriver( ) |
| | SerialOutputInterface( ) | MessageToDriver( ) |
| ARCNET Device | MessageToHanderThreadProc( ) | MessageFromDriver( ) |
| | MessageFromHandlerThreadProc( ) | MessageToDriver( ) |

To receive data from the driver 531, MessageFromDriver( ) 532*a* reads a message from its associated driver 531 using Get( ) or ReadFile( ) functions (for example). It converts the input to a valid IFE Message using functions from the IFE_Message Class or ARCNET_ Message Classes. It then calls MessageProcessorClass::MessageToPipeProcessor( ) to add the message to the NAU Output Queue 536.

To Put Data to an Output Queue 536, PutToHandler( ) puts a valid message at the end of the output queue 536 of its associated driver. It does not perform any data conversion.

To Output Queued Data to the Driver 531, MessageToDriver( ) reads the output FIFO queue 536 and issues the appropriate driver output command. It does not perform any data conversion.

To Start the Handler to open communications to I/O ports, StartHandler( ) performs the necessary initialization to get queues, pointers and driver connections ready. It then starts-up the two I/O threads (InPipeProcessor( ) and OutPipeProcessor( )).

Described below are methods used to communicate with the I/O device drivers 531.

The Serial Driver 531*b* is a standard Windows NT Serial Device Driver. ReadFile( ) and WriteFile( ) are the functions used to communicate with it.

The ARCNET Driver 531*a* is a "user side" driver that performs the actual I/O with the ARCNET hardware. Because it is loaded along with the rest of the Message Processor 404, its interface is via Queue::Put( ) and Queue::Get( ) functions.

The term NAU Server means the set of routines that comprise a "Server" for the Network Addressable Unit processes. They are kept in the PipeProcessorClass. Two threads, NAUInThreado( ) and NAUOutThreado( ) are used to launch a set of I/O threads (InPipeProcessor( ) and OutPipeProcessor( )) for an as yet unknown NAU process. The first message received from any NAU registers it to this set of threads, causing NAUInThreado( ) and NAUOutThreado( ) to launch another set, getting ready for the next NAU to speak. In this way, the Message Processor 404 is dynamic and can support different numbers of NAUs as needed.

As for Incoming Messages, NAUInThreado( ) launches the InPipeProcessor( ) thread 535*a* which continuously receives a message from its input pipe 437. If the message is meant to be routed to a driver 531, it gets sent to MessageToHandler( ) which places it on the appropriate driver's output queue 536. If the message is meant to be routed back to an NAU, it is sent instead to AddMessageToOutQueue( ) which performs this routing.

As for Outgoing Messages, NAUOutThreado( ) launches the OutPipeProcessor( ) thread 535*b* which continuously reads a message from the NAU Out Queue and sends it to its associated NAU process via its named pipe.

Routers 537 are routines that use the LRU table 534 to determine which processing thread needs to process the message. One Router 537 is a From-NAU Router. Upon demand, MessageProcessorClass::MessageToHandler( ) moves the message to the appropriate handler. If necessary, it converts the message to the appropriate 'native' syntax using functions from IFE_Message Class or ARCNET_ Message Class. It calls appropriate PutToHandler( ) function to move the converted message to the handler's output queue 436. Another Router is a From-Device Router 537. Upon demand, PipeProcessorClass::AddMessageToOutQueue( ) calls the appropriate PutData( ) function to move the message to the NAU's output queue 536.

The LRU table 534 is an internal memory structure which contains an entry for each device in the system 100. It contains sufficient information to translate message addresses from NAU-to-Driver and Driver-to-NAU. Specifically, it contains a physical name, which is the name of each device (e.g., 001A for seat 1A); NAU Type, which is the NAU that processes message (e.g., 7 corresponds to SeatNAU); Network Address (e.g., 4F040552 for seat 1A's seat display unit 133); and Device Handler that indicates which device driver 431 to use (e.g., 0 for ARCNET).

This information is kept in the following SQL database table which is read during the Message Processor Main( ) initialization via CreateLRUTable( ).

| Table Name | CSV Name |
|---|---|
| LRU | LRU_IN.CSV |

As NAU processes register with the Message Processor 404, their identities are updated in this table via PipeProcessorClass::AddQueueInfoToLookUpTable( ), PipeProcessorClass::AddThreadPointerToLookUpTable( ) and PipeProcessorClass::AddPipeHandleToLookUpTable( ) functions, which include Pipe Handle, Thread Class, Registeree, Queue Class, and Queue Semaphore.

Figures 26, 27, 28, 29, 30:
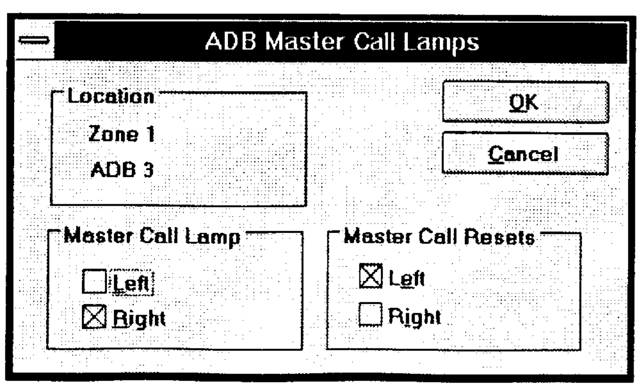

The Transaction Dispatcher 421 will now be discussed with reference to FIG. 30. The Transaction Dispatcher 421 comprises NAU Clients 551, a NAU Server 552, a Router and mail slots 553, a Services Server 554, and Service Clients 555. The NAU Server 552 comprises a plurality of OutPipeProcessors( ) 552*a*, a plurality of InPipeProcessors( ) 552*b*, and a plurality of NAU Out FIFO Queues 552*c*. A plurality of Name Pipes 556 couple the NAU Clients 551 to the InPipeProcessors( ) 552*b* and OutPipeProcessors( ) 552*a* and InPipeProcessors( ) 552*b*. The NAU Out FIFO Queues 552*c* are respectively coupled to the OutPipeProcessors( ) 552*a*. The Services Server 554 comprises a plurality of OutPipeProcessors( ) 552*a*, a plurality of InPipeProcessors( ) 552*b*, and a plurality of Service Out FIFO Queues 552*d*. The Service Out FIFO Queues 552*d* are respectively coupled to the to the OutPipeProcessors( ) 552*a*. A plurality of Name Pipes 556 couple the Service Clients 555 to the OutPipeProcessors( ) 552*a* and InPipeProcessors( ) 552*b*.

The Router and mail slots 553 comprises the LRU table 534, which is coupled to an AddMessageToOutQueue( ) 557. The InPipeProcessors( ) 552*b* of the NAU Server 552 are coupled to the AddMessageToOutQueue( ) 557. Also, the InPipeProcessors( ) 552*b* of the Services Server 554 are coupled to the AddMessageToOutQueue( ) 557. The AddMessageToOutQueue( ) 557 is coupled by way of a IntraNodal Output Queue 553*d* to an IntraNodalOutThreadProcessor( ) 558*a*. The IntraNodalOutThreadProcessor( ) 558*a* is coupled to any process on any NT line replaceable unit connected by way of the Ethernet network 228. Similarly any process on any NT line replaceable unit connected by way of the Ethernet network 228 to an IntraNodalInThreadProcessor( ) 558*b* is coupled to the AddMessageToOutQueue( ) 557.

The primary duty of the Transaction Dispatcher 421 is to move information between the logical devices (or NAUs) and the Application Services. By using a Transaction Dispatcher 421, the NAUs and the Services do not have to control I/O traffic. In addition, the number of Named Pipes (or communication lines) between processes is greatly reduced because each Service and NAU need only communicate with one process, rather than each other. This simplifies the software design and efficiently uses a finite number of available Named Pipes.

To support this, the transaction dispatcher 421 includes the following sub-functions. Upon demand, the transaction dispatcher 421 creates two Named Pipes (input and output) for each NAU and Service, maintaining the lookup table 534 of pipe names (or handles) and their corresponding NAU or Service IDs.

The transaction dispatcher 421 uses Blocking I/O to await a message from any incoming Named Pipe. Once it receives an IFE-structured Message, it examines only the message destination (NAU or Service ID) portion of the message to identify the appropriate Named Pipe to use by cross-referencing the lookup table 534. It then routes the complete message to an output queue 552 for that Named Pipe.

The transaction dispatcher 421 uses Mail Slots to send and receive messages from processes that are resident on remote Windows NT line replaceable units, routing them to the appropriate destination. Using this technique, any Service or NAU can communicate with any other Service, NAU or program on this line replaceable unit or any line replaceable unit that also runs a transaction dispatcher 421.

The detailed design of the transaction dispatcher 421 will now be discussed. FIG. 30 illustrates the transaction dispatcher function and data paths. TD.EXE is the transaction dispatcher 421 and is comprised of the following file:

TRNSCTND.CPP—the Main Program and TransactionDispatcherClass

The Main( ) function of the transaction dispatcher 421 is responsible for initializing all its processing threads using CreateMainServiceThreads( ), CreateMainNAUThreads( ) and CreateMainIntraNodalThreads( ) functions. These threads operate continuously to move data from source to destination.

Main( ) also registers its existence with the system monitor program 412 (using Register( )) and waits for a shutdown signal from the system monitor 412, after which it performs an orderly shutdown of all its threads via its destructor. The relationships of the transaction dispatcher functions are shown in FIG. 30.

The term NAU Server means a set of routines that comprise a "Server" for the Network Addressable Unit processes. Two threads, NAUInThreadProcessor( ) and NAUOutThreadProcessor( ) are used to launch a set of I/O threads (InPipeProcessor( ) and OutPipeProcessor( )) for an as yet unknown NAU process. The first message received from any NAU registers it to this set of threads, causing NAUInThreadProcessor( ) and NAUOutThreadProcessor( ) to launch another set, getting ready for the next NAU to speak. In this way, the transaction dispatcher 421 is dynamic and can support different NAUs as needed.

With regard to Incoming Messages, InPipeProcessor( ) continuously receives an IFE Message from its Input Pipe and sends it to AddMessageToOutQueue( ) which routes it to the appropriate output queue. With regard to Outgoing Messages, OutPipeProcessor( ) continuously reads an IFE Message from the NAU Out Queue and sends it to its associated NAU process via its named pipe.

The term Services Server 555 means the set of routines that comprise a "Server" for Cabin and Sales Services. Two threads, ServiceInThread( ) and ServiceOutThread( ) are used to launch a set of I/O threads (InPipeProcessor( ) and OutPipeProcessor( )) for an as yet unknown Service process. The first message received from any Service registers it to this set of threads, causing ServiceInThread( ) and ServiceOutThread( ) to launch another set, getting ready for the next Service to speak. In this way, the transaction dispatcher 421 is dynamic and can support different Services as needed.

With regard to Incoming Messages, InPipeProcessor( ) continuously receives a message from its Input Pipe and sends it to AddMessageToOutQueue( ) which routes it to the desired output queue. As for Outgoing Messages, OutPipeProcessor( ) continuously reads a message from the Service Out Queue and sends it to its associated Service process via its named pipe.

The router comprises routines that use the lookup table 551 to determine which processing thread needs to process the message. With regard to the From Any Source Router, upon demand, AddMessageToOutQueue( ) calls the appropriate PutData( ) function to move the message to the NAU or Service output queue.

The Named Pipe Lookup Table 551 is an internal memory structure that contains an entry for each device in the system 100. It contains sufficient information to translate message addresses for any piped destination. Specifically, it contains: Pipe Handle, Registeree, Queue Pointer, Queue Semaphore, and Thread Pointer.

This information is kept in an SQL database table which is read during the Main( ) initialization via CreateLRUTable( ). Then as piped processes register with the transaction dispatcher 421, their identities are updated in this table 551 via AddQueueInfoToLookUpTable( ), Add ThreadPointerToLookUpTable( ) and AddPipeHandleToLookUpTable( ) functions.

| Table Name | CSV Name |
|---|---|
| LRU | LRU |

The term Intra Nodal Server means the set of routines that permit communications between two Windows NT line replaceable units connected via the Ethernet network 228. This differs from the Named Pipe communications in that a set of communication pipes is not created and maintained for each process. Instead, a single mail slot is maintained for incoming messages, and an appropriate outgoing mail slot is created for each outgoing message as needed.

With regard to Incoming Messages, IntraNodalInThreadProcessor( ) continuously receives a message from its Mail Slot and sends it to AddMessageToOutQueue( ), which routes the message to the appropriate destination. The destination may be an NAU, a Service or even back out to another process via a mail slot. With regard to Outgoing Messages, IntraNodalOutThreadProcessor( ) continuously reads a message from its Out Queue and sends it to its associated process via the Mail Slot. This mail slot is created for just this message, and then is closed after the message is sent.

Figures 26, 27, 28, 29, 30, 31:
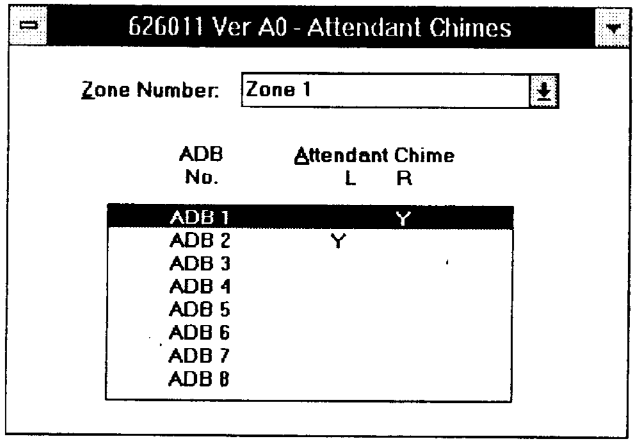

The System Monitor program 412 is automatically invoked by the operating system when the line replaceable unit boots. The system monitor function and data paths are shown in FIG. 31. The System Monitor program 412 comprises a service_main( ) 561 that is coupled to a StopServices( ) 566. The System Monitor program 412 is coupled to console services 562 by way of a ConsoleInput( ) 562*a*. Other outside testing processes 562*a* are coupled to a service_cntrl( ) 563. A WatchDogDrive 567 along with the service_cntrl( ) 563 and the ConsoleInput( ) 562*a* are coupled to a MainQueue 564.

A Process/Event Lookup table 567 is coupled to a GetSystemFullActionItemn( ) 568 that interact with a serv_ server_main( ) and server_main( ) 565. The MainQueue 564 is coupled to the server_main( ) 565. The MainQueue 564 is coupled to a ProcessEventList( ) 569. The ProcessEventList( ) 569 is driven by a plurality of Sysmon Class and Process Class State Machine Functions 570*a*, 570*b*. Output of the Process Class State Machine Functions 570*b* are coupled to OutputQueues 571 of various Process and Process I/O functions 572, 572*a*. The Process and Process I/O functions 572, 572*a* are coupled by way of OutputLoop( ) 573 and Name Pipes 574 to the transaction dispatcher 404 and message processor 421. The transaction dispatcher 404 and message processor 421 are coupled by way of Name Pipes 574 to respective InputLoop( ) 575. The respective InputLoop( ) 575 are coupled to the MainQueue 564.

Sorted functions of the Process Class State Machine Functions 570*b* are coupled by way of a QueueSorted Queue 576 and a StatPutQueueThread( ) 577 to the MainQueue 564. Additional runtime processes 578 are also coupled by way of Name Pipes 574 to SysmonConnectThreads( ) 579. The SysmonConnectThreads( ) 579 are coupled by way of a Register::RegisterInput( ) 580 to the Process functions 572.

A WatchDogDrive 591 is provided that comprises a WatchStaticThread 592, a DogQueue 592 and a StatQueueThread 594. The WatchStaticThread 592 outputs to the DogQueue 592 and a PExternalKillProcess( ) from the Process Class State Machine Functions 570*b* are coupled to the DogQueue 592. The DogQueue 592 outputs to the StatQueueThread 594 which in turn drives the WatchDog Driver 410.

The System Monitor program 412 operates in the background during the life of the control center applications and has the following four basic duties:

| | |
|---|---|
| Start-Up | The Start-up function starts the Executive and Application programs after any system boot. |
| Shutdown | The Shutdown function provides an orderly shutdown, flushing working data from memory to hard disk as appropriate. Then it terminates the execution of the Executive and Application programs. |

-continued

| | |
|---|---|
| Power Down | This function works in conjunction with the Uninterruptable Power Supply (UPS) 400 which is connected via one of the serial ports on each of the Control Center LRUs. The operating system is notified by the UPS when power has been lost, causing it to start this function (POWERDWN.EXE, POWERDWN.CPP). The Power Down program notifies the System Monitor that power has been lost to invoke an orderly shutdown using a 'ProcessStop' IFE Message. POWERDWN.EXE is listed in the NT Register as the program to start when power failure is detected. |
| Restart | The Restart function scans for failed Executive and Application programs, and restarts them. |

The detailed design of The System Monitor 412 will now be discussed.

SYSMON.EXE includes the following primary components:

SYSMON.CPP The Main( ) Program and Sysmon Class

DLYSCHDL.CPP The DelayScheduler Class

PROCESS.CPP The Process Class to manage the external programs

QUEESORT.CPP The QueueSort Class—Used to manage sorted queues

RGSTRBJC.CPP The Register Class used to register external processes

SMSCRIPT.CPP The SysmonScript Class to manage the state tables

SYSGLOBA.CPP Global routines to map to state-machine functions

SYSMNCNN.CPP The SysmonConnect Class used to communicate externally

SYSMNSPC.CPP SysmonSpecial Class

UTL150.CPP RandomPack and Liner Classes plus other utilities

WTCHDGDR.CPP The WatchDogDrive Class

Referring to FIG. 31, the System Monitor 412 is a Windows NT Service Process, which means it runs in the background and is controlled by the following functions in the Win32 SDK Library: StartServiceCtrtDispatcher( ), ControlService( ), Handler( ), RegisterSreviceCtrl Handler( ), and ServiceMain( ).

The System Monitor 412 was designed as a state machine, but, it's actual code is more of an in-line design with state flags used to keep track of processing. For example, a single function calls another function which calls yet another function, and all three are only used once. For clarity, these are grouped together herein.

The main( ) function updates its revision history information in the Windows NT Register, determines where to find the other programs to be started, launches itself as a Windows Service by connecting to the Windows Service Control Manager via StartServiceCtrlDispatcher( ), identifying service_main( ) 461 as the main function for this service. The main( ) function is identified in advance of runtime during software installation, which calls the NT CreateService( ) to set up the System Monitor 412 as a Windows NT Service. Main( ) also alters its behavior depending on whether a Console device 462 (i.e., a display monitor) is available for testing. Main( )uses SetConsoleCtrlHandler( ) to allow someone to abort the programs by pressing Ctrl-C at any time.

Service_main( ) 461 is the main program that continually runs when the system monitor service is running. It calls RegisterServiceCtrlHandler( ) to identify service_ctrl( ) 463 to NT as the function to execute when other outside programs want to alter the execution of this service. It maintains a combination state-checkpoint to identify to the outside world (i.e., test programs) what it is doing:

| State | Check-point(s) | Service Control Code to get there |
|---|---|---|
| SERVICE_START_PENDING | 1,2 | (none) |
| SERVICE_RUNNING | 0 | Service_Control_Continue |
| SERVICE_PAUSED | 0 | Service_Control_Pause |
| SERVICE_STOP_PENDING | 0,1 | Service_Control_Stop |
| SERVICE_STOPPED | 0 | (none) |

When service_main( ) 561 starts, it is in SERVICE_START_PENDING state, checkpoint #1. If it successfully creates all its event handles, it moves to checkpoint #2. It then sets up a Security Descriptor and launches a serv_server_main( )thread, moving its state to SERVICE_RUNNING.

The outside world can alter its state by calling service_ctrl( ) 563 and providing a Service Control Code. The table above shows which state service_main( ) 561 moves to based on the control code received. If the SERVICE_STOPPED state is reached, an hServDoneEvent is triggered, causing this function to exit, terminating the System Monitor 412. The service_ctrl( ) 563 routine is called via an NT Service utility ControlService( ) by any outside program that wishes to control the System Monitor service in some way. Service_ctrl( ) 563 uses a MainQueue 564 to issue commands to various Process Class objects that are running.

The Server_main( ) routine creates the Sysmon object MainSysmon and executes its Sysmon::StartHandler( ) to get the other processes running. If running in test mode, server_main( ) 561 is called directly by main( ). If running in runtime mode, server_main( ) is called by serv_server_main( ) 565 which is a thread launched by service_main( ) 561 (the main program initiated by the Windows NT Service Manager). Finally, server_main( ) calls Sysmon::MainQueueProcessing( ) which loops until it is time to shutdown. Once MainQueueProcessing( ) returns, this thread ends.

The StopService( ) function 566 can be used by any thread to report an error and stop the Sysmon Service. It logs the reason that it was called via ReportEuent( ), and tells service_main( ) to abort via hServDoneEvent.

Derived from Process, the Sysmon Class contains all the software needed to drive all the Process Class state machines. It uses MainQueue 564 as its primary input.

Sysmon::StartHandler( ) is responsible for launching all the external programs and providing a means to monitor them. First, it compiles the file SYSMON.ASC. Then, it queries the NT Registry to determine which type of line replaceable unit it is running on (PAT, CFS or test unit) to know which processes to initiate. It creates a SmScript object to establish system-level state machine tables using SmScript::InitiateTables( ). It sets up communications with the UPS 400 via a communication port, and determines whether the UPS 400 is working, whether the line replaceable unit has power and whether it should continue processing as a result. Finally, it creates the following objects and runs a starter function for each of them:

| Object | Class | Starter Function |
|---|---|---|
| ConnectTask | SysmonConnects | StartHandlerConn( ) |
| MyWatchDog | WatchDogDriver | StartHandler( ) |
| ProcessItem[i] (one for each process for this LRU) | Process | Initialize( ) (StartHandler( ) is called later, after Process Registration) |
| SelfHeartBeatTask | SysmonSpecial | StartHandlerSpecial( ) |
| SelfMonitorTask | SysmonSpecial | StartHandlerSpecial( ) |
| DelayTask | DelayScheduler | StartHandlerDelay( ) |
| QueueSorted | QueueSort | None, used to schedule events (i.e., Process::PPostExternalKillProcess( )) |

It creates an EventOnQueue object with an UpSystem event in it and places it in the MainQueue queue 564 to start the external processes (beginning with the Transaction Dispatcher 421). Finally, it calls Sysmon::MainQueueProcessing( ) which loops forever, using Sysmon::MainProcess( ) to handle all processing requests which get placed on the MainQueue queue by this and the other classes' threads.

The basic flow of startup events is:

| | |
|---|---|
| UpSystem Event from Sysmon::StartHandler | start Transaction Dispatcher |
| Registration received from Transaction Dispatcher | start Message Processor |
| Registration received from Message Processor | start Service |
| Registration received from Service | start NAUs |

In this way, the system comes up in a sequential, orderly fashion.

MainQueueProcessing( ) loops forever waiting for Events to appear on the MainQueue queue. Once found, it calls MainProcess( ) which uses the information from the EventOnQueue object to lookup the 'real' action(s) to perform using the SmScript::GetSystemTFullActionItem( ) and Process::GetTotalMatrix( ) functions. It processes these actions using Sysmon::ProcessEuentList( ) 567.

ProcessEventList( ). 567 is only called by MainProcess( ) to look up and process the desired actions from a table of actions, which are maintained in the SmScript Class.

The above processes loosely form a state machine. In fact, a series of flags denoting the state of the Sysmon system is used to decide what to do next. The following routines are used to support this state machine. Currently, there is only one system level Action List to do: UpSystem[ ] or UpPAT[ ]. They each have several Actions which point to SYSGLOBAL functions. These functions in turn determine whether they should call a Process class function or a Sysmon class function. The Sysmon Class functions are:

PSysSoftReboot( ) Calls softboot( ) which uses the ExitWindowsEx( ) command to reboot the LRU. Called via the global PSoftReboot( ) function.

PSysHardReboot( ) Reboot via WatchDogDriver::Watch_Reboot( ) which causes the hardware to reset. Called via the global PHardReboot( ) function.

PSysGetState( ) Retrieves the state of the system state machine. Called via the global PGetProcessState( ) function. This is not used: The variable 'selfstate' is used directly.

PSetSysState( ) Sets the state of the system state machine, which is used in GetSystemFullActionItem( ) along with the current event to know what action to do to the system. Generally called via the global PSetState( ) function.

The SysmonConnects class contains code necessary to communicate to the other processes in the line replaceable unit, for example the Transaction Dispatcher 421. It establishes a Named Pipe set to communicate with each of them. It works very closely with the RegisterObject Class to provide pipes to each of the Process Class handlers. This method of creating a generic Named Pipe set and assigning it to the first process to register was taken from the Transaction Dispatcher 421, however, because this program directs which external process is executed, and therefore which one is registered.

The StartHandlerConn( ) routine simply launches two threads, one for Named Pipe Input and one for Named Pipe Output.

InputConnectThread( ) is launched by StartHandler Conn( ). It calls DynInput( ) which loops forever, opening a Named Pipe for input, then waiting for an outside process to connect to it. It then creates a temporary RegisterObject class object to tie this Named Pipe to the connecting outside process, and loops to create another named pipe. OutputConnectThread( ) is launched by StartHandler Conn( ). It calls DynOutput( )which loops forever, opening a Named Pipe for output, then waiting for an outside process to connect to it. It then creates a temporary RegisterObject class object to tie this Named Pipe to the connecting outside process, and loops to create another named pipe.

When the DynInput( ) and DynOutput( ) routines of SysmonConnect receive input from an outside process to claim a Named Pipe, they create a temporary RegisterObject class object to receive Registration information from the calling process and tie the current Named Pipe to the Sysmon Process object associated with that process. In this way, each Process object has its own set of I/O to its corresponding external process.

This launches RegisterInput( ) as a new thread. It is called by both SysmonConnects::DynInput( ) and DynOutput( ). The RegisterInput( ) code calls DynRegisterInput( ) and kills itself and its SELF (its own object) when DynRegister Input( ) is done. The DynRegisterInput( ) routine tries to read from the Named Pipe to get a Registration message from the outside process. It attempts this 100 times before it gives up and exits. If successful, it calls Process::StartHandler( ) to get its Input or Output thread started with this Named Pipe.

The SmScript Class contains the tables of events and actions that are used to move each Process object state machine from one state to the next. FullActionItem arrays read like pseudo code, each entry containing the following set of information: Function-Name, Process ID, Additional Data for the named Function. Thus, for example, "{PHardReboot,systemflag,150}" means to run global function PHardReboot(150), which in turn runs the system function Sysmon::PSysHardReboot(150).

The InitiateTables( ) routine is called once per power-up to prepare the event/action table SysMatrix as appropriate for the runtime LRU system monitor. It fills this array with a pointer to the UpSystem or UpPAT FullActionList array.

The InitProcess( ) routine is called by Process:: Initialize( ) for each process object created to complete the tables for the Process to use. It moves the appropriate event/actions into this Process object's TotalMatrix array. This permits the use only one System Monitor executable program, even though its specific duties vary from line replaceable unit to line replaceable unit (for example, the primary access terminal LRU does not have the Service process and the File Server LRU does not have the primary access terminal NAU process).

The GetSystemFullActionItem( ) routine returns the appropriate value from the SysMatrix table. The is used only in Sysmon::MainProcess( ).

The Process Class Initialize( ) initializes the TotalMatrix table via SmScript::InitProcess( ).

The Process Class StartHandler( ) is called by RegisterObject::DryRegisterInput( ) after an external process has successfully registered with Sysmon. It calls StartInputThreado( ) or StartOutputThread( ) depending on the Named Pipe which was registered.

StartInputThreado( ) is called by StartHandler( ) and simply launches a new thread, InputLoop( ). InputLoop( ) in turn simply calls DynInputLoop( ) for this process. DyninputLoop( ) continuously loops, collecting any IFE Message from its Named Pipe (using the IFE__Message::GetData( ) function), and processing it using ProcessIncoming( ). Errors are reported using ProblemReport( ) and the MainQueue is updated to control either a shutdown or retry, depending on the severity of the error. If it's error is severe enough, it exits the loop and the thread dies.

StartOutputThread( ) is called by StartHandler( ) and simply launches a new thread, OutputLoop( ). Output Loop( ) in turn calls DynOutputLoop( ) for this process. DynOutputLoop( ) continuously loops, collecting any IFE Message from its OutputQueue and sending it out its Named Pipe (using the IFE__Message::PutData( ) function). Errors are reported using ProblemReport( ) and the MainQueue is updated to control either a shutdown or retry, depending on the severity of the error. If it's error is severe enough, it exits the loop and the thread dies.

GetTotalMatrix( ) returns the corresponding Action List from TotalMatrix for the current event and state of this process. It is called only by Sysmon::MainProcess( ).

The following State Machine routines are stored in the SmScript State Machine Tables (called FullActionItems) and are activated as a result of certain event/state combinations via ProcessEventList( ):

PExternalKillProcess( ) Kills its associated external process with the TerminateProcess( ) function. Called from the global PExternalKillProcess( ) function.

PGetProcessState( ) Returns the current state of this state-machine. Called from global PGetProcessState( ).

PKillProcess( ) Issues IFE message to external process to commit suicide. Currently not supported by most external processes. Called from global PKillProcess( ).

PPostExternalKillProcess( ) Uses the QueueSorted::PutSorted( ) function to schedule a Kill command to go into the MainQueue later. Called from global PPostExternalKillProcess( ).

PSetState( ) Updates the current state of this state-machine.

Called from global PSetState( ).

PStartProcess( ) Gets the full pathname of the associated external process and starts executing it. Called from global PStartProcess( ).

The WatchDogDriver class contains code necessary to manage watchdog driver messages. The watchdog is a hardware component that is responsible for re-starting the line replaceable unit if it fails to receive input in regular intervals. Using this class ensures that the watchdog receives that input from the System Monitor 412 regularly, unless some system or software error prevents it. Commands available for use by Sysmon and Process objects are: Watch__Enable( ), Watch__Disable( ), Watch__Maintain( ) and Watch__Reboot( ). These functions all put the corresponding watchdog action command onto a DogQueue 468 for processing by DynQueueThread( ), which is the only function allowed to actually talk to the driver directly.

Sysmon::StartHandler( ) creates the WatchDogDriver object and calls its StartHandler( ) routine, which is responsible for launching two threads. One thread manages the I/O with the watchdog hardware, and the other thread maintains the regular output commands to it.

WatchStaticThread( ) calls WatchDynamicThread( ) which places a request for a 'strobe' to the watchdog onto the DogQueue 468 (viaWatch_Maintain( )). It then sleeps for 1,000 seconds and loops again.

StatQueueThread( ) calls DynQueueThread( ) which performs the actual output to the watchdog hardware, "\wdog". It reads a command request from the DogQueue queue 468 and calls either Watch_Enable_DO( ), Watch_Disable_DO( ), Watch_Maintain_DO( ) or Watch_Reboot_DO( ) to perform the requested command using the Windows DeviceIoControl( ) function.

The QueueSorted Class coordinates activity in the MainQueue 464. For example, it is sometimes necessary to schedule tasks to occur in the future (such as shutdown due to loss of power). To do this, QueueSorted provides the following functions. The QueueSorted( ) constructor creates its own queue and launches a thread, StatPutQueue Thread( ) to monitor the queue periodically. The PutSorted( ) function allows users to add elements to the queue along with a timestamp indicating the time at which this element should be dealt with. The PutSorted( ) function puts them on the queue sorted by the timestamp so that they are dealt with in the proper order.

StatPutQueueThread( ) calls DynPutQueueThread( ) which loops forever, trying to process the elements on its queue. If the current time is less than or equal to the time of the element's timestamp, the element is moved to the MainQueue for processing by Sysmon::MainQueueProcessing( ). Even though it is scheduled, it is only placed at the end of MainQueue 464, not at the front. Therefore, it does not supercede any existing MainQueue elements.

The following common software libraries of functions and utilities are used throughout the primary access terminal 225 and cabin file server 268 applications.

Utility Library—UTILITY.LIB

The Database Utilities, DBUTILS.CPP are commonly used by all database applications. They use the SQL commands (recognizable as starting with db . . . ( )', such as dbexit( ), dbresults( ), etc.):

| Function | Purpose |
|---|---|
| CheckResults( ) | Continuously loops calling dbresults( ) to get the results of the prior SQL call for this process until they have all been obtained. If there are errors, it displays function text for tracing. |
| UpdateStats( ) | Updates the statistics of the given table for the given process. |
| FailureExit( ) | Standard exit function, displays the error before calling dbexit( ). |
| TransactionLogControl( ) | |
| SelectIntoControl( ) | |

The event logging functions, EVENTLOG.CPP, RETRYSYS.CPP, are used exclusively in SYSMON.EXE and POWERDWN.EXE. They each call EventLog's ProblemReport( ) subroutine (which is recursive!) which calls EventLog:: WriteHAILog( ) which eventually uses NT's ReportEvent( ) to record the information. For some reason, the UtilityClass::LogEvent( ) utility was not used, even though their functions are essentially the same.

The set SQL Error and Message Handlers, HANDLERS.CPP includes two routines used by functions such as ARCHIVE.CPP CREATEDB.CPP DUMP_POS.CPP, INITDB.CPP and SUD_BLDR.CPP to handle SQL informational and error messages: err_handler( ) and msg_handler( ). These functions are identified to the SQL code using dberrhandle(err_handler) and dbmsghandle(msg_handler) respectively.

| Function | Purpose |
|---|---|
| int err_handler(<br>input DBPROCESS *dbproc,<br>input int severity,<br>input int dberr,<br>input int oserr,<br>input char *dberrstr,<br>input char *oserrstr) | Builds a DB-LIBRARY error message containing both a database error (dberr and dberrstr) and an operating system error (oserr and oserrstr), echoes it to stdout and (if oserr is not DBNOERR) uses UtilityClass::LogEvent( ) to put this info into the event log. See Utilityclass::LogEvent( ) for severity definition.<br>Returns INT_EXIT if the database process pointer dbproc is no good. Otherwise, INT_CANCEL. |
| int msg_handler( )<br>input DBPROCESS *dbproc<br>input DBINT msgno,<br>input int msgstate<br>input int severity,<br>input char *msgtext) | If the severity is greater than zero, it logs it to the event log, otherwise it simply builds and displays the message. It always returns ZERO. |

Queues include QUEUE.CPP and QPAIR.CPP. A Queue is a dynamic list of pointers to elements of any type which must wait for sequential processing such as an output queue. The actual elements are not stored in the Queue. A QPair is a set of two Queues used for related purposes, for example one for Input and one for Output associated with a named pipe pair or a serial port.

This class is used to create and maintain all Queues in the Control Center software to buffer message traffic. The first or top or head position of the queue is identified as element number zero (0).

Queues made with this class are considered to be "thread safe". That is, multiple threads can access these queues concurrently. These queues generate a signal when data is written to them. One can choose whether the queue should signal with only an event handle or with a semaphore as well. This class allows one to create and control the size of (or number of elements in) your queue, move elements in and out of the queue, and allow multiple users or readers to manipulate a single queue.

The following member functions are used to create and control the size of (or number of elements in) the queues.

| Queue class Function | Purpose |
|---|---|
| The Constructors:<br>Queue( ),<br><br>Queue (ULONG Size) | Initialize the queue. If no Size (or if Size = 0) is given, then the Queue is not delimited and can grow to the capacity of the system (defined by constant LONG_MAX). If Size is given, the queue is limited to contain no more than Size elements by having all Put functions display "Queue Overflow" to stdout and returning TRUE when an attempt is made to exceed the limit. |
| short<br>GetCount( ) | Returns the number of elements currently in the queue. |

-continued

| Queue class Function | Purpose |
|---|---|
| ULONG GetSize( ) | Returns the preset maximum size of the queue. If the value returned is zero, the size is not delimited. |
| bool SetSize (ULONG Size) | Allows one to increase the maximum size of the queue. Returns FALSE if Queue was already defined as undelimited or if the new size is less than the previous size. |

Move elements in and out of the queue.

The Selective Style member functions are used when the priority of the queue elements is controlled.

| Queue class Function | Purpose |
|---|---|
| void * GetNth( long N) | Removes and returns the Nth element from the queue. Returns NULL if the Nth element does not exist. If the queue is already locked, it waits for permission to access the queue. Therefore, it is important to lock( ) the queue prior to determining the Nth element (with PeekNth( ), for example) and then retrieving it with GetNth( ). |
| void * PeekNth( long N) | Returns the contents of the Nth element of the list but doesn't remove it from the queue. If none, returns NULL. |
| bool PutNth( void *Element, long N) | Inserts the Element's pointer into the queue at position N. If N + 1 is greater than the current number of elements on the queue, then the Element's pointer is placed at the end of the queue instead of at N. Returns FALSE if. |

The FIFO Style member functions are used when a First-In-First-Out FIFO style queue is desired.

| Queue class Function | Purpose |
|---|---|
| void * Get( ) | Returns the element at the top of the list. If none, returns NULL. Same as GetNth(0). |
| void * Peek( ) | Returns the contents of the element at the top of the list, but doesn't remove it from the queue. If none, returns NULL. Same as PeekNth(0). |
| bool Put( void *Element) | Places the Element's pointer at the end of the queue. Same as PutNth(Element, −1). Returns FALSE if |
| bool PutHead( void *Element) | Places Element's pointer at the head or top of the queue. Same as PutNth(Element, 0). Returns FALSE if |

Allow multiple users or readers to manipulate a single queue.

| Queue class Function | Purpose |
|---|---|
| Constructor: Queue ( ULONG Size, bool useSemaphore = TRUE) | Set useSemaphore = TRUE if the queue is going to be referenced by more than one 'reader' or thread. Otherwise, set it to FALSE or don't supply it. When set to TRUE, the constructor calls CreateSemaphore to establish the semaphore handle, and assigns a Resource Count equal to the Size, which means that if you specify a queue of 10, at most 10 threads can access it at once. |
| const HANDLE getEvent Handle( ) | Returns the signal handle for use primarily with WaitForSingleObject( ) to halt a thread until something is placed in the queue. |

-continued

| Queue class Function | Purpose |
|---|---|
| const HANDLE getSemaphore Handle( ) | Returns the semaphore handle for use primarily with WaitForSingleObject( ) to halt a thread until something is placed in the queue. Use only when useSemaphore is TRUE in constructor. |
| void Lock( ) | Locks the queue so other 'readers' can't alter its contents. If the queue is already locked (in use), this call waits until it is no longer locked. The Queue member functions each perform a lock and unlock when they update the queue, but there are times when you need to perform several queue functions while keeping total control of the queue. In this case, use the Lock( ) function. |
| void Unlock( ) | Releases control of the queue so others can add or remove elements. Use only if you previously used Lock( ) to isolate queue access. |

The short class Queue Pairs maintains a set of two queues that are related. Typically one is used for Input and one is used for Output. Their names, however, are Lefty and Righty.

| Queue class Function | Purpose |
|---|---|
| The Constructors: Qpair( ULONG Size, bool bUseSemaphore), Qpair ULONG Size) | These constructors simply construct the two Queues, Lefty and Righty. |
| Queue& Left( ) | Returns a pointer to Queue Lefty. |
| Queue& Right( ) | Returns a pointer to Queue Righty. |

The RpcClientClass, RPCCLNTC.CPP contains all of the functionality needed for an application to communicate with the Fileserver RPC Server via the Core Application Programming Interface (CAPI). To use it, the Create( ) call should be executed. Then a call to GetContextHandle( ) provides the I/O handle for communications.

| RpcClientClass class Function | Purpose |
|---|---|
| bool Create( ) | Creates and initializes an RPC Interface channel between an application and the RPC Server process using RpcNsBindingImportBegin( ). Returns TRUE if successful, FALSE otherwise. |
| bool Delete( ) | Terminates the RPC Session with the server process. Returns TRUE if successful, FALSE otherwise. |
| bool GetContextHandle( output PPCONTEXT__HANDLE__TYPE pphContext) | Retrieves a database context handle from the server process via an RPC channel previously opened using Create( ). Calls the Capi__c.c InitializeInterface( ) function to connect to RPC. Returns FALSE if none. |
| bool ReleaseContextHandle( output PCONTEXT__HANDLE__TYPE phContext) | Returns a database context handle which was previously obtained by a call to GetContextHandle( ). Returns FALSE if none. |

The System Monitor Interface, SYSMNNTR.CPP is a set of routines that is used by any process that is under the control of SYSMON.EXE for shutdown purposes.

This Constructors class has 3 constructors available for use:

SysmonInterfaceClass( ) is not used.
SysmonInterfaceClass(ParentProcess_id, EventHandle)
SysmonInterfaceClass(ParentProcess_id, MessageQueue)
SysmonInterfaceClass(ParentProcess_id).

ParentProcess_id is used to identify the process in all communications with SysMon (see WriteToSysMon( )). The other parameters are used to control the method of shutdown for the given process. If the process prefers to hear about it using an event, it can pass the EventHandle to be used when shutdown is needed. If the process prefers to hear about it via a message queue, it can pass the Queue ID in.

Initialization

Each process must first create a SysmonInterfaceClass object and then register communications with Sysmon using SysmonInterfaceClass::Register( ). This calls ConnectSystemMonitor( ) to create handles to two Named Pipes (input and output) to use to talk to the System Monitor. It then creates an IFE_Message and sends it to Sysmon via WriteToSysMon( ). Finally, Register( ) launches two threads to manage the named pipes with CreateSystemMonitorThreads( ).

Communication Threads

CreateSystemMonitorThreads( ) launches two threads who in turn call the actual I/O function: InputThreadInterface( ) calls ReadFromSysMon( ), OutputThreadInterface( ) calls HeartBeatSysMon( ).

ReadFromSysMon( ) continuously reads from Sysmon, calling ProcessRequest( ) when any message is received.

HeartBeatSysMon( ) continuously issues a pulse message to Sysmon, to let it know that this process is alive. Unfortunately, this proved not to be a good indicator of health (it only means the interrupts are working), so this is commented out currently.

WriteToSysMon( ) is used to send any message to the System Monitor via the output named pipe. It uses IFE_Message::PutData( ) to do it.

Anytime a message is received in ReadFromSysMon( ), ProcessRequest( ) is called. This simply parses out any ProcessStop message and calls Shutdown( ) to continue. All other messages are ignored.

Shutdown( ) cares about how this class was constructed. If an event handle was given, it sets this event to announce the shutdown to the host process. If a message queue was given, it forwards the ProcessStop message to the queue so the host can shutdown in a more orderly fashion. If neither of these was given, it halts the process with a Process Exit( ).

A Timer Utilities file, TMDCLLBC.CPP, contains a class timedCallback that is used to schedule activity in regular intervals. The user first creates a function to be called when a 'timeout' occurs by declaring it as long (*timedCallbackFun) (timedCallback *Entry); This function must return the number of ticks to wait until the next call should be invoked, or Zero to stop the re-queueing.

| Public timedCallback Functions | Purpose |
|---|---|
| timedCallback( ) | Constructs a callback using a default 'do-nothing' function. This allows one to create arrays of timedCallback objects and define the callback function later by use of member setFun( ). |

-continued

| Public timedCallback Functions | Purpose |
|---|---|
| timedCallback( input timedCallbackFun SomeFun) | Constructs a real-time clock callback to be used for later calls to queue( ) and cancel( ). SomeFun is the user-defined function to call when a timeout occurs |
| ~timedCallback( ) | Cancels the callback before it goes out of scope. |
| void cancel( ) | Cancels 'this' callback if it is queued, but retains the object for subsequent queueing. |
| int isQueued( ) | Returns 1 if 'this' callback is queued, 0 otherwise. |
| void queue(input long Delta) | Queues the callback to be called after the specified number of invocations of tick( ). Delta == 0 cancels the callback. Queue( ) is automatically called each time the user's timedCallbackFunction is invoked. queue( ) can be used to change the interval of an already queued callback. |
| void setFun(input timedCallbackFun SomeFun) | Redefines the callback function to be used for 'this' callback as what's contained in SomeFun. |
| static void tick( ) | Advances the time by one tick. As a result, queued callbacks may time-out and are then invoked from within tick( ). Normally not used externally, this is maintained by the timer thread that was launched by the constructor. |

The General Utilities include UTLTYCLS.CPP. The UtilityClass Class provides a general interface to the following generic utility functions. Many of these functions are declared as STATIC, which means that you can use them without creating an object of UtilityClass, just by calling them with the class name in front, such as UtilityClass::bin2Ascii(0x2f, &Hi, &Lo).

| UtilityClass Public Function | Purpose |
|---|---|
| static void bin2Ascii (input unsigned char Hex, output unsigned char*Hi, output unsigned char*Lo) | Converts a binary hex value into a two byte ASCII character representation. e.g., Hex = 0x2F, *Hi = '2' *Lo = 'F'. |
| unsigned char BuildNetworkAddress (input unsigned char *cpBuffer, output unsigned char *cpNetworkAddress, input DeviceHandlerType Device Handler) | Receives a character buffer of input data and creates a network address, returning it as an unsigned character. DeviceHandler defines whether the data is from ARCNET or RS-422. The length of the address is returned. If ZERO, no address was made. |
| bool ConnectNetworkResource (input char *LocalName, input char *RemoteName) | Connects the Windows NT Network Resource specified by RemoteName to the drive specified by LocalName. Returns FALSE if any errors are encountered and connect fails. |
| static unsigned short ConvertAsciiToBin (input unsigned char*byAscii) | Takes 2 ASCII characters and returns them as unsigned binary. e.g., by ASCII = "2F", returns 0x2F. |
| static unsigned char ConvertAsciiToBin (unsigned char AsciiChar) | Takes a single ASCII char and returns a single unsigned binary char. e.g., AsciiChar = 'F', returns 0x0F. |
| static bool CreateIfeldConversionMap( ) | Initializes the IfeldMap data structure. For each entry in the Ifeld Type definition, a corresponding text string is written to the map. This data structure is used in conversions |

-continued

| UtilityClass Public Function | Purpose |
|---|---|
| | between process enumeration values and text values.<br>Always returns TRUE. |
| static bool<br>CreateIfeFuncConversionMap( ) | Initializes the IfeFuncMap data structure. For each entry in the IfeFunction Type definition, a corresponding text string is written to the map. This data structure is used in conversions between process enumeration values and text values.<br>Always returns TRUE. |
| bool<br>GetFirstRegistryValue<br>(input char *pszKeyName,<br>output char *pszValueName,<br>input LPDWORD dwValueNameLen,<br>output LPDWORD lpdwType,<br>output LPBYTE lpbData,<br>output LPDWORD lpcbData) | Retrieves the name and data associated with the first value contained in the NT Registry that matches the registry keyname.<br>Returns FALSE if unsuccessful. |
| bool<br>GetNextRegistryValue<br>(output char *pszValueName,<br>output LPDWORD dwValueNameLen,<br>output LPDWORD lpdwType,<br>output LPBYTE lpbData,<br>output LPDWORD lpcbData) | After calling GetFirstRegistryValue( ), this function can be called to retrieve subsequent registry value names and data.<br>Returns FALSE if unsuccessful. |
| bool<br>GetRegistryDWord<br>(input char *lpszKeyName,<br>input char *lpszValueName,<br>output DWORD *lpdwValue) | Retrieves a DWORD value from the Registry into lpdwValue.<br>Returns FALSE if unsuccessful. |
| bool<br>GetRegistryInfo<br>(output CStringArray *RegValueArray) | Retrieves all registry information by iterating through the registry key values, returning it in an array of strings.<br>Returns FALSE if unsuccessful. |
| bool<br>GetRegistryString<br>(input char *lpszValueName,<br>output LPBYTE lpbData,<br>output LPDWORD lpcbData) | Retrieves a string in lpbData corresponding to the input parameter ValueName.<br>Returns FALSE if unsuccessful. |
| static bool<br>IfeFuncToText<br>(input IfeFunctionType nIfeFunction,<br>output PGENERIC_TEXT pszIfeFuncText) | Converts the IFE Function Message identifier contained in the nIfeFunction input argument into a text string representing the same enumeration name.<br>Returns FALSE if unsuccessful. |
| static bool<br>IfeIdToText<br>(input IfeIdType nIfeId,<br>output PGENERIC_TEXT pszIfeIdText) | Converts the IFE Process/Thread identifier contained in the nIfeId input argument into a text string representing the same enumeration name.<br>Returns FALSE if unsuccessful. |
| static IfeFunctionType<br>IfeTextToFunc<br>(input PGENERIC_TEXT pszIfeFuncText) | Returns the corresponding Enumeration value for the Text String contained in pszIfeIdText from the IfeFunctionType Type definition.<br>If none, returns NoDestination. |
| static IfeIdType<br>IfeTextToId<br>(input PGENERIC_TEXT pszIfeIdText) | Returns the corresponding Enumeration value for the Text String contained in pszIfeIdText from the IfeIdType Type definition.<br>If none, returns NoDestination. |
| static void<br>LogEvent<br>(input IfeIdType nProcessId,<br>input WORD wCategory,<br>input DWORD dwErrorCode,<br>input char *pszFormat,<br>input. . . ) | This is the call-level interface to the Windows NT event log. This takes the passed variables and develops a series of strings using printf(pszFormat, arg, arg, arg) style, then forwards the developed string to ReportEvent( ). |
| bool<br>SetRegistryConfigValue<br>(input char *ModuleName,<br>input REGCONFIGINFO *ConfigInfo) | This function is used by a process to register its Unit Id, Part Number, and Revision number to the Windows NT Registry.<br>Returns FALSE if any errors are encountered. |
| bool<br>SetRegistryString<br>(input char *lpszKeyName,<br>input char *lpszValueName,<br>input char *szString) | Writes specified value and string data into specified registry key under HKEY_LOCAL_MACHINE.<br>Returns FALSE if any errors are encountered. |

The Discrete Library, DISCRETE.LIB, contains the UTILITY.LIB Library plus the following:

WNRTTLCL.CPP

The WinRUtilClass class contains simple utilities for use with WinRT drivers:

| WinRTUtilClass Functions | Purpose |
|---|---|
| void<br>Build WinRTDeviceName<br>(output LPSTR szDeviceName,<br>input LPSTR szDeviceNumber | Returns the full WinRT device name from a null-terminated device number. |
| DWORD<br>GetWinRTDeviceNumber<br>(input LPSTR szDriverName,<br>output PUCHAR szDeviceNumber,<br>input LPDWORD lpdwDeviceNumberBufSize) | Uses null-terminated DriverName to look-up WinRT device number string in the registry.<br>Returns the value returned by its called RegQueryValueEx( ) function. |

DSCRTDRV.RT and DISCRETE.CPP

DSCRTDRV.RT replaces DSCRTDRV.CPP and is the name of the Discrete Driver code. It is fed into the WinRT Preprocessor to create DISCRETE.CPP, which is compiled into the DISCRETE.LIB library. The DiscreteDriverClass controls the system discretes, which are used to control peripherals such as LED indicators.

| DiscreteDriverClass Public Function | Purpose |
|---|---|
| void<br>CloseDiscretes( ) | Closes the Discrete WinRT device if it is open. |
| UCHAR<br>GetId( ) | Returns the Enumerated LRU ID. If 0, LRU ID has not yet been obtained. May be called after ReadId( ). |
| bool<br>GetLCDbacklight( ) | Returns the state of the LCD backlight (on or off). |
| bool<br>GetLED<br>(LED_TYPE LEDchoice) | Returns the state of the specified LED. |
| bool<br>GetVTRDzscrete<br>(VTR_DISCRETE_TYPE VTRdiscreteChoice) | Returns the state of the specified VTR discrete. |
| bool<br>IsPAT( ) | May be called after ReadId( ).<br>ReturnsTRUE if this LRU is a PAT, FALSE if this LRU is a CFS. |
| DWORD<br>OpenDiscretes( ) | Opens the Discrete WinRT device. |

-continued

| DiscreteDriverClass Public Function | Purpose |
|---|---|
| DWORD ReadId( ) | Reads discrete input I/O port to obtain this LRU id and stores it in the form: 0110fijk where f = 1 if CFS, f =0 if PAT; ijk is the LRU id 000–111 (0–7). In this form the byte may be used as an ARCNET address. If successful, ERROR_SUCCESS is returned. |
| UCHAR ReadInputDiscretes( ) | Returns a byte representing the state of the input discretes. |
| UCHAR ReadOutputDiscretes( ) | Returns a byte representing the state of the output discretes. |
| bool SetLCDbacklight (bool bOnOff) | Turns the LCD backlight on or off. Returns the state of the backlight prior to this function call. |
| bool SetLED (LED_TYPE LEDchoice, bool bOnOff) | Turns the specified LED on or off. Returns the state of the LED prior to this function call. |
| bool SetVTRDiscrete (VTR_DISCRETE_TYPE VTRdiscreteChoice, bool bOnOff) | Asserts or de-asserts the specified VTR discrete. Returns the state of the discrete before this function call. |
| UCHAR WriteOutputDiscretes (UCHAR ucOutputMask) | Sets the output discretes according to the specified mask. Returns the state of the output discretes before they were changed by this function. |

Messages Library—MESSAGE.LIB

The Message Library provides the means of moving data from one place and format to another without needing detailed understanding of the protocols involved. In general, all messages transmitted within the Control Center are of the type IFE_Message. Therefore, a class called IFE_Message was developed to be used to translate information into and out of this message type. Similarly, many messages enter the Control Center from the ARCNET devices, so to support them the ARCNET_Message Class was made. But instead of requiring the user to start with an ARCNET_Message and convert it to an IFE_Message, the ARCNET_Message is a superset of IFE_Message. In this way, it contains the additional functions to manage the translations, and the migration from one form to another is nearly transparent.

For example, when raw data is read into MP.EXE from ARCNET, it is put into a new ARCNET_Message object and passed to MessageToPipeProcess( ) who treats this message as an IFE_Message to send it to the appropriate NAU. The NAU uses its own flavor of IFE_Message (Seat_Message, for example) to read the data (via its own NAUGetMP( )) and from that point forward, the IFE_ message is treated more specifically. No special handling was needed to affect this change. By the time the message finally reaches its ultimate destination process, the message class functions are used to deal with the actual bytes of the messages. These functions are described below.

IFE Messages—IFMSSAGE.CPP

The IFE_Message class is the Base Class for all IFE Message processing. A hierarchy exists such that each derived class implements specifics for its data processing. This makes translating data formats transparent to application programmers.

| IFE_Message Public Function | Purpose |
|---|---|
| IFE_Message (IFE_MESSAGE_DATA *pIfeMessageData) | This constructor prefills the local IfeMessageData with the raw pIfeMessageData. |
| virtual void GetAddress (char *pAddress) | Returns the Address data, (e.g., “SDU 001A”), from the Address member found in the IfeMessageData. |
| bool GetData (Queue *pInputQueue) | Initializes the IfeMesageData structure of an IFE_Message object with data from the Queue. The address of an IfeMessageData structure is read from the specified queue, the data is copied into the IFE_Message class. The IfeMessageData structure read from the input queue is then Deleted Returns FALSE if fails to get data. |
| bool GetData (HANDLE hlnPipe, ULONG *pBytesRead) | Does a ReadFile( ) on the specified handle and uses the data read to populate the IfeMessageData structure contained in this instance of the IFE_Message class. Returns FALSE if fails to get data from Pipe. |
| virtual IfeldType GetDestination( ) | Returns the Destination data found in the IfeMessageData data member. |
| IfeFunctionType GetIfeFunction( ) | Returns the IfeFunction element of the IFE_MESSAGE_DATA structure associated with this IFE_Message. |
| void GetLruInfo (char *pLruInfo) | Returns the LRU information from the IFE_Message. |
| bool GetLrutype (char *pszLruType) | Copies the data contained in the LRUType field of the IfeMessageData structure contained in this IFE_Message into the location specified by the input argument pszLruType. Returns FALSE if pszLruType is a null pointer. |
| void GetMessageData (BYTE *pData, WORD *wDataLen) | Copies the data field of this IFE_Message object into the pData argument. The number of bytes copied is written to the wDataLen argument. |
| virtual long GetMessageLength( ) | Returns the MessageLength data member value. |
| CString GetNetworkAddress( ) | Retrieves the network address from the raw data buffer of an IFE Message. GetNetworkAddress determines the location of address information in the Raw Data buffer based on the destination ID. Address information is converted from Binary to ASCII if necessary then placed into a CString which is returned to the calling function. |
| virtual IfeldType GetSource( ) | Returns the Source data found in the Ife MessageData data member. |
| UnsolicitedMessageType GetUnsolicitedMessage( ) | Returns the value contained in the UnsolicitedMessage field of this IFE_Message object. |
| void Log(int nMessageDirection, IfeldType nProcessId, char *pszDataFormat) | Formats a text string containing pertinent message information and writes it to standard output. MessageDirection can be set to LogInpMsg or any other value to indicate whether the log should say ‘Received’ or ‘Transmitted’, respectively. ProcessId is simply added to the Log string along with the IFE_Message data. The DataFormat is used to determine which fields are used. If null, only the Process Id, Function, Destination Id, |

-continued

| IFE_Message Public Function | Purpose |
|---|---|
| | Source Id and Address are output to stdout. Otherwise the actual message data also prints. |
| bool PutData (Queue *pOutputQueue) | Allocates sufficient memory to hold a copy of the IfeMessageData structure associated with a message. The IfeMessageData is copied from the Class data area to the newly allocated memory. The pointer to the copied data is then placed on the specified queue. Returns FALSE if fails to create a new IFE_Message object. |
| bool PutData (HANDLE hOutPipe, ULONG *pBytesWritten) | Copies the contents of the IfeMessageData class variable to the pipe specified by hOutPipe. The number of bytes actually written to the pipe are returned in the pBytesWritten argument. Returns FALSE if fails to output to the pipe. |
| virtual void SetAddress (char *pAddress) | Updates the IfeMessageData Address data field with pAddress info. |
| virtual void SetDestination (IfeldType DestinationId) | Updates the Destination field in the IfeMessageData data member. |
| void SetIfeFunction (IfeFunctionType nIfeFunction) | Copies the IfeFunctionType input argument into the IfeFunction element of the IFE_MESSAGE_DATA structure associated with this IFE_Message. |
| void SetLruInfo (char *pLruInfo) | Saves information about the host LRU. |
| bool SetLruType (char *pszLruType) | Fills the LRUType field in the IfeMessageData structure for this IFE_Message with the data contained in the input argument pszLruType. Returns FALSE if input LruType is too big to store. |
| void SetMessageData (BYTE *pData, WORD wDataLen) | Copies the specified data block to the MessageData field of this IFE_Message object. |
| void SetMessageLength (long Length) | Sets the MessageLength local data member to Length. |
| void SetNetworkAddress (CString csNetworkAddress) | Converts the Network Address in csNetworkAddress as necessary and writes the resulting data to the Raw Message Data buffer. The type of conversion required as well as the location of data in the Raw Message data buffer is determined by the identifier of the process that sent the message (i.e., Message Source Id). |
| virtual void SetSource (IfeldType SourceId) | Updates the Source field found in the IfeMessageData data member with SourceId. |
| void SetUnsolicitedMessage (UnsolicitedMessageType Message) | Sets the UnsolicitedMessage field for this IFE_Message object with the value contained in Message. |

ARCNET Messages—ARCNTMSS.CPP

The ARCNET_Message class is a derived class from IFE_Message. It is used to carry and process ARCNET data from the Message Processor to an appropriate Network Addressable Unit (e.g., Seat NAU, Backbone NAU). It is used as a base class to any ARCNET devices, such as the Seat_Message, PESCA_Message, and PESCV_Message classes.

Some of the virtual functions defined in IFE_Message have been overridden within ARCNET_Message.

| ARCNET_Message Class Public Functions | Purpose |
|---|---|
| ARCNET_Message( IFE_MESSAGE_DATA *pIfeMessage Data) | This constructor fills the IfeMessageData data member with the message data structure. |
| ARCNET_Message( BYTE *pMessageData, CMapstringToPtr& LookUpTable) | This constructor takes what must be a valid message and parses it to fill the local structure. |
| bool BuildArcnetMessage( CMapStringToPtr& LookUpTable, char *pLRUName, BYTE *pOutBuf) | This method builds the MessageData into an ARCNET message. The first two bytes of the output message buffer are set to the length of the message (as read from the MessageLength field of the IfeMessageData structure. The remainder of the output buffer is populated with the raw ARCNET data from the MessageData field of the IfeMessageData structure. Returns FALSE if failure. |
| BYTE GetCommand( ) | Returns the value of the Command Byte in the ARCNET MessageData. |
| IfeldType GetDestination( CMapStringToPtr LookUpTable, char *pAddress) | Extracts the Destination bytes from the ARCNET MessageData, attempts to map the raw data and returns the Enumerated IfeldType and Mapping address. Returns NoDestination if none found. |
| IfeFunctionType GetIfeFunction( ) | Returns the IfeFunction data member. |
| long GetMessageLength( BYTE *pMessageData) | Processes the raw ARCNET data to determine the message length, update the local data member and return the value. |
| bool IsTestPrimitive( BYTE byTestPrimitive) | Determines whether or not this IFE_Message is a test primitive by comparing the command byte with the constant TP_COMMAND. A value of TRUE is returned if the command byte equals TP_COMMAND. A value of FALSE is returned otherwise. |
| bool PutData( HANDLE hOutPipe, ULONG *pBytesWritten) | Overloaded ARCNET PutData( ) method. Completes the Message Header and calls the IFE_Message function. Returns FALSE if write to OutPipe fails. |
| bool PutData( Queue *pOutputQueue) | Overloaded ARCNET PutData( ) method. Completes the Message Header and calls the IFE_Message function. Returns FALSe if no data was found to put into Queue. |
| bool SetAddress( CMapStringToPtr LookUpTable, char *pAddress) | This method is an override of the IfeMessage SetAddress( ). It takes in a mapping table and an Address. The address is looked-up in the mapping table and if a match is found the Address data member is updated. Returns FALSE if unsuccessful. |
| void SetCommand( BYTE Command) | This method takes a Command Byte and update the MessageData member. |
| void SetDestination( IfeldType DestinationId) | Simply calls the same IFE_Message function to set the Destination data member. |
| void SetDestination( BYTE *pDestination NetworkAddress) | Parses the DestinationNetworkAddress for the IFE_Message Destination. |
| bool SetDestination( CMapStringToPtr& LookUpTable, char *pAddress) | Looks up the pAddress in the specified LookUpTable to determine the corresponding Destination and stores it in the IFE_Message Destination member. Returns FALSE if lookup fails. |
| void SetIfeFunction( IfeFunctionType Function) | Updates the IFE Function with the given value. |

-continued

| | |
|---|---|
| bool SetSource( CMapStringToPtr LookUpTable, char *pAddress) | Cross-references the Address, (e.g., 'SDU 01A') in the LookUpTable. If a match, updates the Source bytes of MessageData with corresponding value. Returns FALSE if failure. |
| void SetSource( BYTE *pSourceNetworkAddress) | This method takes the BYTE parameter and update the MessageData data member for source. |

The following are virtual functions that may be used in classes derived from this class:

| ARCNET_Message Class Virtual Functions | Purpose |
|---|---|
| virtual void CompleteMessageHeader( ) | To finish up the message for shipment. Base version simply calls SetMessageLength( ). |
| virtual void GetAddress( char *pAddress) | Base version simply calls the IFE_Message version. |
| virtual IfeldType GetDestination( ) | Base version simply calls the IFE_Message version. |
| virtual IfeldType GetSource( ) | Base version simply calls the IFE_Message version. |
| virtual void SetAddress( char *pAddress) | Base version simply calls the IFE_Message version. |
| virtual void SetDestination( IfeldType DestinationId) | Base version simply calls the IFE_Message version. |
| virtual void SetMessageLength( ) | Handles ARCNET messages that do not have sub-functions (i.e., 1F messages). Base version does nothing. |
| virtual void SetSource( IfeldType SourceId) | Base version simply calls the IFE_Message version. |

ARCNET Simulation—ARCSMCLS.CPP

This class contains similar functions to the runtime ARCNET_Message class, except that instead of communicating with the actual ARCNET Driver, this simulates data I/O for test purposes.

PESC-A Messages—PSCMSSGE.CPP

PESC-A_Message class is derived from the ARCNET_Message class to implement the functions needed to support the PESC-A devices.

| PESC-A_Message Function | Purpose |
|---|---|
| bool IsGearDown( ) | Returns indication of whether landing gear is down and locked. |
| bool IsGearCompressed( ) | Returns indication as to whether landing gear is compressed (weight on wheels) |

PESC-V Messages—PSCVMSSG.CPP

PESCV_Message class is derived from the ARCNET_Message class to implement the functions necessary to format and transmit interface messages between the Cabin Control Center and the PESC-V 224*b*.

| PESC-V_Message Function | Purpose |
|---|---|
| void WriteVideoControlData (BYTE *byData) | Initializes the data portion of this PESCV_Message with all information necessary for a Video Control Message (0xE9). byData must contain the Video Control Data bytes. |

Seat Messages—SETMSSGE.CPP

The Seat Message class is derived from the ARCNET_Message class to process Seat data between the Seat NAU and the Services. Methods and data relating to all seat sessioning and sales services, along with some cabin services, are provided.

| Seat_Message Function | Purpose |
|---|---|
| void CompleteMessageHeader( ) | Finishes up the message for shipment, adds message length, et. al. |
| BYTE GetApplicationId( ) | Retrieves the Application ID from the IFE_Message data. |
| double GetCashTotal( ) | Retrieves the Cash Total from the IFE_Message data. |
| BYTE GetCommandId( ) | Returns the Command ID found in the IFE_Message data. |
| BYTE GetControlIdentifier( ) | Returns the Control Identifier found in the IFE_Message data. |
| void GetCreditCardAccount Number (BYTE *pCreditCardAccount) | Retrieves the Credit Card Data from the IFE_Message data. |
| void GetCreditCardCustomer Name (char *pCustomerName) | Retrieves the Credit Card Customer Name from the IFE_Message data. |
| void GetCreditCardExpiration Date (BYTE *pExpirationData) | Retrieves the Credit Card Expiration Date from the IFE_Message data. |
| double GetCreditTotal( ) | Retrieves the Credit Total from IFE_Message data and returns it as a floating point value. |
| short GetFlags( ) | Retrieves the Flags from the IFE_Message data. |
| void GetFlightAttendantId (char *pAttendantId) | Retrieves the Flight Attendant Id from the IFE_Message data. |
| BYTE GetMessageId( ) | Returns the Message ID found in the IFE_Message data. |
| ID GetOrderId( ) | Returns the Order ID from the IFE_Message data. |
| void GetProductCode (char *pProductCode) | Returns the Product Code from the IFE_Message data. |
| long GetProductMap( ) | Returns the Product Map from the IFE_Message data. |
| BYTE GetQuantity( ) | Returns the Quantity from the IFE_Message data. |
| BYTE GetRetryCount( ) | Returns the Retry Count from the IFE_Message data. |
| void GetSeat( char *pSeat) | Returns the Seat from the IFE_Message data. |
| void GetSeatTransferData (CString &csSeat1, CString &csSeat2) | Transfers the seat identifiers from the data area of this IFE_Message object into the two output arguments. |
| WORD GetSequenceNumber( ) | Returns the value of the Sequence Number data member. |
| BYTE GetSessionStatus( ) | Retrieves the session status from the message |
| BYTE GetTransactionStatus( ) | Retrieves the Transaction Status from the IFE message. |
| BYTE GetUpdateType( ) | Retrieves the Update Type from the IFE message. |
| void InitializeSeat( ) | Initializes the LengthMap array with seat Ids once per flight. |
| void SetAddress( char *pAddress) | Copies the Address info into the IFE_Message data member. |
| void SetCashTotal (double Amount) | Copies the Amount into the IFE_Message data. |
| void | Copies the ID info into the IFE_Message |

-continued

| Seat_Message Function | Purpose |
|---|---|
| SetControlIdentifier (BYTE ID) | data. |
| void SetCPMSFlags (BYTE byFlags) | Writes the value contained in byFlags to the Flags location in the CPMS Status message. |
| void SetCreditCardAccount Number (BYTE *pCreditCardAccount) | Copies the CreditCardAccount data into the IFE_Message data. |
| void SetCreditCardCustomer Name (char *pCustomerName) | Copies the CustomerName data into the IFE_Message data. |
| void SetCreditCardExpiration Date (BYTE *pExpirationDate) | Copies the ExpirationDate data into the IFE_Message data. |
| void SetCreditTotal (double Amount) | Formats as a dollar amount and copies Amount into the IFE_Message data. |
| void SetDBBuildId( WORD wBuildId) | Writes the value in wBuildId to the Database Build ID field position in the IFE_Message data. |
| void SetElapsedTime (TIME tmElapsed) | Formats elapsed time 0–999 into IFE_Message data. Values greater than 999 are reduced to 999. |
| void SetHSDLQueueStatus (BYTE *pHSDLQueueStatus) | Copies the High Speed Download Queue Status into the IFE_Message data. |
| void SetIfeState( BYTE IfeState) | Copies the IFE State value into the IFE_Message data. |
| void SetMessageId (BYTE MessageId) | Copies the Message Id into the IFE_ Message data. |
| void SetMessageLength( ) | Sets the length of the IFE_Message data based on the raw data message length. |
| void SetMessagesProcessed (short MessagesProcessed) | Copies the MessagesProcessed into the IFE_Message data. |
| void SetMovieCycleId (BYTE MovieCycleId) | Copies the MovieCycleId into the IFE_Message data. |
| void SetMovieCycleStatus (BYTE MovieCycleStatus) | Copies the MovieCycleStatus into the IFE_Message data. |
| void SetMovieNumber (BYTE MovieNumber) | Copies the MovieNumber into the IFE_Message data. |
| void SetNewVideoChannel Number (BYTE ChannelNumber) | Copies the ChannelNumber into the IFE_Message data. |
| void SetNewVideoRecord Number (BYTE RecordNumber, BYTE LanguageId) | Copies the RecordNumber into the IFE_Message data using LanguageId to pad the text field appropriately. |
| void SetOrderId (ID OrderId) | Copies the OrderId into the IFE_Message data. |
| void SetProductCode (char *pProductCode) | Copies the ProductCode into the IFE_Message data. |
| void SetProductMap (long ProductMap) | Copies the ProductMap into the IFE_Message data. |
| void SetQuantity (BYTE Quantity) | Copies the Quantity into the IFE_Message data. |
| void SetQueuePosition (short QueuePosition) | Copies the QueuePosition into the IFE_Message data. |
| void SetSeatTransferData (Cstring &csSeat1, Cstring &csSeat2) | Copies the seats identified by the two input arguments into the IFE_Message data. |
| void SetSEBMessagingOff( ) | Sets IFE_Message data to SEB-Messaging Off. |
| void SetSEBMessagingOn( ) | Sets IFE_Message data to SEB-Messaging On. |
| void SetSEBMessageSeat Address (char *SeatAddress) | Copies SeatAddress into the IFE_Message data. |
| void SetSequenceNumber (WORD SequenceNumber) | Copies SequenceNumber into the IFE_Message data. |
| void SetSessionStatus (BYTE SessionStatus) | Copies the SessionStatus into the IFE_Message data. |
| void SetSIBacklightCmd (bool bBacklightOn) | Sets the Message ID to SI_BACKLIGHT_ CTL and the first data byte 1 (ON) or 0 (OFF) based on bBacklightOn. |
| void SetStoreStatus (BYTE *StoreStatus) | Copies StoreStatus into the IFE_Message data. |
| void SetTimeLeftOnCurrent Cycle (TIME tmRemaining) | Copies tmRemaining into the IFE_Message data. |
| void SetTimeUntilNextShowing (TIME tmNextShow) | Copies tmNextShow into the IFE_Message data. |
| void SetTransactionStatus (BYTE TransactionStatus) | Copies TransactionStatus into the IFE_Message data. |
| void SetUpdateType (BYTE UpdateType) | Copies UpdateType into the IFE_Message data. |

Test Port Messages—TSTPRTMS.CPP

The TestPort_Message class is derived from ARCNET_ Message to communicate with the yest port of the gile derver.

| TestPort_Message Class Function | Purpose |
|---|---|
| void GetBiteResults (DWORD *pdwErrorCode, DWORD *pdWTestID, DWORD *pdwWitnessType, DWORD *pdwSuspectType, DWORD *pdwSuspectID, DWORD *pdw/TSData, DWORD *pdwErrorClear) | Extracts data from an BIT_BITE_STATUS (op_status) and returns it to the calling function for inclusion in the Application event log. |
| void GetRawSourceAddress (BYTE *pszSrcAddrs) | Extracts the source address field from the IFE_Message data and copies it into pszSrcAddrs. |
| BYTE GetSubCommand( ) | Returns the SubCommand byte from the IFE_Message data. |
| bool SetRevInfo (BYTE *pbyRevInfo) | Parses the text contained in the pszRevInfo string and formats the data into the IFE_Message data. |
| void SetSubCommand (BYTE command) | Sets the SubCommand byte in the IFE_Message data with command. |

Standard Protocol—STNDRDPR.CPP

StandardProtocol class is derived from the IFE_Message class and is the base class that supports the Hughes standard start-stop protocol as described in the, which is used in communications with PATMessage class, PIMessage class, PATSEBMessage class.

| StandardProtocol Class Functions | Purpose |
|---|---|
| bool Decode( ) | Decode data from Hughes standard start-stop data into just plain data. Returns FALSE if decoding failed. |
| void Encode( ) | Encodes the data into the Hughes standard start-stop format. |
| BYTE GetCommand( ) | Returns the Command Byte from the IFE_Message data. |
| bool GetData (HANDLE hInPipe, ULONG *pBytesRead) | Reads data from the hInPipe into the IFE_Message data. Returns the number of bytes read in pBytesRead. Returns FALSE if read failed. |
| bool GetData (Queue *pInputQueue) | Reads and encodes the data from the InputQueue into the IFE_Message data. Returns FALSE if no data or if pointer is NULL. |
| BYTE GetLengthOfCommand( ) | Returns the Command Length from IFE_Message data. |
| bool IsValidCommand( ) | Returns FALSE if Command in IFE_Message is not recognized as one of the Standard Protocol commands. |
| bool PutData (HANDLE hOutPipe, ULONG *pBytesWritten) | Outputs encoded data from IFE_Message data to the OutPipe, reporting the number of BytesWritten. Returns FALSE if failed the written. |
| bool PutData (Queue *pOutputQueue) | Decodes the data from the IFE_Message data and puts it on the OutputQueue. Returns FALSE if message could not be decoded. |
| void SetLength( ) | Sets the Message Length and Destination Address of the IFE_Message. |

Primary access terminal messages—PATMSSGE.CPP

The PATMessage is derived from StandardProtocol to support communication with the primary access terminal's 225 PI board.

| PATMessage Function | Purpose |
|---|---|
| void ConvertCardDataToASCIIFormat (unsigned char *pCardData, long lCardDataLength) | Converts binary format card data in pCardData to ASCII format in IFE_Message data. Requires CardDataLength to set the length of the IFE_Message data field. |
| void ConvertPrinterStatusToASCII (long lPrinterStatus) | Converts PrinterStatus to ASCII format and stores in IFE message data. |
| void DerivedDecode( ) | Stub. |
| void DerivedEncode( ) | Stub. |
| void GetAudioChannel (BYTE *LeftTimeSlot, BYTE *RightTimeSlot) | Stub. |
| long GetCardDataBinaryFormat (unsigned char *pCardData) | Copies magcard data (MagCardReadData Command is first byte) in the original binary format into pCardData. Size of user-supplied buffer should be MAXMESSAGEDATASIZE. Returns adjusted message length. Returns 0 if unable to copy data. |
| BYTE GetControlByte( ) | Returns the control byte from the IFE_Message data. |
| BYTE GetDestinationDevice( ) | Returns address of destination device from IFE_Message data. |
| BYTE GetSourceDevice( ) | Returns address of source device from IFE_Message data. |
| void GetVideoPreviewChannel (BYTE *Channel, BYTE *AudioSel) | Returns the Preview Channel info from the IFE_Message data into Channel and AudioSel. |
| void GetVideoPreviewSource (char *Source) | Stub. |
| void SetAddress (char *Address) | Simply calls the IFE_Message version. |
| void SetAudioChannel (BYTE LeftTimeSlot, BYTE RightTimeSlot) | Develops the Audio Channel info in the IFE_Message data based on the LeftTimeSlot and RightTimeSlot values. |
| void SetAudioVolume (BYTE LeftVolume, BYTE RightVolume) | Develops the Audio Volume info in the IFE_Message data based on the LeftVolume and RightVolume values. |
| void SetCardData( unsigned char *pCardData) | Sets up request to PI to dump the most recent magcard buffer into CardData. |
| void SetDestinationDevice (BYTE byDstDeviceAddr) | Sets address of destination device in IFE_Message data to byDstDeviceAddr. |
| void SetSourceDevice (BYTE bySrcDeviceAddr) | Set address of source device in IFE_Message data to bySrcDeviceAddr. |
| void SetVideoPreviewChannel (BYTE Channel, BYTE AudioSel) | Copies the Channel and AudioSel data into IFE_Message data. |
| void SetVideoPreviewSource (har *Source) | Stub. |

PI Messages—PIMSSAGE.CPP

The PIMessage class is derived from the StandardProtocol class to handle the specifics of the primary access terminal's 225 PI board.

| PIMessage Class Function | Purpose |
|---|---|
| void DerivedDecode( ) | Massages the data in IFE_Message data for local usage. |
| void DerivedEncode( ) | Massages the data in IFE_Message data for output to the PI board. |
| BYTE fooGetCommand( ) | For testing only. |
| BYTE fooGetLengthOfCommand( ) | For testing only. |
| bool fooIsValidCommand( ) | For testing only. |
| bool GetCardData (unsigned char *CardData) | Stub. Always returns FALSE. See PATMessage for this functionality. |
| bool GetCurrentChannelResponse (BYTE *Channel, BYTE *AudioSel) | If the current command was a Channel Request, this returns the Channel and AudioSel. Otherwise returns FALSE. |
| BYTE GetMsgCommandByte( ) | Returns the Command Byte from last PI Message. |
| bool GetPartAndRevisionData (BYTE *PartAndRevision) | If current command was a Part&Revision command, copies the data from IFE_Message data into PartAndRevision. Otherwise returns FALSE. |
| bool GetStatusResponse (BYTE *Response) | If current command was a Status Request command, copies the data from IFE_Message data into Response. Otherwise returns FALSE. |
| bool GetVideoPreviewVCP (char *VCPName) | If current command was a Video Preview VCP command, returns the current VCP assigned to Video Preview screen, persisted by PIInterface VLRU into |

-continued

| PIMessage Class Function | Purpose |
|---|---|
| | VCPName. Otherwise returns FALSE. |
| bool IsCardReaderCommand( ) | Returns TRUE only if the current Command is one from the card reader. |
| bool IsTunerCommand( ) | Returns TRUE only if the current Command is one from or for the Tuner. |
| bool IsUnsolicated( ) | Stub. Always returns FALSE. |
| void PartAndRevisionRequest( ) | Builds a Part&Revision Request into the IFE_Message data. |
| void PutCardData (unsigned char *CardData) | Stub. See PATMessage for this functionality. |
| void RequestCurrentChannel( ) | Builds a Current Channel Request into the IFE_Message data. |
| void SetAck( BYTE byCmdToBeAcked) | Builds an Ack-by-Current-Command into the IFE_Message data. |
| void SetMsgCommandByte (BYTE byMsgCmd) | Copies byMsgCmd into the Message Command Byte class member data. |
| void SetNak (BYTE byCmdToBeNaked) | Builds a NAK-by-Current-Command into the IFE_Message data. |
| void SetVideoPreviewToVCP( char *VCPName) | Stub. |
| void SoftwareReset( ) | Builds a Software Reset Command into the IFE_Message data. |
| void StatusRequest( ) | Builds a Status Request Command into the IFE_Message data. |
| void SwitchTunerType (BYTE TunerType) | Builds a Switch Tuner Type Command into the IFE_Message data. |
| void TuneChannel (BYTE Channel, BYTE AudioSel) | Builds a Tune Channel Command into the IFE_Message data using Channel and AudioSel as part of the command. |

PAT/SEB Messages—PTSBMSSG.CPP

The PATSEBMessage class is derived from StandardProtocol but currently none of its functions are implemented. Therefore, it behaves exactly like StandardProtocol.

| PATSEBMessage Class Function | Purpose |
|---|---|
| void DerivedDecode( ) | Stub. |
| void DerivedEncode( ) | Stub. |
| BYTE GetLengthOfCommand( ) | Stub. Returns Zero. |
| bool IsValidCommand( ) | If Command is recognized by GetLengthOfCommand( ), returns TRUE. Currently returns FALSE. |

Serial I/O Messages—SRLMSSGE.CPP

The Serial_Message is derived from IFE_Message. It is used to carry and process Serial data from the Message Processor to any serial I/O devices NAU. Currently, it is the base class for VCP_Message. The pure virtual functions defined in IFE Message is implemented within Serial Message.

| Serial_Message Function | Purpose |
|---|---|
| bool GetData (HANDLE hInPipe, ULONG *pBytesRead) | Local version reads data into IFE_Message data from InPipe, returning the number of BytesRead. Returns FALSE if no data read from InPipe. |
| bool GetData (IfeldType idSource, IfeldType idDestination, BYTE *pData, DWORD dwDataLen) | Local version fills IFE_Message data structures with data contained in input arguments. Always returns TRUE. |
| bool GetData (Queue *pInputQueue) | Simply calls the IFE_Message version. |
| bool PutData (BYTE *byData, DWORD *pDataLen) | Local version copies the data and length elements from an IFE_Message to the specified arguments. Always returns TRUE. |
| bool PutData (HANDLE hOutPipe, ULONG *pBytesWritten) | Simply calls the IFE_Message version. |
| bool PutData(Queue *pOutputQueue) | Simply calls the IFE_Message version. |

VCP Messages—VCPMSSGE.CPP

The VCP_Message class is derived from Serial_Message (which is derived from IFE_Message) to communicate with the Video Players. It is used between the Message Processor and the VCP NAU.

| VCP_Message Class Function | Purpose |
|---|---|
| void Format (VCPMessageFormat nMessageFormat) | Stub. |
| CString GetAddress( ) | Overrides the one in the IFE_Message base class. Returns the contents of the IFE_Message data Address field in a CString. |
| void GetCommandData (PLAYERCOMMANDS *pPlayerCommand, BYTE *byData, int *pDataLen) | If a valid VCP PlayerCommand, parses out the Command Bytes from the IFE_Message data, returning it in byData. Returns the number of bytes in DataLen, Zero if invalid command. |
| CString GetLruInfo( ) | Overrides the one in the IFE_Message class. This version creates a CString from the data contained in the LruInfo field of the IfeMessageData structure and returns it to the function. |
| void GetPlayerResponse (PlayerCommands *pPlayerCommand, PLAYERSTATE *pPlayerState, BYTE *pData, BYTE *pDataLen) | Stub |
| void GetResponseData IfeFunctionType *pResponseCommand, BYTE *byData, int *pDataLen) | Parses data from IFE_Message data into byData, returning the DataLen size of the data. Returns responses Ack or Nak in ResponseCommand. |
| PLAYERSTATE GetState( ) | Returns the enumerated state of the VCP (e.g., Playing, FastForward, etc.) |
| void GetStateInfo (PLAYERSTATE *pState, DWORD *pTime) | Retrieves state information from this IFE Message object. Assumes that state information was writing using the SetStateInfo member function. |
| bool Is ValidChecksum( ) | Returns FALSE if checksum test. |
| void SetAddress | Overrides SetAddress in IFE_Message base class. Address field of the |

-continued

| VCP_Message Class Function | Purpose |
|---|---|
| (CString csAddress) | IfeMessageData structure for this message is populated using the CString input argument. |
| void SetChecksum( ) | Calculates and writes a checksum to the IFE Message. Then stores the full length of the message in the MessageLength field of the message. |
| void SetLruInfo( CString csLruInfo) | Overrides the function in the IFE_Message base class. This version copies the csLruInfo data to the LruInfo field of IFE_Message data. |
| void SetPlayerCommand (PlayerCommands nPlayerCommand, BYTE *byData, BYTE byDataLen) | Converts enumerated internal PlayerCommand into the actual command byte to go to the VCP. Returns any associated data from IFE_Message data into byData and returns its length in DataLen. |
| void SetStateInfo (PLAYERSTATE nState, DWORD dwTime) | Writes VCP State and Time information to the IFE Message data. State information is retrieved using GetStatefrInfo( ). |
| void SetUnitId (PGENERIC_TEXT pszUnitId) | Writes the UnitId into the IFE Message data. |

(PGENERIC_TEXT pszUnitld)

The following drivers could not be obtained from a COTS resource, so they were therefore developed as custom drivers for use in the present invention.

ARCNET Driver

ARCNET is the token-passing network that provides the primary communication link between the Control Center and the backbone of the system 100. The ARCNET driver 408 is software that provides the interface between the message processor 404 and the physical ARCNET device interface in the cabin file server 268 or the primary access terminal 225.

For development efficiency, the ARCNET driver 408 has been attached to the message processor 404. The ARCNET driver 408 performs the following. The ARCNET driver 408 obtains a network address of this line replaceable unit. The ARCNET driver 408 understands network addresses for up to 8 cabin file servers 268 and up to 8 primary access terminals 225, to provide for future growth. The ARCNET driver 408 initializes the ARCNET device to proper configuration. The ARCNET driver 408 signs-on to the network. The ARCNET driver 408 handles network reconfigurations and builds up network map to obtain information for routing messages across multiple ARCNET networks. The ARCNET driver 408 deals with transmit handshaking exceptions that may occur.

The ARCNET device is an SMC COM20020 Universal Local Area Network Controller, the fame device as used in all backbone line replaceable units. The network speed is 1.25 Mbps. 256 byte ARCNET packet (short packet format) is employed. 2 KB internal device RAM is divided into two 256 byte pages: 1 receive buffer and 1 transmit buffer. The rest is currently not used. The line replaceable units are arranged in 2 ARCNET networks 216, one each supported by the primary access terminal 225 and the cabin file servers 268. The ARCNET driver 408 supports this variability.

Figures 26, 27, 28, 29, 30, 31, 32:
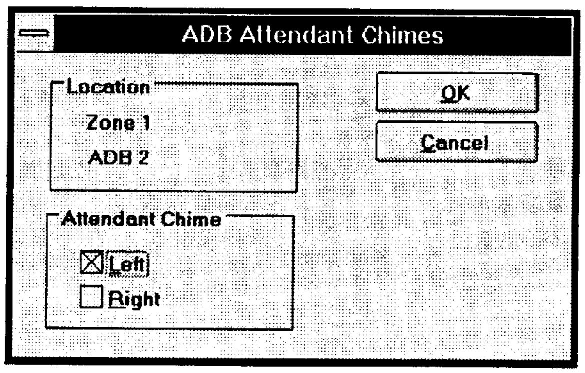

FIG. 32 is a diagram illustrating the ARCNET Message Packet components. The ARCNET Message Packet includes a packet header and packet data. The packet header includes a ______ (PSID) word, a ______ (PDID) word, and a ______ (PCount) word. The packet data includes a word that is not used, a packet message separator (Mcount), a packet message, and a packet message trailer. The packet message includes a ______ (DID) word, a ______ (DSID) word, a ______ (DUID) word, a ______ (SID) word, a ______ (SSID) word, a ______ (SUID) word, a command (CMD) word, and data. An ARCNET short format packet includes only the packet message. In transmitting data, the user, or ARCNET Handler supplies the Packet Message, and the driver supplies the rest. In receiving, the driver strips the complete message and supplies the Packet Message only to the ARCNET Handler.

Figures 26, 27, 28, 29, 30, 31, 32, 33:
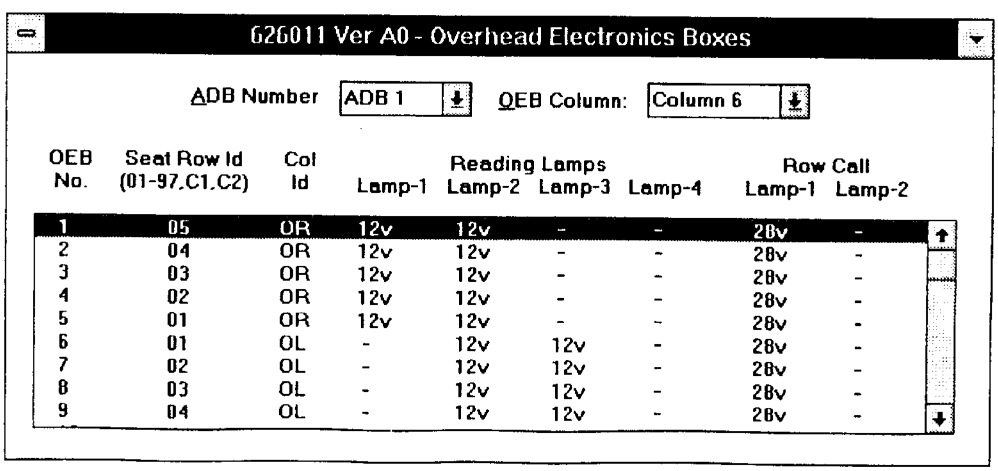

FIG. 33 illustrates the operational flow of the ARCNET Driver 408. The ARCNET driver 408 is part of MP.EXE and comprises the following source file:

ARCNTDRV.RT—the ARCNET Driver Source

This file is pre-processed using WinRIT (see the make file) to incorporate the necessary additional functionality.

To use the ARCNET driver 408, a user first calls ArcnetDriverClass::StartDriuer( ) to initialize this driver and its device and establish queues 607, 606 to be used to transmit and receive data.

FIG. 33 illustrates the operational flow of the ARCNET Driver 408, where StartDriver( ) 601 launches I/O (receive, transmit) threads 604, 605 and an interrupt handler 603, and StopDriver( ) 602 shuts them all down.

The ARCNET driver 408 maintains a set of counts, called Statistics, typically used during system testing to show the following: Number of Transmissions, Number of Receipts, Number of Reconnects (Recon) to network, Number of Reconnects caused by this program, and the Number of Excessive NAKs (ExcNak). These Statistics can be reset and read by the caller using functions below.

The ARCNET driver 408 also collects all communications with seats 123 into an ever-growing structure called Seat History. The caller can periodically cause this to be saved to disk and then cleared. This also is typically used for testing.

| ArcnetDriverClass Public Functions | Purpose |
|---|---|
| void ClearStatistics( ) | Zero all ARCNET statistics counters. |
| UCHAR GetNetworkMap (PUCHAR pNetMap) | If pNetMap is non-null, provides snapshot of current network map: pNetMap points to a caller-provided array UCHAR[256] to be filled. Non-zero entries in this array signify nodes that have signed on to the network. The array indices are node addresses. If the contents of an array element equals its index, then that node is on the "local" ARCNET, otherwise it's on the "distant" ARCNET. Returns the ARCNET address of this node or 0 if the driver has not been started. |
| void GetStatistics (PARCNETSTATS pStats) | Copies ARCNET statistics structure to callers structure pointed to by pStats. |
| void PurgeHistory( ) | Purges ARCNET Seat Trace History list. |
| DWORD SaveHistory (LPCTSTR lpszPathname) | Dumps ARCNET Seat Trace History list to specified disk file lpszPathname. |
| void SetExNakCnt (ULONG ulCnt) | Set number of excessive Naks counter of ARCNET statistics structure. |
| void SetReconCnt (ULONG ulCnt) | Set number of reconfiguration interrupts counter of ARCNET statistics structure. |
| void SetRxCnt (ULONG ulCnt) | Set number of packets received counter of ARCNET statistics structure. |
| void SetTxCnt (ULONG ulCnt) | Set number of packets transmitted counter of ARCNET statistics structure. |
| void ShowData (ARCNET_SHOWDATA ShowDataType, BOOL bEnableDisable, BOOL bShowBroadcasts) | Tells driver to enable or disable console data display of selected items: Transmitted Packets, Received Packets, Broadcasts of each type may be selectively enabled or disabled. This is used for testing purposes. |

-continued

| ArcnetDriverClass Public Functions | Purpose |
|---|---|
| DWORD StartDriver 601 (Queue *pTxQueue, Queue *pRxQueue, Queue *pExceptionQueue) | Starts the ARCNET driver and device. Arguments are pointers to a user's Transmit Queue (outgoing data to ARCNET), Receive Queue (incoming data from ARCNET), and Exception Queue (error info to handler). These queues are set up by the user before StartDriver( ) is called. StartDriver( ) intializes the device and start up the driver's internal threads. Returns ERROR_SUCCESS if successful. |
| DWORD StopDriver( ) | Stops the driver and causes this ARCNET node to leave the ARCNET network. Returns ERROR_SUCCESS always. |

The Watchdog Driver 410 controls a watchdog device supplied by Octagon (called the Octagon PC-450) which, when activated by the System Monitor 412, reboots the system unless it is accessed no less than every 1.6 seconds by the watchdog driver 410. The driver 410 can receive a command to force a reboot of the system, which stops it from updating the watchdog driver 410. The watchdog driver 410 then times-out and a reboot occurs. Use of the watchdog driver 410 helps improve system availability in the event of a software or hardware anomaly that causes unpredictable results in system operation.

WDOG.SYS is the Watchdog Device Driver and is comprised of the following primary files:

WATCHDOG.C Does the non-initialization work of the watchdog driver.

WDOGINIT.C Specific to initialization and unloading of the watchdog driver.

The Watchdog Device Driver is used like any Windows NT driver via the following NT standard functions: CreateFile( ), which establishes communications with the device; and DeviceIoControl( ), which allows the user to: Enable Watchdogging, Disable Watchdogging, Strobe to reset the countdown timer, and Defer the Resetting of the system by some number of seconds.

The cabin file server Executive Extension will be discussed with reference to FIG. 27. The cabin file server Executive Extension set of routines together with the Common Executive Software forms the generic application for the cabin file server 268. It includes the following components: Backbone NAU 463, Seat NAU 465, VCP NAU 462, Test Port NAU 461, High-Speed Download Driver 449, Services 477 including Cabin Services 478–482, 487–491 and Sales Services 483–486, CAPI calls 476, and the database 493, as shown in FIG. 27. The function and data paths of the many of the NAUs 461–465 have a structure substantially identical to the structure shown and described with reference to FIG. 28 regarding the basic network addressable units function and data paths. The changes generally relate to the structure of the state machine objects 510 that are used in the respective NAUs 461–465. The Backbone NAU 463 comprises a PESC-V NAU dispatcher 500*a* and PESC-V and PESC-AP VLRU state machine objects 510*a*. The Seat NAU 465 comprises a HSDL NAU dispatcher 500*b* and NAU VLRU state machine objects 510*b*. The VCP NAU 462 comprises a VCP NAU dispatcher 500*c* and a NAU VLRU state machine object 510*c*. The Test Port NAU 461 comprises a TestPort NAU dispatcher 500*d* and a NAU VLRU state machine object 510*d*. The cabin file server NAUs are Network Addressable Units that reside on the cabin file server 268.

Figures 26, 27, 28, 29, 30, 31, 32, 33, 34:
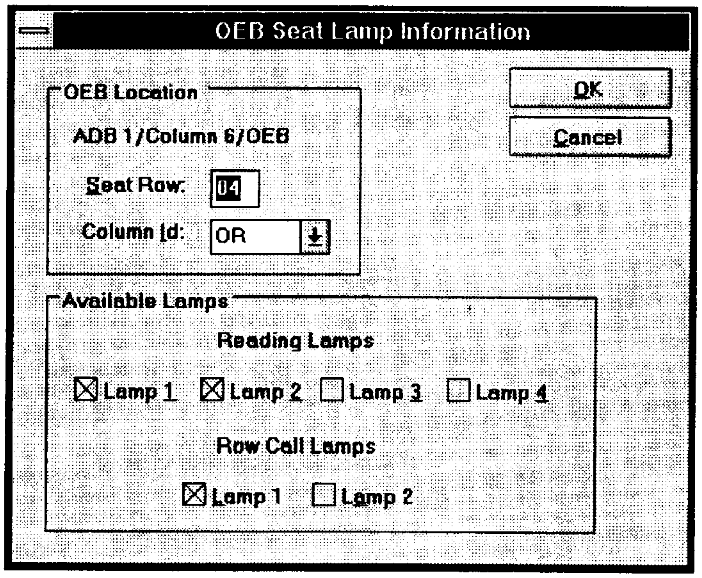

FIG. 34 illustrates the Backbone NAU program 463 function and data paths. The Backbone NAU 463 is responsible for receiving and processing messages that originate from the audio-video units 231, area distribution boxes 217, passenger entertainment system controllers 224, and any other "communications backbone" line replaceable unit. Currently however, the only communications it handles are with the primary PESC-A 224*a* and the PESC-V 224*b*. The structure of the Backbone NAU 463 is substantially the same as the Network Addressable Units function and data paths discussed with reference to FIG. 28.

The detailed design of the cabin file server Executive Extension will now be discussed. The BACKBONE.EXE routine contains the Backbone NAU program 463. The Backbone NAU program 463 includes the following primary components:

| | |
|---|---|
| BACKBONE.CPP | The Main( ) Program |
| PSCPDSPT.CPP | The NAU Dispatcher for the PESC-A |
| PSCVDSPT.CPP | The NAU Dispatcher for the PESC-V |
| PSCPVLRU.CPP | The VLRU Class for the PESC-A |
| PSCVVLRU.CPP | The VLRU Class for the PESC-V |

The Main( ) program is a standard NAU starter that registers the Backbone NAU 463 with the system monitor 412 using a SysMonInterfaceClass::Register( ) routine.

The Main( ) program launches a PescV_Dispatch object to open up PESC-V VLRU communications between the message processor 404 and the transaction dispatcher 421, and a PescAp_Dispatch object as well to launch the PESC-A 224*a*. It calls PescV_Dispatch::startItUp( ) to initialize both of the VLRUs (since they're both BackBoneNAUs, this works).

The Main( ) program launches 14 Session( ) threads, although only three are actually in use. It sends a SubProcessStart command to the VLRUs which causes the first Session( ) threads in to connect to each VLRU permanently. Only the PescV_Dispatch object maintains a set of MPRight( ), MPLeft( ), TDRight( ) and TDLeft( ) threads.

Finally, the Main( ) program sleeps forever until interrupted. It does not call shutItDown( ) to close all the VLRUs down and exit gracefully (this has been commented out). Instead, it simply deletes the PescV_Dispatch object and dies.

The VLRUs in this NAU contain their own set of NAUPutTD( ), NAUPutMP( ), NAUGetTD( ) and NAUGetMP( ) routines because they use I/O routines from the PESCA_Message class and PESCV_Message class instead of the IFE_Message class.

The PescAp_VLRU object attaches directly to the first Session( ) possible via its StartItUp( ) function. Then, it continuously loops waiting for data to appear in its message processor and transaction dispatcher input queues. It processes the following commands:

FlightInfoRequest IFE Function from the PESC-A 224*a*. This VLRU creates its own IFE message to the IFE Control Service asking for Flight Information.

FlightInfoUpdate IFE Function from the IFE Control Service, after the PESC-A 224*a* issues it a FlightInfoRequest. This VLRU creates its own IFE message to forward this to the PESC-A 224*a* via the message processor 404.

PES_CONTROL command from the PESC-A 224*a*. This VLRU examines the state of the WeightOnWheels using PESCA_Message::IsGearCompressed( ). If the state of the wheels has changed, it forwards this new information to the database using NotifyNewFlightState( ), and to the CAPI Message Service via its own NAUPutTD( ).

All other messages are ignored.

This prints to the standard output (if any) a single character to denote progress:

| Character | Meaning |
| --- | --- |
| ? | Unknown Command or Message |
| – | PES_Control_Command received |
| V | Weight ON Wheels |
| ˆ | Weight OFF Wheels |

The PescV_VLRU object attaches directly to the first Session( )possible via its StartItUp( ) function. Then, it continuously loops waiting for data to appear in its message processor and transaction dispatcher input queues. It processes the following commands:

VideoControl command from IFE Control Services is formatted- and forwarded to PESC-V 224*b*. Any other message from PESC-V 224*b* is routed directly to the IFE Control Services. This prints to the standard output (if any) a single character to denote progress:

| Character | Meaning |
| --- | --- |
| ] | Unknown Command from the message processor |
| ]? | Unknown Command from the transaction dispatcher |
| < | VideoControl Command Received |

Figures 26, 27, 28, 29, 30, 31, 32, 33, 34, 35:
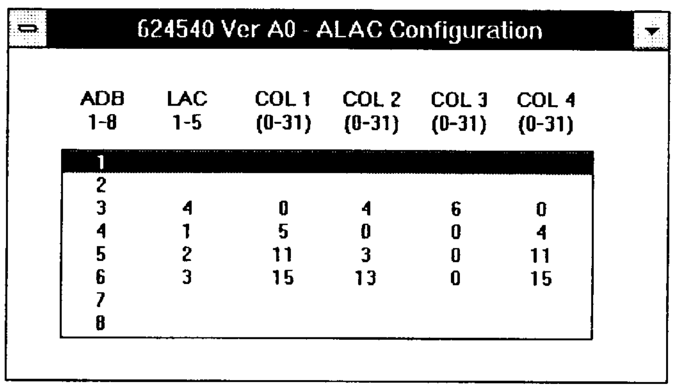

The Seat NAU program 465 function and data paths are depicted in FIG. 35. The Seat NAU 465 controls communication with the seats in the aircraft 111. It maintains three kinds of VLRUs: one that controls high speed download of games and programs to the seats 123; one that periodically broadcasts status messages to the seats 123, and one for each seat 123 to communicate during the flight for sales and other requests.

The structure of the Seat NAU 465 is substantially the same as the Network Addressable Units function and data paths discussed with reference to FIG. 28. However, the Seat NAU 465 also includes VLRU state machine objects 510b comprising an HSDLInterface VLRU 650, a SeatInterface VLRU 651, and a SeatBroadcast VLRU 652.

The HSDLInterface VLRU 650 comprises a ProcessFileChanges( ) 650*a*, ProcessDownloads( ) 650*b*, and a RefreshThread( ) 650*c*. The SeatInterface VLRU 651 comprises a Crank( ) 651*a*, a SessionQueueLeft 651*b*, and a SessionQueueRight 651*c*. The SeatBroadcast VLRU 652 comprises a PendingSessionMonitor( ) 652*a* and a WheelStatusMonitor( ) 652*b*.

SEAT.EXE contains the Seat NAU program 465. This program includes the following primary components:

NAUMAIN.CPP The Main( ) Program

HSDLDSPT.CPP The High Speed Download NAU Dispatcher

STDSFTCH.CPP The Seat NAU Dispatcher

STNTRFCE.CPP The Seat VLRU Class

SESSION.CPP The Service Session Class

STBRDCST.CPP The Seat Broadcast VLRU Class

HSDLNTRF.CPP The HSDL VLRU Class

DWNLDFLN.CPP For HSDL, the DownLoadFileInfo Class

FILEMAP.CPP For HSDL, The FileMap Class

A VLRU Session is characterized by the NAU:: Session( ) threads, one for each VLRU that may be active concurrently. A Service Session is characterized by the Session class, that controls a stream of communications between a single seat and a Service (such as a Sales Service). This stream may include several messages back and forth before a Service Session is complete.

The Main Program is a standard NAU starter.Main( ) registers this program with the System Monitor using the SysMonInterfaceClass::Register( ) routine. For test purposes only, if any parameter is passed to this program, it bypasses this step.

The Main Program creates a HDSLDispatch object to open up communications between the message processor 404 and the transaction dispatcher 421 and create the High Speed Download VLRU. Then the Main Program creates the SeatDispatch object to create all the SeatInterface VLRUs and the SeatBroadcaster VLRU. The Main Program launches 14 Session( ) threads that are shared by all the VLRUs. A typical number of Sessions is 14 including 10 seats' Service Sessions, plus HSDL, plus Broadcast, plus two more to control seats that are waiting for a Service Session to free up (pending seats). The Main Program calls NAUDispatch::startItUp( ) to initialize the VLRUs with a SubProcessStart command.

The HSDLDispatch file defines a MPRightHook( ) function to be called within the NAUDispatch::MPRight( ) thread prior to processing the incoming message from the message processor 404. It uses this hook function to intercept the High Speed Download Request messages and route them to the HSDL VLRU instead of to the Seat VLRU, where its LRU address would normally send it. This reduces traffic to the 10 Sessions( ) reserved for the seats.

Finally, Main( ) sleeps forever until interrupted. It does NOT call shutItdown( ) to close all the VLRUs down and exit gracefully (this has been commented out). Instead, it simply deletes the NAU Dispatch and dies.

The SeatInterface VLRU is responsible for processing requests from the seats such as ordering a movie or a game. It routes these requests to the applicable Service via the Transaction Dispatcher. One VLRU for each seat in the system exists, however, only 10 VLRUs at a time may actively be engaged in a communication session between seat and Service.

Each SeatInterface VLRU has a Session object that it uses as its state machine. Its StartItUp( ) function loops continuously as long as it is actively engaged within a session (that is, the session state is not idle), looking for one of the following events:

Data from the message processor 404, Data from the transaction dispatcher 421, an NAU TIMEOUT, an NAU RUN IMMEDIATE, a NAU AUX, a SessionQueue.Right or SessionQueue.Left events. It passes any TD messages on to the seat display unit 133 provided they do not affect the State of the VLRU. StartItUp( ) then calls Session::Crank( ) to process one event from the SessionQueue.Right queue. Once it has been processed, StartItUp( ) forwards any message that may be waiting in SessionQueue.Left (sending it out to the message processor 404 or transaction dispatcher 421), then determines what to do with the input event that got it going (from the message processor 404, transaction dispatcher 421, Timeout etc.). Usually, it simply puts it in SessionQueue.Right, which re-triggers StartItUp( ) to again call Session::Crank( ) until all events and/or messages are processed. Once the processing is complete for this VLRU's Session, StartItUp( ) exits, to give the session thread to another seat. It uses MessageToEuent( ) to convert a Seat_Message into its corresponding Event value, and it uses EventToMessage( ) to develop an appropriate outgoing message based on the current VLRU Event.

StartItUp( ) also processes the following control messages:

| IFE Message | Action |
|---|---|
| StartStatisticsCapture | Sent by the SeatBroadcast thread when WeightOnWheels is detected, uses timedCallback::queue( ) to set a timer to a random value to cause the Statistics request to go to the seat after the timeout. This prevents all seats from processing the request at the same time (as it would from a broadcast), to keep the traffic on the network less congested. |
| SubProcessReinit | Re-Initializes tables via Initialize( ). |
| SubProcessStart | Starts the State Machine for this VLRU, putting it into the Start state. |
| SubProcessStop | Exits. |
| Service Session Class | |

At a minimum, a seat transaction requires sending a message to a Service and receiving an answer back. However, if it is a complex transaction (for example, a multiple-product merchandise order), several messages are routed before the entire transaction is complete. Because 500 seats may be all communicating at the same time, the basic design of communications flow from the seat to the Services and back can get highly fragmented when these complex transactions are involved. To minimize this fragmentation (and thus create the appearance of faster response at the seats), the Service Session protocol has been developed.

Supported by the Session class and the SDU interface, this protocol requires a seat to open a session (or tap dibs) with the Seat NAU before a transaction can take place. Only 10 Sessions are supported simultaneously (controlled in the Session constructor by hSessionSemaphore), so if they are all busy, a Pending message is returned to the seat to tell it to wait, and the seat's ID is kept on the SeatInterface::PendingSeats queue. Once a seat has a Session assigned to it, it can communicate freely with the Service via the NAU until it closes or releases the Session.

The following table illustrates a Sample Session Communication Flow.

| Seat | Seat NAU | Sales Service |
|---|---|---|
| Session Control - OPEN> | | |
| | <Session Status - Pending | |
| Session Control - SDU Pending> | | |
| | <Session Status - Opened | |
| Transaction Command - Order> | | |
| | Transaction Command - Order> | |
| | | <Transaction Status - Ordered |
| | <Transaction Status - Paid | |
| Transaction Command - Order> | | |
| | Transaction Command - Order> | |
| | | <Transaction Status - Ordered |
| | <Transaction Status - Paid | |
| Session Control - Close> | | |
| | <Session Status - Closed | |

Each SeatInterface VLRU has a Session class, called the_Session to support this which uses an EventStateTable that keeps track of the action to perform for any given Event and/or State. Each action is maintained as a separate function whose name begins "Ac" (e.g., AcTerminateSelf( )). These Action functions are all static BOOL functions that need the current Session and Event pointers passed to them to operate. They are called by the function Crank( ) after it looks them up in the EventStateTable.

The following state table, called "Action" in the software, shows the relationship between the States, Events, Actions and changed or new states, sorted by From-State. Using this table, one can see how a Seat's Session moves from one state to another, which events can trigger the change and what actions are performed to cause the change. In the software, the events are prefixed with "Ev" (such as "EvSelfBackOut"), actions with "Ac" (such as "AcBackOut") and states with "St" (such as "StBackOut"). These prefixes are omitted from the table below for easier reading.

| From-State (St . . . ) | Event Trigger (Ev . . . ) | Action Function (Ac . . . ) | To-State (St . . . ) |
|---|---|---|---|
| BackOut | SelfBackOut | BackOut | BackOut |
| BackOut | ServiceBackedOut | BackOut | BackOut |
| BackOut | SelfBackOutDone | BackOutDone | Opened |
| CancelPending | ServiceCanceled | ServiceGeneralAction | Opened |
| CancelPending | SelfTimeOut | GeneralTimeOut | Terminating |
| Closed | SelfClosed | SessionNormal-Terminate | Terminated |
| Closed | SelfTimeOut | GeneralTimeOut | Terminating |
| Complete Up-dateByCommand | SDUGetNext-Transaction | SendTransaction-Update | Complete-UpdatePending |
| Complete-UpdatePending | SDUGetNext-Transaction | SendTransaction-Update | CompleteUpdate-Pending |
| Complete-UpdatePending | SelfUpdateDone | TransactionUpdate-Complete | Opened |
| Complete-UpdatePending | SelfTimeOut | GeneralTimeOut | Terminating |

-continued

| From-State (St . . . ) | Event Trigger (Ev . . . ) | Action Function (Ac . . . ) | To-State (St . . . ) |
|---|---|---|---|
| DeliveryPending | ServiceDelivered | ServiceGeneral-Action | Opened |
| DeliveryPending | SelfTimeOut | GeneralTimeOut | Terminating |
| End | SelfTimeOut | GeneralTimeOut | Terminating |
| Foo | SDUPending | SessionNotAvailable | Paused |
| Incremental-Update-ByCommand | SDUGetNext-Transaction | SendTransaction-Update | Incremental-UpdatePending |
| Incremental-UpdatePending | SDUGetNext-Transaction | SendTransaction-Update | Incremental-UpdatePending |
| Incremental-UpdatePending | SelfUpdateDone | Transaction-UpdateComplete | Opened |
| Incremental-UpdatePending | SelfTimeOut | GeneralTimeOut | Terminating |
| Opened | SDUCancel | SDUGeneralAction | CancelPending |
| Opened | SDUClose | SessionClose | Closed |
| Opened | SDUDeliver | SDUGeneralAction | DeliveryPending |
| Opened | SDUOpen | DoNothing | Opened |
| Opened | SDUStatisticsData | Statistics | Opened |
| Opened | SDUSurveyData | Survey | Opened |
| Opened | SDUOrder | SDUOrder | OrderPending |
| Opened | SDURefund | SDUGeneralAction | RefundPending |
| Opened | SelfTimeOut | GeneralTimeOut | Terminating |
| Opened | SDUComplete-Update | DetermineUpdate-TypeNeeded | UpdateType-Pending |
| Opened | SDUIncremental-Update | DetermineUpdate-TypeNeeded | UpdateType-Pending |
| Opened | SDUUpdate-Request | DetermineUpdate-TypeNeeded | UpdateType-Pending |
| Ordered | SelfDeliverOnOrder | ServicePaid | Opened |
| Ordered | SDUPayment | SDUPayment | PaidPending |
| Ordered | SelfTimeOut | GeneralTimeOut | Terminating |
| OrderPending | ServiceOrdered | ServiceOrdered | Ordered |
| OrderPending | SelfTimeOut | GeneralTimeOut | Terminating |
| PaidPending | ServiceNotPaid-ForReason | ServiceNotPaid | BackOut |
| PaidPending | ServicePaid | ServicePaid | Opened |
| PaidPending | SelfTimeOut | GeneralTimeOut | Terminating |
| Paused | SDUOpen | SessionOpenNow | Waiting |
| Pending | SelfSystem-NotAvailable | SystemNotAvailable | Closed |
| Pending | SelfSession-NotAvailable | SessionNotAvailable | Foo |
| Pending | SelfSession-Available | SessionAvailable | Opened |
| Pending | SDUOpen | SessionTryToOpen | Pending |
| Pending | SelfTimeOut | GeneralTimeOut | Terminating |
| RefundPending | ServiceRefunded | ServiceGeneralAction | Opened |
| RefundPending | SelfTimeOut | GeneralTimeOut | Terminating |
| SessionInit | SDUClose | SessionNormal-Terminate | Closed |
| SessionInit | SDUOpen | SessionTryToOpen | Pending |
| SessionInit | Terminate-Immediatly | SessionInit | SessionInit |
| SessionInit | SDUTerminate | SessionAbnormal-Terminate | Terminating |
| SessionInit | SelfTimeOut | GeneralTimeOut | Terminating |
| SessionInit | SelfStatisticsNotify | SendUpdate-NotifyToSDU | UpdateNotify-AckPending |
| SessionInit | ServiceComplete-UpdateNotify | SendUpdate-NotifyToSDU | UpdateNotify-Ackpending |
| SessionInit | ServiceInc-UpdateNotify | SendUpdate-NotifyToSDU | UpdateNotify-AckPending |
| SessionInit | ServiceIncUpdate-NotifyWithRevoke | SendUpdate-NotifyToSDU | UpdateNotify-WithRevoke-AckPending |
| Start | Start | SessionInit | SessionInit |
| Start | SelfTimeOut | GeneralTimeOut | Terminating |
| Terminated | SelfReinitialize | SessionInit | SessionInit |
| Terminated | SelfTimeOut | GeneralTimeOut | Terminating |
| Terminating | SelfTerminated | Terminated | Terminated |
| Terminating | SelfTimeOut | GeneralTimeOut | Terminating |
| TVOffAck-Pending | SelfTimeOut | UpdateNotifyTimeOut | DontChangeState |
| TVOffAck-Pending | SDUTVOffAck | ServiceUpdate-NotifyComplete | SessionInit |

-continued

| From-State (St . . . ) | Event Trigger (Ev . . . ) | Action Function (Ac . . . ) | To-State (St . . . ) |
|---|---|---|---|
| TVOffAck-Pending | SelfCancel-UpdateNotify | DoNothing | SessionInit |
| UpdateNotify-AckPending | SelfTimeOut | UpdateNotifyTimeOut | DontChangeState |
| UpdateNotify-AckPending | SDUUpdateNotify-AckFromSDU | ServiceUpdate-NotifyComplete | SessionInit |
| UpdateNotify-AckPending | SDUUpdateNotify-AckFromSI | ServiceUpdate-NotifyComplete | SessionInit |
| UpdateNotify-AckPending | SelfCancel-UpdateNotify | DoNothing | SessionInit |
| Update Notify-WithRevoke-AckPending | SelfTimeOut | UpdateNotifyTimeOut | DontChangeState |
| UpdateNotify-WithRevoke-AckPending | SDUUpdateNotify-AckFromSI | SendTVOff | TVOffAckPending |
| Update-TypePending | SelfCompleteType | SendUpdateType | CompleteUpdate-ByCommand |
| UpdateType-Pending | SelfIncrementalType | SendUpdateType | Incremental-UpdateBy-Command |
| Waiting | SelfSessionAvailable | SessionAvailable | Opened |
| Waiting | SelfSession-NotAvailable | SessionNotAvailable | Waiting |

All possible From-State/Event Trigger combinations are not represented in the Action table. Many do-nothing or illogical combinations need to default. For that reason, the Action table is used to fill in a larger, more comprehensive table called the EventStateTable. This two-dimensioned table uses the values of From-State and Event Trigger as indexes, and defaults the illogical values to either do nothing or to terminate.

A typical session flow (with no errors) to place an order would start and end in the SessionInit state as shown below:

| From-State (St . . . ) | Event Trigger (Ev . . . ) | Action Function (Ac . . . ) | To-State (St . . . ) |
|---|---|---|---|
| Start | Start | SessionInit | SessionInit |
| SessionInit | SDUOpen | SessionTryToOpen | Pending |
| Pending | SelfSessionAvailable | SessionAvailable | Opened |
| Opened | SDUOrder | SDUOrder | OrderPending |
| OrderPending | ServiceOrdered | ServiceOrdered | Ordered |
| Ordered | SDUPayment | SDUPayment | PaidPending |
| PaidPending | ServicePaid | ServicePaid | Opened |
| Opened | SDUClose | SessionClose | Closed |
| Closed | SelfClosed | SessionNormalTermiate | Terminated |
| Terminating | SelfTerminated | Terminated | Terminated |
| Terminated | SelfReinitialize | SessionInit | SessionInit |

Each Session has a SessionQueue queue pair that is used to store the Events to perform for this Session's State Machine. The SessionQueue's Right queue stores incoming message/event pointers for Session::Crank( ) to process, while its Left queue stores outgoing event/message pointers for SeatInterface::StartItUp( ) to forward to either the message processor 404 or the transaction dispatcher 421 or timeouts as appropriate.

Broadcast VLRU

The SeatBroadcast VLRU is a child of the SeatInterface class so that it can help monitor the seat communication traffic for the other SeatInterface objects. It is responsible for sending messages to more than one seat or more than one SeatInterface VLRU. Only one message is actually sent in a broadcast to the seats with the destination set to "AllSeats". It uses the CalledTimeOut utilities to create a TimeOut Thread called SeatBroadcastTimeout( ) to force periodic, unsolicited broadcasts. It also launches the PendingSessionMonitor( ) and WheelStatusMonitor( ) threads.

It's StartItUp( ) function loops forever, retaining possession of one of the Session( ) threads. It continuously monitors messages and processes the following events or messages:

| Message or Event | Action |
|---|---|
| CPMS Message | Tells all SDU-SI boards the current status of the HSDL Queue. Retriggers the HSDLInterface::ProcessDownLoadQ( ) event. |
| MovieTimes Message | Tells the MP what the Movie Run Times are |
| NAU_TIMEOUT Event | Triggers every tenth of a second using the timedCallback::queue( ) function. When received, this broadcasts a "Session Complete" |

-continued

| Message or Event | Action |
| --- | --- |
| | message to all seats if a Service Session has just completed, so they can retry communications, if needed. |
| ProcessReinit Message | Tells all VLRUs to "SubProcessReinit". |
| SeatTransfer Message | Uses ProcessSeatTransfer( ) to parse and forward this message to the two SeatInterface VLRUs that are involved in the transfer. |
| SubProcessStart Message | Tells all VLRUs to "SubProcessReinit". |
| SubProcessStop Message | Stops the Timeout thread and ends the program. |
| Weight_On_Wheels Event | Tells all VLRUs to Start Statistics Capture, now that the aircraft has landed (ending flight). |

The PendingSessionMonitor( ) has nothing to do with Seat Broadcasting: It is a supplement to the normal SeatInterface processing. This monitor continuously waits for a Seat to be put onto the static SeatInterface::PendingSeats queue (by any of the other SeatInterface::StartItUp( ) threads), and then waits until one of the Seat Sessions is available for processing. Then it puts this Seat ID onto the AuxFifo queue to be taken by the next available Session( ) thread.

The WheelStatusMonitor( ) is a High Priority thread that waits for a signal from the PESC-A VLRU in the Backbone NAU, which pulses the Weight On Wheels or the Weight Off Wheels events when their status changes. This monitor forwards this event information to the StartItUp( ) to process when it next loops.

HSDL VLRU

The HSDLInterface object is a standard NAU child dedicated to servicing all download requests for games or application programs by the seats. Its constructor connects to the driver, "HSDL1" to transmit data to the seats via the Digitized Video Multiplexer system. The constructor also prefills a CRC Table used for deriving the CRC values during downloads. It creates a Mutex to control access to the HSDL directory to ensure that the routines in COPYDNL.CPP and SDU_BLDR.CPP don't interfere with the download process by modifying the files in the download directory at the wrong time.

The StartItUp( ) routine launches the following threads:

| Thread | Function |
| --- | --- |
| ProcessFileChanges( ) | Reacts to changes in the NT Registry as well as changes in the Download Files Directory. It then calls ProcessEntireDirectory( ) to read the directory that contains the files that can be downloaded, creating a DownLoadFileInfo object for each, and placing all download files in the ConvertQ for RefreshThread( ) to handle. This thread places all programs and database files ahead of games in the ConvertQ so that the Seats can be ready for use as soon as possible. |
| RefreshThread( ) | Looks for files in the ConvertQ queue to prepare for later downloading. Calls DownLoadFileInfo::Refresh( ) to block the data and add checksums and CRCs for Seat verification. It also saves the identity of the requesting seat for communication during the actual download. |
| ProcessDownLoads( ) | This thread is launched at a low priority, so that the others can prepare all the files beforehand. It calls ProcessDownloadQ( ) to use SeatInterface::GetDownLoadInstruction( ) to handle this file properly. Calls DownLoadFileInfo::Download( ) for each file in the DownLoadQ to actually send them to the output driver. During the download, it redirects message handling away from the seat's SEB and toward its SDU I/F board because the seat display unit 133 can't receive messages without its application running, which is true whenever it is receiving a download. |

Then StartItUp( ) calls ProcessIOQueues( ) to continuously sample the message processor and transaction dispatcher input queues. It processes the following message processor messages:

| IFE Message | Action |
| --- | --- |
| HighSpeedDownload | Puts the download request onto the DownLoadQ. It moves a request to the top of the queue if the request is for a program (high priority). |
| SubProcessStart | Simply recognizes this command, no further processing. |
| SubProcessStop | Flushes its MP and TD Input queues and tells the DestructFifo queue (one of the few VLRUs to use this) that it can be shut down. |

Figures 26, 27, 28, 29, 30, 31, 32, 33, 34, 35, 36:
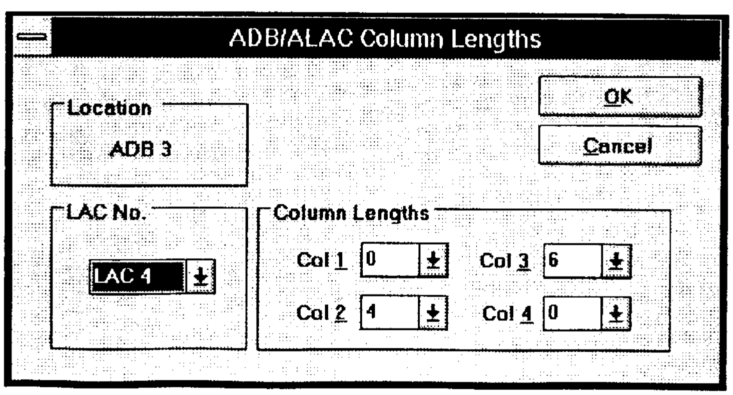

The VCP NAU controls communications with the video players and other video sources. It maintains one VLRU for each video source, and constantly polls the players for their status. The VCP Network Addressable Unit program 463 function and data paths are shown in FIG. 36. The structure of the VCP NAU 463 is substantially the same as the Network Addressable Units function and data paths discussed with reference to FIG. 28.

VCP.EXE contains the VCP NAU program. This program includes the following primary components:

| | |
| --- | --- |
| VNUMAIN.CPP | The Main( ) Program |
| VCPDSPTCH.CPP | The NAU Dispatcher |
| VCPNTRFC.CPP | The VCP VLRU Interface Class |
| VCPSTSVL.CPP | The VCP Status VLRU Class |

Main Program

Main( ) issues a call to GetLruInfo( ) to read the database for all the VCP names (e.g., "VCP01"). It then launches a VCPDispatch object to open up communications between the message processor 404 and the transaction dispatcher 421. It calls VCPDispatch::startItUp( ) to initialize the VLRUs, one for each video cassette player 227 plus one for periodic statusing of all video cassette players 227. It also launches the Session( ) threads.

Main( ) then calls ConsoleCmd( ) to process all console characters that may be in the input buffer. If "S" is encountered, a STOP command is issued to VCP01. If "P" is encountered, a PLAY command is issued to VCP01. This is for testing purposes only.

Finally, Main( ) sleeps forever until interrupted. It calls shutItDown( ) to close all the VLRUs down and exit gracefully.

VCP Interface VLRU

A VCP VLRU is created for each video cassette player 227 in the database using the VCPInterface Class. This class is derived from the Generic NAU Class, however, due to the communications protocol employed by the players, many of the generic functions are overcast or not used at all.

The VCPInterface( ) constructor creates two unique controllers: Static hIOSemaphore and bHasSemaphore. These are used to enforce single-threaded communications between a video cassette player 227 and the transaction dispatcher 421. Using these controllers, only one VLRU can be processing communications at a time. hIOSemaphore is a handle that acts as 'dibs': When this handle is owned by a thread, that thread can process communications. bHasSemaphore is a local flag that tells the thread whether it currently is the owner of the semaphore.

VCPInterface::StartItUp( ) is called immediately for each Session( ) to process a 'dummy' message from the message processor 404 for each of the video cassette players 227. This 'dummy' message was invoked at their creation to glue each video cassette player 227 to its own Session.

This function then loops forever to continuously process messages. (This is contrary to the generic VLRU processing logic, that releases the session as soon as a message has been processed, but since we have enough sessions available, we can permanently assign them.) The basic loop does the following:

If this session does not have dibs, it waits for input from the transaction dispatcher 421 and waits for the hIOSemaphore. Then it flushes all possible input from the message processor 404, reads the transaction dispatcher message and transmits it to the message processor 404. It retains ownership of the IO handle, and loops again.

If this session already has dibs (from the previous paragraph), it waits for input from the message processor 404. Once received, it processes it and sends an acknowledgement back to the video cassette player 227 via the message processor 404. It then releases dibs for use by the other VLRUs.

VCP Status VLRU

A single VLRU of class VCPSts_VLRU is created to periodically poll the players for their status. Two lists of information are used to organize this: MessageMap, that contains a list of each video cassette player 227 and its network address; PendingStatus, that contains a list of video cassette players 227 that have just completed a communications event. MessageMap is maintained via AddVLRU( ) as each VCP VLRU is created by the dispatcher. PendingStatus is maintained by XmitResponse( ) each time the VCP VLRU completes a communications event.

VCPSts_VLRU contains a timeout function that is invoked approximately 10 times per second. The StartItUp( ) function is immediately invoked and tied permanently to a Session( ) thread. It then loops forever waiting for both a timeout to occur and the hIOSemaphore to be available. Once both events have occurred, it examines the contents of the PendingStatus string list and prompts the topmost video cassette player 227 on this list for its status. If none are on this list, it prompts the next video cassette player 227 in the MessageMap list. This is performed via SendStatus( ). These status responses are formatted and forwarded to the Video Control Service via the transaction dispatcher 421. The I/O semaphore is released and the process cycle repeats.

Test Port NAU

Figures 26, 27, 28, 29, 30, 31, 32, 33, 34, 35, 36, 37:
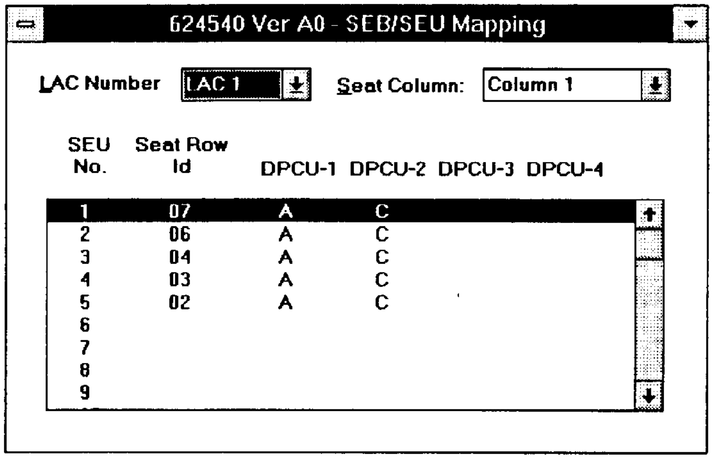

The Test Port NAU program 461 function and data paths is shown in FIG. 37. The Test Port NAU 461 controls communications to the serial test port for BIT/BITE and MAINT system access. The structure of the Test Port NAU 461 is substantially the same as the Network Addressable Units function and data paths discussed with reference to FIG. 28. However, the Test Port NAU 461 includes NAU VLRU state machine objects **510*d* comprising a LoopbackThread( ) 660, a EthernetThread( ) 661, a VCPStatusThread( ) 662, and a Loopback Timout( ) 663 that are initiated by StartItUp( ) 518**.

The Test Port NAU program 461 has two exclusive behaviors: BIT test mode and BITE test mode. The Test Port NAU program 461 starts out in BIT mode, and upon receipt of a GO_BITE command (presumably from the PESC-A **224*a*), it attempts to switch to BITE mode. BITE test mode is only available while the aircraft 111** is on the ground (as indicated by weight-on-wheels).

A BITE test is a three-pass 'loopback' in which data is sent to one of the I/O devices (the primary access terminal 225 to test the Ethernet network 228, a PESC-A **224*a* to test the ARCNET 216, and VCP Status Service to test video cassette players 227**) and an answer is expected back.

BIT tests are continuously occurring 'loopback' tests, however 3 consecutive failed communications are needed before a fault is recorded for any I/O device. A BIT test failure is only reported once per device per flight.

All BIT/BITE information is forwarded to a 'depository' or line replaceable unit that stores the information. In addition, BITE tests are initiated by an outside source or BITE Host. The default value for both of these is the primary PESC-A **224*a***, however, a SET_DEPOSITORY command executes SetBITEDepository( ) to alter these values.

TESTPORT.EXE contains the Test Port NAU program 461. The Test Port NAU program 461 includes the following primary components:

| | |
|---|---|
| TESTPORT.CPP | The Main( ) Program |
| TSTPRTDS.CPP | The NAU Dispatcher |
| TSTPRTVL.CPP | The VLRU Class |

The Main Program is a standard NAU starter. Main( ) registers the program with the System Monitor 412 using the SysMonInterfaceClass::Register( ) routine. Main( ) launches a TestPortDispatch object to open communication between the message processor 404 and the transaction dispatcher 421 and calls TestPortDispatch::startItUp( ) to initialize the VLRU. Main( )launches two Session( ) threads, although only one is actually busy. Main( ) sends a SubProcessStart command to the TestPort VLRU which causes the first Session( ) thread to connect to the VLRU permanently. Finally, Main( ) sleeps forever until interrupted. Main( ) does not call shutItDown( ) to close all the VLRUs down and exit gracefully, it deletes the VLRU and dies.

A single Test Port VLRU is created using the TestPortVLRU Class. This class is derived from the Generic NAU Class, however it overcast the communications routines to support the TestPort_Message Class data routines. This constructor reads the database to develop a table of all Test Port LRUs, PESC LRUs, Process LRUs, ADB LRUs and ALAC LRUs. This table of LRU addresses is passed to the TestPort VLRU for reference in GetSourceAddress( ) and SetBITEDepository( ).

TestPortVlru::StartItUp( ) is called immediately for the first Session( ) to process a 'dummy' message from message processor 404. This 'dummy' message was invoked at their creation to glue the VLRU to a Session (a SubProcessStart message).

The VLRU then creates a set of 6 events used to communicate to 3 new threads:

| Thread Name | Event 1 | Event 2 |
|---|---|---|
| ARCNET LoopbackThread | Message | Abort |
| EthernetThread | Message | Abort |
| VCPThread | Message | Abort |

This function loops forever to continuously process messages to-and-from the message processor 404. As a message is received, it is tested for validity, and then passed to the appropriate thread via a Message Event. Typically, the Message Events are used to determine what to do next, however to end BITE mode testing, the Abort Event is triggered for each thread to stop BITE testing, making BIT testing possible again.

LoopbackTimeout( ) Routine

StartItUp( ) uses the TimedCallback Utility Class to periodically launch LoopbackTimeout( ) which is responsible for issuing a command to the ARCNET network 216, the primary access terminal 225 and the VCP Service to initiate a 'loopback' test, n that it causes these devices to respond. Failure to respond within a specified timeframe causes the associated thread to log that device as FAILED. The initiation is accomplished by calling Perform Loopback( ). It uses its own versions of NAUPutMP( ) and NAUPutTD( ) to communicate because it needs to use the TestPort_Message class instead of IFE_Message class routines to process the data.

LoopbackThread( ) Thread

When an event is received, this process calls ProcessLoopback( ) to fully process the event. It tests ARCNET by communicating with the PESC-A 224*a*. If the PESC-A 224*a* fails to respond within a given timeframe, it times out, causing a failure to be noted.

In BITE mode, any failure to communicate is reported to the Depository, but ONLY if the Depository is not the same PESC-A 224*a*. and the amber Communications LED is turned on. Any communications received is logged to the event log as "Error Cleared" and the LED is turned off.

In BIT mode, any failure that occurs 3 times consecutively is reported to both the Depository and to the event log. Again, the Depository cannot be this same PESC-A 224*a*. If a previous error was recorded in BIT mode and a message is then received from the PESC-A 224*a*, this news is also logged in the Depository and the event log.

EthernetThread( ) Thread

When an event is received, this process calls ProcessEthernet( ) to fully process the event. It tests the Ethernet network 228 by communicating with the primary access terminal 225. If the primary access terminal 225 fails to respond within a given timeframe, it times out, causing a failure to be noted.

In BITE mode, any failure to communicate is reported to the Depository. Any communications received is logged to the event log as "Error Cleared". In BIT mode: Any failure that occurs 3 times consecutively is reported to both the Depository and to the event log. If a previous error was recorded in BIT mode and a message is then received from the primary access terminal 225, this news is also logged in the Depository and the event log.

VCPThread( ) Thread

When an event is received, this process calls ProcessVCPStatus( ) to fully process the event. This NAU does not communicate directly to the video cassette players 227, but obtains their information via the VCP Status Service which gets their statuses from the VCP NAU. If a message is received by this process, it can only have come from the VCP Status Service via the transaction dispatcher 421 to declare which video cassette players 227 are known to have failed.

In BITE mode, any failure reported from the Service is logged both to the Depository (the PESC-A 224*a*) and to the event log. In BIT mode, the video cassette player 227 must be reported as failed 3 time in a row before the failure is logged to the Depository and the event log. If no message is received from the VCP Status Service, this thread times-out. When that occurs, it assumes that all players have failed, and process BITE or BIT accordingly. Custom drivers needed for the cabin file server 268 are discussed below.

High-speed Download

In order to efficiently load programs, data and video games in the seats 123, the High-Speed Download driver provides the ability to convert this information into a Synchronous Data Link Control (SDLC) data stream. This data stream is forwarded to the video modulator (VMOD) 212 to broadcast to all seats 123 via the RF distribution system. Any seat 123 that requires the download can then tune to the download channel and retrieve the information.

HSDL.SYS is the High Speed DownLoad driver, written in C as a standard Windows NT driver, and includes the following files:

CONFIG.C Code for the initialization phase of the HSDL device driver.

DISPATCH.C Code for the function dispatcher.

DMA.C Code for input and output which is non-hardware specific.

HARDWARE.C Code for communicating with the Zilog 85230 processor on the HSDL card.

HSDLLIB.C Common code for HSDL Kernel mode device drivers.

INIT.C Code for an initialization phase of the HSDL device driver.

ISR.C Code for an Interrupt Service Routine for the HSDLBlaster device driver.

REGISTRY.C Common code for Sound Kernel mode device drivers for accessing the registry.

The HSDL device is a Zilog 85230 Enhanced Serial Communications Controller (ESCC), which is an industry-standard serial controller. HSDL is a Synchronous Data Link Control (SDLC) data stream running at 409.6 Kbps with 514-byte frames using FM0 (biphase space) data encoding. To move the data as quickly as possible, DMA transfers are employed.

The driver is registered as "\\HSDL1" and the following NT driver commands are supported: CreateFile( ), WriteFile( ), DeviceIoControl( ) and CloseFile( ). The calling program writes to the device in 514-byte blocks. Currently, only CreateFile( ) and WriteFile( ) are used in the system 100.

Services

The application functions are divided into Services that are responsible for carrying out the requests that come from the various devices (Seats 123, PAT GUI 426, etc.). Requests come in two forms: IFE_Messages from the transaction dispatcher 421, and CAPI calls from the GUI 426. Service functions are the primary functions that interact with the database 493 during runtime. Each Service is connected to the transaction dispatcher 421 via its own Named Pipes, and as needed, it connects to the SQL Server 492 for database access.

SERVICE.EXE is organized into 4 basic components: Main, CAPI Calls 476, Cabin Services 478–482, 487–491 and Sales Services 483–486. The Cabin Services 478–482, 487–491 and Sales Services 483–486 are sets of Service classes whose objects each connect to the transaction dispatcher 421 via named pipes. They also each have a thread and subroutines to process all IFE messages received, and they all have sets of functions that are used by CAPI.CPP routines of the same name.

SERVICE.EXE is comprised of the following source files:

SRVCPRCS.CPP The Main Program and Service Class

CAPI_S.C The RPC Server Functions (See CAPI_C for its client companion functions)

CAPI.CPP The actual CAPI Application Functions, called by CAPI_S.C, APIINT.CPP, and the Services.

CBNSRVCC.CPP The CabinService Base Class

CRDTCRDP.CPP The CreditCardProcessor Class

DTYFRSRV.CPP The DutyFreeService Class

GMSRVCCL.CPP The GamesService Class

IFCNTRLS.CPP The IFEControlService Class

MVCYCLCL.CPP The MovieCycle Class

MVSRVCCL.CPP The MovieService Class

OFFLOADR.CPP Database Offloader Functions

PCKGSRVC.CPP The PackageService Class

PLYRCNFG.CPP The PlayerConfiguration Class

SET.CPP The Set Class (to support the _Set table)

SLSSRVCE.CPP The SalesService Base Class

VCPMSSGE.CPP The VCP_Message Class (see MESSAGES.LIB for details)

VDNNNCMN.CPP The VideoAnnouncement Class

VDSRVCCL.CPP The VideoService Class

Figures 26, 27, 28, 29, 30, 31, 32, 33, 34, 35, 36, 37, 38:
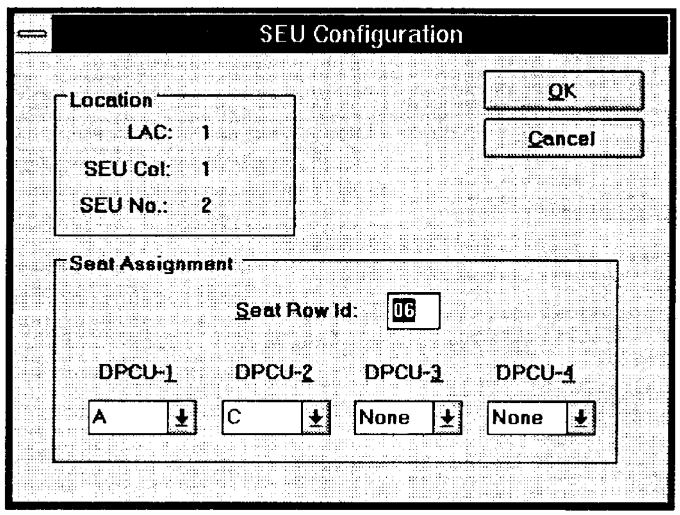

The Services NAU program 477 function and data paths are shown in FIG. 38. Located in SRVCPRCS.CPP file, the main( ) program is responsible for launching each of the services. Once launched, they are each connected to the named pipes that communicate with the transaction dispatcher 421.

The services include CAPI.CPP calls 701 which access CAPI_S.C. calls 702 that access CAPI_C.C programs 427. The services include an IFEControlService Class 703, MovieCycle, VideoService and VideoAnnouncement Classes 704, and SalesService, MovieService and GameService Classes 705. The Services NAU program 477 includes a ServiceProcessor 706 that employs a GetContextHandle( ) 722 a ContextHandleSessionQueue 723, and a PutcontextHandle( ) 724.

The IFEControlService Class 703 employs a CabinService::Get Message( ) thread 711 and a CabinService::Put Message( ) thread 712 that are coupled to the transaction dispatcher 421 by way of name pipes. The CabinService::Get Message( ) thread 711 is routed to an InQueue 713 to a ProcessRequest( ) 715 which accesses IFE Message Support Functions 718. The ProcessRequest( ) 715 is coupled by way of an OutQueue 713 to a CabinService::Put Message( ) thread 712 which is coupled to the transaction dispatcher 421 by way of the name pipe. A TimeSynchronizationThread( ) 716 is also routed through the OutQueue 713 and CabinService::Put Message( ) thread 712. CAPI Support functions 717 are routed to the CAPI.CPP calls 701 and to the SQL server 492. The IFE Message Support Functions 718 access the SQL server 492.

The MovieCycle, VideoService and VideoAnnouncement Classes 704 employs a CabinService::Get Message( ) thread 711 and a CabinService::Put Message( ) thread 712 that are coupled to the transaction dispatcher 421 by way of name pipes. The CabinService::Get Message( ) thread 711 is routed to an InQueue 713 to a ProcessRequest( ) 715 which accesses IFE Message Support Functions 718. The ProcessRequest( ) 715 is coupled by way of an OutQueue 713 to a CabinService::Put Message( ) thread 712 which is coupled to the transaction dispatcher 421 by way of the name pipe. A TimeSynchronizationThread( ) 716 is also routed through the OutQueue 713 and CabinService::Put Message( ) thread 712. CAPI Support functions 717 are routed to the CAPI.CPP calls 701 and to the SQL server 492. The IFE Message Support Functions 718 access the SQL server 492.

The SalesService, MovieService and GameService Classes 705 employs GetMessage( ) and PutMessage( ) threads 719, 720 that interface to the transaction dispatcher 421 by way of name pipes. The Get Message( ) thread 719 is routed by way of an InQueue 713 to a ProcessRequest( ) 715 which accesses IFE Message Support Functions 718. ProcessRequest( ) 715 are routed by way of an OutQueue 713 to the Put Message( ) thread 712 which is coupled to the transaction dispatcher 421 by way of the name pipe. CAPI Support functions 717 are routed to the CAPI.CPP calls 701 and to the SQL server 492. The IFE Message Support Functions 718 access the SQL server 492.

The main( ) program establishes a logon to the SQL Server 492 for database access using the standard SQL library commands in NTWDBLIB.LIB library. The main( ) program establishes 10 SQL Sessions, for example, with Context Handles to be used by the Services to talk to the database 493. The main( ) program establishes multiple handles to the database 493 for all the services and CAPI functions to use, then starts Pipe Threads and Process Threads for each service to run independently.

The main( ) program establishes itself as an RPC Server to communicate with the PAT GUI 426 and any other RPC Clients with the NT RPC utilities. Any program that has CAPI_C.C linked into it is an RPC Client in the system 100. The main( ) program registers itself with the system monitor 412 for subsequent Shutdown support with SystemMonitor::Register( ). The main( ) program issues a call to ServiceProcessor::StartActivityMailSlotThread( ) to hook up to the primary access terminal NAU's GUI Monitor process, periodically sending it a message to let it know that Service is alive and well. Finally, the main( ) program waits forever listening to the RPC Server that it set up (via RpcServerListen( )) until System Monitor'sShutdown( ) kills the process.

ServiceProcessor Class

The ServiceProcessor class is used by main( ) and the Services to control the access to the database 493 using the finite number of Context Handles available. This program has more Service SQL functions than we do Context Handles. It is conceivable that as many as 25 SQL requests may be present at one time (10 games, 10 movies, 1 CAPI, 1 IFE Control, 1 Movie Cycle, 1 Video Service and 1 Video Announcement). As a result, this code provides for optimum processing efficiency by queueing up the available Context Handles and issuing them on a first-come first served basis.

| ServiceProcessor Public Functions | Purpose |
|---|---|
| CONTEXTHANDLESTRUCT * GetContextHandle( ) | Returns the handle to the next available context structure for access to the database |

-continued

| ServiceProcessor Public Functions | Purpose |
|---|---|
| int GetContextHandleCount( ) | Returns the number of available Context Handles. |
| HANDLE GetContextHandleSemaphore( ) | Returns the semaphore for the context handle Queue. |
| DWORD GetLastError( PCONTEXT__HANDLE__TYPE phContext) | Retrieves the error code associated with the specified context handle (phContext) that was most recently set by the SetLastError( ) member function. |
| void PutContextDB( int dContextLocation, DBPROCESS*pDBProc) | Adds the DPROCESS handle to the context handle structure. |
| void PutContextHandle( CONTEXTHANDLESTRUCT* pContextHandle) | Replaces the context structure into the context structure queue. Service Classes use this one. |
| void PutContextHandle( int dContextLocation) | Adds the context structure to the context structure queue. The main( ) program uses this one to initialize the queue. |
| void SetLastError( PCONTEXT__HANDLE__TYPE phContext, DWORD dwErrorCode) | Associates the error code in dwErrorCord with the context handle pointer (phContext) storing them in the LastErrorMap structure. Values are retrieved from the structure via the GetLastError( ) member. This makes the errors available to all RPC Clients outside the Services. |
| bool StartActivityMailSlotThread( ) | Starts the Mail Slot Thread used for transmitting an "I'm alive" signal to the PAT NAU GuiMonitor. Returns FALSE if fails to start the thread. |

The Service Class

Based on the DBAccess class, the Service class is a template for all the Services to follow for proper operation. As a result, all its functions are virtual, and are defined in its children classes.

| Service Class Virtual Functions | Purpose |
|---|---|
| virtual bool ConnectToTD( ) | Abstract definition to interface supports Service-to-TD named pipe connections. |
| virtual void GenerateReport( ReportType nReport) | Abstract definition to define the interface to launch a report. (All of them are stubs for now, and not called by anyone.) |
| virtual void GetMessage( ) | Abstract definition to receive data into the Service. |
| virtual PolicyType GetPolicy( ) | Abstract definition to retrieve the access policy for the Service. (All of them are stubs for now, and not called by anyone.) |
| virtual bool IsAvailable( ) | Abstract definition that defines an interface to evaluate whether a Service is available and ready to process requests or commands. (All of them are stubs for now, and not called by anyone.) |
| virtual void MakeAvailable( SERVICESTATE ServiceAction) | Abstract definition that defines an interface to make a Service available. (All of them are stubs for now, and not called by anyone.) |
| virtual void ProcessRequest( ) | Abstract definition for an interface that handles IFE__Messages for the Service. In addition to specific messages designed for each Service, all ProcessRequest( ) functions should handle the SubProcessStart, SubProcessStop and SubProcessReinit messages to get themselves going and synchronized as needed by the rest of the system. |

-continued

| Service Class Virtual Functions | Purpose |
|---|---|
| virtual void PutMessage( ) | Abstract definition to send data out of the Service to TD and beyond. |

Cabin Services

These services control all the functions of In-Flight Service except those in which individual passengers 117 are involved. Cabin Services are divided into the following Services: IFE Control Service, Movie Cycle Service, Video Service and the Video Announcement Service. In addition to its overcast versions of the Service class functions, CabinServiceClass includes:

| CabinServiceClass Public Functions | Purpose |
|---|---|
| TIME GetRemainingFlightTime (PCONTEXT__HANDLE__TYPE phContext) | Retrieves the remaining fight time using the CalcRemainingFlightTime stored procedure. |
| bool RegisterPipe (HANDLE hPipeHandle) | Registers this named pipe with the Transaction Dispatcher to make I/O possible. |
| bool SetStatus (STATUS__TYPE nStatusType, char *pszData) | Transfers the data contained in pszData into the status message field identified by nStatusType. |
| bool StartPipeThreads (ServiceProcessor *pServiceProcessor) | Called by main( ) to get a pair of named pipes to TD for this Service. |
| bool StartProcessThreads (ServiceProcessor *pServiceProcessor) | Called by main( ) to get the child's ProcessRequest( ) loop going by invoking ProcessRequestInterface( ). |
| static UINT GetMessageThreadInterface (LPVOID lpParam) | Shared by all the CabinServiceClass children, this launches the child's GetMessage( ) function to handle its input from TD. |
| static UINT ProcessRequestInterface (LPVOID lpParam) | Shared by all the CabinServiceClass children, this launches the local ProcessRequest( ) function that loops forever handling the messages that it receives. |
| static UINT PutMessageThreadInterface (LPVOID lpParam) | Shared by all the CabinServiceClass children, this launches the child's PutMessage( ) function to handle its output to TD. |
| void Wait( DWORD dwSeconds) | Initiates a delay for the number of seconds specified by the input parameter dwSeconds. |

IFE Control Service

The IFEControlService class is derived from the CabinService class and contains several additional sets of functions that are used sporadically throughout the flight including:

| Function Set | Tables Used |
|---|---|
| IFE State Changes | Aircraft, Order__ |
| Flight Duration Management | |
| Statistics | Member, PassengerMap, PassengerStatistics, Set__ |
| Surveys | SurveyAnswer |
| Seat Transfers | |
| Database Backup | All Database Tables |

CAPI support

CAPI support includes the following public functions accessed by CAPI.CPP calls (having the same name):

| IFEControlService Class Public Functions | Purpose |
|---|---|
| bool CommandSeat (PCONTEXT_HANDLE_TYPE phContext, SEAT_COMMAND nCommand, PGENERIC_TEXT pszSeatName) | Formats an IFE Message as specified by nCommand and transmits the message to the seat specified by pszSeatName. |
| bool SeatTransferInit (PGENERIC_TEXT pszSeat1, PGENERIC_TEXT pszSeat2) | Due to a CAPI call, Formats and sends an IFE_Message to the Seat NAU, which is where the actual transfer takes place. The data in the message reflects the two seats that are to be transferred. |
| void SendStatusMessage (PCONTEXT_HANDLE_TYPE phContext) | Formats and transmits an unsolicited Status Window Message to the GUI. |
| bool SetIFEState (PCONTEXT_HANDLE_TYPE phContext, IFESTATE IFEStateValue) | Calls the local SetState( ) to update the system state information. IFE State is a term that describes whether the IFE System is IDLE, STARTED, PAUSED, and more. This allows CAPI to alter these states to either free up services or disable them as appropriate for the current runtime state of the system. For example, when the system is IDLE or PAUSED, movies cannot be viewed which affects the Movie Cycle Service as well as the Movie Rental Service. |
| void SetRemainingFlightDuration (PCONTEXT_HANDLE_TYPE phContext) | Called to refresh the value contained in the tmRemainingFlightDuration which is defined statically in the CabinService class. This function is called periodically from the IFEControlService::TimeSynchronizationThread( ) thread to update the value as the flight progresses, and directly from the CAPI when a change to the flight duration occurs. |

IFE Message Support

In addition to the CAPI support functions, this Service also handles incoming IFE Messages using its overcast ProcessRequest( ) thread. In addition to the standard messages, this class handles the following messages: Statistics, Survey, SeatFault, FlightInfoRequest and DatabaseBackup.

| IFE Message | Function Called | Purpose | Tables Affected |
|---|---|---|---|
| DatabaseBackup | ProcessDatabase Backup( ) | Generates a backup of the entire CFS database to recover after a possible CFS hard disk failure. | All database tables |
| FlightInfoRequest | ProcessFlightInfo( ) | Gathers flight information from the CFS database and uses the information to populate an IFE_Message. The IFE_Message is then returned to the requesting program | Aircraft FlightV |
| SeatFault | ProcessSeatFault( ) | Updates the database, clearing or setting a fault indication for the seat or range of seats in the IFE message | PassengerMap |
| Statistics | ProcessStatistics( ) | Stores statistical information from the seats to the database and prepares them for output to a text file. Statistics include information such as how many hours of which movie was viewed, which games were played and more. | Member Set_PassengerMap PassengerStatistics |
| SubProcessStart | InitService( ) | Establish IFE State and tell it to all affected programs via IFE Messages. Calls StartTimeSynchronizationThread( ) to launch TimeSynchronizationThread( ) | Aircraft |
| Survey | ProcessSurvey( ) | Stores the answers given by passengers to survey questions available through the IFE system. These answers are stored in the database, as well as prepared for output to a text file | Survey SurveyAnswer SurveyAnswerKey SurveyQuestion |

TimeSynchronizationThread( )

This thread is responsible for managing flight duration information, which changes all the time. It uses SetRemainingFlightDuraton( ) to update values, and calls AutoEndRevenue( ) to send a Stop Revenue Unsolicited Message to the GUI 426 once there is no time for further revenue purchases.

PlayerConfiguration Support Class

The PlayerConfiguration class supports any Service that uses video players, such as the MovieCycle, VideoAnnouncement and Video Services. The PlayerConfiguration class contains all pertinent information necessary to describe information specific to a Movie Cycle or Video Announcement. The PlayerConfiguration class also contains the methods needed to issue all appropriate messages to start a specific Movie Cycle or Video Announcement.

| PlayerConfiguration Class Public Functions | Purpose |
|---|---|
| PlayerConfiguration (Queue *pParentQueue, CString csName, CString csAddress, TIME tmIntermission, TIME tmStart) | Creates a PlayerConfiguration object of specified Name, Intermission Time and Start time. In addition, a reference to the parent object's queue is stored in order for this PlayerConfiguration object to communicate with the parent object. |
| PlayerConfiguration (Queue *pParentQueue, CString csName, CString csAddress) | Same as above, except default values for Intermission Time and Start Time are assigned as Zero. |
| void AddPlayer (CString csPlayerName, BYTE bySegment, BYTE byRepeat, DWORD dwMediaId) | Adds the specified player to this Player Configuration. If the program to be played is a Video Segment, then a segment number is provided, otherwise a value of zero is passed in the bySegment argument. If the repeat flag is set TRUE then the associated player is placed into it's REPEAT state. |
| bool ChangeCabinAudioLevel (BYTE byAudioLevel, BYTE byZone) | Updates internal data structures for this PlayerConfiguration object with the audio level specified in the byAudioLevel argument. |
| void CommandCabinAudio (bool bAudioOn) | Transmits the necessary messages to the Backbone NAU which command the PESC-V to make the necessary cabin audio connections for the zones associated with this Player Configuration object. If the input argument bAudioOn is TRUE, the connections are enabled, if bAudioOn is FALSE, the connections are disabled. |
| void CommandCabinVideo (bool bVideoOn) | Sends messages to the PESC-V to activate or de-activate the Overhead Monitors and override the in-seat video displays associated with this Player Configuration object. A value of TRUE for the input argument bVideoOn causes cabin video connections to be enabled, a value of FALSE for bVideoOn causes cabin video connections to be disabled. |
| bool CommandPlayer (CStrrng csPlayerName, PLAYERCOMMANDS nCommand, PGENERIC_TEXT pszExtra) | Transmits the player command specified by nCommand to the player specified by csPlayerName. Any additional data needed for the command must be passed in pszExtra. |
| bool CommandPlayers (PlayerCommands nPlayerCommand) | Issues the commands to start, stop or rewind the player. |
| bool CreateAssignmentMap (PCONTEXT_HANDLE_TYPE phContext) | Populates the static data structure AssignMap with a status record for each LRU of type VCP residing in the LRU table. |
| BYTE GetCabinAudioZoneMap( ) | Returns the Cabin Audio Zone BitMap. |
| BYTE GetCabinVideoZoneMap( ) | Returns the Cabin Video Zone BitMap. |
| CString GetConfigAddress( ) | Returns the Configuration Address. |
| PLAYERSTATE GetConfigState( ) | Returns the cumulative state of all players currently assigned in this PlayerConfiguration object. |
| PLAYERSTATE GetConfigState( ) | Returns the state of the Player's Configuration. |
| void GetConfigStatus (ULONG *ulCurrentViewing, long *tmElapsed, long *tmRemaining, long *tmNextShow) | Returns information pertinent to this PlayerConfiguration object. The information returned is:<br>- Number of configurations started<br>- Elapsed time current configuration has been playing<br>- Remaining play time for current configuration<br>- Number of minutes until the next Configuration starts. |

-continued

| PlayerConfiguration Class Public Functions | Purpose |
|---|---|
| ConfigState GetCurrState( ) | Returns the current configuration state. |
| TIME GetCycleTime( ) | Returns the sum of the Longest Program Time and the Intermission. |
| int GetCycleTimes (TIME tmFlightRemaining, CDWordArray *dwCycleTimeList) | Computes a list of start times for all movie cycles contained in this PlayerConfiguration object. Cycle time values are store in dwCycleTimeList and the number of elements added to the array is returned to the calling function. |
| long GetLongestProgramTime( ) | Returns the Longest Program duration in minutes. |
| CString GetLongestProgramVcp( ) | Returns the value of the Longest VCP Program name |
| DWORD GetMediaId (Cstring csPlayerName) | Returns the MediaId associated with the Video Player specified in csPlayerName. A value of −1 is returned if an invalid player name is specified. |
| CString GetName( ) | Returns the configuration name. |
| int GetPlayerList (CStringArray &csList) | Populates a CStringArray with a list of the VCP Player Names currently associated with this PlayerConfigurationObject. |
| WORD GetPlayerStateCount (PLAYERSTATE nPlayerState) | Returns the number of players in this PlayerConfiguration object that are currently in the state specified by nPlayerState. |
| ConfigState GetPrevState( ) | Returns the previous configuration state. |
| BYTE GetSeatVideoZoneMap( ) | Returns the Seat Video Zone BitMap. |
| TIME GetStartTime( ) | Returns the Start Time. |
| bool GetTimeoutFlag( ) | Returns the value of the Timeout Flag. |
| PLAYERSTATE GetVCPState (CString csVCPName) | Returns the state currently stored in the assignment map for the player specified by csVCPName. |
| bool IsCabinAudioActive( ) | Returns a value of TRUE to the calling function if cabin audio is being used by any of the currently active assignments. A value of FALSE is returned otherwise. |
| bool IsLastViewing (TIME tmFlightRemaining) | Determines whether or not the cycle being played is the final cycle based on the remaining time in the flight. It returns a value of TRUE if the last cycle has started and returns a value of FALSE otherwise. |
| bool IsRunning( ) | Returns TRUE if the current state is IDLE. |
| bool IsTransitionActive( ) | Returns TRUE if Transition is marked as active. |
| bool IsValidVCP (CString csVCPName) | Returns a value of TRUE to the calling function if the player name specified by the csVCPName argument is found in the Assignment map. Otherwise a value of FALSE is returned. |
| void Purge( ) | Removes references to all video player names and configuration data associated with this PlayerConfiguration Object. |
| void RecoverCycle (IFE_Message *msgRecoveryInfo) | Extracts recovery information from the IFE_Message object referenced by msgRecoveryInfo, converts the data into Binary and uses the converted data to initialize timing information for this PlayerConfiguration object. |
| bool ReplacePlayer( Cstring &csOld, CString &csNew) | Removes the player identified by csOld from this PlayerConfiguration object and adds the player identified by csNew to this PlayerConfiguration object. |
| void ResetTransitionActive( ) | Sets Transition to InActive. |

-continued

| PlayerConfiguration Class Public Functions | Purpose |
|---|---|
| void SetAudioDistributionInfo (BYTE byAudioMap, BYTE byMapType, CByteArray *pbyVolume) | Stores the Audio distribution information for this Player Configuration. |
| bool SetConfigState (ConfigState nState) | Sets the state of this PlayerConfiguration object to the value specified by nState. Performs all initialization necessary to make the transition into the new state. Returns TRUE if the state was successfully entered, returns FALSE otherwise. |
| void SetIntermission (TIME tmIntermission) | Sets the intermission Duration for this Player Configuration. |
| void SetLongestProgram (int nPlayTime, CString csPlayerName) | Identifies a VCP Name and Program Duration as the longest program in this PlayerConfiguration. |
| void SetStartTime (TIME tmStartTime) | Sets the player start time. |
| void SetTransitionActive( ) | Sets Transition to Active. |
| int SetVCPAssignment (int nLockState) | Updates the pConfig entry in the PlayerMap data structure associated the player identified by csVCPName. If the value of nLockState is LOCK the pointer to this PlayerConfiguration object is written. If the value of nLockState is AVAILABLE and the player is currently assigned to this player configuration object, the pConfig field is set to NULL. Returns the number of players which were successfully assigned. |
| bool SetVCPState (CString csVCPName, PLAYERSTATE nVCPState, DWORD dwVCPTime) | Updates the entry in the PlayerMap data structure associated the player identified by csVCPName with the value contained in the nVCPState argument. |
| void SetVideoDistributionInfo (BYTE byRFChannel, BYTE bySeatMap, BYTE byOHMap, BYTE byMapType) | Stores the video distribution information for this Player Configuration. |
| void UpdateConfigState (VCP_Message *pMessage) | Updates the state of this PlayerConfiguration object based. The state may be changed based on the content of the input message or based on a timeout applied to the current state. |
| void UpdateConfigTimeout( ) | Sets the state of the bConfigTimeoutFlag variable TRUE if the elapsed time for the current state has been exceeded. Otherwise, the bConfigTimeoutFlag variable is set False. |
| void UpdateCycleStatus (TIME tmStatusUpdateRate, TIME tmRemainingCycleTime) | Used periodically to transmit the Movie Cycle Times (based on RemainingCycleTime) message to the Seat NAU. Also periodically transmits a RecoveryInfo message to the IFEControlService. |

Movie Cycle Service

Throughout the In-Flight operation, one or more movies continuously play, all starting together as a set, providing maximum viewing possibilities for the passengers 117. This is known as Movie Cycling. The Movie Cycle Service controls the synchronization of these cycles.

Derived from the CabinService class, MovieCycleClass is responsible for keeping track of the remaining time of the flight, as well as the longest movie duration. It starts a cycle, stops a cycle, pauses a cycle, and recovers a cycle. The following database tables are used to support the MovieCycle Class:

Tables Used

Member

MovieCycle

Set_

VideoMedium

Video Player

Video Segment

VideoUse

CAPI Support

The following table shows those functions that are used by CAPI.CPP calls:

| MovieCycle Class Public Functions | Purpose |
|---|---|
| bool AddPlayerToMovieCycle (PCONTEXT_HANDLE_TYPE phContext, PGENERIC_TEXT MovieCycleName, PGENERIC_TEXT PlayerName) | Adds a player to a movie cycle. |
| bool ChangeMovieCycleIntermissionTime (PCONTEXT_HANDLE_TYPE phContext, PGENERIC_TEXT MovieCycleName, TIME Intermission) | Modifies the movie cycle intermission time. |
| bool ChangeMovieCycleStartTime (PCONTEXT HANDLE_TYPE phContext, PGENERIC_TEXT MovieCycleName, TIME StartDelay) | Update the start delay time for the PlayerConfiguration object specified by MovieCycleName. Updates the start delay locally: The value is written to the database as part of the StartMovieCycle processing. |
| APIResult GetFirstMovieCycleTime (PCONTEXT HANDLE_TYPE phContext, PGENERIC_TEXT pszMovieCycleName, TIME *tmMinUntilStart) | Calculates the number of minutes until each of the remaining movie cycles starts. Returns the first start time in tmMinUntilStart. The return value is APIOK if there are 2 or more entries in the list and APIEndOfList if there is only 1 entry in the list. |

-continued

| MovieCycle Class Public Functions | Purpose |
|---|---|
| bool GetMovieConfigurationState (PCONTEXT_HANDLE_TYPE phContext, PGENERIC_TEXT pszMovieCycleName) | Returns TRUE if the movie cycle specified by pszMovieCycleName is running. |
| bool GetMovieCycleDuration (PCONTEXT_HANDLE_TYPE phContext, PGENERIC_TEXT pszMovieCycleName, TIME *tmDuration) | Returns the duration, in minutes, of the Movie Cycle specified by pszMovieCycleName. A return value of TRUE indicates that the specified movie cycle was found and the time is valid. |
| APIResult GetNextMovieCycleTime (PCONTEXT_HANDLE_TYPE phContext, TIME *tmMinUntilStart) | After GetFirstMovieCycleTime() has been called to calculate movie cycle times and return the first one, this can be called iteratively to retrieve the remaining movie cycle start times. Returns APIEndOfList for the last entry in the list. Returns APIOK for all other entries. |
| bool RemovePlayerFromMovieCycle (PCONTEXT_HANDLE_TYPE phContext, PGENERIC_TEXT MovieCycleName, PGENERIC_TEXT PlayerName) | Removes the PlayerName player from the movie cycle MovieCycleName. |
| bool ReplaceMovieCyclePlayer (PCONTEXT_HANDLE_TYPE phContext, PGENERIC_TEXT pszMovieCycleName, PGENERIC_TEXT pszPlayerToRemove, PGENERIC_TEXT pszPlayerToAdd) | Swaps players (usually because of a hardware failure, and movies must be moved to new devices). |
| bool SetMovieCycleUpdateRate (PCONTEXT_HANDLE_TYPE phContext, long 1Seconds) | Sets the movie cycle update rate. The movie cycle update rate is the rate at which the system transmits movie cycle update information to the seats in seconds. |
| bool StartMovieCycle (PCONTEXT_HANDLE_TYPE phContext, PGENERIC_TEXT MovieCycleName, TIME tmStartTime) | Starts the specified MovieCycleName at the given tmStartTime. |
| bool StopMovieCycle (PCONTEXT_HANDLE_TYPE phContext, PGENERIC_TEXT MovieCycleName) | Stops the specified Movie Cycle. |
| void UpdateSystemState (PCONTEXT_HANDLE_TYPE phContext) | Notifies MovieCycleService that a change to the system state has occurred. The Service retrieves the system state from the database and updates the state of the active cycle(s) accordingly. |

IFE Message Support

This Service handles incoming IFE Messages using its overcast ProcessRequest( ) thread. In addition to the standard IFE messages, this class handles the following messages: MovieTimes and MovieCycle.

| IFE Message | Function Called | Purpose |
|---|---|---|
| MovieCycle | StopMovieCycle() or StartMovieCycle() | Starts or Stops the movie cycle as needed. |
| MovieTimes | UpdateMovieTimes() | Updates the duration of the movies that are playing or scheduled to play. |
| SubProcessStart | InitService() | Creates a PlayerConfiguration object, determines what the players are doing using UpdateSystemState() |

Video Service

Flight Attendants often need the ability to view and listen to videos to verify quality and accuracy (for example, to determine if the expected movie is installed in the proper player 227). The Video Service functions support this capability. Derived from the CabinService class, the VideoServiceClass is responsible for connecting the GUI 426 to the individual players 227 for preview and overhead control. The following database tables are affected by the Video Service Class:

Table Name
VideoMedium
Video Player
VideoUse

CAPI Support

The following table shows those functions that are used by CAPI.CPP calls:

| VideoServiceClass Public Function | Purpose |
|---|---|
| PLAYERSTATE CommandPlayer (PGENERIC_TEXT pszPlayerName, PLAYERCOMMANDS nCommand, PGENERIC_TEXT pszExtra) | Uses PlayerConfiguration class functions to tell VCP pszPlayerName to perform nCommand (e.g., start, stop, play . . . etc). |
| void GetOverhead (OVERHEADSTATETYPE *pOHState, long *pChannel) | Returns the state and channel # of the currently selected Overhead Video source. |
| PLAYERSTATE GetPlayerState (PGENERIC_TEXT pszPlayerName) | Uses CommandPlayer() to prompt the VCP to supply its current state. Returns this state to caller. |
| long GetRemainingPlayerTime (PGENERIC_TEXT pszPlayerName) | Uses CommandPlayer() to prompt the VCP to supply its remaining play time. Currently, this always returns ZERO. |
| bool SetAnnouncementAudioLevel (PCONTEXT_HANDLE_TYPE phContext, long 1AudioLevel, DWORD dwZone, bool Persist) | Sets the Cabin Audio volume level. A value of −1 for dwZone specifies that PA volume for all zones is to be set to the specified audio level. If Persist is set TRUE, this updates the database as well, making this a permanent setting. |
| void SetOverhead (OVERHEADSTATETYPE OHState, long Channel, PGENERIC_TEXT pszPlayerName) | Transmits a message to the PESC-V via the Backbone NAU to identify which channel represents the overhead video source. All parameters are Input Parameters. |
| bool SetPlayerSegment (PGENERIC_TEXT pszPlayerName, long 1Segment) | Tells the VCP NAU to set the given pszPlayerName VCP to the selected 1Segment. Returns FALSE if Segment value is invalid (>0xff). |
| void UpdateSystemState (PCONTEXT_HANDLE_TYPE phContext) | Notifies this Service that a change to the system state has occurred. |

IFE Message Support

This Service handles incoming IFE Messages using its overcast ProcessRequest( ) thread. In addition to the standard IFE messages, this class handles the following messages: FailedPlayer, VCPStatus, and VideoControl.

| IFE Message | Function Called | Purpose |
|---|---|---|
| FailedPlayer | ProcessFailedPlayer() | Returns to the caller the number of players and which ones are flagged as failed. |
| SubProcessStart | InitService() | Creates a PlayerConfiguration object and initialize its variables. |
| VCPStatus | ProcessVCPStatus() | Updates the VCPState (via PlayerConfiguration:: SetVCPState()), updates the database and tell the MovieCycle Service of the changed status via an IFE_Message. |
| VideoControl | ProcessVideoControl() | Updates the named player's status as given in the message, and outputs it to the Status Window. |

Video Announcement Service

The VideoAnnouncementService class is derived from the CabinService class and contains several additional sets of functions that are used sporadically throughout the flight to support the playing of video clips, such as a safety video that must be broadcast to all passengers 117 at specific times during the flight. It provides the following functionality: creates a message for cabin configuration (cabin audio/video), works with MovieCycleService to pause the movie cycle, starts an announcement tape, and talks to PESC-V 224*b* to control PA.

The database tables affected by the VideoAnnouncement-Service Class are:

Table Name
Aircraft
PA_Volume
VA_Distribution
VideoMedium
VideoSegment

CAPI Support

The following table shows those functions that are used by CAPI.CPP calls:

VideoAnnouncementService Public Purpose Functions
APIRESULT
GetFirstVideoAnnouncementPlayList (PCONTEXT_HANDLE_TYPE phContext, PGENERIC_TEXT pszVideoAnnouncementName, PGENERIC_TEXT pszPlayerName, VIDEOANNOUNCEMENTSTATUSTYPE *nState)
APIRESULT
GetNextVideoAnnouncementPlayList
(PCONTEXT_HANDLE_TYPE phContext, PGENERIC_TEXT pszVideoAnnouncementName, PGENERIC_TEXT pszPlayerName, VIDEOANNOUNCEMENTSTATUSTYPE *nState)
bool
ReplaceVideoAnnouncementPlayer
(PCONTEXT_HANDLE_TYPE phContext, PGENERIC_TEXT pszAnnouncementName, PGENERIC_TEXT pszReplacementPlayer)

| VideoAnnouncementService Public Functions | Purpose |
|---|---|
| bool ResumeVideoAnnouncement (PCONTEXT_HANDLE_TYPE phContext) | Starts the PlayerConfiguration Object associated with the next Video Announcement to be played. |
| bool StartVideoAnnouncement (PCONTEXT_HANDLE_TYPE phContext, PGENERIC_TEXT pszAnnouncementName) | Starts the specified video announcement. |
| bool StopVideoAnnouncement (PCONTEXT_HANDLE_TYPE phContext, PGENERIC_TEXT pszAnnouncementName) | Stops the specified video announcement. |
| void UpdateSystemState (PCONTEXT_HANDLE_TYPE phContext) | Notifies this Service that a change to the system state has occurred. |

IFE Message Support

In addition to the CAPI support functions, this Service also handles incoming IFE Messages using its overcast ProcessRequest( ) thread. In addition to the standard IFE messages, this class handles the following messages:

| IFE Message | Function Called | Purpose |
|---|---|---|
| Ack or Nak | SetNextState() | Sets the next state for the video announcement associated with the Player Configuration Object pPlayerConfig. |
| PlayNextVA | PlayNextAnnouncement() | First, determines if the next announcement in the Video Announcement Play list requires installation of a new tape (i.e., Media ID). If so, then an Unsolicited message is transmitted to the GUI and the video announcement cycle is suspended. Once paused, the cycle must be re-started via either StartVideoAnnouncement() or Resume VideoAnnouncement(). |
| SubProcessStart | InitService() | Performs the necessary Inits to get this Service going, including: SetAudioDistributionInfo() SetVideoDistributionInfo() SetPlayerInfo() |

Sales Services

These services control all the functions of In-Flight Service in which goods or entertainment are made available to passengers 117. Sales Services 482–486 are divided into the following Services: GamesService 482, MovieSaleService 483, CatalogService 484, DutyFreeService 486, and DrinkService 485.

The design structure of the Sales Service classes are similar to the Cabin Service classes, except that sales services 482-486 launch many more ProcessRequest( ) threads to be able to service as many passengers 117 as possible. This is not necessary for the Cabin Services because they do not service individual passengers 117, they service the system as a whole.

In addition to its overcast versions of the Service class virtual functions, SalesService Class includes its own virtual definitions within its children classes. This keeps the CAPI consistent in its calls:

| SalesService Virtual Function | Purpose |
|---|---|
| virtual bool CancelOrder (ID OrderID) | Abstract to cancel an open order. |
| virtual ID CreateOrder (unsigned char *ProductCode, long Quantity, LRU_NAME Seat, unsigned char *EmployeeNumber, long 1ProductMap, MONEY AmountDue) | Abstract to Create an order. |
| virtual bool DeliverOrder (ID OrderID, GENERIC_TEXT Employee Number) | Abstract to schedule an Order for Delivery. |
| virtual bool PayForOrder | Abstract to record the payment for an order. |

-continued

| SalesService Virtual Function | Purpose |
|---|---|
| (ID OrderID, MONEY AmountCash, MONEY AmountCredit, GENERIC_TEXT CurrencyCode, GENERIC_TEXT EmployeeNumber, GENERIC_TEXT AccountNumber, GENERIC_TEXT ExpirationDate, GENERIC_TEXT CardName, CREDITCARDS CardType) | |
| virtual bool RefundOrder (ID OrderID, GENERIC_TEXT EmployeeNumber, bool RevokeProduct) | Abstract to Refund an order. |
| virtual bool StartPipeThreads() | Abstract to start the I/O with Transaction Dispatcher. |
| virtual bool StartUpProcessThreads() | Abstract to start ProcessRequest() threads. |

SalesService also provides several 'generic' sales functions, as shown in the sub-sections that follow.

CAPI Support

The following functions are called by CAPI functions. In the Sales Services 482–486, all CAPI calls cause an update message to be built and sent to the applicable seat 117, so that it knows the status of its sales.

| SalesServiceClass Public Functions | Purpose |
|---|---|
| bool BackOrderOut( CONTEXTHANDLESTRUCT *pContextHandle, ID OrderID) | Removes the any OrderId records from the database. |
| bool CloseSalesStore( ID StoreID) | Sets the status of the store to Closed. |
| SERVICESTATUSTYPE IsValidCreditCard( char *CardNumber, char *ExpirationDate, double CreditAmount, CONTEXTHANDLESTRUCT ContextHandle) | Verifies the type of card, expiration date and checksum according to the policy of this card type. |
| bool OpenSalesStore( ID StoreID) | Sets the status of the store to Open. |

IFE Message Support

The following functions are provided to support these IFE Messages for all Sales:

| IFE Message | SalesService Function | Purpose |
|---|---|---|
| BackOut | bool BackOrderOut( CONTEXTHANDLESTRUCT *pContextHandle, ID OrderID) | Removes the order from the database. This is usually due to an error during processing, rather than a customer request. |
| Cancel | bool PrepareCancel( CONTEXTHANDLESTRUCT *pContextHandle, Seat_Message *pSeatMessage) | Cancels an open order upon customer request. |

-continued

| IFE Message | SalesService Function | Purpose |
|---|---|---|
| Complete-Update | void ProcessUpdateRequest( Seat_Message *pMsg, IfeldType nProcessID, Queue *pTransmitQueue) | Collects revenue and movie or game lock information for a specified seat and returns the data to the SeatNAU. |
| Delivery | bool PrepareDelivery( CONTEXTHANDLESTRUCT *pContextHandle, Seat_Message *pSeatMessage) | Prepares an order for delivery. |
| Incre-mental-Update | void ProcessUpdateRequest() | See CompleteUpdate message above. |
| Payment | bool PreparePayment( CONTEXTHANDLESTRUCT *pContextHandle, Seat_Message *pSeatMessage, ID *OrderID) | Applies the provided payment information to the specified order. |
| Refund | bool PrepareRefund( CONTEXTHANDLESTRUCT *pContextHandle, Seat_Message *pSeatMessage) | Processes a refund request to return payment(s) to a customer and update inventory (if needed). |

Movie Sales Service 483

Movie Viewing is a highly variable feature of the system. At the discretion of the airline, and subject to change from time to time, different video offerings are free to certain classes of passengers 117, while others are chargeable. The Movies Sales Service 483 controls this feature.

Table Name
Policy
Price
VideoMedium
VideoSegment
VideoUse

Derived from SalesService class, the MovieServiceClass provides the functions needed to process the sales of movies onboard. Like CabinService class, it provides its own ProcessRequest( ), GetMessage( ), PutMessage( ), etc. functions.

CAPI Support

The following overcast functions are called by their corresponding CAPI calls: CancelOrder( ), CreateOrder( ), DeliverOrder( ), PayForOrder( ), and RefundOrder( ).

IFE Message Support

In addition to the CAPI support functions, this Service also handles-incoming IFE Messages using its overcast ProcessRequest( ) thread. Currently, all of the supported messages are supported using inline code that includes functions from the generic SalesService class along with the following:

| IFE Message | Function | Purpose |
|---|---|---|
| Order | CreateOrder() | See CAPI Support |

Games Rentals Service 482

Nintendo Video Games are available for passengers to enjoy. To play them, a request must be made and often a payment is required. The Games Rental Service controls this capability.

Table Name

GameDetail

Policy

Price

Derived from SalesService class, the GameServiceClass provides the functions needed to process the sales of movies onboard. Like CabinService class, It provides its own ProcessRequest( ), GetMessage( ), PutMessage( ), etc. functions.

CAPI Support

The following overcast functions are called by their corresponding CAPI calls: CancelOrder( ), CreateOrder( ), DeliverOrder( ), PayForOrder( ), and RefundOrder( ). See SalesService class for details.

IFE Message Support

In addition to the CAPI support functions, this Service also handles incoming IFE Messages using its overcast ProcessRequest( ) thread. Currently, all of the supported messages are supported using inline code that includes functions from the generic SalesService class along with the following:

| IFE Message | Function | Purpose |
|---|---|---|
| Order | CreateOrder() | See CAPI Support |

Package Entertainment Functions

Package Entertainment is a hybrid of Games and Movies Sales and is maintained within the MoviesSales class. It involves a one-time purchase to all entertainment services onboard. The Package Entertainment Functions may be used to control this capability, but currently the SEAT NAU and CAPI.CPP calls route Package products to either the Game Service or the Movie Service, based on the product code that is used. The following table is used to identify the components of a "Package".

Table Name

Package Detail

Catalog Sales 484

Purchasing goods through an electronic catalog is an enhancement provided by the system 100. All functions that control it are kept in the Catalog Service. The following tables support the feature:

Table Name

Address

Order_

ShippingRate

Drink Sales 485

Ordering drinks through the In-Flight Entertainment system 100 is provided. All functions that control it are kept in the Drinks Service. The following table supports the feature:

Table Name

Product

Duty Free Sakes 486

Purchasing onboard duty-free goods through the In-Flight Entertainment system 100 is provided. All functions that control it are kept in the Duty Free Service. The following tables support the feature:

Table Name

Cart

CartInventory

Commitment

InventoryLog

CAPI Calls

All the application-level database functions are directly accessible via calls to the CAPI functions. These calls are available directly, or via the RPC server. Thus, any Service as well as any RPC Client can access the CAPI calls.

CAPI.CPP contains the actual commands that interface to the database and perform the application duties (such as CreateOrder( ), GetOrder( ), etc.). CAPI_S.C is the RPC Server whose functions are made available to RPC Clients (via CAPI_C.C). The Server functions use the CAPI.CPP calls to perform application duties. They are used together to make up this set of routines. In addition, the PAT GUI 426 can also access CAPI.CPP via APIINT.CPP and CAPI_S.C in the RPCCLNT.DLL.

Access Control Functions

Access Control Functions are used to validate and direct user access throughout the system. They include ID Card parsers, PIN validators, and the like.

Table Name

Access

Personnel

Database Schema

Figures 26, 27, 28, 29, 30, 31, 32, 33, 34, 35, 36, 37, 38, 39:
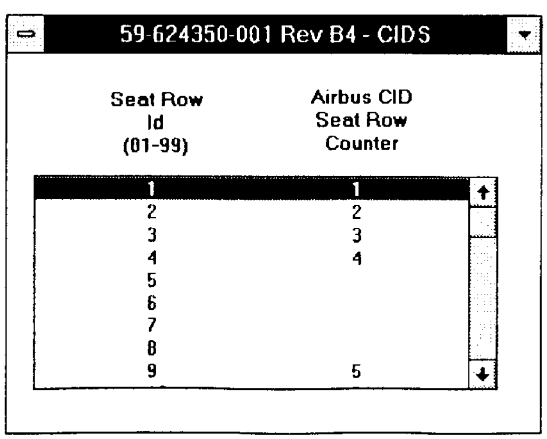

The cabin file server database 493 is shown in FIG. 39 and stores the following types of information. This information is utilized by both the cabin file server Application and the PAT GUI 426 and is described in greater detail below.

The cabin file server database 493 stores other line replaceable units in the IFE system 100, the products and services available to the passengers 117, revenue due to the sales of products and services, system usage due to the flight attendants and passengers 117, surveys offered to passengers 117, the state of the cabin file server Application, video announcements, and global attributes of the IFE system 100. The structure (i.e., tables, views, triggers, relationships, etc.) of the cabin file server database 493 is shown in FIG. 39, which is maintained using a Microsoft Access® Relationships tool.

LRU Information

The cabin file server database 493 provides storage for line replaceable unit information. This enables the cabin file server application to communicate with and/or control these other devices. Some line replaceable unit information is provided by the two data files that are generated by the ACS tool.

Line replaceable unit information is stored in the following tables:

Table Name

LRU

Member

PA_Volume

PassengerMap

Set_

Video Player

Seat Transfer

All purchased goods and services, purchase summary information, complimentary service assignments, and movie lockout information is stored on a per passenger basis. This information may be swapped from one seat 123 to another seat to accommodate the occasion when a passenger 117 must be moved during a flight. Each passenger 117 is represented in a PassengerMap table by a single record. This record contains the following pertinent information:

| Field Name | Purpose |
|---|---|
| SeatNumber | Passenger seat number |
| PassengerID | Passenger Identifier |

When a passenger 117 changes seats, the SeatNumber fields of the two records involved are swapped. Thus, all the information associated with the passenger 117 is not with the seat 123, but with their PassengerID.

Seat Lockout

The viewing of any movie and/or the playing of any game can be locked out at any seat, usually at the request of a parent to prevent a child from seeing a certain movie or excessive game play. Each passenger 117 is represented in the PassengerMap table by a single record. This record contains the following pertinent information:

| Field Name | Purpose |
|---|---|
| SeatNumber | Passenger seat number |
| MovieLockoutMap | Movie lockout bit map |
| GameLockoutMap | Game lockout bit map |

The MovieLockoutMap and GameLockoutMap fields are bit map fields whose bits correspond to individual movie and game titles, respectively. A movie or game is locked out when it's corresponding bit in this field is set to one.

Loss of Seat

Loss of communication with an seat display unit 133 is also recorded in the PassengerMap table.

| Field Name | Purpose |
|---|---|
| SeatNumber | Passenger seat number |
| SeatCommSuccessCount | # Successful communications |
| SeatCommFailCount | # Unsuccessful communications |

At the beginning of each flight, the SeatCommFailCount and SeatCommSuccessCount fields for each seat are initialized to zero. The SeatCommFailCount field is incremented for each first-time-failure encountered for the corresponding seat 123 (i.e., increment if fail<=success). The SeatCommSuccessCount field is incremented for each first-time-success encountered for the corresponding seat (i.e., increment if success<fail). These rules are enforced through triggers on these database fields. The seat 123 is considered bad if the SeatCommSuccessCount is less than the SeatCommFailCount.

Product and Service Information

The cabin file server database 493 provides storage for product and service information (e.g., movie titles, viewing times, movie audio languages, game titles, audio entertainment titles, audio channels, etc.). This information is sent by the cabin file server application to the Seat Display Unit 133 for each flight. This enables up-to-date information to be presented to the passengers 117 so they can know which products and services are available to them and at what cost on a per flight basis. Product and Service information is stored in the following tables:

Table Name
AudioDetail
Cart
CartInventory
GameDetail
IFE_Service
InventoryLog
MovieCycle
MovieCycleDetail
Package Detail
Price
Product
ProductEffectivity
Route
ShippingRate
Store
VideoMedium
Video Player
VideoSegment
VideoUse Video Games Video Game information is maintained in the GameDetail table, one record per Title/EffectiuityDate combination:

| Field Name | Purpose |
|---|---|
| Title | The Game Title that is displayed on the seat display unit 133 |
| EffectivityDate | The date on or after which this game information is effective. |
| RouteType | The flight route type during which this game is available. |
| ProductCode | Corresponds to a product code in the Price table for price lookups. |

Prices are controlled via these fields in the Price table, one per ProductCode/RouteType combination:

| Field Name | Purpose |
|---|---|
| ProductCode | Corresponds to Game or Movie Products for sale |
| RouteType | The flight route type during which this price applies |
| FreeMap | Identifies which zones (identified in bitmap) offer this product free of charge |
| Pricing1 | Pricing structure for zone 1 during this flight route |
| Pricing2 | Pricing structure for zone 2 during this flight route |
| Pricing3 | Pricing structure for zone 3 during this flight route |
| Pricing4 | Pricing structure for zone 4 during this flight route |

Video Programming

Video Game information is maintained in the VideoMedium table, one record per video program, one record per MediaTitle:

| Field Name | Purpose |
|---|---|
| MediaTitle | The Game Title that is displayed on the seat display unit 133 |
| ProductCode | Corresponds to a product code in the Price table for price lookups. |

The IFE system 100 can inhibit the selectability of these video programs based on the date stored in the Effectivity- Date of the VideoSegment table. Movie titles are associated with a specific flight route through the RouteType field of the VideoUse table. Prices are controlled via these fields in the Price table, one per ProductCode/RouteType combination:

| Field Name | Purpose |
|---|---|
| ProductCode | Corresponds to Game or Movie Products for sale |
| RouteType | The flight route type during which this price applies |
| FreeMap | Identifies which zones (identified in bitmap) offer this product free of charge |
| Pricing1 | Pricing structure for zone 1 during this flight route |
| Pricing2 | Pricing structure for zone 2 during this flight route |
| Pricing3 | Pricing structure for zone 3 during this flight route |
| Pricing4 | Pricing structure for zone 4 during this flight route |

Movie Cycles

The database tables used in Movie Cycle are:

Table Name

Member

MovieCycle

Set__

VideoMedium

Video Player

Video Segment

VideoUse

Video sources such as video cassette player 227 or video reproducers (VR) 227 are assigned to a movie cycle through the Member and Set__ tables. Each VCP or VR 227 is stored in the Member field of the Member table. Each movie cycle is stored in the SetName field of the Set__ table. The following movie cycle information is stored in the database.

A movie cycle type is a predefined grouping of video reproducers 227 and movie titles. Movie titles are assigned to video reproducers 227 through the VideoMedium and VideoUse tables. The database 493 can store up to eight different movie cycle types. Information about each movie cycle type is stored in the MovieCycle table. A movie cycle can include from one to fifteen video reproducers 227 (i.e., one to fifteen records of the Member table can be associated with a single movie cycle in the Set__ table).

The start time for a movie cycle is stored in the RelativeStartTime field of the MovieCycle table. It is stored in minutes relative to the time since movie cycle initiation at the primary access terminal 225. A between-cycle intermission time is stored in the IntermissionLength field of the MovieCycle table. It is stored in minutes and must exceed the time required to prepare the video reproducer 227 containing the longest playing tape for the next cycle (e.g., tape rewind).

The end time of a movie cycle is the time in which the final viewing of a particular movie cycle ends. The number of viewings that can be scheduled for each movie cycle depends upon the length of a single viewing of the movie cycle and the flight duration. The length of a single viewing of the specific movie cycle can be calculated by adding the IntermissionLength field of the MovieCycle table to the SegmentRunTime field of the VideoSegment table for the movie with the longest run time in the specific movie cycle. The expected flight duration is stored in the FlightDuration field of the Flight table.

Information about the state of a particular Video Reproducer 227 is stored in the State field of the VideoPlayer table. This information includes whether or not the video reproducer 227 is operational, whether or not the video reproducer 227 contains a tape, etc.

The number of minutes before the start of each cycle can be calculated using the RelativeStartTime field of the MovieCycle table, the calculated length of the single viewing of the movie cycle, and the IntermissionLength field of the MovieCycle table. The number of minutes before intermission for the current cycle is stored in the RemainingViewingTime of the MovieCycle table.

The number of minutes until the next viewing of a specific movie cycle is stored in the NextViewingTime of the MovieCycle table. The number of minutes remaining on the current viewing of the specific movie cycle is stored in the RemainingViewingTime of the MovieCycle table. The number of minutes elapsed into the current viewing of the specific movie cycle is stored in the ElapsedViewingTime of the MovieCycle table.

Package Entertainment

A predetermined set of movies and/or games can be assigned to an airline-defined package. Package information is stored in the PackageDetail table.

Audio Programming

Audio programming (entertainment) can be distributed on a maximum of 83 mono audio channels, controlled by the AudioDetail table, one record per program. The title of each audio program is stored in the AudioTitle field. The channel of each Audio program is stored in the AudioChannel field.

Language Selection

The VideoMedium table stores up to four different languages for a particular video tape (e.g., movies). These languages are displayed on the display screen 122 for passenger selection. The languages are stored in the LanguageCode1, LanguageCode2, LanguageCode3, and LanguageCode4 fields of the VideoMedium table. Each video tape must have one language designated as the default primary language (i.e., LanguageCode1 must not be empty) but it can have up to three other languages. The relationship of the output configuration of the video players and available language configuration is stored in the VideoPlayer table.

Video Reproducer (VR) Control

Information about each video reproducer 227 is stored in the VideoPlayer table. In order to "preview" the output of a particular video player on the primary access terminal screen, both primary access terminal tuners (audio and video) must be tuned to the proper channels. Video channel information for each video reproducer 227 is stored in the VideoRF__Channel field. Audio time-slot information is stored in the various time slot fields (i.e., LeftTimeSlot1, RightTimeSlot1, LeftTimeSlot2, etc.).

A video reproducer 227 can be reassigned for use during a video announcement. The MediaType field in the VideoMedium table distinguishes a video announcement from a movie. The VideoUse table tracks which movie or video announcement is assigned to which video reproducer 227. When a video reproducer 227 is reassigned, the PlayerName field in the VideoUse table is modified. The playing status of each video reproducer 227 is stored in the State field of the VideoPlayer table.

Overhead Display Control

Overhead monitors 162 can be assigned to a video source (i.e., video player 227) for movies. This information is stored in the OverheadAudioMap and OverheadVideoMap fields of the MovieCycleDetail table.

Revenue Information

The cabin file server database 493 provides storage for revenue information (e.g., credit card data, cash collection data, etc.) concerning the sales of products (e.g., duty free) and services (e.g., movies and games). When a passenger 117 uses a credit card to pay for movies or games, this information must be stored in the database so that it can be transferred to the credit card company. Likewise, when a passenger 117 uses cash to pay for movies or games, this information must be stored in the database 493 so that the IFE system 100 has a record of how much cash should be collected by the flight attendant.

Revenue information is stored in the following tables:

Table Name
Address
BadCreditCards
Commitment
CreditCard
Currency
Exchange
Flight
Order__
OrderHistory
PassengerMap
PAT__History
Policy
Price
Product
Product Effectivity
Shipping Rate
Table Name
ValidCardData Transaction Processing The purpose of transaction processing is to maintain a record of monetary transactions for service and products. When a flight attendant is involved with an order placed by a passenger 117 (e.g., order refunded, order placed at the PAT, etc.), then the flight attendant ID is stored in the FlightAttendant field of the Order__ table.

Product/Service Pricing

Information about each product and service is stored in the Product table. Information about each package of goods or services is stored in the PackageDetail table. The pricing information for each product, service, and package is stored in the Price table. Prices can be altered according to the policy stored in the PolicyDescription field of the Policy table. For example, the policy may specify different service price data for movies and games offered in each seat class zone (e.g., first class) in the aircraft 111.

Payment Methods

Services and products may be paid by either cash, credit card, or a combination of the two. Cash and credit card payments are respectively stored in the CashTotal and CreditTotal fields of the Order__ table. Orders are comprised of sets of products or services of the same type. If the passenger 117 uses a credit card, the credit card information (e.g., passenger name, account number, etc.) is stored in the CreditCard table.

Cash Payment

Cash transactions may be represented in up to 30 different currency types. Information about each currency type is stored in the Currency__ table. Each aircraft 111 has associated with it a base currency that is stored in the BaseCurrencyCode field of the Aircraft table.

Credit Card Payment

Passengers 117 may pay for products and services using any single card from the credit card types accepted by the airline. Information about each valid credit card type is stored in the ValidCardData table. The credit card payment made on a given order is stored in the CreditTotal field of the Order__ table. This payment is recorded in the base currency type as specified in the BaseCurrencyCode field of the Aircraft table.

Credit card numbers are validated against the standard number format and range for that particular credit card type. This standard number format is stored in the ValidatioPattern field of the ValidCardData table. Also, credit card transactions are validated against the credit limit specified by the passenger 117 for that particular credit card type. This credit limit is stored in the CreditLimit field of the ValidCardData table. In addition, each credit card is compared against the credit card numbers in the BadCreditCards table. This table may contain up to 10,000 records, for example.

Transaction Records

All transactions (i.e., service orders, product orders) processed by the system are stored in the Order__ table. The state of an order (open, paid, canceled, refunded) is stored in the State field of the Order__ table. For refunded orders, a duplicate order record is created with the AmountDue field, the CashTotal field, the CreditTotal field, and the Quantity field all set to negative amounts. Orders that are placed at the primary access terminal 225 also have a corresponding entry in the PAT__History table. A new record is generated for the OrderHistory table for each change to the State field or the Delivered field.

The following information is maintained for each order:

| Table | Field | Description |
|---|---|---|
| PassengerMap | SeatNumber | seat number |
| Product | ProductDescription | service or product ordered |
| Order__ | Quantity | quantity of service or product ordered |
| CreditCard | all fields | credit card information for credit card orders |
| Price | UnitPrice | unit cost of service or product ordered |
| Order__ | AmountDue | total cost of service or product ordered |

IFE System Shutdown

Prior to shutdown of the IFE system 100, a message is displayed on the primary access terminal 225 if the database 493 contains any open transactions from the current flight. The number of open orders for the current flight is always displayed in the status window on the primary access terminal 225. This is calculated by counting each order in the Order__ table (for the current flight) whose associated State field is set to "Open".

Purchase Summary

A running tabulation of all expenses incurred for each passenger during the current flight can be displayed on the seat display unit 133 or seat display 122. Each order is associated with a specific passenger 117 via the PassengerID field of the Order__ table. The total cost of each order is stored in the AmountDue field of the Order__ table. Total expenses incurred for a particular passenger 117 is the sum of the total cost of each order placed by the specific passenger 117.

SalesService Function Support

The following subsections describe selected database interactions that occur when the corresponding functions in the SalesServiceClass classes are executed.

CancelOrder( )

Upon cancellation of any cash passenger product and/or service order that has not been paid, the State field of the Order__ table is changed from "Open" to "Cancelled". If the service (i.e., video game or movie) is revoked from the passenger 117, then the ProductRevoked field in the Order__ table is set to TRUE.

Cash Collection List

A list of orders can be generated for which cash collection is to be made in-flight. Information related to each order is as follows:

| Table | Field | Description |
|---|---|---|
| PassengerMap | SeatNumber | seat number |
| Product | ProductDescription | product or service ordered |
| Order__ | AmountDue | amount due |

Orders can be listed by service type and/or by general service zone. The service type of an order (i.e., game, movie, package) is stored in the ServiceType field of the Product table. The general service zone of the passenger 117 that placed the order is stored in the SetName field of the Set__ table.

Product Delivery List

A list of orders can be generated for which delivery is to be made in-flight. Information related to each order is as indicated above. Orders can be listed by service type and/or by general service zone.

Complimentary Service

Complimentary service for movies, games, and/or entertainment packages may be offered to individual passengers or to the entire aircraft 111. For individual passengers, an order is placed in the Order__ table for each passenger 117 receiving a service that is complimentary, the PayCurrencyCode field is set to "Free" and the State field is set to "Paid". The order is then associated with the record in the PassengerMap table where the SeatNumber corresponds to the specific passenger 117.

To provide complimentary service for the entire aircraft 111, all entertainment (movies, games, packages) must be complimentary. A single order is placed in the Order__ table: The PayCurrencyCode field is set to "Free" and the State field is set to "Paid". The order is then associated with the record in the PassengerMap table where the SeatNumber field is set to "Allseats". The FreeServicesMode field of the Aircraft table is set to TRUE.

Currency Exchange

The system 100 can support up to thirty forms of currency. Currency information is stored in the Currency__ table. Exchange rate information is stored in the Exchange table. Currency exchange rate calculations can be performed that support a display with up to four decimal places. The number of decimal places to display is stored in the DisplayPrecision field of the Currency__ table.

Each currency is associated with a Policy table entry to specify how to convert from one currency to another. For example, the policy for converting to US dollars might be to round to the nearest penny, or nearest whole dollar if the airline does not wish to deal with change. The policy actually points to the applicable stored procedure to perform this function.

System Usage Information

The cabin file server database 493 provides storage for system usage by both the flight attendants and passengers 117.

Flight Attendant Activity

The cabin file server database 493 keeps track of each time the flight attendant logs on and off. Additionally, the flight attendants may also enter flight identification information (e.g., flight number, destination, etc.) which is stored in the cabin file server database 493. Flight attendant activity is stored in the following tables:

Table Name

Access

Flight

Personnel

Each time a user (i.e., employee) logs in to the IFE system 100, this login information is stored in the Access table. It is also added to the Personnel table (once for each user) if a predefined set of valid users does not already exist. If a predefined set of valid users is preloaded into the Personnel table, then each user that tries to login can be validated against this pre-defined set of valid users.

An access level for each user is stored in the AccessLevel field of the Personnel table. This access level can be used to direct the user's access throughout the system 100, effectively controlling what they can see or do. For example, a Service Person should not have access to Revenue Modification functions.

When users are required to insert a magnetically encoded card during the logon process, the card is encoded with the user ID (EmployeeNumber field), pin number (PIN field), and grade level (AccessLevel). This information is stored in the Access table for each login. This information is also added to the Personnel table (once for each user) if a pre-defined set of valid users does not already exist. If a predefined set of valid users is preloaded into the Personnel table, then each user that tries to login can be validated against this predefined set of valid users.

In the case where the card read is not successful, the user must manually enter the user ID, pin number, and grade level. This information is stored in the Access table for each login. This information is also added to the Personnel table (once for each user) if a predefined set of valid users does not already exist. If a predefined set of valid users is preloaded into the Personnel table, then each user that tries to login can be validated against this predefined set of valid users.

Passenger Activity

The cabin file server database 493 also logs system activity (i.e., passenger usage of the system 100from the seat display unit standpoint). The database 493 stores how much time each seat spent on each movie, on each game, and on each audio selection. This allows the airline to see how passengers 117 are using the system 100.

Passenger activity is stored in the following tables:

Table Name

PassengerStatistics

Passenger Statistics

The following passenger statistic information is stored in the database 493:

| Table(s) | Field(s) | Definition or Comment. |
|---|---|---|
| PassengerMap | SeatNumber PassengerID | Each passenger is associated with their seat number. |
| Member Set__ | Member SetName | Each seat number is associated with one class (e.g., first class, coach, etc.). The seat number is stored in the Member field of the Member table. The class is stored in the SetName field of the Set__table. |
| PassengerStatistics | StatImage | Time spent viewing movies by title: Each movie watched and length of time spent watching each movie is |

-continued

| Table(s) | Field(s) | Definition or Comment. |
|---|---|---|
| | | stored here as a Binary Large OBject (BLOB) which can hold up to 2GBytes of data if disk space allows. |
| PassengerStatistics | StatImage | Time spent listening to entertainment audio by title: Each audio entertainment listened to and the length of time spent listening to each audio entertainment is additionally stored here (BLOB). |
| PassengerStatistics | StatImage | Time spent playing games by title: Each game played and length of time spent playing each game is additionally stored in the here (BLOB). |

Passenger Survey Information

The cabin file server database 493 provides storage of passenger survey information. Passengers 117 at each seat 123 can elect to participate in the survey. The database 493 records each result (i.e., passenger's answer) to each survey taken so that this information can be made available to the airline. Passenger survey information is stored in the following tables:

Table Name
Survey
SurveyAnswer
SurveyAnswerKey
SurveyQuestion

The results of each survey taken (or same survey taken multiple times) by each passenger are stored in the SurveyAnswer table. Survey results may be off-loaded using the Data Offload approach discussed above. The name of the survey is stored in the Survey table. The corresponding questions contained in the survey are stored in the SurveyQuestion table. All possible answers (i.e., six multiple choice answers) for each survey question are stored in the SurveyAnswerKey table.

Application State Information

The cabin file server database 493 provides storage for application state information. This is useful in cases where there is an interruption of aircraft power while the application is running. Storing this information in the database 493 allows the system to resume operation where it left off. There may be over 100 processes running at any given time. Each process can store as much information as needed in the Data field of the PowerRecovery table in order for the process to know where it should continue once power is resumed. The Data field is defined as a Binary Large OBject (BLOB).

Pause/Resume Interactive Services

The state (e.g., start, pause, stop, init) of the IFE system 100 is stored in the IFE_State field of the Aircraft table. Products and/or services ordered by the passenger 117 are stored in the Order_ table (as well as at the seat display unit 133 for backup). This enables the IFE system 100 to start from where it left off once passenger entertainment and interactive services are resumed.

Video Announcement Information

The cabin file server database 493 provides storage for Video Announcement information. This information may include attributes such as video announcement titles, overhead audio, overhead video, and whether in-seat displays 122 are overridden. Video Announcement information is stored in the following tables:

Table Name
VA Distribution
Video Medium
Video Segment
Video Player
VideoUse

Video Announcement

Video Announcement information is stored in the VideoMedium table. Examples include boarding announcements, safety announcements, short subject programs, etc. Each Video Announcement has more specific information stored in the VideoSegment table.

Attributes for each Video Announcement are stored in the VA_Distribution table. Attributes include, but are not limited to: if the announcement is heard on the overhead audio and in which zone (OverheadAudioMap field, where each bit in the field represents a zone), if the announcement is viewed on the overhead video and in which zone (Overhead VideoMap field, where each bit in the field represents a zone), if the announcement (audio and video) overrides whatever is currently being viewed at the seat (InseatOverrideMap field, where each bit in the field represents a zone), or be available for in-seat viewing (default) and in which zone.

Video Announcements (audio and video) are available for in-seat viewing (default). This means that the passenger 117 has the option to select the video channel on which the video announcement is being played. Video Announcements can also be set to override in-seat viewing. In this case, the IFE system 100 causes the overridden in-seat displays in a specified zone to select the video channel on which the video announcement is being played, and the passenger 117 is unable to turn off the in-seat video display 122.

Each Video Announcement is assigned to a particular source (i.e., video player) through the VideoUse table. Attributes for each video player are stored in the VideoPlayer table. The default volume level for the PA speakers is stored in the DefaultPA_AudioLevel field of the Aircraft table. The volume level for the PA speakers can be different for each zone. This is stored in the AudioLevel field in the PA_Volume table.

Overhead Display Control

Overhead monitors 162 can be assigned to a video source (i.e., video player 227) for video announcements. This information is stored in the OverheadAudioMap and Overhead VideoMap fields of the VA_Distribution table.

Global Attribute Information

The cabin file server database 493 provides storage for global attribute information (i.e., information that can be accessed by any service). Examples may include the current state of the IFE system 100, the base currency, and the default PA audio. IFE system global attribute information is stored in the following tables:

Table Name
Aircraft
Airline
Airport
Country
Flight
Route

Flight Information

The following flight information is pre-loaded and stored in the Route table, one record per known route:

| Field | Description |
| --- | --- |
| FlightNumber | flight number assigned to this flight leg |
| FlightDuration | estimated flight duration in minutes |
| DepartureAirport | departure airport code |
| ArrivalAirport | arrival airport code |
| RouteType | route type to determine which services are available on this route |

When the flight attendant enters a FlightNumber and RouteType at the primary access terminal 225, the corresponding flight information (i.e., FlightDuration, ArrivalAirport, and DepartureAirport) is found in the Route table and presented at the primary access terminal 225 and stored in the current record of the Flight table. The DepartureDate and DepartureTime are determined based on when the weight-off-wheels signal is received. This date and time is then stored in the WeightOffWheelTime field of the Flight table to calculate movie cycle and other sales times.

IFE Tool Support

The following IFE data is configurable in order to tailor the IFE functionality for a particular airline. This tailoring is done using the IFE Tools software.

(a) IFE function data configuration ID: Version field of the DB_Version table.

(b) For each video game: (1) The cost of each video game is specified in the UnitPrice field of the Price table. This cost can be altered based on the PolicyDescription field of the Policy table. A video game can be offered for free in a given zone by setting the associated bit in the FreeMap field of the Price table to 1. (2) The type of video game is stored in the GameType field of the GameDetail table. (3) The activation date is stored in the EffectivityDate field of the GameDetail table.

(c) For each movie: (1) The cost of each movie is specified in the UnitPrice field of the Price table. This cost can be altered based on the PolicyDescription field of the Policy table. A movie can be offered for free in a given zone by setting the associated bit in the FreeMap field of the Price table to one. (2) The length of each movie is stored in the SegmentRunTime field of the VideoSegment table. (3) The activation date is stored in the EffectivityDate field of the VideoUse table.

(d) For each aircraft seat class zone: whether video games and movies are pay or free is addressed in items (b) and (c) above.

(e) For each aircraft seat class zone: which passenger survey is available.

(f) Logical seat groups (e.g., general service zones, duty free zones) are specified in the Member and Set_ tables. Seat numbers are stored in the Member field of the Member table. Zones are stored in the SetType field of the Set_ table.

(g) For each route type: Titles to appear in the video game menu, audio menu, and movie menu of the seat display unit 133. Titles to appear in the video game menu can be limited according to route type. The titles are stored in the Title field of the Gamebetail table. The route type is stored in the RouteType field of the GameDetail table. Titles to appear in the audio menu can be limited according to route type. The titles are stored in the AudioTitle field of the AudioDetail table. The route type is stored in the RouteType field of the AudioDetail table. Titles to appear in the movie menu can be limited according to route type. The titles are stored in the MediaTitle field of the VideoMedium table. The route type is stored in the RouteType field of the VideoUse table.

(h) Currency exchange rates are stored in the ExchangeRate field of the Exchange table.

(i) The primary access terminal display currency is stored in the PAT_DisplayCurrency field of the Aircraft table.

(j) For each flight number: Arrival/departure city pairs, flight duration and route type. Each flight number is associated with a specific route. The route is specified by the FlightNumber and Leg fields of the Route table. The arrival/departure city pairs for a given route is respectively stored in the ArrivalAirport and DepartureAirport fields of the Route table. The scheduled flight duration for a given route is stored in the FlightDuration field of the Route table. The calculated flight duration (e.g., based on tail wind, etc.) for a given route is stored in the FlightDuration field of the Flight table. The route type of a given route is stored in the RouteType field of the Route table.

(k) Movie cycle attributes are specified in the Cabin File Server Executive Extensions Software Design Document.

(l) Video announcement titles are stored in the MediaTitle field of the VideoMedium table. Video announcement lengths are stored in the SegmentRunTime field of the VideoSegment table.

(m) The video announcement cabin speaker default volume is stored in the DefaultPA_AudioLevel field in the Aircraft table. This volume cannot be changed during a flight. During database initialization, a record for the PA_Volume table is created for every PA zone (as specified by the LRU table). The AudioLevel field in each record of the PA_Volume table is initialized to the DefaultPA_AudioLevel. The video announcement cabin speaker default volume can then be modified for each PA zone (e.g., passengers in the PA zone over the engine may need a louder default volume). The new volume is stored in the AudioLevel field of the PA_Volume table.

(n) The video reproducer 227 assigned to a particular video announcement is stored in the PlayerName field of the VideoUse table. The video reproducer 229 assigned to a particular movie is stored in the PlayerName field of the VideoUse table.

(o) Product pricing data is stored in the UnitPrice field of the Price table. Product effectivity data is stored in the EffectivityDate of the ProductEffectivity table.

(p) Accepted credit card types (i.e., Visa, Discover, etc.) are stored in the CardName field of the ValidCardData table. Accepted charge limits are stored in the CreditLimit field of the ValidCardData table. This charge limit is defined by the airline.

(q) The airline name is stored in the AirlineName field of the Airline table.

(r) The number of movies in a particular package is stored in the MovieQuantity field of the PackageDetail table. The hours of game play is stored in the GameQuantity field of the PackageDetail table. Additional package details (e.g., which games/movies are in the package) are also stored in the PackageDetail table.

Cabin file server Runtime Utilities 425

Cabin file server Runtime Utilities 425 are programs that are used once per flight, either at the beginning or at the end. As a result, they are part of the application and are maintained along with the cabin file server Executive Extensions.

Seat Display Unit Database Builder

SDU_BLDR.EXE, the seat display unit database builder, is used to develop a download file to be downloaded to all seats 117. The download file is comprised of product and entertainment information that is subject to change based on the contents of the cabin file server database 493.

When flight information is entered by the Flight Attendants at the primary access terminal 225, the SDU_BLDR on the cabin file server 268 is initiated. The GUI 426 calls SDU Builder via the CAPI to extract the information from the cabin file server database 493 that is pertinent to the current flight. This information is used to create the download file (sdu_data.dnl) that is sent to each seat on the aircraft 111.

The purpose of sdu_data.dnl is to provide current information (i.e., entertainment, pricing, etc.) from the database 493 to the passenger seats 123. The creation of the download file triggers the Seat NAU to notify each seat that a new download file exists. Each seat then requests the file and applies the portion of the download file that is applicable to their programming (i.e., first class seats don't read the information in the download file applicable to coach seats 123).

Event Log Archiver

CFSLOGS.EXE is the main C++ executable associated with the archival of the event logs. It runs on the cabin file server 268 and is initiated during the data archive process. Cfslogs.exe is responsible for dumping the NT event logs of the cabin file server 268 to the hard disk using a unique archive file name. This file name is passed to cfslogs.exe as an input parameter.

Point of Sales Offloader

DUMP_POS.EXE is the main C++ executable associated with offloading Point of Sales data. It runs on the cabin file server 268 and is initiated during the data offload process. Dump_pos.exe is responsible for writing the archived database information for a given flight to the various FLT-SALES.CSV files on the hard disk. The flight ID is passed to dump_pos.exe as an input parameter.

Archive Purger

PARCHIVE.EXE is the main C++ executable associated with the purging of archive data. It runs on the cabin file server 268 and is initiated as part of the effort to manage the disk space on the cabin file server 268. Parchive.exe is responsible for deleting both the Archive file and the Offload file from the hard drive. Both of these files are passed to parchive.exe as input parameters.

Dump Passenger Statistics

DUMPSTAT.EXE is the main C++ executable associated with offloading Passenger Statistic data. It runs on the cabin file server 268 and is initiated during the data offload process. Dumpstat.exe is responsible for writing the archived database information for a given flight to the paxstats.csv files on the hard disk. The flight ID is passed to dumpstat.exe as an input parameter.

The primary access terminal Executive Extension

The primary access terminal Executive Extension set of routines which, together with the Common Executive software, forms the generic application for the primary access terminal 225. It includes NAUs, Libraries, Drivers, and Runtime Utilities as described herein.

Figures 26, 27, 28, 29, 30, 31, 32, 33, 34, 35, 36, 37, 38, 39, 40:
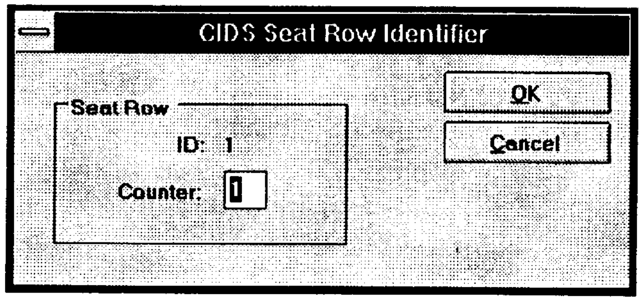

A discussion follows regarding the Network Addressable Units that reside on the primary access terminal 225. The primary access terminal 225 Network Addressable Unit program 409 function and data paths are shown in FIG. 40. The primary access terminal NAU 409 provides the interface between the PAT GUI 426 or the Application Services and the unique devices attached to the Primary Access Terminal 225. Each of these devices is controlled via its own Virtual LRU set of functions. In addition, most of these devices communicate via the same I/O channel, the PI Mux.

| | |
|---|---|
| Audio Tuner VLRU | The Audio Tuner VLRU allows control of audio channel selections for flight attendant previewing via the PAT GUI. |
| Card Reader VLRU | The Card Reader VLRU collects and forwards data from the card reader, to be used by the Access Functions and Sales Services' Functions. |
| GUI Monitor VLRU | No LRU is actually associated with this VLRU. The GUI Monitor VLRU's duty is to start the GUI and end the GUI as appropriate. |
| PAT VLRU | The PAT VLRU responds to loopback messages from the CFS TestPort NAU via Ethernet for BIT functionality. It logs communication failures between the PAT and the CFS. It controls the BITE and COMM LEDs on the front of the PAT, lighting them to indicate failures. |
| Printer VLRU | The Printer VLRU periodically queries the Control Center Printer for its status and provide this status as an unsolicited message to the PAT GUI. |

PAT. EXE contains the primary access terminal NAU program 409. The primary access terminal NAU program 409 includes the following primary components:

PAT.CPP The Main( ) Program
PDSPATCH.CPP The NAU Dispatcher
GUMNITOR.CPP The GUI MonitorVLRU Class
CRDRDRVL.CPP The Card Reader VLRU Class
TUNRVLRU.CPP The Audio Tuner VLRU Class
PATVLRU.CPP The PAT main VLRU Class
PRNTRVLR.CPP The Printer VLRU Class
PRNTRSTT.CPP The Printer VLRU's Status Sub-Class
PIMUX.CPP The PI MUX VLRU Class
PINTRFCE.CPP The base class for the Tuner VLRU, Card Reader VLRU and PAT VLRUs Main Program Main( ) registers with the System Monitor 412 and launches a PIDispatch object to open up communications between the message processor 404 and the transaction dispatcher 421. It calls PIDispatch::startItUp( ) to initialize the VLRUs, one each. It also launches the Session( ) threads. Main( ) waits to die, either by receiving a ProcessStop command from System Monitor 412, or else it sleeps forever until interrupted. It calls shutItdown( ) to close all the VLRUs down with a SubProcessStop command and exit gracefully.

GUI Monitor VLRU

When the GUI_Monitor object is created, it creates an extra event called ServiceAlive. This event is set via ServiceMonitor( ) and tested in StartItUp( ) to know whether Cabin Service is communicating to this NAU.

The StartItUp( ) routine is called as soon as all the VLRUs are created via the PIDispatch::startItUp( ) it launches another thread called ServiceMonitor( ) which continuously tries to receive messages from the Cabin Services program via a mail slot. It then uses this as a 'heart beat' to know if the application is still alive. If this heart beat fails to occur after having been established, the GUI Monitor terminates the GUI process. If this heart beat is never established, ServiceMonitor( ) simulates one, for test purposes.

StartItUp( ) continuously loops and waits for the SubProcessStart command from the message processor 404 (from the PIDispatch::startItUp( ) routine), and then it waits for PIDispatch( ) to tell whether it connected to the database successfully by triggering the ConnectedToService event. Then it attempts to start the CGUI.EXE program. If StartItUp( ) detects that the GUI terminated, it attempts to restart it. StartItUp( ) ignores messages from the transaction dispatcher 421, and only processes the SubProcessStart and Stop commands from the message processor 404.

PI Interface VLRU Starter

The Card Reader, Tuner, PI Mux, primary access terminal and Printer VLRUs are all based on the PIInterface class. Essentially, this provides support for one more source of I/O, from the PI Mux (or multiplexed I/O port) via the PIMux VLRU.

It provides the following member routines:

| | |
|---|---|
| ToMuxPut() | Converts a PAT_Message into appropriate syntax for either Audio Tuner or PI 'Board' message and sends the data to the ToMux queue. |
| FromMuxPut() | Places a message on the FromMux queue. |
| FromMuxGet() | Reads a PI_Message from the FromMux queue and converts it to a PAT_Message. |
| ToMuxGet() | Reads and encodes for transmission a PI_Message from the ToMux queue. |
| FromMuxSemaphoreHandle() | Returns the handle for this queue |
| FromMuxSemaphoreHandle() | Returns the handle for this queue. |

PI Mux VLRU

The PIMux class is the VLRU which communicates via the message processor 404 and the transaction dispatcher 421 for all I/O with the PI Board, for card reader, tuning, etc. The PIMux class points to each of these VLRU classes for data transfers through their FromMux and ToMux queues. A StartItUp( ) routine loops forever retaining its Session( ) thread. It looks for a SubProcessStart command from the message processor 404 (which is issued by the NAUDispatch:startItUp( ) routine) and triggers the StartEvent to activate its associated VLRUs (Card Reader, etc.).

Once StartEvent has occurred, it proceeds to receive I/O from the message processor 404 and the transaction dispatcher 421. It determines which sub-VLRU should process the message and forwards it to their FromMux queue for handling, and then it responds an Ack or Nak to the PI board, as applicable to satisfy its communications protocol needs.

Messages from the VLRUs intended for the PI Mux are sent to this VLRU as well via their ToMux queues. It encodes the messages as needed, forwards them and handles the Ack/Nak protocol. It has its own version of NAUGetMP( ) in order to use the PI_Message data handling routines.

Card Reader VLRU

Based on the PIInterface class, the CardReaderVLRU class is the first actual VLRU created for this NAU. It creates an event called StartEvent which is used by PIMux to coordinate all the other PIInterface VLRUs.

Its StartItUp( ) routine loops forever retaining its Session( ) thread. It looks for a SubProcessStart command from the message processor 404 (which is issued by NAUDispatch:startItUp( ) and then waits for StartEvent to trigger before processing any other messages.

Once StartEvent has occurred, it can continue processing. If it receives a SubProcessStop message, it terminates. It reads and ignores all other messages from the message processor 404 and the transaction dispatcher 421. Instead, it looks for input via its FromMux semaphore event, which tells when it has received data from the PI Mux.

If the PI Mux sends a CardRead command, this VLRU calls MagCardData( ) to process this message. All other messages are returned to the Mux via the ToMux queue.

MagCardData( ) converts the data into ASCII and forwards it to the primary access terminal Application via the transaction dispatcher 421. Optionally for testing, the Register can be set with the value "DisplayMagCardData" to cause all the card data to be printed to a window at the primary access terminal 225 via stdout.

Tuner VLRU

The TunerVLRU class is also a PIInterface class child. Its StartItUp( ) routine handles the SubProcessStart and SubProcessStop commands the same as the others, and then waits for I/O from either the PI Mux or the transaction dispatcher 421. If a message is received from the PI Mux, it forwards it to the transaction dispatcher 421 using NAU::NAUPutTD( ). If a message is received from the message processor 404, it forwards it to the PI Mux using ToMuxPut( ).

Primary Access Terminal VLRU

The PatVLRU class is also a PIInterface class child only so it can synchronize operation via the StartEvent trigger. Its constructor reads the registry "VerbosePATVLRU" settings (for test purposes) and the "BITTestInterval" value for Bit testing timeouts.

StartItUp( ) launches a thread called BitTestMonitor( ) and then loops continuously to process messages. First, it waits to receive a SubProcessStart message, then it waits for the StartEvent to know that PIMux is alive and ready to go. SubProcessStop causes it to kill the BitTestMonitor( ) thread and then die. All other messages from the message processor 404 are ignored.

If an Ethernet Loopback message is received from Test Port NAU via the transaction dispatcher 421, it uses EthernetLoopback( ) to return a message via NAU::NAUPutTD( ), and then tell the BitTestMonitor that the loopback occurred. All messages from the PIMux are returned to it via PIInterface::ToMuxPut( ) and otherwise ignored as an error.

The BitTestMonitor( ) turns both BITE and COMM LEDs on at the primary access terminal 225 to show that they are both working (similar to the oil light on a car dash board). Then it turns off the BITE light and waits. If it receives notification from StartItUp( ) that a loopback occurred, it turns off the BITE LED. If it times out waiting for a loopback, it turns the LED back on. If it gets several successive failures (timeouts) it logs it to the event log. If it gets told to exit by StartItUp( ), it turns the BITE LED on and dies.

Printer VLRU

The PrinterVLRU object is a PIInterface class child only so that it can sync up with PI Mux to start processing. It's constructor retrieves "PrinterPollInterval" and "PrinterStatusTimeout" from the Registry and then creates hEventPrinterStatusChange and hEventStop to communicate to the monitor thread that is created in StartItUp( ). This class also has a PrinterStatus class object called Printer which does all the actual communication with the printer over the Ethernet network 228.

StartItUp( ) launches the PrinterStatusMonitor( ) thread, and then loops forever. The only message processor messages it processes are:

SubProcessStart After receipt it waits for the StartEvent signal to continue

SubProcessStop Kills the Monitor thread and dies

StartItUp( ) ignores all messages from the transaction dispatcher 421. It echoes any messages back to the PI Mux and otherwise ignores them. If StartItUp( ) receives a PrinterStatus event (from the monitor), it calls SendPrinterStatus( ) to build the status message and then sends it to the CAPI Message Service via NAU::NAUPutTD( ).

PrinterStatusMonitor( ) uses the PrinterStatus object of this VLRU to talk to the printer. If it cannot talk to the printer via PrinterStatus::InitalizePrinterSNMP( ), it logs the error to the event log. If changes in the printer status occur, it tells StartItUp( ) via hEventPrinterStatusChange. It logs the following other events to the event log: Out of Paper, Has Paper Again, any other errors, and 1st Status after any error.

SendPrinterStatus( ) uses PAT_Message routines to convert the PrinterStatus info to ASCII. It then sends it on to the CAPI Message Service via NAU::NAUPutTD( ).

The PrinterStatus class constructor connects to the Printer via the Ethernet network 228 using InitializePrinterSNMP( ), requests the status via RequestRawPrinterStatus( ), Interprets (with StatusDescription( )) and displays the printer status info using DisplayPrinterStatus( ), among other private routines.

CAPI Library

Figures 26, 27, 28, 29, 30, 31, 32, 33, 34, 35, 36, 37, 38, 39, 40, 41:
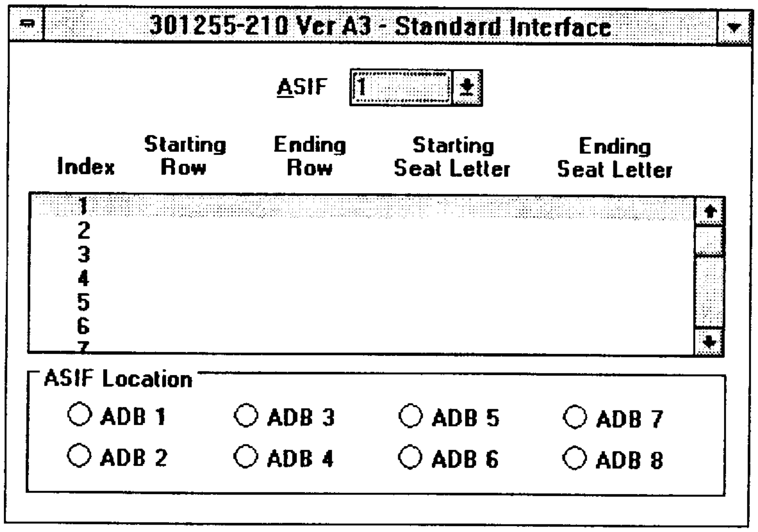
Figures 26, 27, 28, 29, 30, 31, 32, 33, 34, 35, 36, 37, 38, 39, 40, 41, 42:
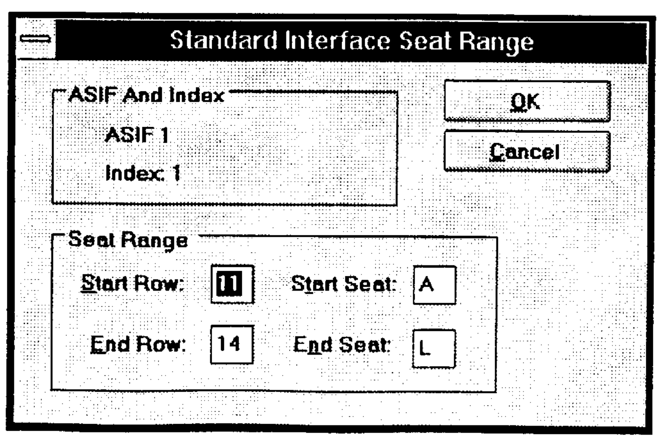
Figures 26, 27, 28, 29, 30, 31, 32, 33, 34, 35, 36, 37, 38, 39, 40, 41, 42, 43:
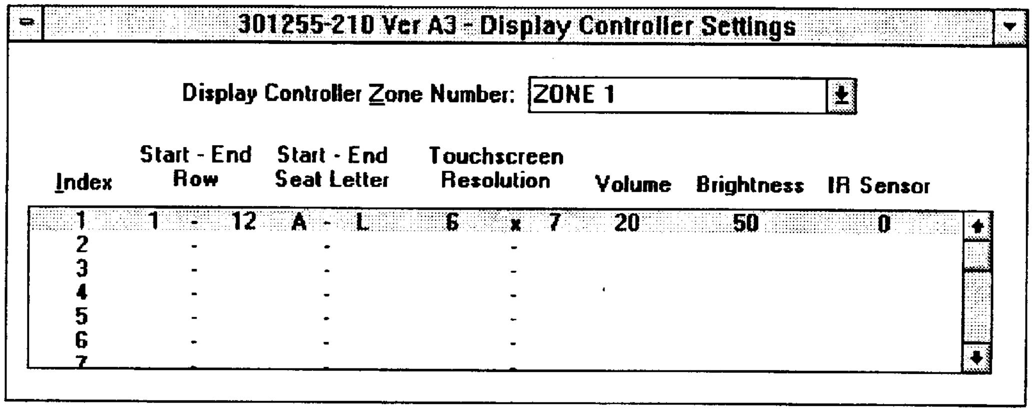
Figures 26, 27, 28, 29, 30, 31, 32, 33, 34, 35, 36, 37, 38, 39, 40, 41, 42, 43, 44:
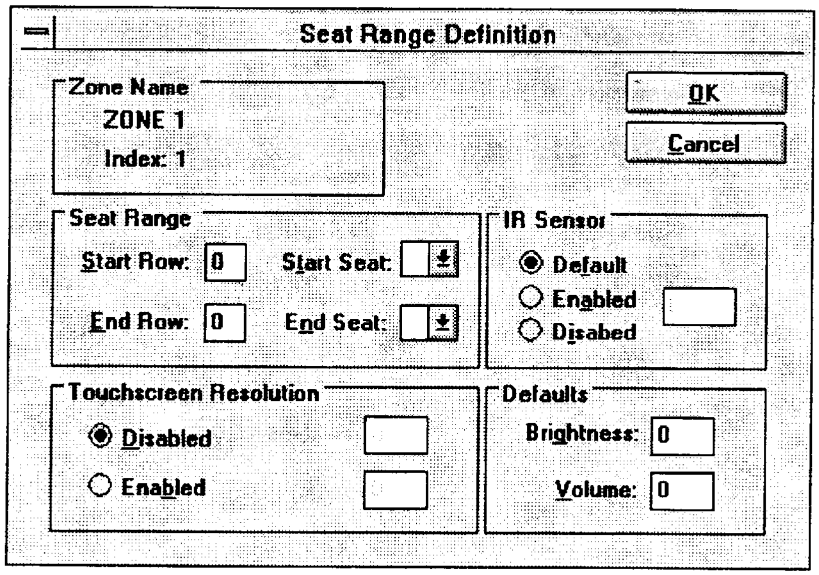
Figures 26, 27, 28, 29, 30, 31, 32, 33, 34, 35, 36, 37, 38, 39, 40, 41, 42, 43, 44, 45:
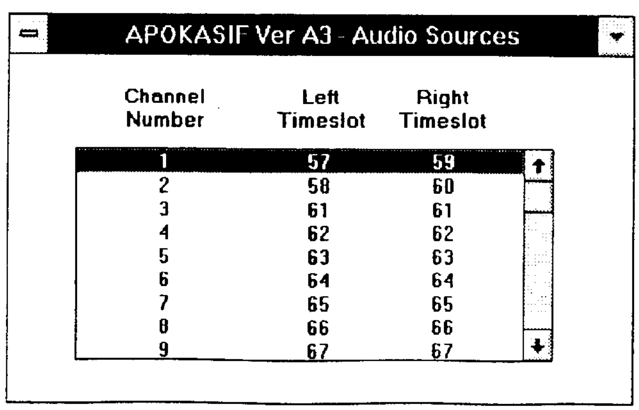
Figures 26, 27, 28, 29, 30, 31, 32, 33, 34, 35, 36, 37, 38, 39, 40, 41, 42, 43, 44, 45, 46:
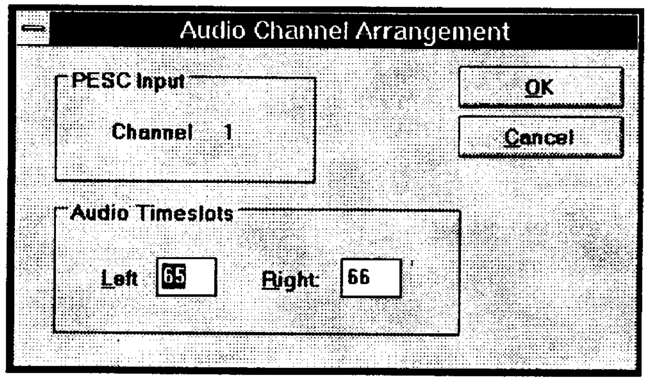
Figures 26, 27, 28, 29, 30, 31, 32, 33, 34, 35, 36, 37, 38, 39, 40, 41, 42, 43, 44, 45, 46, 47:
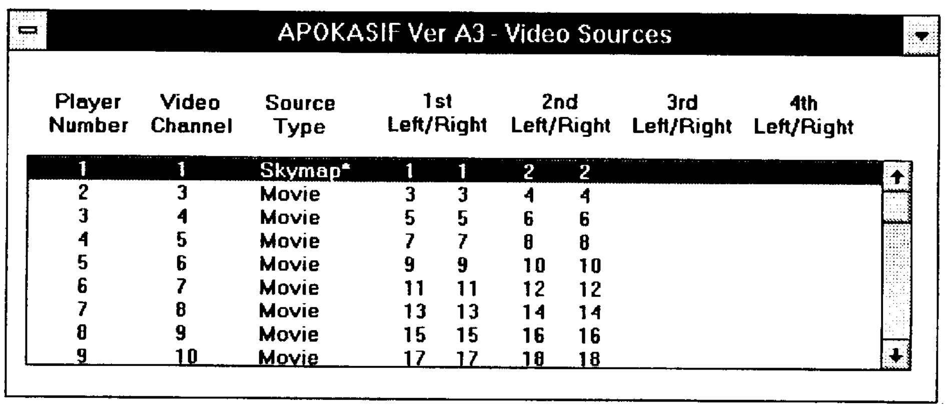
Figures 26, 27, 28, 29, 30, 31, 32, 33, 34, 35, 36, 37, 38, 39, 40, 41, 42, 43, 44, 45, 46, 47, 48:
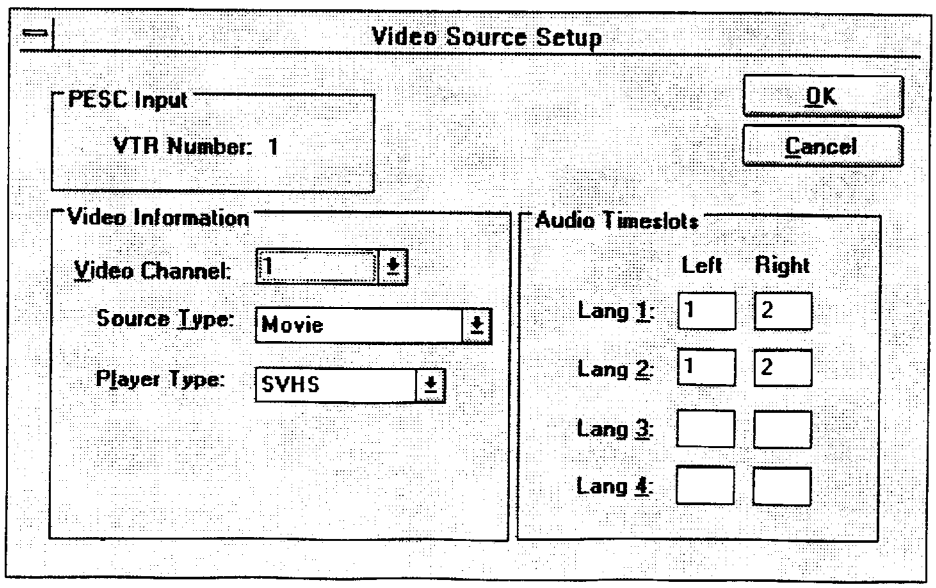
Figures 26, 27, 28, 29, 30, 31, 32, 33, 34, 35, 36, 37, 38, 39, 40, 41, 42, 43, 44, 45, 46, 47, 48, 49, 50, 51, 52:
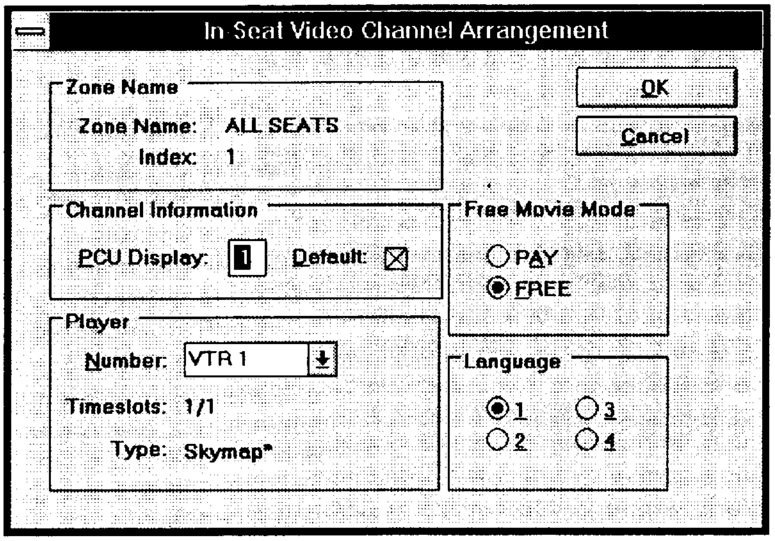
Figures 26, 27, 28, 29, 30, 31, 32, 33, 34, 35, 36, 37, 38, 39, 40, 41, 42, 43, 44, 45, 46, 47, 48, 49, 50, 51, 52, 53:
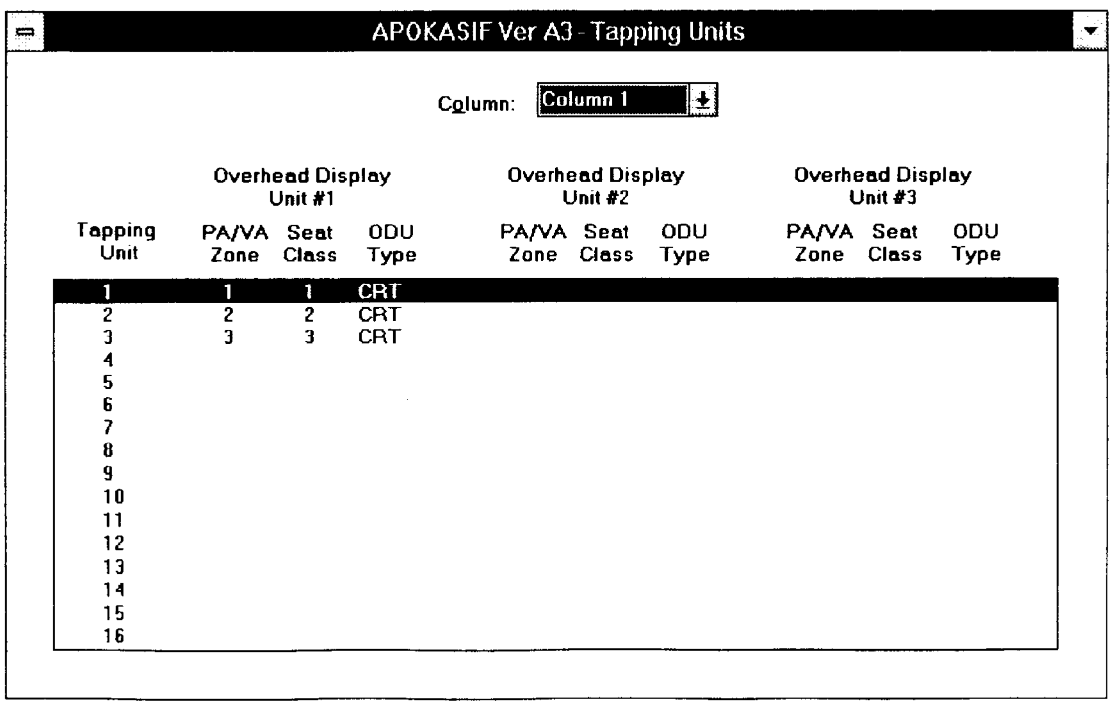
Figures 26, 27, 28, 29, 30, 31, 32, 33, 34, 35, 36, 37, 38, 39, 40, 41, 42, 43, 44, 45, 46, 47, 48, 49, 50, 51, 52, 53, 54:
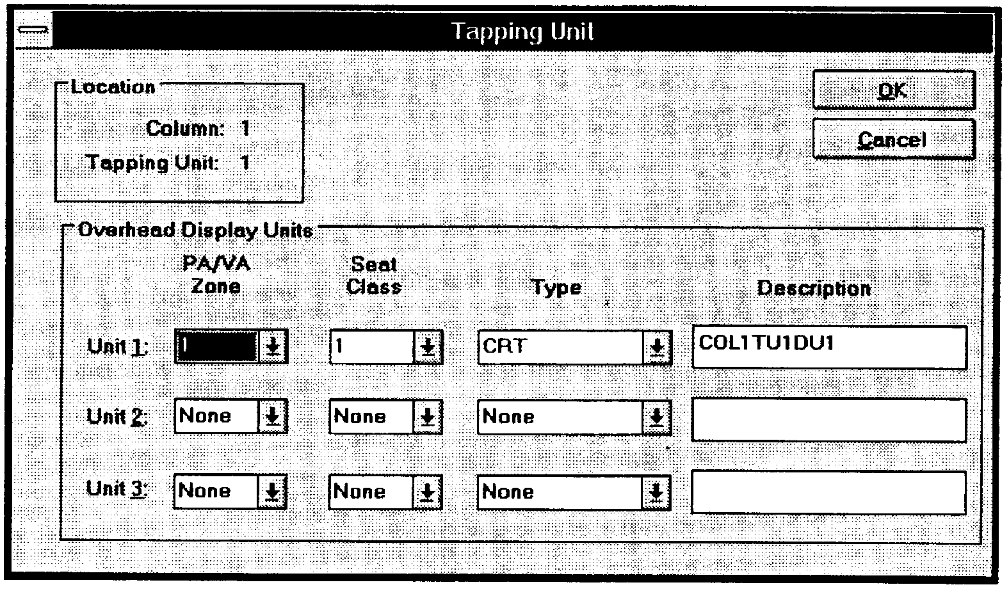
Figures 26, 27, 28, 29, 30, 31, 32, 33, 34, 35, 36, 37, 38, 39, 40, 41, 42, 43, 44, 45, 46, 47, 48, 49, 50, 51, 52, 53, 54, 55:
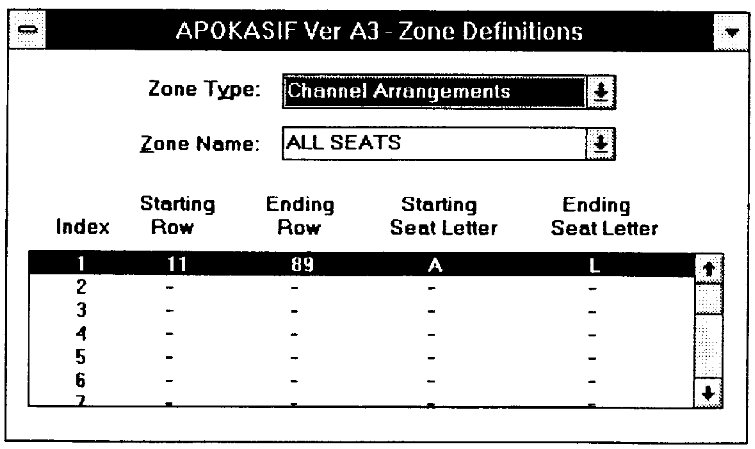
Figures 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56:
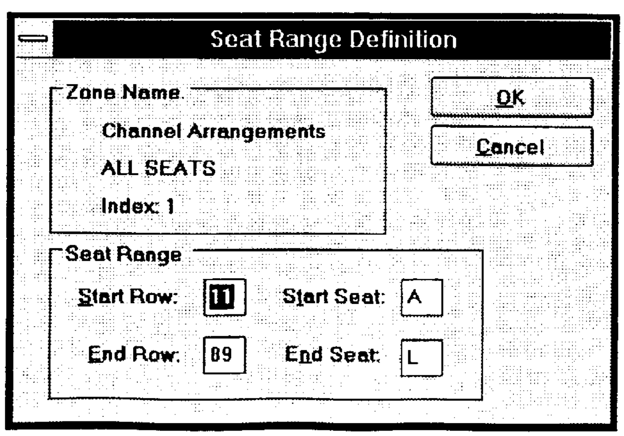
Figures 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57:
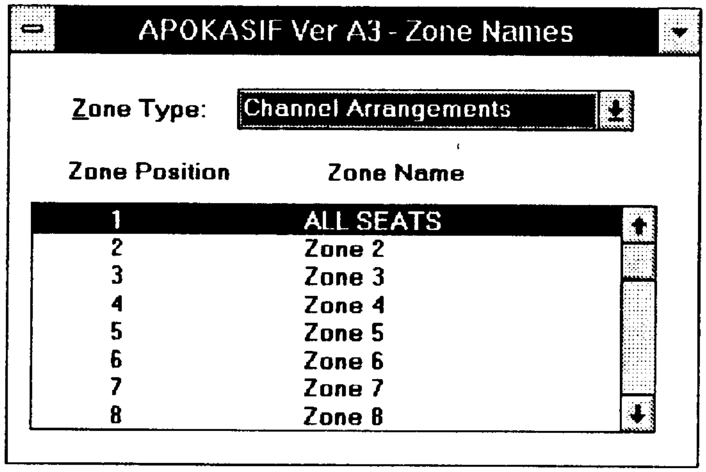
Figures 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58:
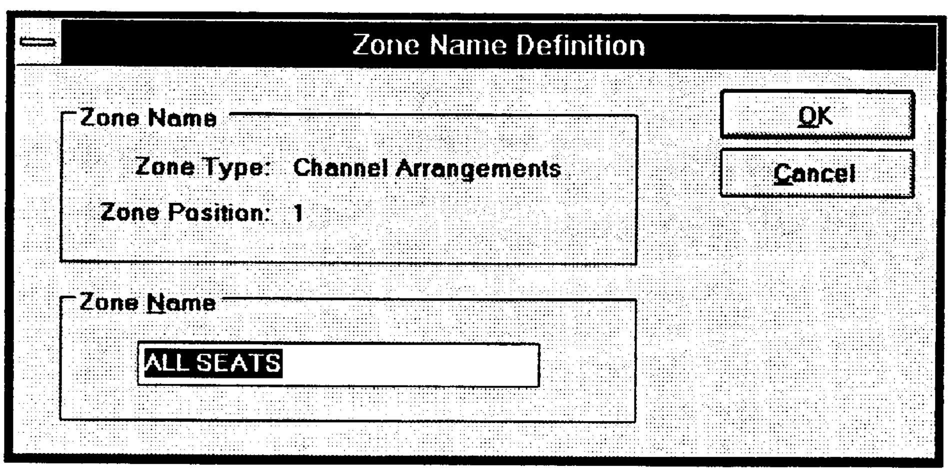
Figure 27:
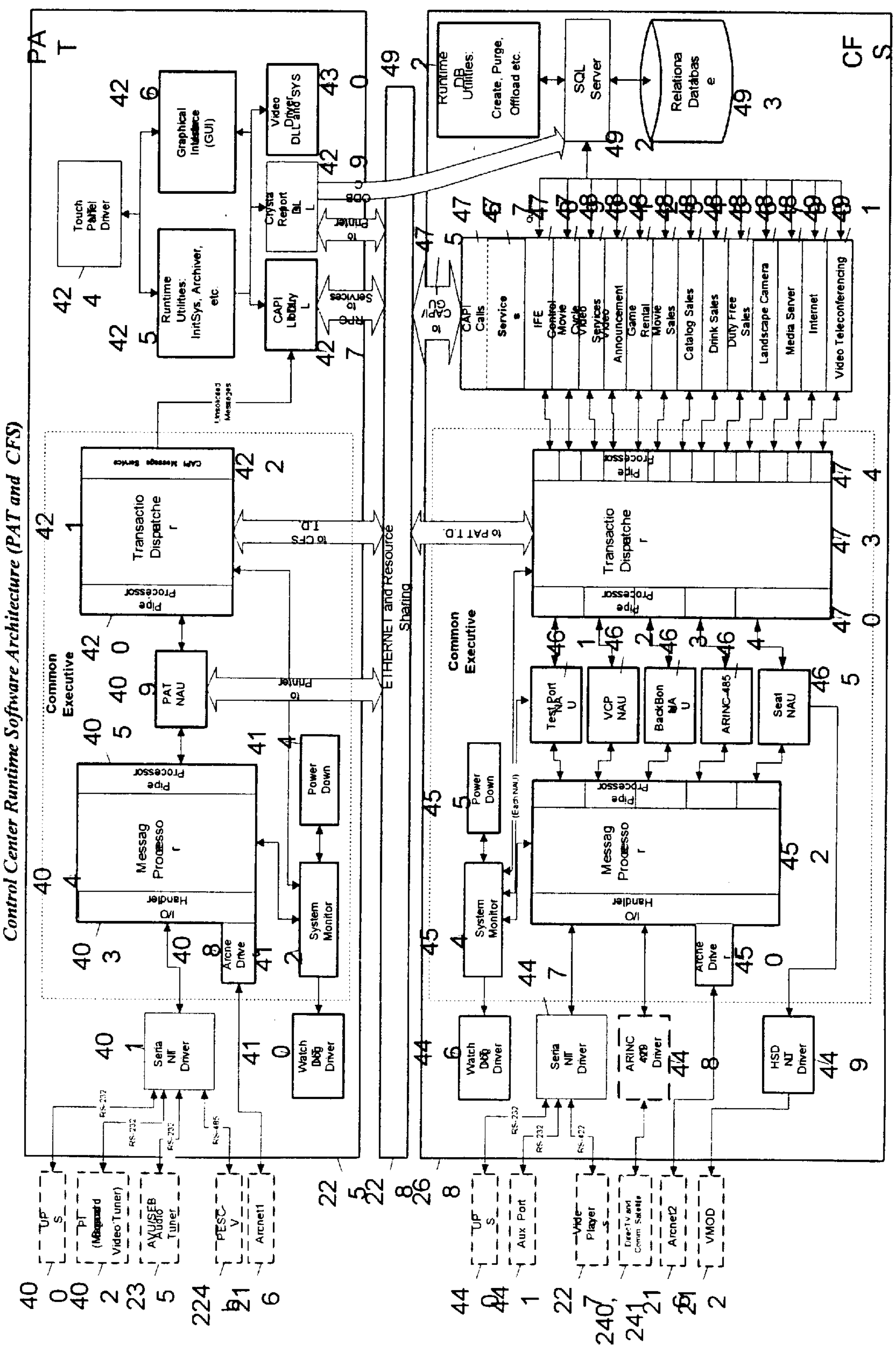
Figure 28:
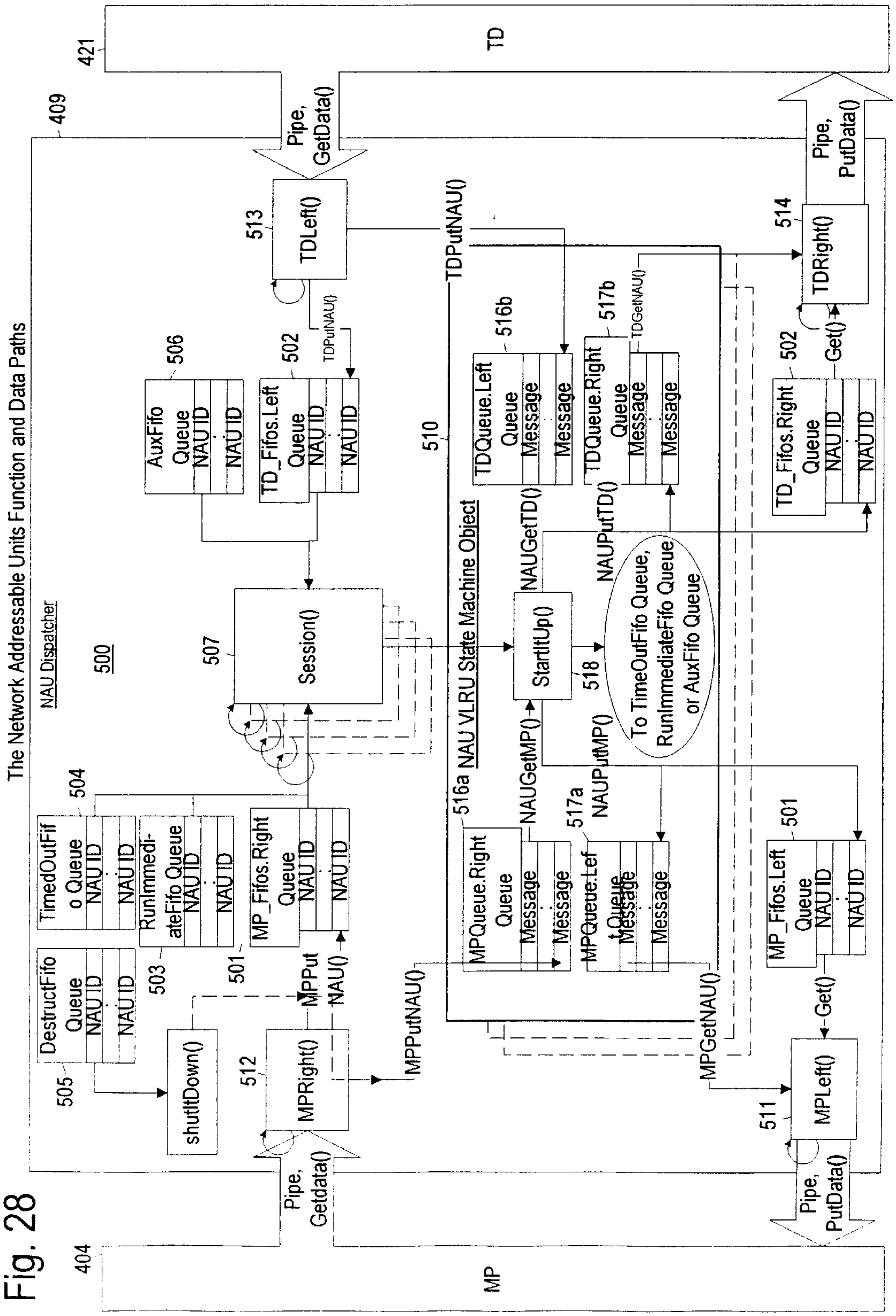
Figure 29:
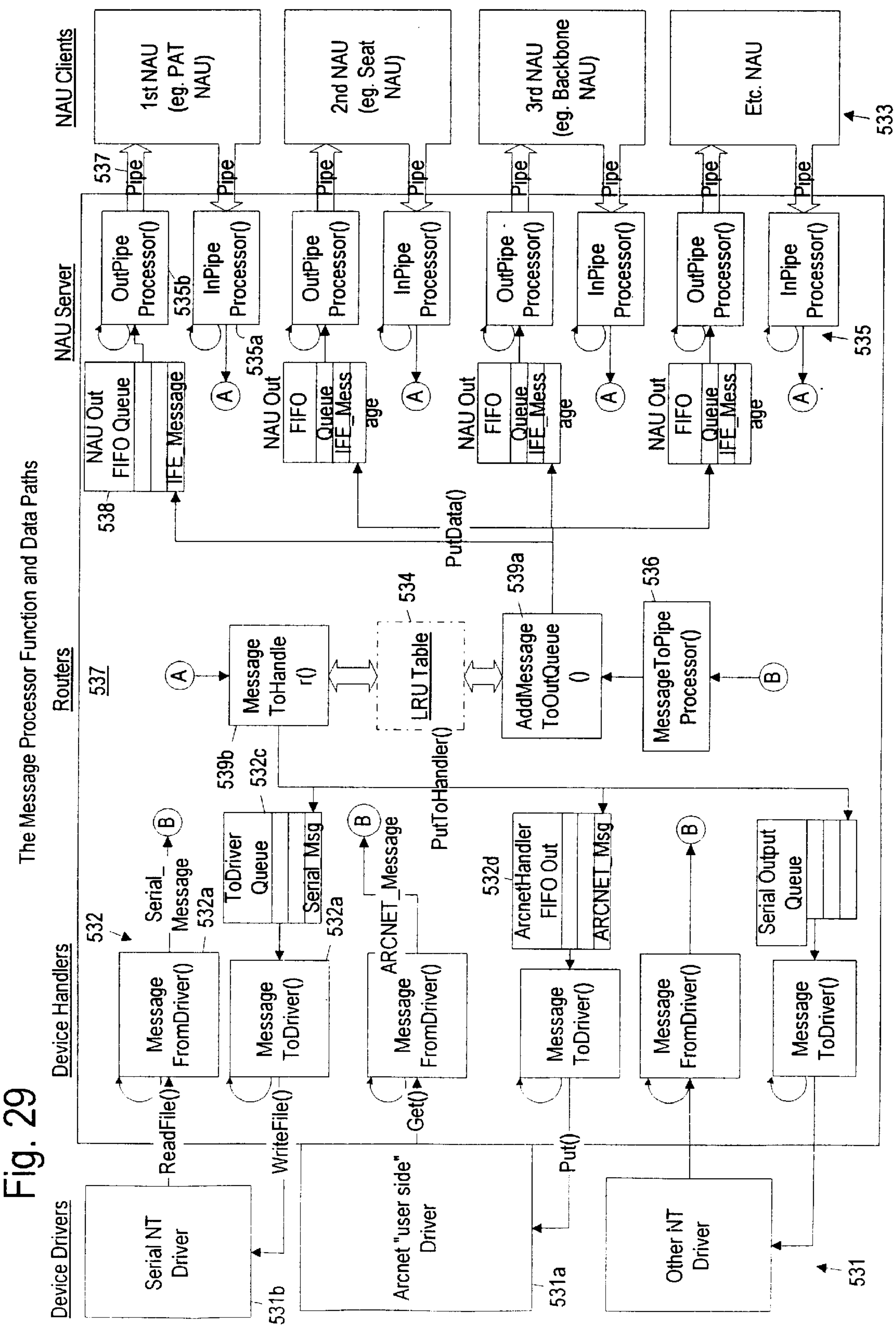
Figure 30:
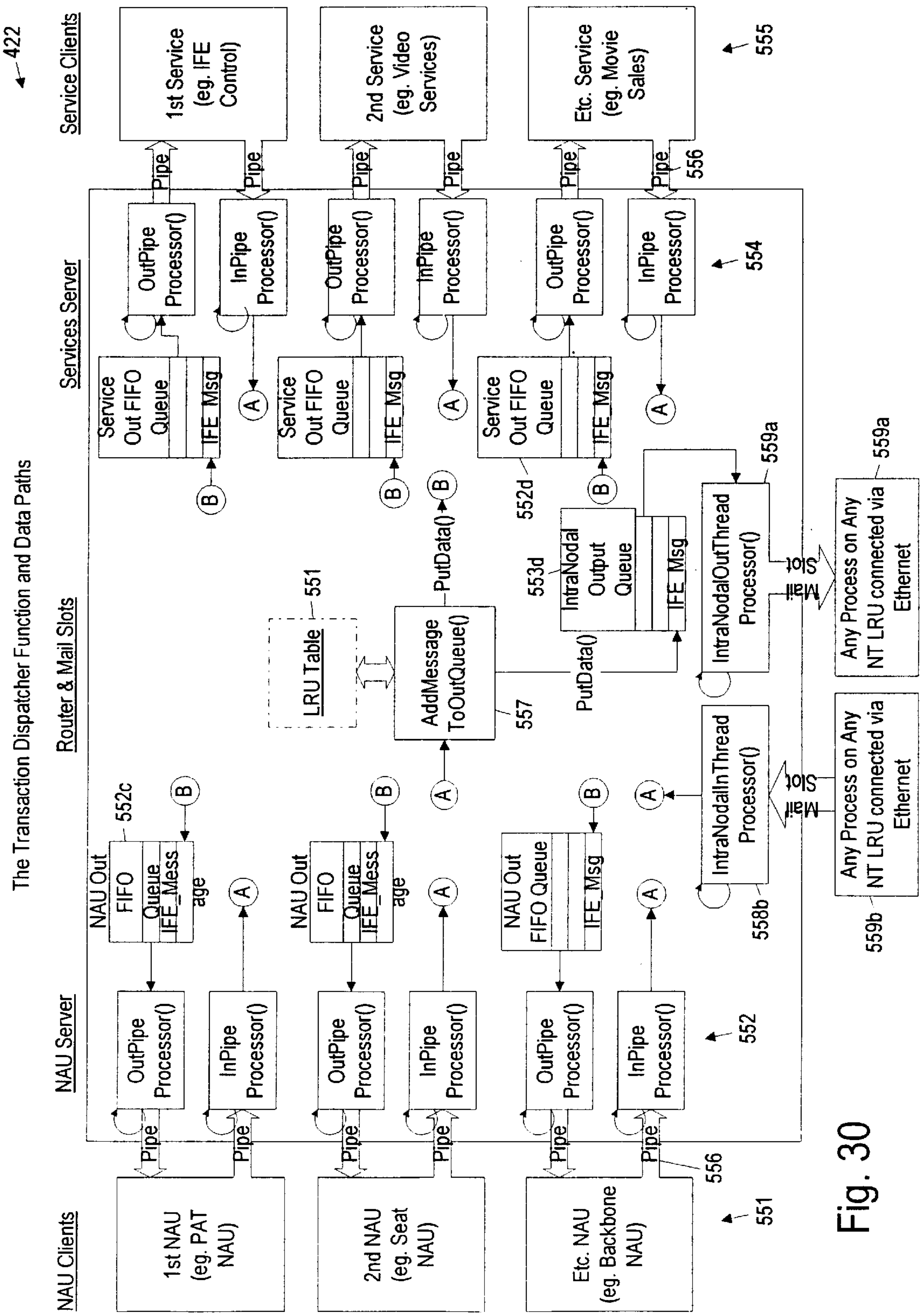
Figure 31:
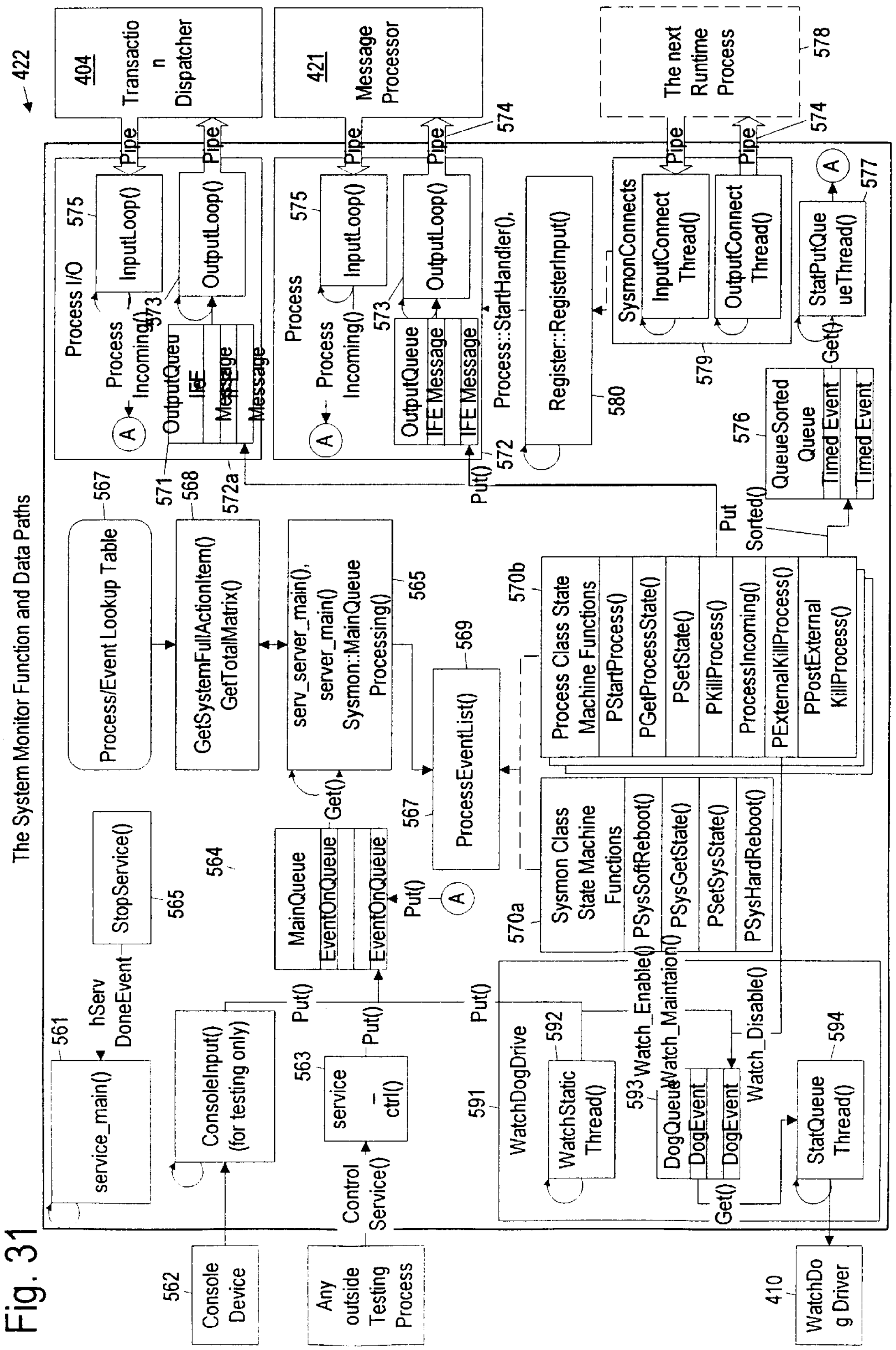
Figure 32:
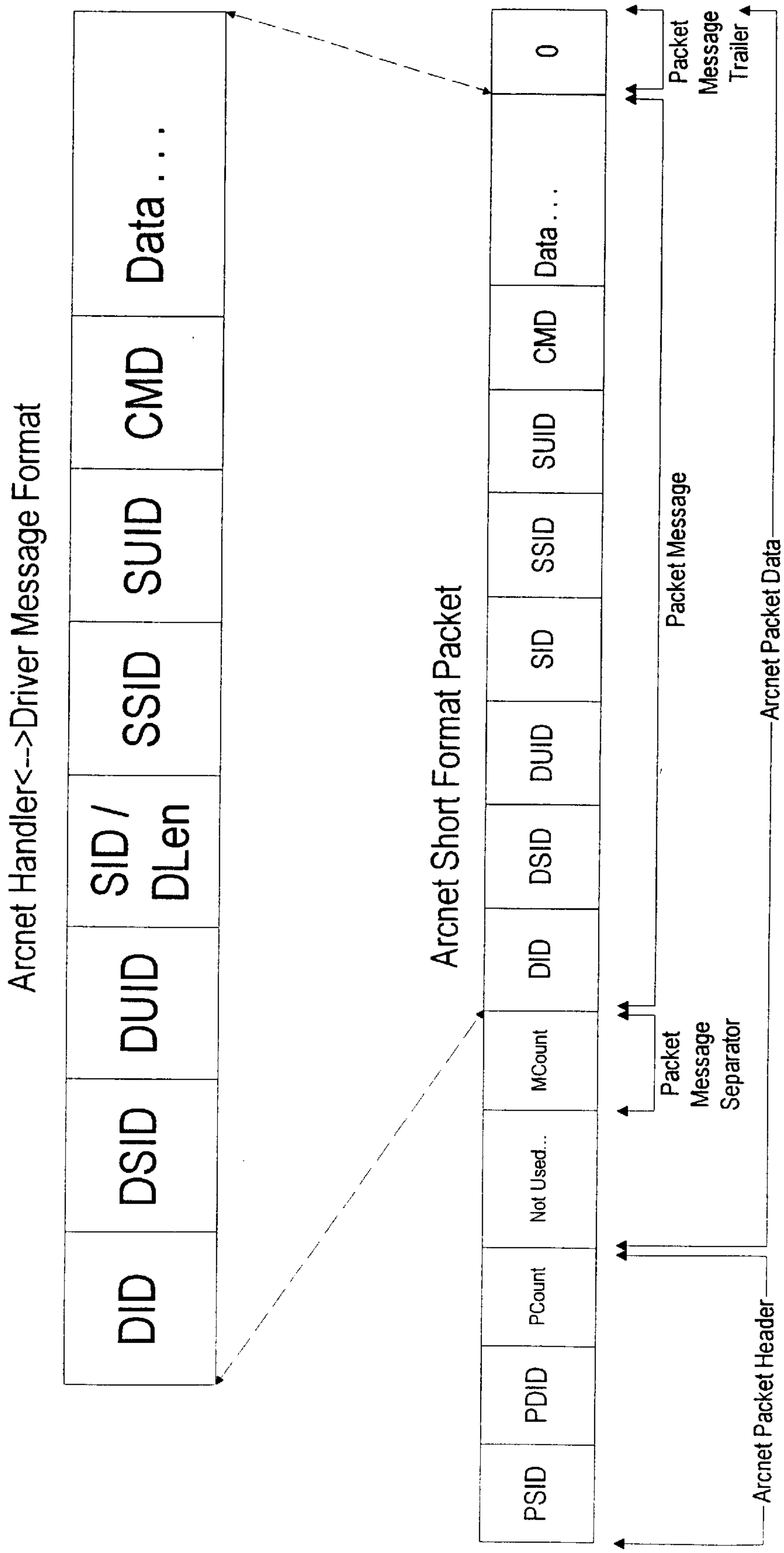
Figure 33:
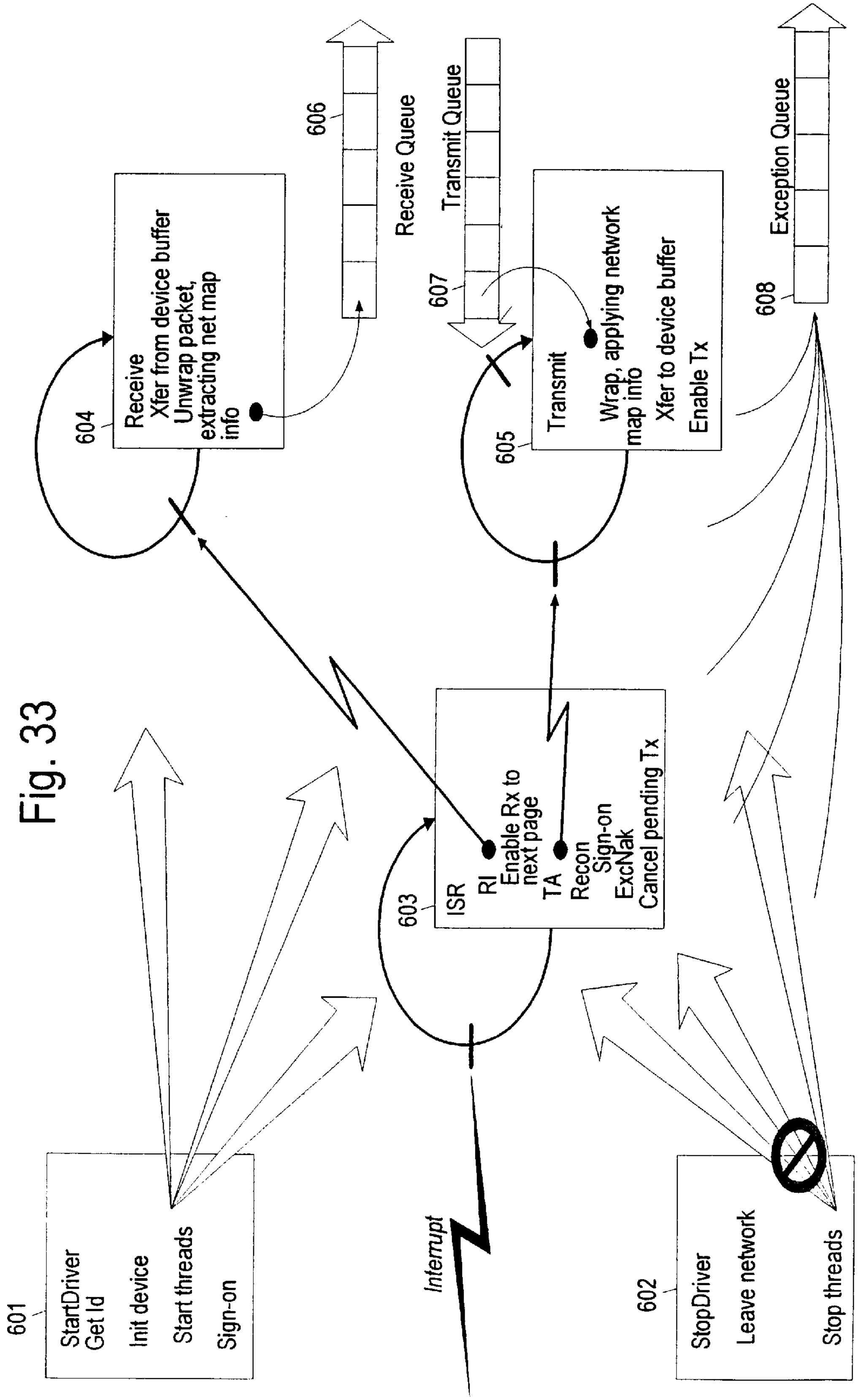
Figure 34:
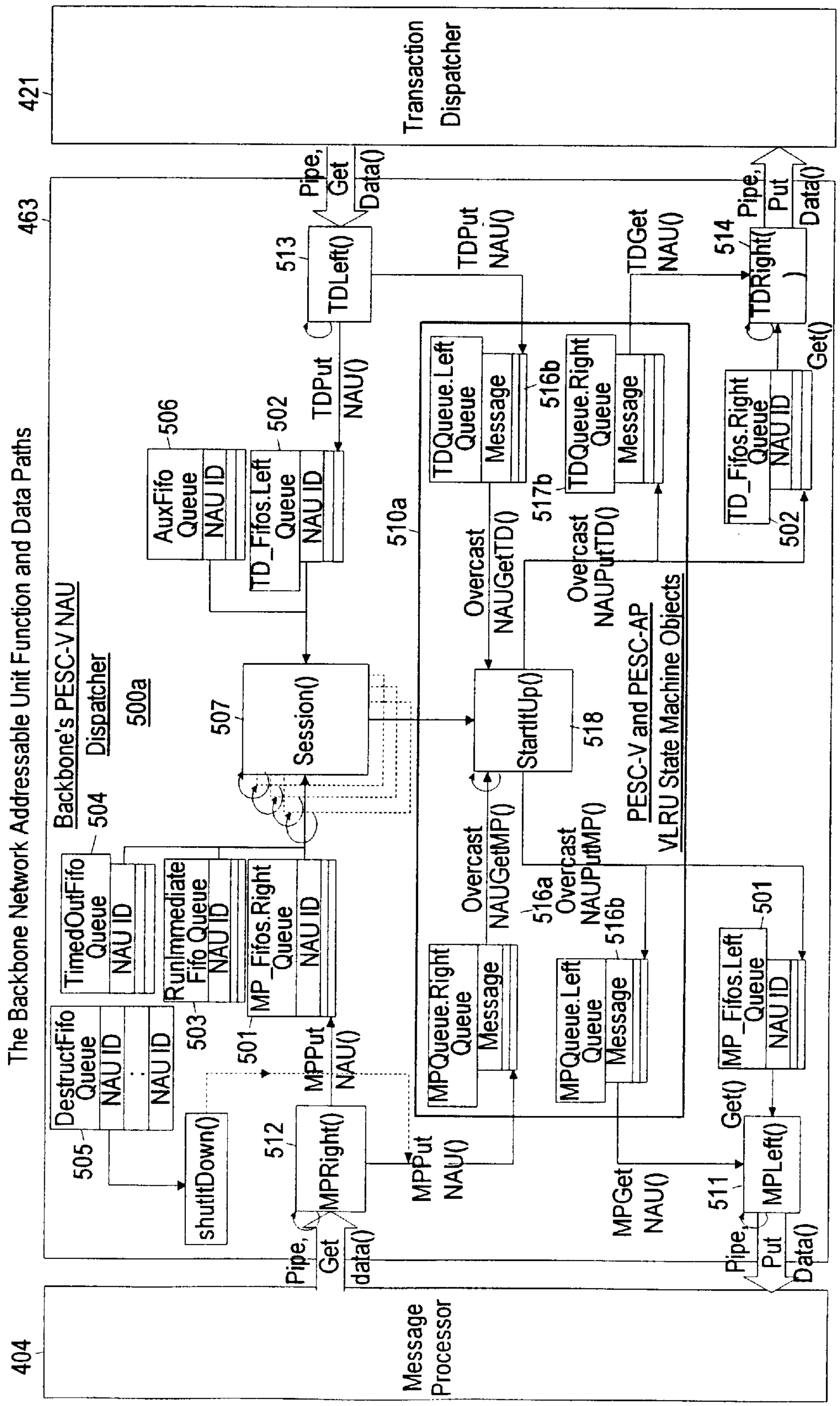
Figure 35:
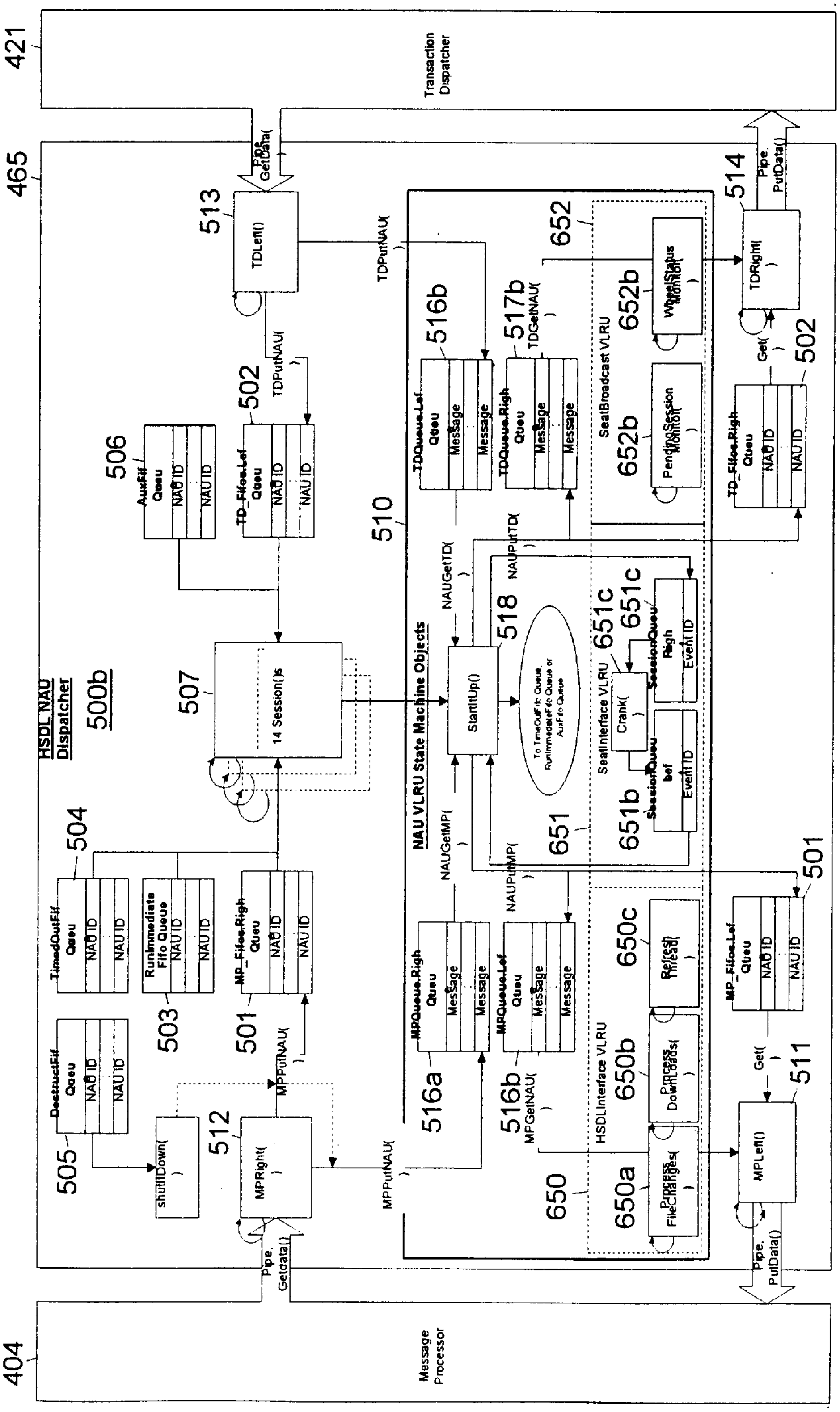
Figure 36:
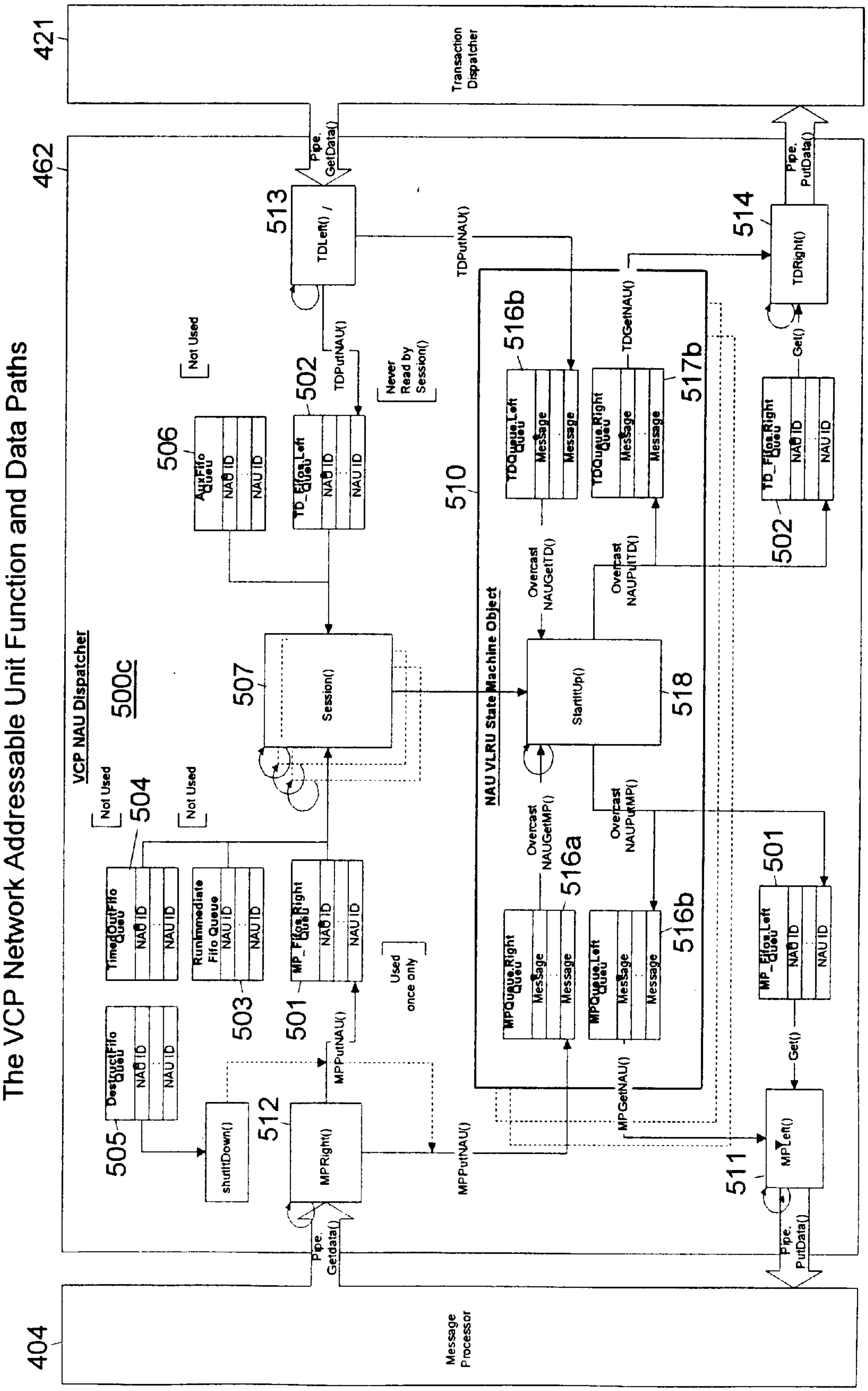
Figure 37:
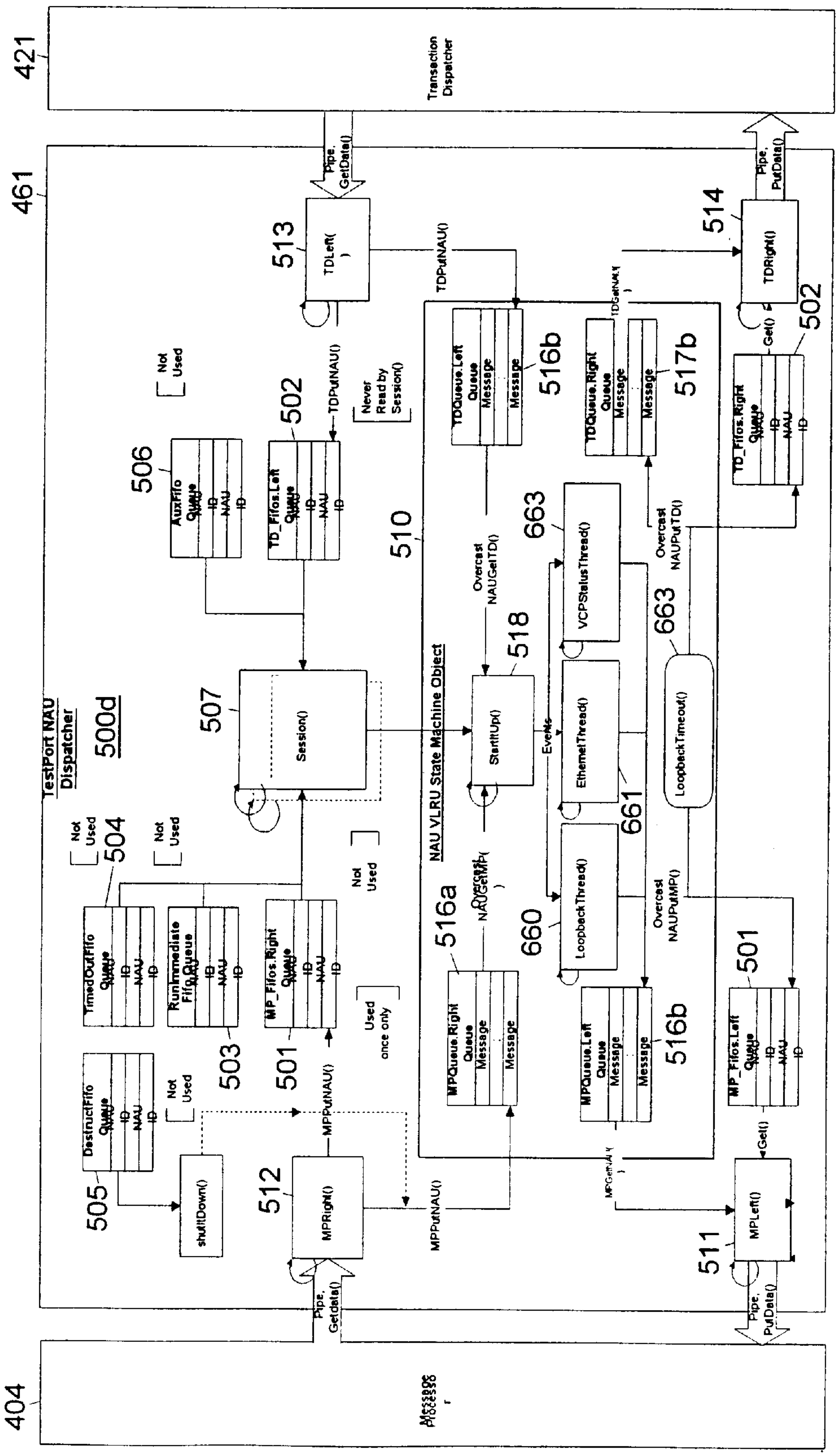
Figure 38:
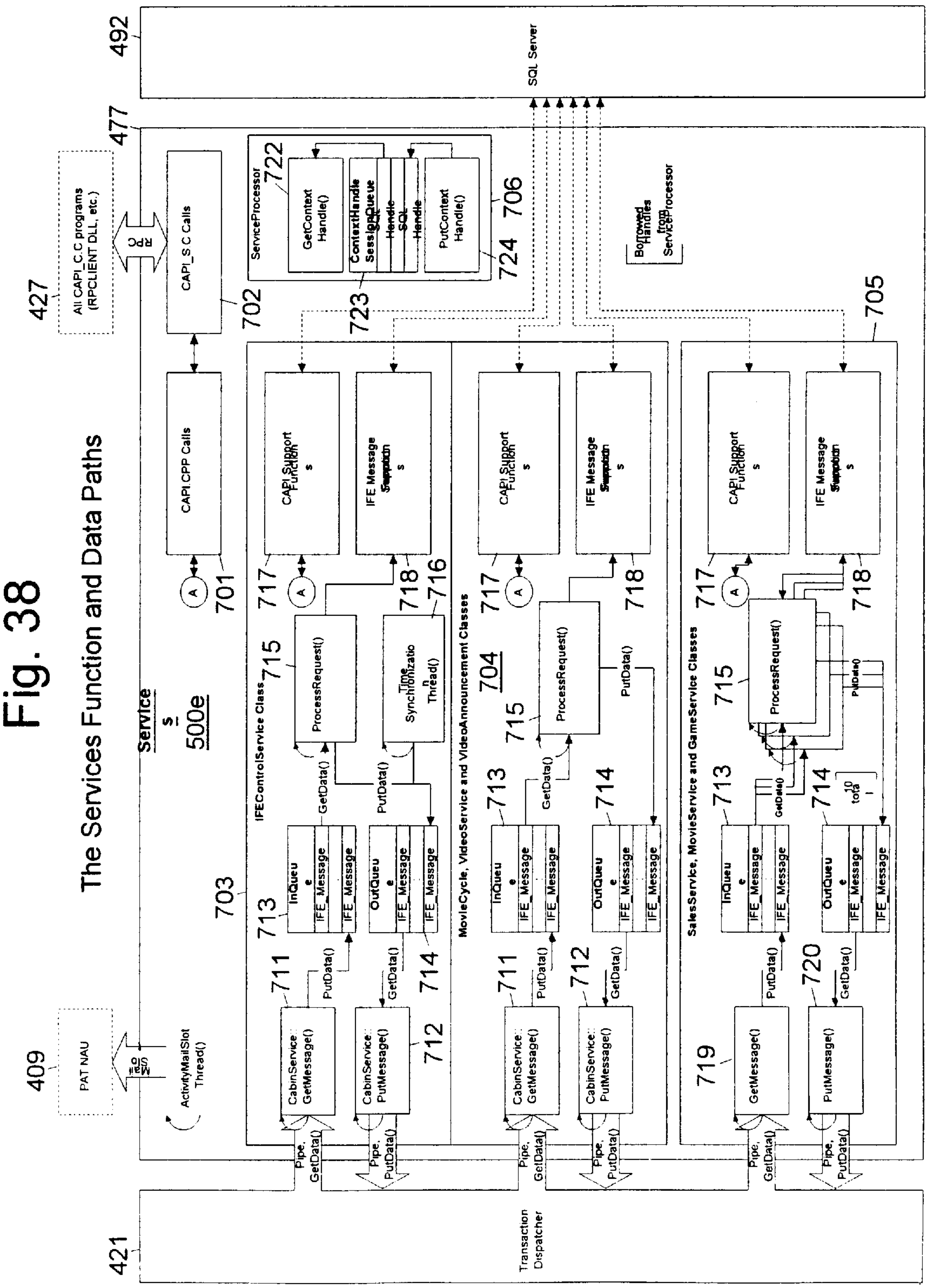
Figure 39:
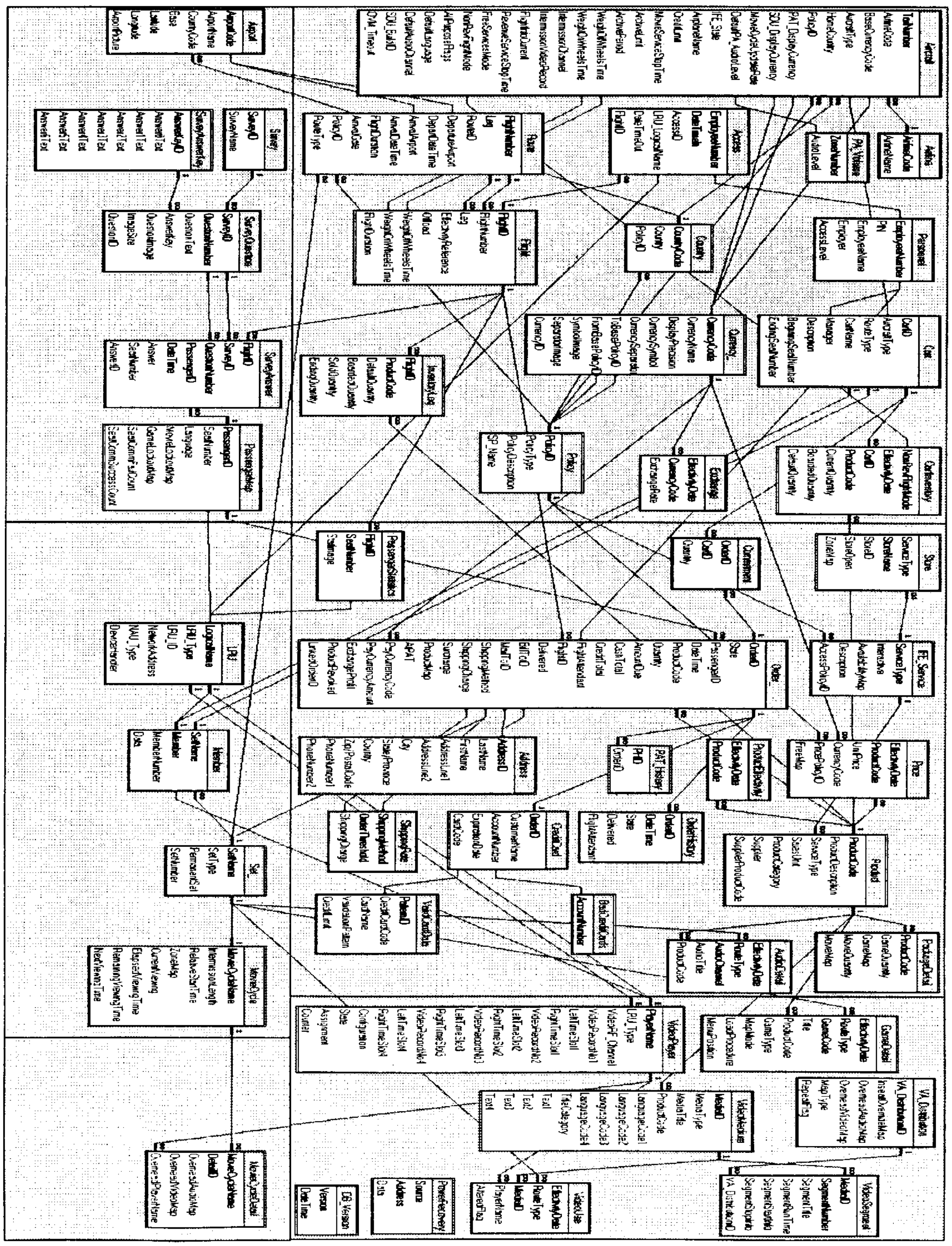
Figure 40:
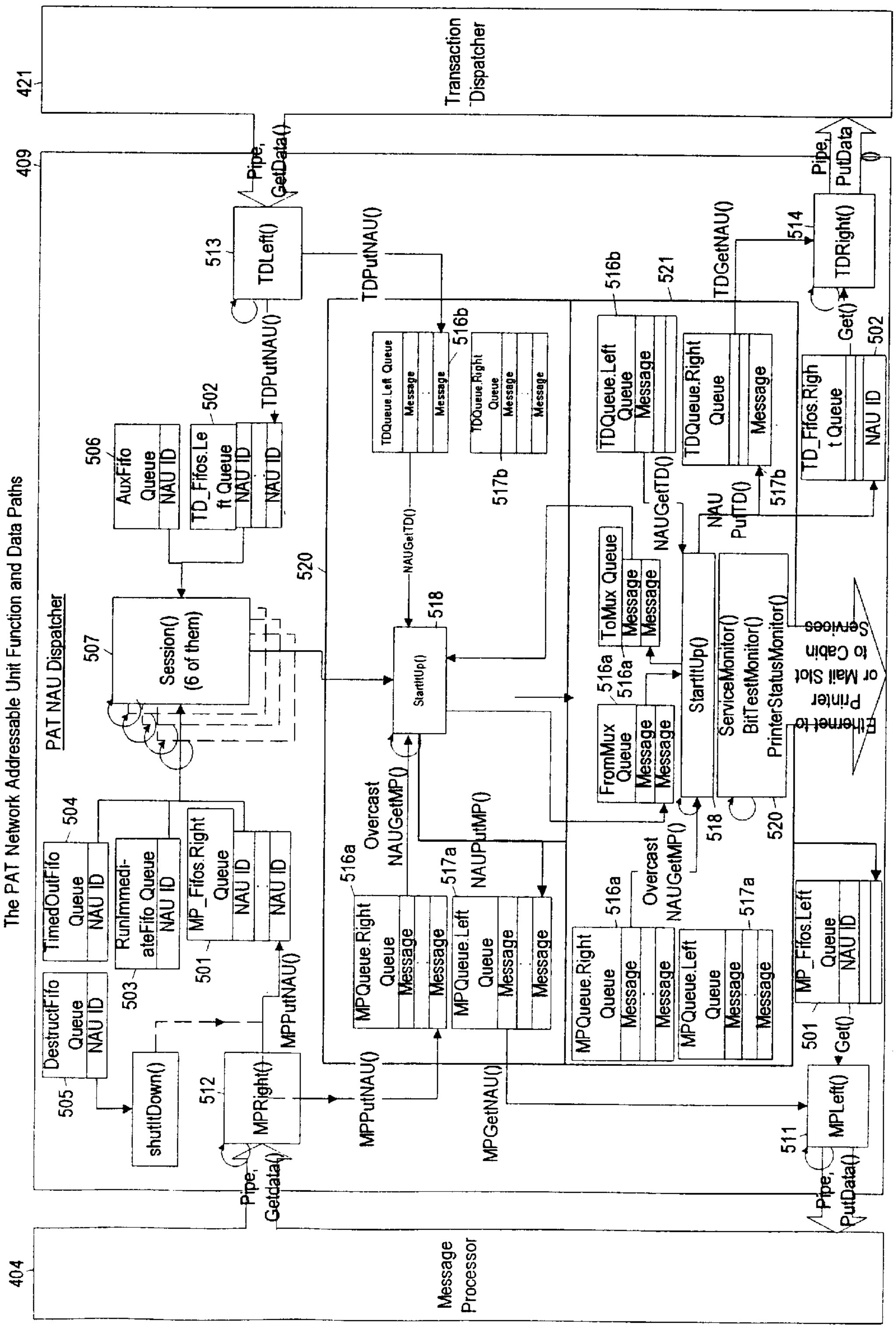
Figure 41:
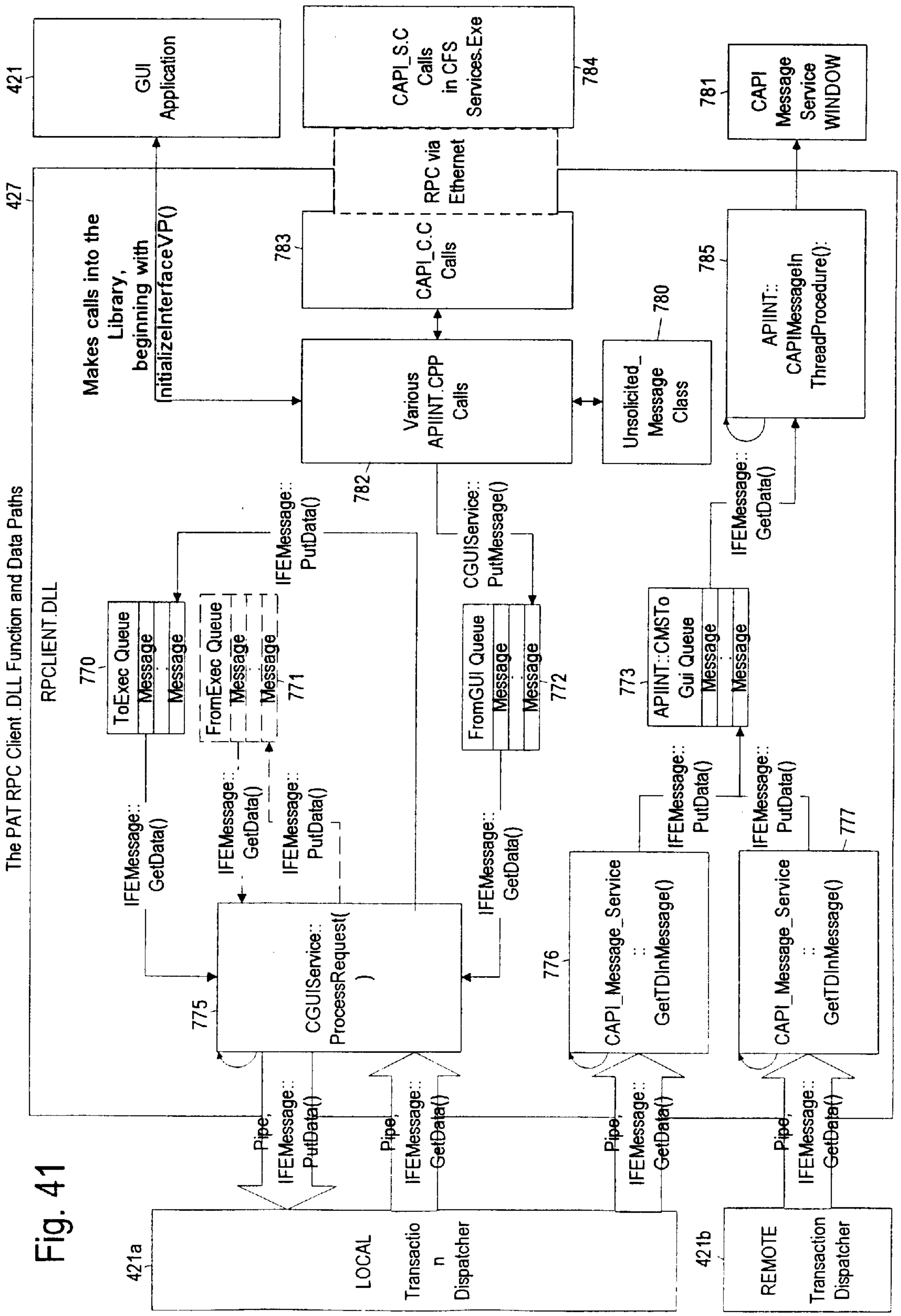

The CAPI (RPC Client) Library 427, or RPCLIENT.DLL 427, provides a means of communication between the graphical user interface 426 and the rest of the system 100. The RPC Client Library 427 is shown in FIG. 41. The RPC Client Library 427, or RPCLIENT.DLL 427, comprises a ToExec Queue 770, a FromExec Queue 771, a FromGUI Queue 773, and an APIINT::CMSToGui Queue 774. The ToExec Queue 770 and FromExec Queue 771 are coupled to transmit and receive CGUIService::ProcessRequest( ) threads 775. The FromGUI Queue 773 is coupled to transmit various APIINT.CCP calls 782 to the CGUIService::ProcessRequest( ) threads 775. The APIINT.CCP calls 782 are derived from CAPI_C.C Calls 783 that are routed by way of the Ethernet network 228 from CAPI_S.C calls 784 in the Services.exe program 477 running in the cabin file server 268. The CGUIService::ProcessRequest( ) threads 775 route messages to and from a local transaction dispatcher 421*a*. The APIINT::CMSToGui Queue 774 receives messages from the local transaction dispatcher 421*a* and from a remote transaction dispatcher 421*b*. Messages sent from the transaction dispatchers 421*a*, 421*b*, are forwarded to an APIINT::CAPIMessageInThreadProcedure( ): 785 which routes the messages to the CAPI Message Service Window 481.

The PAT GUI 426 cannot be communicated to via Named Pipes because it is a Windows application, and must therefore communicate using standard Windows messages. The CAPI Message Handler is a set of routines within the CAPI Library 427 which provides a bridge between the IFE messages and the GUI Windows application. Instead of communicating via Named Pipes directly with the GUI, Unsolicited Messages 780 utilize Named Pipes into a Message Service Window 780. In order for the GUI 426 to be able to receive them, it must have already opened or started a Window capable of receiving this type of message in the background using the appropriate CAPI Library calls.

Any Windows User Interface that needs to communicate with the transaction dispatcher(s) 421 of the primary access terminal 225 and/or cabin file server 268, or who needs to access the CAPI calls in the SERVICE.EXE program of the cabin file server 268 needs to link in and use the RPCLIENT.DLL library 427 which contains the following files:

APIINT.CPP Dllmain( ) and Visual Basic Application Interface Routines

CAPI_C.C The CAPI's RPC Client Support Routines

HOOKSDLL.C 'Canned' Dynamic Link Library 'glue' from Microsoft

CGUSRVCE.CPP Core Gui (CGUIService) Class (connects to TD)

CPMSSGSR.CPP CAPI_Message_Service Class

UNSLCTDM.CPP Unsolicited_Message Class

APIINT.CPP—The Application Interface's Interface

This is the interface between the graphical user interface 426 (GUI or Main Application) and the rest of the system 100. In order to connect to the rest of the system 100, InitializeInterfaceVB( ) must be called to establish communications with the transaction dispatcher(s) 421 and start CAPI_Message Service::GetTDInMessage( ) threads, which receive all unsolicited messages from the transaction dispatcher(s) 421.

I/O Threads

A call to StartMessageServiceVB( ) launches a thread, CAPIMessageInThreadProcedure( ) to continuously read and process unsolicited messages obtained from the CMSToGui Queue, supported by the CAPI_Message_Service class object.

GUI Application Calls

CAPI provides a comprehensive set of functions that allow the application to perform in the following functional categories:

| | | |
|---|---|---|
| CAPI Maintenance Functions | | |
| InitializeInterface | ReleaseInterface | |
| OpenCommunicationPath | CloseCommunicationPath | |
| Currency Functions | | |
| ConvertCurrency | GetFirstCurrency | GetNextCurrency |
| Flight Information Functions | | |
| SetIFEState | GetFirstRoute | GetNextRoute |
| GetRouteData | GetRouteDataFromFlightLeg | GetFirstAirport |
| GetNextAirport | GetAirportData | GetFirstCountry |
| GetNextCountry | GetFirstAircraft | GetNextAircraft |
| GetAircraftData | GetFirstLRU | GetNextLRU |
| GetLRUData | GetRemainingFlightTime | |
| Personnel and Access Functions | | |
| GetAccessData | GetFirstAccess | GetFirstPersonnel |
| GetNextAccess | GetNextPersonnel | GetPersonnelData |
| IsLoggedIn | LogPersonnelIn | LogPersonnelOut |
| Player and Media Functions | | |
| ChangeMovieCycleIntermissionTime | CommandPlayer | |
| GetFirstMovieCycle | GetFirstPlayer | |

-continued

| | | |
|---|---|---|
| GetNextMovieCycle | GetNextPlayer | |
| GetPlayerState | GetPlayerTypeFromName | |
| GetRemainingPlayerTime | GetVCPCount | |
| ReplaceMovieCyclePlayer | ReplaceVideoAnnouncementPlayer | |
| SetAnnouncementAudioLevel | SetMovieCycleUpdateRate | |
| SetPlayerSegment | SetVideoAnnouncementZone | |
| StartMovieCycle | StartVideoAnnouncement | |
| StopMovieCycle | StopVideoAnnouncement | |
| VideoPreview | | |
| Point of Sale Functions | | |
| CancelOrder | CloseSalesStore | CreateOrder |
| DeliverOrder | GetFirstCart | GetFirstCommitment |
| GetFirstOrder | GetFirstOrderHistory | GetFirstProduct |
| GetFirstProductServiceType | GetFirstStore | GetNextCart |
| GetNextCommitment | GetNextOrder | GetNextOrderHistory |
| GetNextProduct | GetNextProductServiceType | GetNextStore |
| GetOrderAddressData | GetOrderAddressIDs | GetOrderData |
| GetOrderDataEx | GetProductData | GetProductTitle |
| GetSalesStoreState | GetStoreData | OpenSalesStore |
| PayForOrder | PutAddressData | PutOrderAddressIDs |
| RefundOrder | UpdateOrderShippingInfo | |
| Set Functions | | |
| AddToSet | CreateSet | GetFirstSetMemberBySetName |
| GetFirstSetName | GetFirstSetType | GetNextSetMemberBySetName |
| GetNextSetName | GetNextSetType | IntersectionOfSets |
| TakeFromSet | UnionOfSets | |
| Survey Functions | | |
| GetFirstSurvey | GetFirstSurveyAnswer | GetFirstSurveyQuestion |
| GetNextSurvey | GetNextSurveyAnswer | GetNextSurveyQuestion |
| GetSurveyAnswerData | GetSurveyName | GetSurveyQuestionData |
| GetSurveyQuestionImage | StartSDUDatabase Process | |
| Unsolicited Message Service Functions | | |
| StartMessageService | StopMessageService | PauseMessageService |
| Video Preview Functions | | |
| FreezeVideoPreviewPicture | InitializeVideoPreview | |
| SetVideoPreviewColor | SetVideoPreviewWindowSize | |
| UnFreezeVideoPreviewPicture | | |

CAPI_C.C 783—RPC Client Support Routines

The CAPI_C.C file 783 contains routines called by the APIINT functions. These routines are RPC Client routines that are "glued" to the RPC Server routines found in the SERVICE.EXE file of the cabin file server 268. In this way, the GUI application 784 can remotely make calls inside SERVICE as if one of the SERVICE classes made the call. This is the preferred way the GUI 426 should access the database 493.

CGUSRVCE.CPP—CGUIService Class

Created by a call to either APIINT's SetPATTunerChannelsVB( ) or SetPATTunerAudioLevelVB( ) functions, the CGUIService class starts a thread called ProcessRequest( ) to route data from the GUI to the local transaction dispatcher 421.

CPMSSGSR.CPP—CAPI_Message_Service Class

Designed to support unsolicited messages, the CAPI_Message_Service Class is activated by the APIINT InitializeInterfaceVB( ) call. This creates the one CAPI_Message_Service class object used in the system. It then launches two threads, GetTDInMessage( ), to receive IFE Messages from a registered named pipe, one for each transaction dispatcher 421 (in the primary access terminal 225 and the cabin file server 268). These messages are routed to APIINT's CMSToGui Queue so that the APIINT CAPIMessageInThreadProcedure( ) can find and process them.

UNSLCTDM.CPP—Unsolicited_Message Class

The Unsolicited_Message Class 780 is a repository for unsolicited message data used by APIINT.CPP routines 782. It includes private data members and functions that get and put to those members. The custom drivers needed by the primary access terminal 225 are discussed below.

LCD Video—Hopkins VLCD-102

Control of the LCD video device is maintained via two tools, VIDEO.SYS (which is the actual hardware driver registered as "vlcd102") and VIDEO.DLL, which comprises the functions used by the application to work with the video driver for PC video functions. This driver was provided by Hopkins Industries to support the LCD video display, which must support both VGA output (for PC I/O) and composite video for video preview functionality.

VIDEO.DLL is comprised of the following source files:

V102.RT The Application Function Calls

12C.RT Routines for read and writing to the Phillips chips

These files are pre-processed with WinRT, and the following functions are made available to the application programmer:

| Function | Purpose |
|---|---|
| long PCV_FitVideo | Display a video window on the screen with the video scaled to fit in the |
| (long nX1, | window. |
| long nY1, | nX1, nY1 are screen coordinates for |
| long nSizeX, | upper left corner of window, |

-continued

| Function | Purpose |
|---|---|
| long nSizeY) | nSizeX, and nSizeY are the window extent. Returns: 0 always. |
| long PCV_FreezeVideo() | Freezes the video image. Returns: 0 always. |
| bool PCV_GetPreviewData (long *X, long *Y, long *XSize, long *YSize, long *Brightness, long *Contrast, long *Tint) | Returns the video preview settings in the provided variable addresses. See PCV_SetPreviewData(). Returns: TRUE always. |
| long PCV_Initialize() | Initializes all VLCD-102 components: Opening the "vlcd102" driver, initializing all the PC Video and Pixel registers, etc. Returns: 1 for success, 0 for failure. |
| long PCV_SetColor (short nColor, short nColorValue) | Adjust the brightness, contrast OR hue. nColor selects which color attribute is modified. nColorValue is the new color setting. Returns: 0 always. |
| bool PCV_SetPreviewData (long X, long Y, long XSize, long YSize, long Brightness, long Contrast, long Tint) | Establishes the video preview window, where X and Y are the starting coordinates, XSize and YSize are the height and width of the window, and Brightness, Contrast and Tint control those features. Returns: FALSE if failure. |
| long PCV_SetVideoFormat (short nFormat) | Chooses a video format based on nFormat: CF_PAL CF_NTSC or CF_SECAM. Returns: 0 always. |
| long PCV_UnFreezeVideo() | UnFreezes the video image. Returns: 0 always. |

The driver, VLCD102.SYS, is comprised of the following source files:

V102INIT.C Performs the initialization logic for the video chip.

V102_I2C.C Supports the I2C protocol and hardware.

VLCD102.C Handles the IOCTL support for this driver.

The system 100 is constructed in a modular framework, and is designed to expand to support various aircraft 111 configurations. System configuration information is defined in an off-line configurable database. System configuration support tools provide the capability to generate database information, which is downloaded to the appropriate system line replaceable units. The line replaceable units stores database information in non-volatile memory, and reverts to default database information when they detect newly downloaded data inconsistent with the physical aircraft configuration, or when a database download is unsuccessful.

Aircraft configuration data requires modification only when the aircraft configuration changes, or when the line replaceable unit in which it resides has been replaced or corrupted. Aircraft configuration data at a minimum includes the following fields: Aircraft type, ACS database configuration ID, Overhead system type, Seat configuration, tapping unit and Overhead monitor assignments, Reading/Call light assignment, Master call lamps/attendant chimes data, RF level gain values, Internal ARCNET termination, PA/VA headphone, APAX-140-to-TES interface assignments, PESC audio channel assignments, VMOD video channel assignments, ADB phone capability, ADB discretes, PA zone, display controller, configuration of passenger entertainment system controllers 224, interactive/distributed video only (DVO), PAT/CFS options, and movie preview.

The entertainment system data define specific parameters for the available system features. It is necessary to reload the database whenever it is determined the associated features are to be changed. Entertainment system data, at a minimum, includes the following fields: Entertainment system data configuration ID, Video games, Movies, Pay/Free entertainment per zone, Passenger surveys per zone, General service/Duty free zones, seat display unit 133 entertainment titles per route type, Currency exchange rates, primary access terminal display currency, Airline name, flight number, arrival/departure city, flight duration, and route type, Movie cycle attributes, Video announcements, video reproducer entertainment assignments, Product data, Credit card data, and Entertainment package details.

The off-line configuration database tools support generation of all downloadable configuration data. Airplane Configuration System (ACS) tools are used to generate aircraft configuration system data. The ACS tool is executable on an IBM-compatible 486 PC running Microsoft Windows 3.1 or a later version. The ACS tool produces downloadable data file on media that may be directly input via the primary access terminal 225 or a maintenance PC connected to a test port.

The entertainment system database tool produces downloadable data files on media that may be directly input via the primary access terminal 225. This tool is executable on any IBM-compatible 486 PC running Microsoft Windows 3.1 or a later version.

The system 100 also includes cabin file server Stand Alone Utilities, which are cabin file server resident tools that do not require the use of the primary access terminal 225 to operate. They are typically used during testing and system configuration.

The first tool is a Manual High Speed Downloader. DOWNLOAD.EXE is a utility that uses the high-speed download channel to force a file (typically the seat's application) to the seats 123 without the need of the cabin file server runtime environment. The DOWNLOAD.EXE utility uses an NT HSDL driver, and performs substantially the same functions as the HSDL VLRU in the seat NAU 465. This is discussed herein with reference to the cabin file server Executive Extensions Software Design.

The second tool is an Install Database Utility. In order to install a new database for a customer, CREATEDB.EXE is the main C++ executable file used to create the database. The database is created by a programmer in a development environment.

Figure 42A:
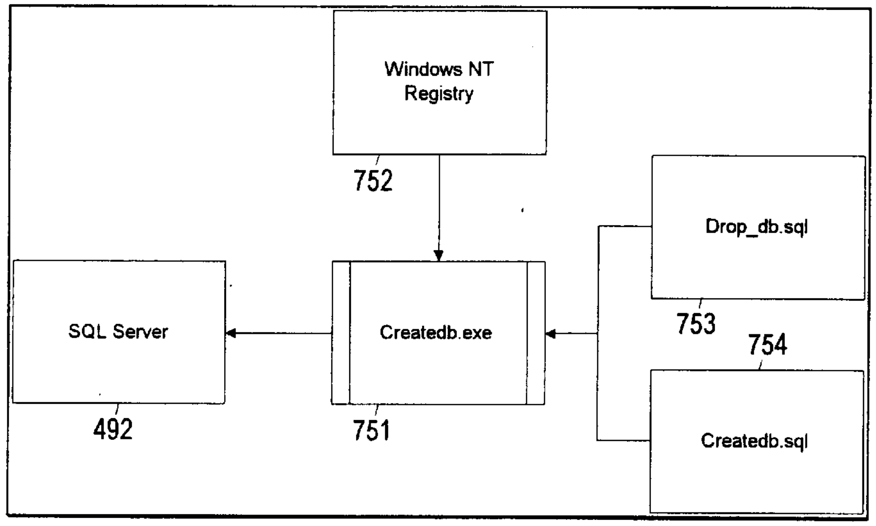
FIG. 42*a* illustrates the process of creating a CFS database on one device and a CFS transaction log on another device.

Referring to FIG. 42*a*, CREATEDB.EXE 751 executes an SQL script 753 (DROP_DB.SQL) to delete an existing cabin file server database 493 and cabin file server Transaction log as well as the database devices on which they reside. CREATEDB.EXE 751 then executes another SQL script 754 (CREATEDB.SQL) to create two database devices on the SQL Server 492. CREATEDB.SQL 754 then creates the cabin fileserver database 493 on one device and the cabin file server Transaction Log on the other device.

CREATEDB.EXE 751 is run as part of the system installation setup program. CREATEDB.EXE 751 locates createdb.sql 754 in a directory specified as the input path in the Windows NT Registry 752. The installation setup procedure adds the appropriate information (i.e., input path) to the NT Registry 752.

Figure 42B:
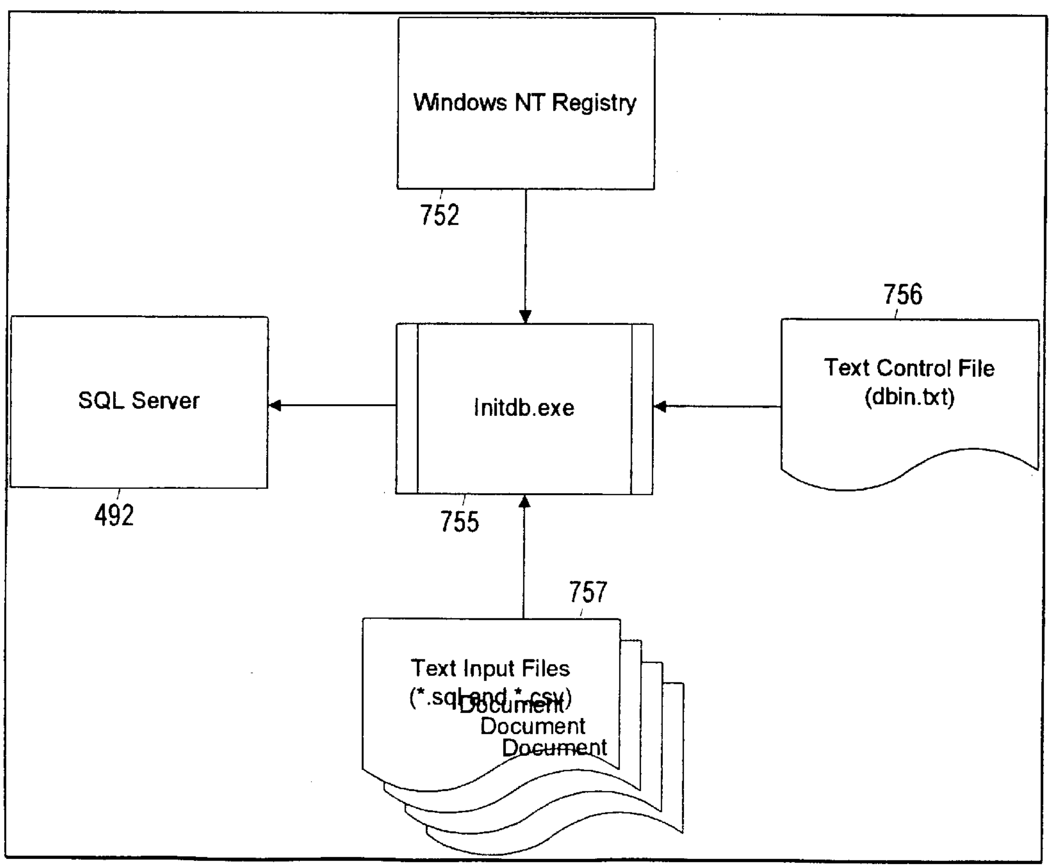
FIG. 42*b* illustrates the process of installing and updating the CFS database.

The third tool is an Install/Update Database Utility. INITDB.EXE 755 is the main C++ executable file used to initialize the database 493. It is created by the programmer in the development environment. INITDB.EXE 755 relies on the following files: Control file(s) to control the behavior of INITDB.EXE 755, and Comma separated variable file(s) 757 (.CSV files) and/or SQL script file(s) 757 (.SQL files) to create and populate the database structure. The process of installing and updating the cabin file server database 493 is illustrated in FIG. 42*b*.

INITDB.EXE 755 contains subroutines which are responsible for performing the actions specified in the control file. The control file dictates to initdb.exe 755 which command to perform on which object using which input file and which initdb subroutine. For example, when INITDB.EXE 755 encounters the following line in a control file, it knows to call upon its subroutine, Generic_Load, to Add the values found in AIRLINE.CSV to the Airline table.

| Command | Object Name | Filename | Load Procedure |
|---|---|---|---|
| Add | Airline | Airline.csv | GenericLoad |

INITDB.EXE 755 can be executed multiple times using different control files. If it is initiated by the setup program without a command line argument, it expects to perform the commands listed in a control file 756 DBIN.TXT. Otherwise, it performs the commands listed in whichever control file(s) is coded into the setup program as the command line argument for initdb.exe 755. INITDB.EXE 755 is run as part of the system installation setup program. INITDB.EXE 755 expects to locate the control file(s) and input file(s) in the directory specified as the input path in the Windows NT Registry 752. The installation setup procedure adds the appropriate information (e.g., input path) to the NT Registry 752.

The fourth tool is a Service Installer. HAIINST.EXE is a stand-alone utility based on a Windows NT program to install Windows NT Services to Windows NT groups. For example, this is used to install a System Monitor program as a Service.

Primary access terminal Runtime Utilities are programs which are used once per flight, either at the beginning or at the end. As a result, they are part of the application and are maintained along with the primary access terminal Executive Extensions.

An Archive Orchestrator, ARCHIVE.EXE, is the main C++ executable associated with archive orchestration. It runs on the primary access terminal 225 and is initiated by the PAT GUI 426 upon completion of a flight. Archive.exe is responsible for orchestrating the archival of the NT event logs to the cabin file server hard disk. The functionality of the Archive Orchestrator is discussed above in with reference to the Data Offload approach.

The primary access terminal 225 must perform certain coordinating functions prior to being able to operate with the cabin file server 268 successfully. A System Initializer establishes the cabin file server hard drives as shared devices with the primary access terminal 225, synchronizes its system date and time with the date and time of the cabin file server 268, and turns on the LCD's backlight so the user can see what's going on. The System Initializer, INITSYS.EXE, performs these functions at boot time. This program includes the source file INITSYS.CPP.

Primary access terminal Stand Alone Utilities are PAT-resident utilities that are needed between runtimes (i.e., between flights). They are used by Service Personnel to manage data and system behavior.

A Data Offloader is provides so that specific data is offloaded from the aircraft 111 for the purpose of revenue collection and system performance evaluation. At the end of each flight, the NT event logs are archived on the cabin file server hard disk.

Passenger Statistics information, passenger survey results, and Transaction records are stored in the cabin file server database 493 for later retrieval.

This database information is stored for up to forty flight legs. The number of flight legs is stored in the FlightID field of the Flight table. FlightID is simply a counter which is incremented after each flight. The Data Offload approach discussed previously describes the Data Archival, Data Offload and Disk Space Management processes.

The following paragraphs describe the additional functionality associated with the Data Offload process, in the utility OLUTIL.EXE.

The flight number for a test flight always begins with a "9". This enables a custom trigger, FLIGHT_ITRIG.SQL, to purge just test flight data (i.e., flights beginning with a "9") from the database at the beginning of a subsequent flight. The purge is automatically performed at the beginning of the next flight rather than at the end of the test flight so that the information can remain in the database long enough to offload the data for trouble-shooting purposes but not so long that credit card data may be compromised. However, if the Data Offload process is manually initiated at the end of the test flight, then the test flight data is purged at this time.

Archived data (i.e., previous flight leg) can be off-loaded on a per-flight basis. All credit card transaction data is encrypted using PKZIP. EXE (an industry-standard third-party file-compression utility). PKZIP was chosen because it provides excellent file compression ratios and allows for password encryption of the compressed data.

At the start of each flight, the Offload field in the Flight table for the specific flight is initialized to one. Once a particular flight has been off-loaded, the Offload field in the Flight table is set to zero (i.e., flight data is tagged). It is possible to automatically specify the off-load of all non-tagged data (i.e., all flights with Offload field set to one). It is also possible to manually specify the off-load of data for a specific flight.

An operator is able to disable the Watchdog driver 410. DISWDOG.EXE is used to disable the hardware Watchdog by issuing an IOCTL Disable command to the Watchdog Driver 410.

Thus, systems, methods and articles of manufacture have been disclosed that provide for a networked passenger entertainment system that integrates audio, video, passenger information, product ordering and service processing, communications, and maintainability features, and permits passengers to selectively order or request products and services, receive video, audio and game data for entertainment purposes, and communicate with other passengers and computers on- and off-board the aircraft, and which thereby provides for passenger selected delivery of content over a communication network. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

| GLOSSARY | |
|---|---|
| Domestic Flight | Any flight in which the originating, destination, and intermediate airports (for a country flight with multiple flight legs) are all in the same country. |
| Distributed Video Only (DVO) Mode | A system mode of operation that allows passenger selection of audio and video programs via the PCU, and video only programs via the SDU touchscreen. No game capability. May also be called 'basic' mode. No CFS to provide interactive entertainment/passenger service capability. |
| Download | The process of loading configuration data (e.g., database) into a LRU. |
| Failure | Any deviation beyond the limits of acceptance or any discontinuance of operation causing inability to accomplish the intended function. |
| Flight | An end-to-end trip from one airport to another, possibly consisting of multiple flight legs |
| Flight Leg | Any flight from one airport to another. |
| Free Movie/ Free Game Mode | A system mode of operation that allows one or more passengers access to movies and/or games without requiring collection of payment for these services. Airline personnel may authorize these free services in exchange for coupons, or as compensation for passenger inconvenience. |
| Interactive Mode | A system mode of operation that allows selection of audio, video and game programs via menus displayed at the seat. The CFS provides interactive entertainment/passenger service capability |
| Irrelevant Failure | Any component failure directly attributed to failure of customer flight personnel or maintenance technicians to follow Rockwell Collins operating or maintenance procedures. Any failure of a component that has not been updated to the latest configuration and for which the need for removal is directly attributed to the lack of updating. |
| Memory Margin | Memory margin is equal to (M − U)/M, where M = total installed memory and U = amount of memory used. |
| Overseas Flight | Any flight where the originating and destination airport are in different countries. |
| Passenger Service Functions | Passenger-to-Attendant calls, Passenger reading light control. |
| Program | The process of loading application software into an LRU. |
| Reconcile | The process of informing the system the products ordered by a passenger have been delivered to that passenger. |
| Tailorable | A system feature/function may be provided by making source code adjustments. |
| Useful Life | The length of time a population of items is expected to operate with a constant failure rate, excluding any infant mortality and wear out periods. |
| Head End | The central originating point of all signals carried in an RF distribution network. |
| Weight-Off-Wheels | An event corresponding to the time the aircraft weight is removed from the wheels upon takeoff. |
| Weight-On-Wheels | An event corresponding to the time the aircraft weight is restored to the wheels upon landing. |
| Video Announcement | An announcement taking video and optional audio from any source and routing it to the passengers via in-seat, overhead, and/or PA. |
| Video Reproducer | A generic term, including video cassette players and other devices, that produce video outputs from storage media. |
| Movie Cycle | Multiple predetermined sequences of movies/programs to be shown. |
| System State | Operational condition that applies to the entire system. |
| LRU State | Operational condition that applies to a specific LRU or group of LRUs, but not necessarily the entire system. |
| System Mode | The system can operate in one or more modes in each system state. Some modes can be used to provide work around functionality to compensate for failures of system components. |

Abbreviations and Acronyms

ACS Aircraft Configuration System
ADB Area Distribution Box
ADC AC to DC
ALAC Area Distribution Box—LAC Interface Box
APAX Advanced Passenger Entertainment System
API Application Programming Interface
AR Audio Reproducer
ARCNET 1.25 Mbps serial interface Communication Network
ARINC Aeronautical Radio Inc.
ASA Airline Seat Availability
ATP Acceptance Test Procedure
AVU Audio-Video Unit
BFE Buyer Furnished Equipment
BIT Built-In Test
BITE Built-In Test Equipment
bps bits per second
Brick the PAT Power Supply
CAPI Core Application Program Interface
CFS Cabin File Server
CIDS Cabin Intercommunication Data System
CMC Centralized Maintenance Computer
CPU Central Processing Unit
CTU Cabin Telecommunications Unit
DAC DC to AC
dB decibel
dBm decibel relative to 1.0 milliwatts
DBS Direct Broadcast Satellite
DU Display Unit
DUC Display Unit, Console
DUS Display Unit, Seat
EDSD Electrostatic Discharge Sensitive Devices
EPCU Enhanced Passenger Control Unit
ESD Electro-Static Discharge
ETM Elapsed Time Meter
FA Flight Attendant
FDB Floor Disconnect Box
FJB Floor Junction Box
FSA Flight-leg Seat Availability
GUI Graphical User Interface
HAI Hughes-Avicom International
Hz Hertz
IFE In-Flight Entertainment
LAC Local Area Controller
LED Light Emitting Diode
LCD Liquid Crystal Display
LOPA LayOut of Passenger Arrangement
LRU Line Replaceable Unit
MCDU Multi-purpose Control Display Unit
MTBF Mean Time Between Failures
MTBUR Mean Time Between Unscheduled Repair
mV millivolt
NBS National Bureau of Standards
NTSC National Television System Committee
OEB Overhead Electronics Box
PA Passenger Address
PAT Primary Access Terminal
PC Personal Computer
PCM Pulse Code Modulation
PESC Passenger Entertainment System Controller
PCU Passenger Control Unit
PSS Passenger Service System
PESC-A Passenger Entertainment System Controller-Audio
PESC-V Passenger Entertainment System Controller-Video
PFIS Passenger Flight Information System
PVIS Passenger Video Information System
PIN Personal Identification Number
PSU Passenger Service Unit
PVIS Passenger Video Information System
PVM Performance Verification Matrix
RF Radio Frequency
RS-232 serial interface protocol
RS-422 serial interface protocol RS-485 serial interface protocol
RTCA Requirements and Technical Concepts for Aviation
SCC Seat Controller Card
SDU Seat Display Unit
SEB Seat Electronics Box
SIF Standard InterFace
SNR Signal to Noise Ratio
SVHS Super VHS
SVT System Verification Test
TBD To Be Determined
TES Total Entertainment System
TRR Test Readiness Review
TU Tapping Unit
UEB Underseat Electronics Box
UPCU Universal Passenger Control Unit
UPS Uninterruptable Power Supply
VA Video Announcement
VAC Volts AC
VCC Video Control Center
VCR Video Cassette Reproducer
VCP Video Cassette Player
VCU Video Control Unit
VEP Video Entertainment Player
VHS Video Home System
VMOD Video Modulator
VOD Video On Demand
VR Video Reproducer
VTP Video Tape Player
VTR Video Tape Reproducer
ZMU Zone Management Unit While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by letters patent is:

1. A passenger entertainment system comprising a plurality of line replaceable units for performing entertainment and passenger and operator control functions, a primary access terminal for providing an operator interface to the passenger entertainment systems, and a cabin file server for processing passenger transactions said primary access terminal and said cabin file server each having a control center common executive said control center common executive further comprising:

a message processor for moving messages to and from the line replaceable units and for translating messages from the line replaceable units into a common format;

one or more network addressable units connected to the message processor for routing common format messages to and from the message processor; and a transaction dispatcher connected to the one or more network addressable units wherein said transaction dispatcher further comprises:

a network addressable unit server that interfaces to one or more network addressable units and manages communication to and from the network addressable units;

a services server that interfaces to one or more service clients that provides services of the passenger entertainment system and manages communication to and from the service clients; and a router and mail slots for identifying each of the network addressable units and service clients and for moving messages between the network addressable units and the service clients.

2. The passenger entertainment system of claim 1 wherein the router and mail slots comprise a lookup table and wherein data comprising a network routing address and a physical device type are used to access the lookup table to determine the destination for a message.

3. The passenger entertainment system of claim 1, wherein the network addressable unit server and the client server respectively interface to the network addressable units and service clients by way of named pipes.

4. The passenger entertainment system of claim 1, wherein the transaction dispatcher further comprises intranodal thread processors that route messages through mail slots between the line replaceable units and the one or more service clients to route services of the passenger entertainment system to the line replaceable units.

5. The passenger entertainment system of claim 3 wherein the router and mail slots further comprises an add message to out queue that receives messages from input pipes and sends the message to a network addressable unit.

6. The passenger entertainment system of claim 3 wherein the router and mail slots further comprises an add message to out queue that receives messages from input pipes and sends the message to a service client.

7. A system for controlling a passenger entertainment system, including a primary access terminal for providing an operator control interface to the system and for managing communication over a network between the primary access terminal and a plurality of physical devices to control one or more services of the passenger entertainment system, said primary access terminal comprising:

a transaction dispatcher said transaction dispatcher further comprising:

a network addressable unit server that interfaces to one or more network addressable unit clients and manages communication therefrom and thereto;

a services server that interfaces to one or more service clients that provide the services of the passenger entertainment system and manages communication therefrom and thereto; and a router and mail slots for identifying each of the network addressable unit clients and service clients that moves messages between the network addressable unit clients and the service clients; and a graphical user interface (GUI) for controlling the system and generating and receiving GUI format messages; and a cabin applications programming interface (CAPI) library that provides an interface between the graphical user interface and the transaction dispatcher for transferring GUI format messages and common format messages.

8. The system as recited in claim 7, wherein the router and mail slots comprise a lookup table and wherein data comprising a network routing address and a physical device type are used to access the lookup table to determine the ultimate destination for a message.

9. The system as recited in claim 7 wherein the CAPI library receives operator request messages from the graphical user interface and provides the operator request messages to the service clients.

10. The system as recited in claim 7, further comprising a cabin file server said cabin file server further comprising:

a database server having a database containing information relating to the services offered by the system; and the service clients that communicate queries from the transaction dispatcher relating to the services offered by the system to the database server to retrieve information defining the selected product or service and generating an appropriate response to requests from passenger seats.

11. The system as recited in claim 7, wherein the network addressable unit server and the services server respectively interface to the network addressable unit clients and service clients by way of named pipes.

12. The system as recited in claim 7, wherein the transaction dispatcher further comprises intranodal thread processors that route messages through mail slots between processes on the physical devices and the one or more service clients to route services of the passenger entertainment system to the processes on the physical devices.

13. A method for enabling a primary access terminal having a graphical user interface (GUI) and a cabin applications interface library to manage communication over a network between the primary access terminal and a plurality of physical devices said primary access terminal comprising one or more network addressable unit clients, one or more service clients and a transaction dispatcher said primary access terminal performing the steps of:

managing communications between a network addressable unit server in the transaction dispatcher and the one or more network addressable units;

managing communications between a services server in the transaction dispatcher and the one or more service clients that provide services of the passenger entertainment system;

identifying each of the network addressable unit clients and service clients with a router and mail slots in the transaction dispatcher;

moving messages between the network addressable unit clients and the service clients with the router and mail slots;

controlling the passenger entertainment system with the graphical user interface that generates and receives GUI format messages; and providing an interface between the graphical user interface and the transaction dispatcher with the cabin applications interface library that transfers GUI format messages and common format messages.

14. The method as recited in claim 13 further comprising the steps of:

receiving operator request messages from the graphical user interface through the cabin applications programming interface library;

providing the operator request messages to the service clients;

communicating the operator request messages to a database server;

retrieving information relating to services from a database; and generating an appropriate response to the operator request.

15. The method as recited in claim 13, wherein the network further comprises a cabin file server said cabin file server performing the steps of:

receiving a common format message that is a passenger transaction message from the transaction dispatcher;

providing the passenger transaction to a service client;

communicating the passenger transaction to a database server;

retrieving information relating to services from a database; and generating an appropriate response to the passenger transaction.

16. The method as recited in claim 13 further comprising the steps of routing messages from and to the one or more network addressable unit clients and the one or more service clients through input named pipes and output named pipes.

17. The method as recited in claim 13 further comprising the steps of:

accessing a lookup table in the router and mail slots with data comprising a network routing address and physical device type; and determining an ultimate destination for a message.

18. The method as recited in claim 3, wherein the transaction dispatcher further comprises intranodal thread processors said intranodal thread processors routing messages between processes on the physical devices and the one or more service clients to route services of the passenger entertainment system to the processes on the physical devices.

* * * * *